United States Patent
Zhu et al.

(10) Patent No.: US 12,526,818 B2
(45) Date of Patent: Jan. 13, 2026

(54) DETERMINING A REFERENCE PDCCH CANDIDATE

(71) Applicant: Samsung Electronics Co., Ltd., Suwon-si (KR)

(72) Inventors: Dalin Zhu, Richardson, TX (US); Emad N. Farag, Flanders, NJ (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 414 days.

(21) Appl. No.: 18/162,677

(22) Filed: Jan. 31, 2023

(65) Prior Publication Data

US 2023/0262727 A1 Aug. 17, 2023

Related U.S. Application Data

(60) Provisional application No. 63/309,899, filed on Feb. 14, 2022, provisional application No. 63/311,776, (Continued)

(51) Int. Cl.
*H04W 72/232* (2023.01)
*H04W 72/044* (2023.01)

(52) U.S. Cl.
CPC ....... *H04W 72/232* (2023.01); *H04W 72/046* (2013.01)

(58) Field of Classification Search
CPC ............. H04W 72/232; H04W 72/046; H04W 72/0446; H04W 72/1273; H04W 72/21;
(Continued)

(56) References Cited

U.S. PATENT DOCUMENTS

2019/0260524 A1    8/2019   Nam et al.
2020/0119869 A1    4/2020   Taherzadeh Boroujeni et al.
(Continued)

FOREIGN PATENT DOCUMENTS

WO          2021163408 A1    8/2021
WO    WO-2022091032 A1 *   5/2022  ............. H04B 7/024

OTHER PUBLICATIONS

Qualcomm "Discussion Summary for mTRP PDCCH Reliabliby Enhancements", Apr. 20, 2021, Section 2.4 TCI field not present (Issue 2), p. 5 (Year: 2021).*

(Continued)

*Primary Examiner* — Ian N Moore
*Assistant Examiner* — Latresa A McCallum

(57) ABSTRACT

Apparatuses and methods for beam indication and repetition in a wireless communication system. A method for operating a user equipment (UE) includes receiving a first physical downlink control channel (PDCCH) candidate and a second PDCCH candidate including first and second beam indication downlink control information (DCI), respectively; receiving higher layer radio resource control (RRC) signaling including a parameter indicating a linkage between the first and second PDCCH candidates. The method further includes identifying information related to a reference PDCCH candidate; identifying, based on the parameter, that the first and second beam indication DCI include at least a same set of TCI states; and determining, based on the information, the reference PDCCH candidate from the first and second PDCCH candidates.

18 Claims, 7 Drawing Sheets

Related U.S. Application Data filed on Feb. 18, 2022, provisional application No. 63/312,635, filed on Feb. 22, 2022, provisional application No. 63/325,395, filed on Mar. 30, 2022.

(58) Field of Classification Search
CPC ... H04W 72/231; H04B 7/022; H04B 7/0413; H04B 7/0695; H04B 7/06968; H04L 1/1812; H04L 5/0023; H04L 5/0053
See application file for complete search history.

(56) References Cited

U.S. PATENT DOCUMENTS

| | | | |
|---|---|---|---|
| 2021/0195600 A1 | 6/2021 | Khoshnevisan et al. | |
| 2022/0225135 A1* | 7/2022 | Cirik | H04L 5/0053 |
| 2024/0008052 A1* | 1/2024 | Matsumura | H04W 80/02 |

OTHER PUBLICATIONS

International Search Report and Written Opinion issued May 11, 2023 regarding International Application No. PCT/KR2023/002057, 8 pages.

Moderator (Qualcomm), "Summary #2 of [106bis-e-NR-feMIMO-02] Email discussion on multi-TRP for PDCCH", 3GPP TSG-RAN WG1 Meeting #106-bis-e, R1-2110439, Oct. 2021, 69 pages.

"3rd Generation Partnership Project; Technical Specification Group Radio Access Network; NR; Physical channels and modulation (Release 16)", 3GPP TS 38.211 V16.1.0, Mar. 2020, 130 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)", 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

Extended European Search Report issued Apr. 4, 2025 regarding Application No. 23753238.7, 8 pages.

NEC, "Discussion on multi-TRP for PDCCH, PUCCH and PUSCH", 3GPP TSG RAN WG1 #106-e, R1-2107144, Aug. 2021, 6 pages.

Ericsson, "On beam indication, measurement, and reporting", 3GPP TSG-RAN WG1 #90bis, R1-1718433, Oct. 2017, 9 pages.

* cited by examiner

DETERMINING A REFERENCE PDCCH CANDIDATE

CROSS-REFERENCE TO RELATED APPLICATIONS AND CLAIM OF PRIORITY

The present application claims priority to: U.S. Provisional Patent Application No. 63/309,899, filed on Feb. 14, 2022; U.S. Provisional Patent Application No. 63/311,776, filed on Feb. 18, 2022; U.S. Provisional Patent Application No. 63/312,635, filed on Feb. 22, 2022; and U.S. Provisional Patent Application No. 63/325,395, filed on Mar. 30, 2022. The contents of the above-identified patent documents are incorporated herein by reference.

TECHNICAL FIELD

The present disclosure relates generally to wireless communication systems and, more specifically, the present disclosure relates to beam indication and repetition in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to beam indication and repetition in a wireless communication system.

In one embodiment, a user equipment (UE) is provided. The UE includes a transceiver configured to receive a first physical downlink control channel (PDCCH) candidate and a second PDCCH candidate including first and second beam indication downlink control information (DCI), respectively and receive higher layer radio resource control (RRC) signaling including a parameter indicating a linkage between the first and second PDCCH candidates. The UE further includes a processor operably coupled with the transceiver. The processor is configured to identify information related to a reference PDCCH candidate; identify, based on the parameter, that the first and second beam indication DCI include at least a same set of TCI states; and determine, based on the information, the reference PDCCH candidate from the first and second PDCCH candidates.

In another embodiment, a base station (BS) is provided. The BS includes a processor and a transceiver operably coupled with the processor. The transceiver is configured to transmit a first PDCCH candidate including a first beam indication DCI, transmit higher layer RRC signaling including a parameter indicating a linkage between the first PDCCH candidate and a second PDCCH candidate including a second beam indication DCI, and transmit information related to a reference PDCCH candidate. The parameter indicates that the first and second beam indication DCI include at least a same set of TCI states. The information indicates the reference PDCCH candidate from the first and second PDCCH candidates.

In yet another embodiment, a method for operating a UE is provided. The method includes receiving a first PDCCH candidate and a second PDCCH candidate including first and second beam indication DCI, respectively; receiving higher layer RRC signaling including a parameter indicating a linkage between the first and second PDCCH candidates. The method further includes identifying information related to a reference PDCCH candidate; identifying, based on the parameter, that the first and second beam indication DCI include at least a same set of TCI states; and determining, based on the information, the reference PDCCH candidate from the first and second PDCCH candidates.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
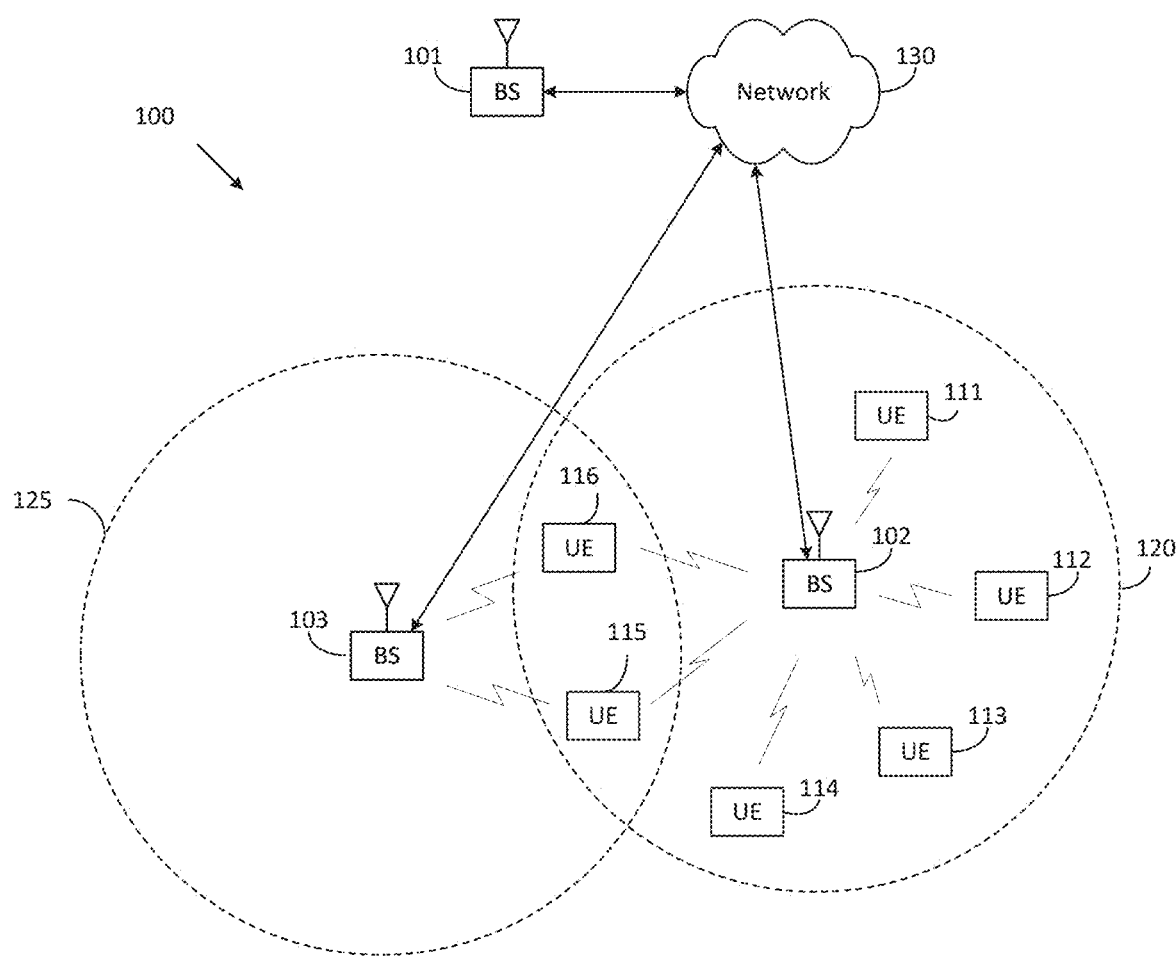
FIG. 1 illustrates an example of wireless network according to embodiments of the present disclosure.
Figure 2:
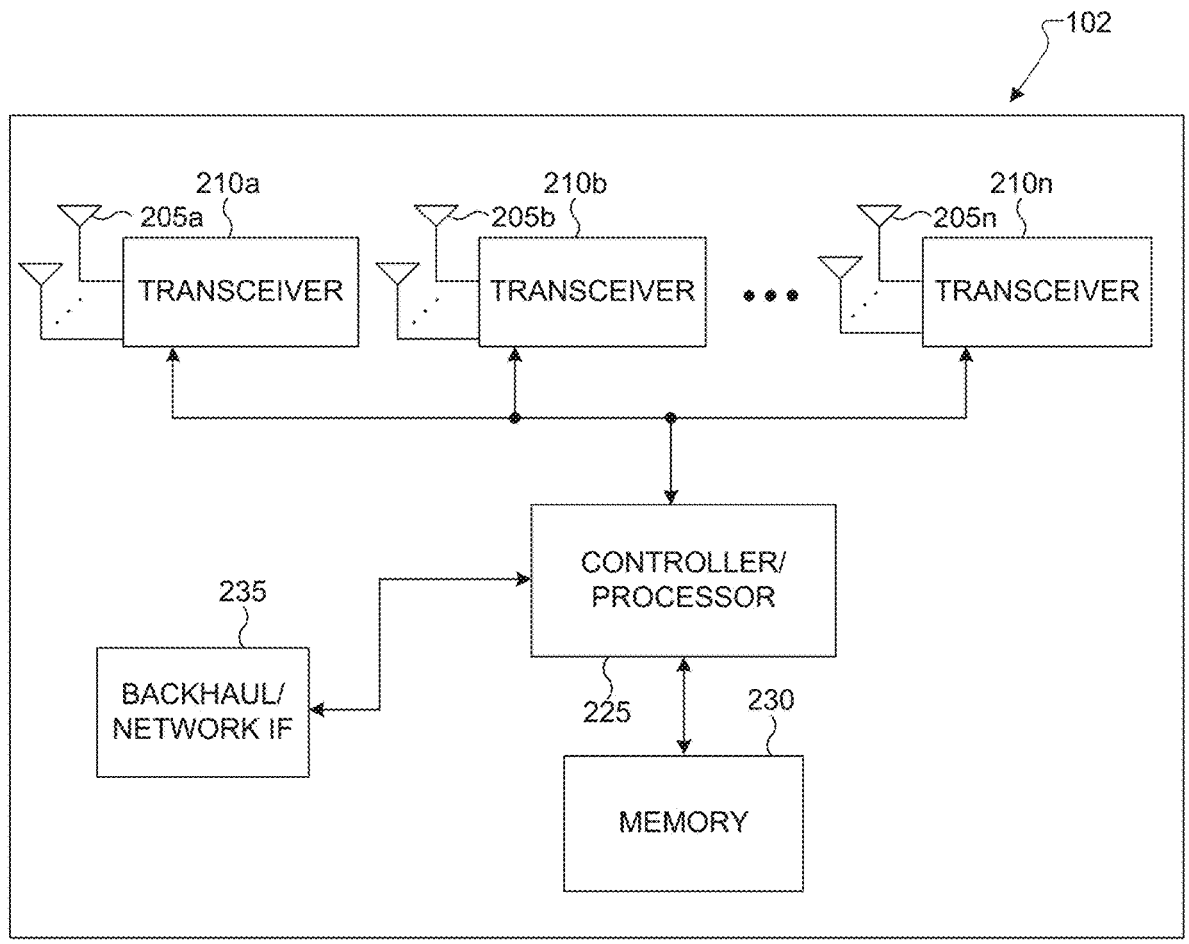
FIG. 2 illustrates an example of gNB according to embodiments of the present disclosure.
Figure 3:
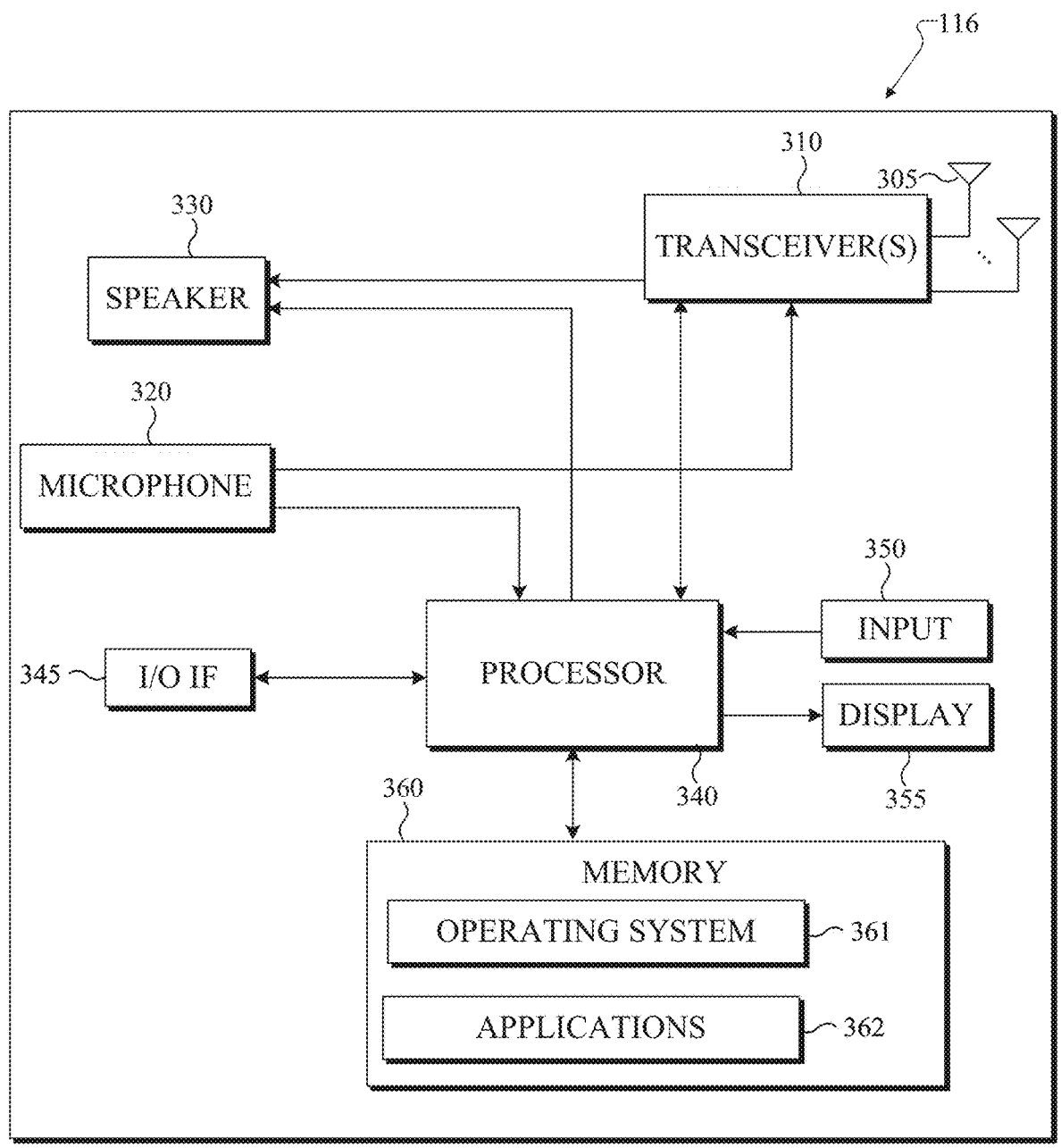
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a beam indication and repetition in a wireless communication system. In certain embodiments, and one or more of the gNBs 101-103 includes circuitry, programing, or a combination thereof, for a beam indication and repetition in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for a beam indication and repetition in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a beam indication and repetition in a wireless communication system.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355m which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
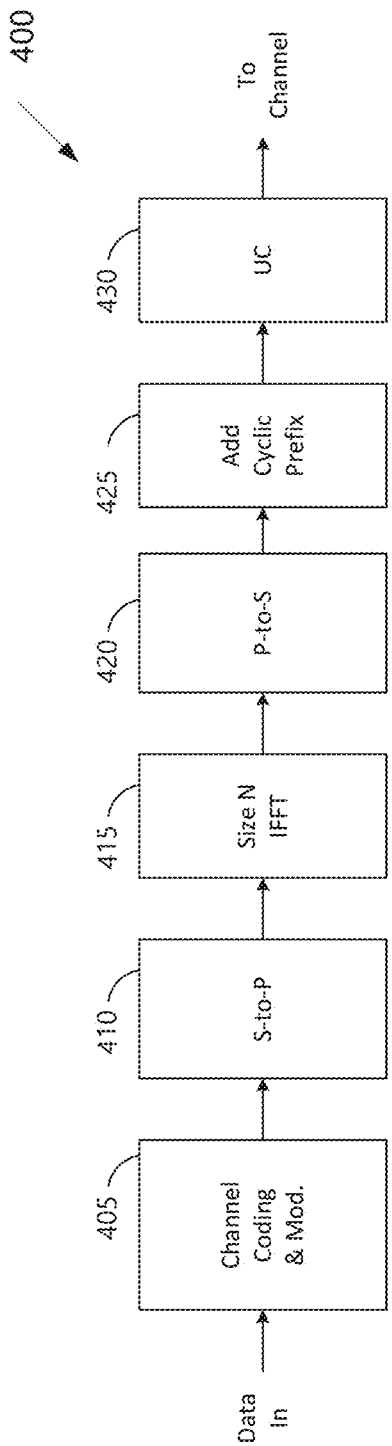
FIGS. 4 and 5 illustrate example of wireless transmit and receive paths according to this disclosure.
Figure 5:
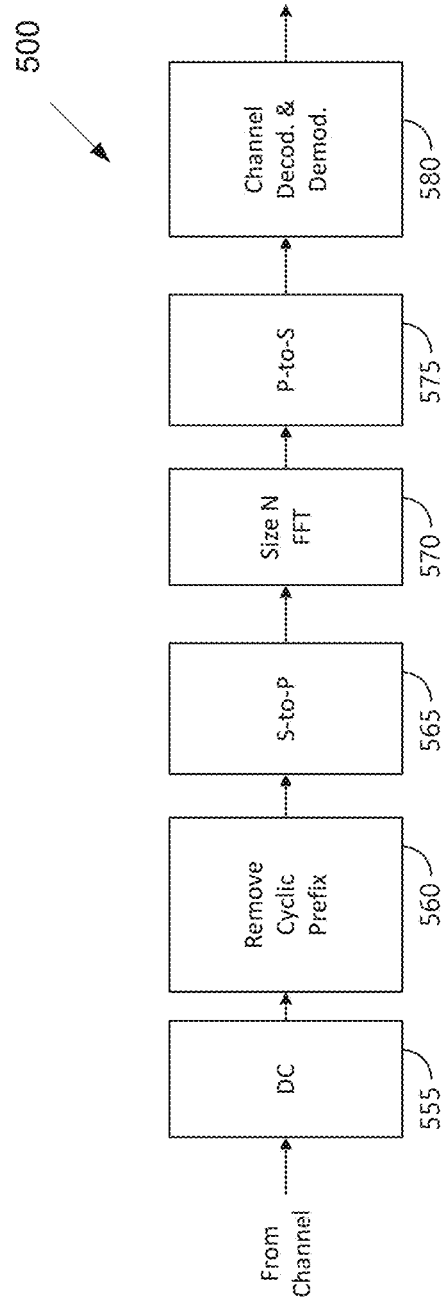

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a CORESET where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Figure 6A:
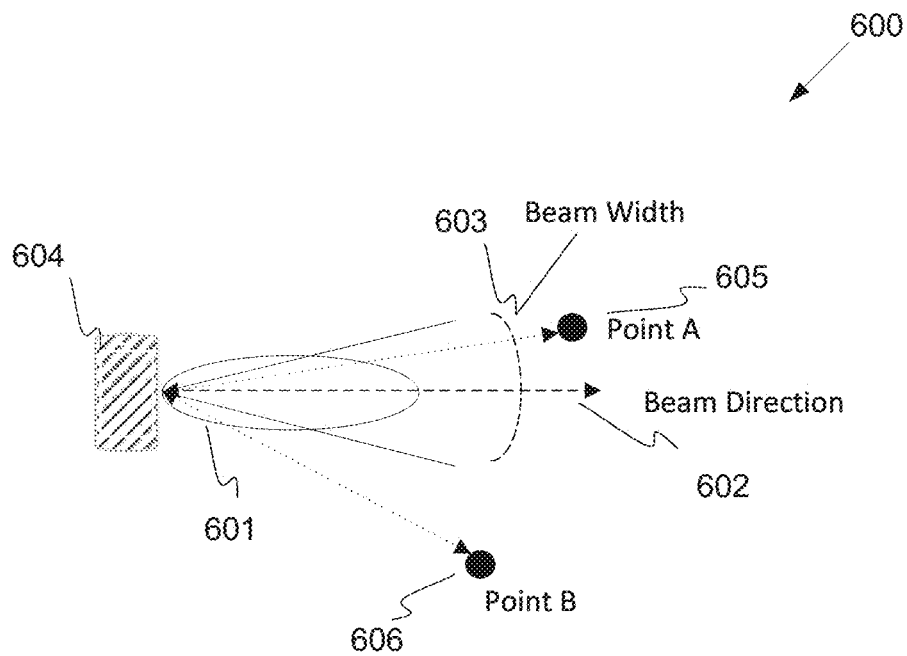
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
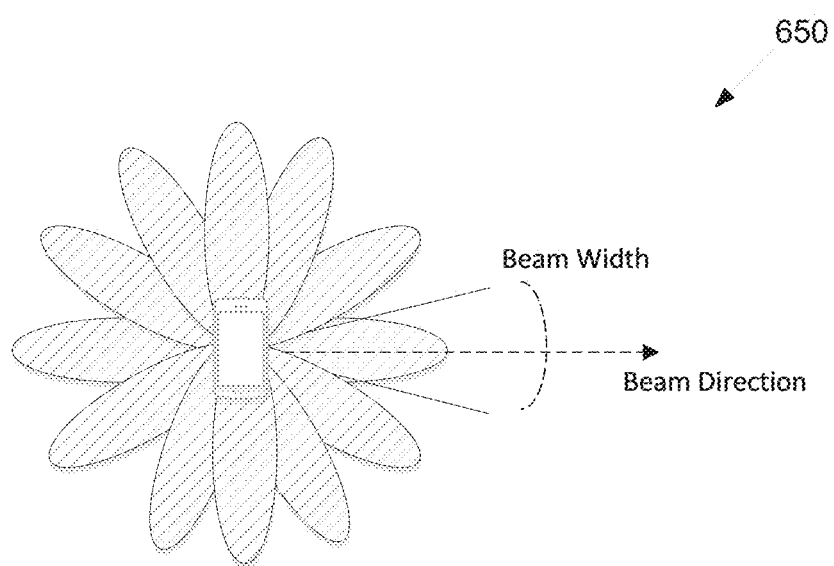
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
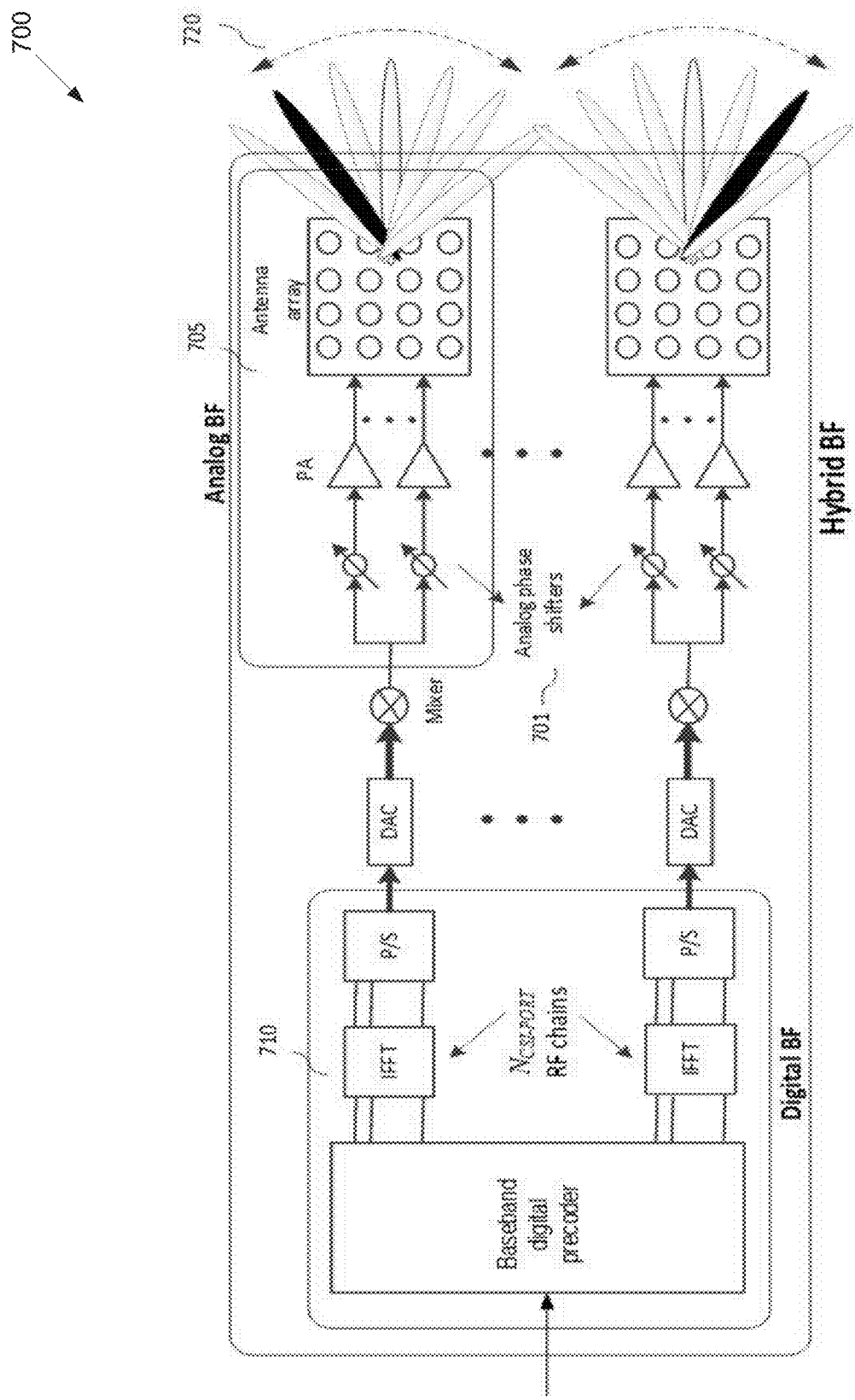
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

Figure 8:
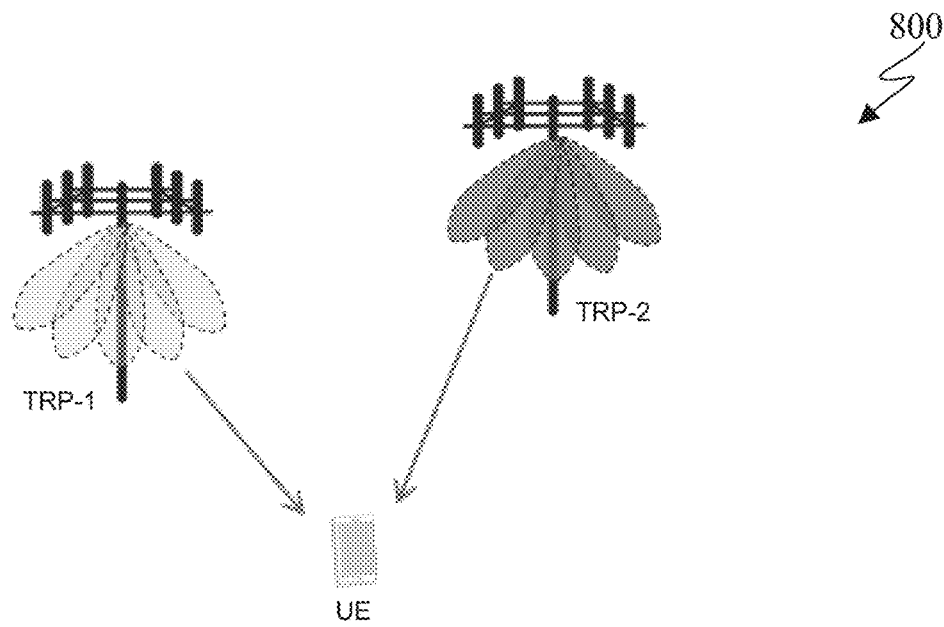
FIG. 8 illustrates an example of multiple TRP system according to embodiments of the present disclosure.

FIG. 8 illustrates an example of multiple TRP system 800 according to embodiments of the present disclosure. In one example, the TRPs in the system 800 may be BSs, such as BSs 101-103 in FIG. 1. The embodiment of the multiple TRP system 800 illustrated in FIG. 8 is for illustration only.

In a multiple transmission and reception point (TRP) system depicted in FIG. 8, the UE could simultaneously receive from multiple physically non-co-located TRPs various channels/RSs such as PDCCHs and/or PDSCHs using either a single receive (RX) panel or multiple RX panels. In this disclosure, a RX panel could correspond to a set of RX antenna elements/ports at the UE, a set of measurement RS resources such as SRS resources, a spatial domain RX filter or etc. Further, a TRP in the multi-TRP system can represent a collection of measurement antenna ports, measurement RS resources and/or control resource sets (CORESETs).

For example, a TRP could be associated with one or more of: (1) a plurality of CSI-RS resources; (2) a plurality of CRIs (CSI-RS resource indices/indicators); (3) a measurement RS resource set, for example, a CSI-RS resource set along with its indicator; (4) a plurality of CORESETs associated with a CORESETPoolIndex; and (5) a plurality of CORESETs associated with a TRP-specific index/indicator/identity.

A cell/TRP could be a non-serving cell/TRP. In this disclosure, the non-serving cell(s) or the non-serving cell TRP(s) could have/broadcast different physical cell IDs (PCIs) and/or other higher layer signaling index values from that of the serving cell or the serving cell TRP (i.e., the serving cell PCI). In one example, the serving cell or the serving cell TRP could be associated with the serving cell ID (SCI) and/or the serving cell PCI. That is, for the inter-cell operation considered in the present disclosure, different cells/TRPs could broadcast different PCIs and/or one or more cells/TRPs (referred to/defined as non-serving cells/TRPs in the present disclosure) could broadcast different PCIs from that of the serving cell/TRP (i.e., the serving cell PCI) and/or one or more cells/TRPs are not associated with valid SCI (e.g., provided by the higher layer parameter ServCellIndex). In the present disclosure, a non-serving cell PCI can also be referred to as an additional PCI, another PCI or a different PCI (with respect to the serving cell PCI).

Under the Rel. 17 unified transmission configuration indication (TCI) framework, beam indication procedure for the multi-TRP operation needs to be specified. Furthermore, means of improving beam indication reliability, especially when a DCI is used to indicate TCI state/beam update for one or more TRPs in a multi-TRP system, need to be developed.

The present disclosure considers various design aspects related to beam indication for multi-TRP operation under the Rel. 17 unified TCI state framework. Specifically, several PDCCH repetition strategies are provided to improve the beam indication reliability under the Rel. 17 unified TCI framework in a multi-TRP system. Furthermore, the corresponding beam application time (BAT) issues related to the PDCCH/DCI repetition for beam indication are also addressed.

As described in the U.S. patent application Ser. No. 17/584,239, as incorporated by reference its entirety herein, a unified TCI framework could indicate/include N≥1 DL TCI states and/or M≥1 UL TCI states, wherein the indicated TCI state could be at least one of: (1) a DL TCI state and/or its corresponding/associated TCI state ID; (2) an UL TCI state and/or its corresponding/associated TCI state ID; (3) a joint DL and UL TCI state and/or its corresponding/associated TCI state ID; and (4) separate DL TCI state and UL TCI state and/or their corresponding/associated TCI state ID(s).

There could be various design options/channels to indicate to the UE a beam (i.e., a TCI state) for the transmission/reception of a PDCCH or a PDSCH. As described in the U.S. patent application Ser. No. 17/584,239, as incorporated by reference its entirety herein, in one example, a MAC CE could be used to indicate to the UE a beam (i.e., a TCI state and/or a TCI state ID) for the transmission/reception of a PDCCH or a PDSCH. In another example, a DCI could be used to indicate to the UE a beam (i.e., a TCI state and/or a TCI state ID) for the transmission/reception of a PDCCH or a PDSCH.

For example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.

For another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant.

Yet for another example, a custom/purpose designed DCI format could be used to indicate to the UE a beam (i.e., a TCI state and/or a TCI state ID) for the transmission/reception of a PDCCH or a PDSCH.

Rel-17 introduced the unified TCI framework, where a unified or master or main TCI state is signaled to the UE. The unified or master or main TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state can be used at least for UE-dedicated DL channels; and (3) in case of separate TCI state indication, wherein different beams are used for DL and UL channels, a UL TCI state can be used at least for UE-dedicated UL channels.

The unified (master or main) TCI state is TCI state of UE-dedicated reception on PDSCH/PDCCH or dynamic-grant/configured-grant based PUSCH and all of dedicated PUCCH resources.

In one embodiment, various unified TCI state/beam indication methods and PDCCH repetition strategies for DCI(s) indicating TCI state/beam update for one or more TRPs in a single-DCI (sDCI) based multi-TRP system are provided.

As discussed above, in a single-DCI (sDCI) based multi-TRP system, a UE could be provided by the network, e.g., via MAC CE or DCI (e.g., DCI format 1_1 or 1_2 with or without DL assignment) based signaling through the higher layer parameter TCI-State_r17, M>1 joint DL and UL Rel. 17 unified TCI states or M>1 separate UL Rel. 17 unified TCI states or a first combination of M>1 joint DL and UL Rel. 17 unified TCI states and separate UL Rel. 17 unified TCI states or N>1 separate DL Rel. 17 unified TCI states or a second combination of N>1 joint DL and UL Rel. 17 unified TCI states and separate DL Rel. 17 unified TCI states or a third combination of N>1 joint DL and UL Rel. 17 unified TCI states, separate DL Rel. 17 unified TCI states and separate UL Rel. 17 unified TCI for UE-dedicated reception on PDSCH/PDCCH or dynamic-grant/configured-grant based PUSCH and all of dedicated PUCCH resources.

For instance, the DCI format for unified TCI state/beam indication (e.g., DCI format 1_1 or 1_2 with or without DL assignment) could include a "transmission configuration indication" field containing one or more codepoints activated by a first MAC CE activation command from a set/pool of codepoints. For this case, each codepoint could indicate M>1 joint DL and UL Rel. 17 unified TCI states or M>1 separate UL Rel. 17 unified TCI states or a first combination of M>1 joint DL and UL Rel. 17 unified TCI states and separate UL Rel. 17 unified TCI states or N>1 separate DL Rel. 17 unified TCI states or a second combination of N>1 joint DL and UL Rel. 17 unified TCI states and separate DL Rel. 17 unified TCI states or a third combination of N>1 joint DL and UL Rel. 17 unified TCI states, separate DL Rel. 17 unified TCI states and separate UL Rel. 17 unified TCI for UE-dedicated reception on PDSCH/PDCCH or dynamic-grant/configured-grant based PUSCH and all of dedicated PUCCH resources.

In the present disclosure, one or more CORESETs in the sDCI based multi-TRP system could be configured with a same group index, denoted by CORESETGroupIndex. The CORESETs configured with the same CORESETGroupIndex value could be associated with the same TRP in a multi-TRP system. The UE could be provided by PDCCH-Config one or more (e.g., two) CORESETGroupIndex values (e.g., 0 and/or 1). The association of a CORESET and a CORESETGroupIndex value could be via indicating the explicit CORESETGroupIndex value (e.g., either 0 or 1) in the parameter, e.g., the higher layer parameter ControlResourceSet, configuring the CORESET.

Furthermore, DM-RS antenna ports for PDCCH receptions in one or more CORESETs could be quasi co-located with reference signal(s) provided in one or more indicated Rel. 17 unified TCI states—e.g., out of the indicated M>1 joint DL and UL TCI states or M>1 separate UL TCI states or N>1 separate DL TCI states. In the present disclosure, the CORESETs whose QCL assumption(s) follow that provided in the indicated Rel. 17 unified TCI state(s) or sharing the indicated Rel. 17 unified TCI state(s) is referred to as Type-1 CORESET(s), while the CORESET(s) whose QCL assumption(s) does not follow that provided in the indicated Rel. 17 unified TCI state(s) or not sharing the indicated Rel. 17 unified TCI state(s) is referred to as Type-2 CORESET(s).

Furthermore, a Type-1 CORESET or a Type-2 CORESET could correspond to one or more of: (1) "CORESET A": a CORESET other than CORESET with index 0 (or CORESET #0) associated with only UE-dedicated PDCCH reception(s) in a CC, comprising, e.g., CORESET(s) associated with USS set(s) or Type3-PDCCH CSS set(s); (2) "CORESET B": a CORESET other than CORESET #0 associated with only non-UE-dedicated PDCCH reception(s) in a CC, comprising, e.g., CORESET(s) associated with all types of CSS sets such as Type0/0A/1/2/3-PDCCH CSS sets or CSS sets other than Type3-PDCCH CSS set(s) such as Type0/0A/1/2-PDCCH CSS sets; (3) "CORESET C": a CORESET other than CORESET #0 associated with both UE-dedicated and non-UE-dedicated PDCCH receptions in a CC; and (4) CORESET #0, i.e., CORESET with index 0.

The UE could be provided/configured with "useIndicatedR17TCIState" for one or more of the Type-1 CORESETs. For instance, the UE could be provided/configured with "useIndicatedR17TCIstate" set to "enabled" in the parameter, e.g., the higher layer parameter ControlResourceSet, that configures the corresponding Type-1 CORESET(s).

In the present disclosure, in the single-DCI based multi-TRP system, the indicated Rel. 17 unified TCI state n or m ($n \in \{1, \ldots, N\}$ and $m \in \{1, \ldots, M\}$) could correspond to the n-th joint DL and UL TCI state or the m-th separate UL TCI state or the n-th separate DL TCI state or the m-th TCI state in the first combination of TCI states or the n-th TCI state in the second combination of TCI states or the n-th TCI state in the third combination of TCI states or the joint DL and UL TCI state with the n-th lowest or highest TCI state ID or the separate UL TCI state with the m-th lowest or highest TCI state ID or the separate DL TCI state with the n-th lowest or highest TCI state ID or the TCI state in the first combination of TCI states with the m-th lowest or highest TCI state ID or the TCI state in the second combination of TCI states with the n-th lowest or highest TCI state ID or the TCI state in the third combination of TCI states with the n-th lowest or highest TCI state ID, among the N>1 or M>1 Rel. 17 unified TCI states, indicated via the MAC CE or DCI (e.g., DCI format 1_1 or 1_2 with or without DL assignment) based signaling.

The same PDCCH or DCI payload (e.g., DCI format 1_1 or 1_2 with or without DL assignment) indicating/updating the same Rel. 17 unified TCI state(s) could be repeated in time, frequency or spatial domains. Alternatively, the network could transmit separate DCIs/DCI payloads (e.g., DCI format 1_1 or 1_2 with or without DL assignment) indicating/updating the same Rel. 17 unified TCI state(s).

In one example, one or more (e.g., N>1 or M>1) PDCCH candidates from one or more (e.g., N>1 or M>1) search space sets could be received in a single CORESET configured with one or more (e.g., N>1 or M>1) Rel. 17 unified TCI states. The CORESET could be a Type-1 CORESET or a Type-2 CORESET as described above. The one or more PDCCH candidates could carry/contain the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states. Hence, the corresponding CORESET can also be referred to as a beam indication CORESET. For instance, a UE could receive in a single beam indication CORESET (e.g., a Type-1 CORESET or a Type-2 CORESET as described above) at least N=2 or M=2 PDCCH candidates, wherein the CORESET is configured with N=2 or M=2 active Rel. 17 unified TCI states, and the at least two PDCCH candidates could correspond to the same DCI payload/contents (e.g., DCI format 1_1 or 1_2 with or without DL assignment) indicating/updating the same TCI field(s) or the same TCI state codepoint(s) or the same N=2 or M=2 Rel. 17 unified TCI states.

In another example, one or more (e.g., N>1 or M>1) PDCCH candidates from one or more (e.g., N>1 or M>1) search space sets configured with a higher layer parameter searchSpaceLinking could be received in one or more (e.g., N>1 or M>1) CORESETs. Each of the one or more CORESETs could be a Type-1 CORESET or a Type-2 CORESET as described above. Furthermore, each of the one or more CORESETs could be configured with a Rel. 17 unified TCI state. The one or more PDCCH candidates could carry/contain the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states. Hence, the corresponding one or more CORESETs can also be referred to as beam indication CORESETs.

For instance, a UE could receive in N=2 or M=2 beam indication CORESETs (e.g., Type-1 CORESETs or Type-2 CORESETs as described above) at least N=2 or M=2 search space sets configured with searchSpaceLinking, respectively, wherein each of the at least N=2 or M=2 search space sets could include at least one PDCCH candidate, each of the N=2 or M=2 beam indication CORESETs could be configured with a single active Rel. 17 unified TCI state, and the PDCCH candidate(s) from the at least N=2 or M=2 search space sets linked by the higher layer parameter searchSpaceLinking could correspond to the same DCI payload/contents (e.g., DCI format 1_1 or 1_2 with or without DL assignment) indicating/updating the same TCI field(s) or the same TCI state codepoint(s) or the same N=2 or M=2 Rel. 17 unified TCI states.

In yet another example, one or more (e.g., N>1 or M>1) PDCCH candidates from one or more (e.g., N>1 or M>1) search space sets could be received in one or more (e.g., N>1 or M>1) CORESETs. Each of the one or more CORESETs could be a Type-1 CORESET or a Type-2 CORESET as described above. Furthermore, each of the one or more CORESETs could be configured with a Rel. 17 unified TCI state. The one or more PDCCH candidates could carry/contain one or more separate DCIs (e.g., DCI format 1_1 or 1_2 with or without DL assignment) indicating/updating the same TCI field(s) or the same TCI state codepoint(s) or the same N>1 or M>1 Rel. 17 unified TCI states; other DCI contents/fields could be different among/across the one or more separate DCIs (multi-chance PDCCH transmission/reception).

For this case, one or more of the separate DCIs/DCI formats could schedule PDSCH reception(s), while one or more of the separate DCIs/DCI formats could be without any DL assignment(s). Hence, the corresponding one or more CORESETs can also be referred to as beam indication CORESETs. For instance, a UE could receive in N=2 or M=2 beam indication CORESETs (e.g., Type-1 CORESETs or Type-2 CORESETs as described above) at least N=2 or M=2 search space sets, respectively, wherein each of the at least N=2 or M=2 search space sets could include at least one PDCCH candidate, each of the N=2 or M=2 beam indication CORESETs could be configured with a single active Rel. 17 unified TCI state, and the PDCCH candidate(s) from the at least N=2 or M=2 search space sets could respectively correspond to two DCIs (e.g., DCI format 1_1 or 1_2 with or without DL assignment) indicating/updating the same TCI field(s) or the same TCI state codepoint(s) or the same N=2 or M=2 Rel. 17 unified TCI states. For this case, other DCI contents/fields such as DL assignment could be different between the two DCIs.

For sDCI based multi-TRP operation, DM-RS antenna ports for PDCCH receptions in the same or different (beam indication) CORESETs could be quasi co-located with reference signals provided in one or more indicated Rel. 17 unified TCI states. When a UE receives from the network M>1 or N>1 Rel. 17 unified TCI states indicated by a codepoint in a DCI (e.g., DCI format 1_1 or 1_2 with or without DL assignment) or MAC CE, the Rel. 17 unified TCI state(s) for the beam indication CORESET(s) could be determined according to at least one of following examples.

In one example, DM-RS antenna ports for PDCCH receptions—i.e., for receiving the PDCCH candidates that carry/contain the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states—in the beam indication CORESET could be quasi co-located with reference signals provided in one or more of the M>1 or N>1 Rel. 17 unified TCI states indicated by a codepoint in a DCI (e.g., DCI format 1_1 or 1_2 with or without DL assignment) or MAC CE. For N=2 or M=2, DM-RS antenna ports for PDCCH receptions—i.e., for receiving the PDCCH candidates that carry/contain the same DCI payload/contents (e.g., DCI format 1_1 or 1_2 with or without DL assignment) indicating/updating the same TCI field(s) or the same TCI state codepoint(s) or the same N=2 or M=2 Rel. 17 unified TCI states—in the beam indication CORESET could be quasi co-located with reference signals provided in the M=2 or N=2 Rel. 17 unified TCI states indicated by a codepoint in a DCI (e.g., DCI format 1_1 or 1_2 with or without DL assignment) or MAC CE.

In another example, DM-RS antenna ports for receiving the PDCCH candidate(s)—among the PDCCH candidates from the search space sets configured with searchSpaceLinking and carrying/containing the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states—in the n-th (or m-th) beam indication CORESET or in the beam indication CORESET with the n-th (or m-th) lowest (or highest) CORESET ID or in the n-th (or m-th) search space set configured with searchSpaceLinking or in the search space set configured with searchSpaceLinking with the n-th (or m-th) lowest (or highest) search space set ID or in the n-th (or m-th) PDCCH monitoring occasion for a search space set configured with searchSpaceLinking or in the PDCCH monitoring occasion for a search space set configured with searchSpaceLinking with the n-th (or m-th) lowest (or highest) monitoring occasion ID or having the n-th (or m-th) lowest (or highest) starting control channel element (CCE) index or ending the n-th (or m-th) latest (or earliest) in time could be quasi co-located with the reference signals provided in the corresponding indicated Rel. 17 unified TCI state n (or m)—e.g., among/from the M>1 joint DL and UL TCI states or M>1 separate UL TCI states or N>1 separate DL TCI states indicated by a codepoint in a DCI (e.g., DCI format 1_1 or 1_2 with or without DL assignment) or MAC CE, wherein n∈{1, . . . , N} and m∈{M}. For N=2 or M=2, (1) DM-RS antenna ports for receiving the PDCCH candidate(s)—among the PDCCH candidates from the search space sets configured with searchSpaceLinking and carrying/containing the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states—in the first beam indication CORESET or in the beam indication CORESET with the lowest (or highest) CORESET ID or in the first search space set configured with searchSpaceLinking or in the search space set configured with searchSpaceLinking with the lowest (or highest) search space set ID or in the first PDCCH monitoring occasion for a search space set configured with searchSpaceLinking or in the PDCCH monitoring occasion for a search space set configured with searchSpaceLinking with the lowest (or highest) monitoring occasion ID or having the lowest (or highest) starting control channel element (CCE) index or ending earlier (or later) in time could be quasi co-located with the reference signals provided in the first indicated Rel. 17 unified TCI state—e.g., among/from the M=2 joint DL and UL TCI states or M=2 separate UL TCI states or N=2 separate DL TCI states indicated by a codepoint in a DCI (e.g., DCI format 1_1 or 1_2 with or without DL assignment) or MAC CE, and (2) DM-RS antenna ports for receiving the PDCCH candidate(s)—among the PDCCH candidates from the search space sets configured with searchSpaceLinking and carrying/containing the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states—in the second beam indication CORESET or in the beam indication CORESET with the highest (or lowest) CORESET ID or in the second search space set configured with searchSpaceLinking or in the search space set configured with searchSpaceLinking with the highest (or lowest) search space set ID or in the second PDCCH monitoring occasion for a search space set configured with searchSpaceLinking or in the PDCCH monitoring occasion for a search space set configured with searchSpaceLinking with the highest (or lowest) monitoring occasion ID or having the highest (or lowest) starting control channel element (CCE) index or ending later (or earlier) in time could be quasi co-located with the reference signals provided in the second indicated Rel. 17 unified TCI state—e.g., among/from the M=2 joint DL and UL TCI states or M=2 separate UL TCI states or N=2 separate DL TCI states indicated by a codepoint in a DCI (e.g., DCI format 1_1 or 1_2 with or without DL assignment) or MAC CE.

In yet another example, if one or more CORESET-GroupIndex values are configured, DM-RS antenna ports for receiving the PDCCH candidate(s)—among the PDCCH candidates from the search space sets configured with searchSpaceLinking and carrying/containing the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states—in a beam indication CORESET associated with CORESETGroupIndex value n−1 (or m−1) or in a search space set configured with searchSpaceLinking in a CORESET associated with CORESETGroupIndex value n−1 (or m−1) or in a PDCCH monitoring occasion for a search space set configured with searchSpaceLinking in a CORESET associated with CORESETGroupIndex value n−1 (or m−1) or in the n-th (or m-th) beam indication CORESET associated with CORESETGroupIndex value n−1 (or m−1) or in the beam indication CORESET with the n-th (or m-th) lowest (or highest) CORESET ID associated with CORESETGroupIndex value n−1 (or m−1) or in the n-th (or m-th) search space set configured with searchSpaceLinking in a CORESET associated with CORESETGroupIndex value n−1 (or m−1) or in the search space set configured with searchSpaceLinking with the n-th (or m-th) lowest (or highest) search space set ID in a CORESET associated with CORESETGroupIndex value n−1 (or m−1) or in the n-th (or m-th) PDCCH monitoring occasion for a search space set configured with searchSpaceLinking in a CORESET associated with CORESETGroupIndex value n−1 (or m−1) or in the PDCCH monitoring occasion for a search space set configured with searchSpaceLinking in a CORESET associated with CORESETGroupIndex value n−1 (or m−1) with the n-th (or m-th) lowest (or highest) monitoring occasion ID or having the n-th (or m-th) lowest (or highest) starting control channel element (CCE) index or ending the n-th (or m-th) latest (or earliest) in time could be quasi co-located with the reference signals provided in the corresponding indicated Rel. 17 unified TCI state n (or m)—e.g., among/from the M>1 joint DL and UL TCI states or M>1 separate UL TCI states or N>1 separate DL TCI states indicated by a codepoint in a DCI (e.g., DCI format 1_1 or 1_2 with or without DL assignment) or MAC CE and associated with CORESETGroupIndex value n−1 (or m−1).

In such embodiment, n∈{1, ..., N} and m∈{1, ..., M}. For N=2 or M=2, (1) DM-RS antenna ports for receiving the PDCCH candidate(s)—among the PDCCH candidates from the search space sets configured with searchSpaceLinking and carrying/containing the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states—in a beam indication CORESET associated with CORESETGroupIndex value 0 (or 1) or in a search space set configured with searchSpaceLinking in a CORESET associated with CORESETGroupIndex value 0 (or 1) or in a PDCCH monitoring occasion for a search space set configured with searchSpaceLinking in a CORESET associated with CORESETGroupIndex value 0 (or 1) or in the first beam indication CORESET associated with CORESETGroupIndex value 0 (or 1) or in the beam indication CORESET with the lowest (or highest) CORESET ID associated with CORESETGroupIndex value 0 (or 1) or in the first search space set configured with searchSpaceLinking in a CORESET associated with CORESETGroupIndex value 0 (or 1) or in the search space set configured with searchSpaceLinking with the lowest (or highest) search space set ID in a CORESET associated with CORESETGroupIndex value 0 (or 1) or in the first PDCCH monitoring occasion for a search space set configured with searchSpaceLinking in a CORESET associated with CORESETGroupIndex value 0 (or 1) or in the PDCCH monitoring occasion for a search space set configured with searchSpaceLinking in a CORESET associated with CORESETGroupIndex value 0 (or 1) with the lowest (or highest) monitoring occasion ID or having the lowest (or highest) starting control channel element (CCE) index or ending earlier (or later) in time could be quasi co-located with the reference signals provided in the first indicated Rel. 17 unified TCI state—e.g., among/from the M=2 joint DL and UL TCI states or M=2 separate UL TCI states or N=2 separate DL TCI states indicated by a codepoint in a DCI (e.g., DCI format 1_1 or 1_2 with or without DL assignment) or MAC CE and associated with CORESETGroupIndex value 0 (or 1), and (2) DM-RS antenna ports for receiving the PDCCH candidate(s)—among the PDCCH candidates from the search space sets configured with searchSpaceLinking and carrying/containing the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states—in a beam indication CORESET associated with CORESETGroupIndex value 1 (or 0) or in a search space set configured with searchSpaceLinking in a CORESET associated with CORESETGroupIndex value 1 (or 0) or in a PDCCH monitoring occasion for a search space set configured with searchSpaceLinking in a CORESET associated with CORESETGroupIndex value 1 (or 0) or in the second beam indication CORESET associated with CORESETGroupIndex value 1 (or 0) or in the beam indication CORESET with the highest (or lowest) CORESET ID associated with CORESETGroupIndex value 1 (or 0) or in the second search space set configured with searchSpaceLinking in a CORESET associated with CORESETGroupIndex value 1 (or 0) or in the search space set configured with searchSpaceLinking with the highest (or lowest) search space set ID in a CORESET associated with CORESETGroupIndex value 1 (or 0) or in the second PDCCH monitoring occasion for a search space set configured with searchSpaceLinking in a CORESET associated with CORESETGroupIndex value 1 (or 0) or in the PDCCH monitoring occasion for a search space set configured with searchSpaceLinking in a CORESET associated with CORESETGroupIndex value 1 (or 0) with the highest (or lowest) monitoring occasion ID or having the highest (or lowest) starting control channel element (CCE) index or ending later (or earlier) in time could be quasi co-located with the reference signals provided in the second indicated Rel. 17 unified TCI state—e.g., among/from the M=2 joint DL and UL TCI states or M=2 separate UL TCI states or N=2 separate DL TCI states indicated by a codepoint in a DCI (e.g., DCI format 1_1 or 1_2 with or without DL assignment) or MAC CE and associated with CORESETGroupIndex value 1 (or 0).

In yet another example, DM-RS antenna ports for receiving the PDCCH candidate(s)—among the PDCCH candidates carrying/containing separate DCIs (e.g., DCI format 1_1 or 1_2 with or without DL assignment) indicating/updating the same TCI field(s) or the same TCI state codepoint(s) or the same N>1 or M>1 Rel. 17 unified TCI states—in the n-th (or m-th) beam indication CORESET or in the beam indication CORESET with the n-th (or m-th) lowest (or highest) CORESET ID or in the n-th (or m-th) search space set or in the search space set with the n-th (or m-th) lowest (or highest) search space set ID or in the n-th (or m-th) PDCCH monitoring occasion for a search space set or in the PDCCH monitoring occasion for a search space set with the n-th (or m-th) lowest (or highest) monitoring occasion ID or having the n-th (or m-th) lowest (or highest) starting control channel element (CCE) index or ending the n-th (or m-th) latest (or earliest) in time could be quasi co-located with the reference signals provided in the corresponding indicated Rel. 17 unified TCI state n (or m)—e.g., among/from the M>1 joint DL and UL TCI states or M>1 separate UL TCI states or N>1 separate DL TCI states indicated by a codepoint in a DCI (e.g., DCI format 1_1 or 1_2 with or without DL assignment) or MAC CE, wherein n∈{1, ..., N} and m∈{1, ..., M}. For N=2 or M=2, (1) DM-RS antenna ports for receiving the PDCCH candidate(s)—among the PDCCH candidates carrying/containing separate DCIs (e.g., DCI format 1_1 or 1_2 with or without DL assignment) indicating/updating the same TCI field(s) or the same TCI state codepoint(s) or the same N>1 or M>1 Rel. 17 unified TCI states—in the first beam indication CORESET or in the beam indication CORESET with the lowest (or highest) CORESET ID or in the first search space set or in the search space set with the lowest (or highest) search space set ID or in the first PDCCH monitoring occasion for a search space set or in the PDCCH monitoring occasion for a search space set with the lowest (or highest) monitoring occasion ID or having the lowest (or highest) starting control channel element (CCE) index or ending earlier (or later) in time could be quasi co-located with the reference signals provided in the first indicated Rel. 17 unified TCI state—e.g., among/from the M=2 joint DL and UL TCI states or M=2 separate UL TCI states or N=2 separate DL TCI states indicated by a codepoint in a DCI (e.g., DCI format 1_1 or 1_2 with or without DL assignment) or MAC CE, and (2) DM-RS antenna ports for receiving the PDCCH candidate(s)—among the PDCCH candidates carrying/containing separate DCIs (e.g., DCI format 1_1 or 1_2 with or without DL assignment) indicating/updating the same TCI field(s) or the same TCI state codepoint(s) or the same N>1 or M>1 Rel. 17 unified TCI states—in the second beam indication CORESET or in the beam indication CORESET with the highest (or lowest) CORESET ID or in the second search space set or in the search space set with the highest (or lowest) search space set ID or in the second PDCCH monitoring occasion for a search space set or in the PDCCH monitoring occasion for a search space set with the highest (or lowest) monitoring occasion ID or having the highest (or lowest) starting control channel element (CCE) index or ending later (or earlier) in time could be quasi co-located with the reference signals provided in the second indicated Rel. 17 unified TCI state—e.g., among/from the M=2 joint DL and UL TCI states or M=2 separate UL TCI states or N=2 separate DL TCI states indicated by a codepoint in a DCI (e.g., DCI format 1_1 or 1_2 with or without DL assignment) or MAC CE.

In yet another example, if one or more CORESETGroupIndex values are configured, DM-RS antenna ports for receiving the PDCCH candidate(s)—among the PDCCH candidates carrying/containing separate DCIs (e.g., DCI format 1_1 or 1_2 with or without DL assignment) indicating/updating the same TCI field(s) or the same TCI state codepoint(s) or the same N>1 or M>1 Rel. 17 unified TCI states—in a beam indication CORESET associated with CORESETGroupIndex value n−1 (or m−1) or in a search space set in a CORESET associated with CORESETGroupIndex value n−1 (or m−1) or in a PDCCH monitoring occasion for a search space set in a CORESET associated with CORESETGroupIndex value n−1 (or m−1) or in the n-th (or m-th) beam indication CORESET associated with CORESETGroupIndex value n−1 (or m−1) or in the beam indication CORESET with the n-th (or m-th) lowest (or highest) CORESET ID associated with CORESETGroupIndex value n−1 (or m−1) or in the n-th (or m-th) search space set in a CORESET associated with CORESETGroupIndex value n−1 (or m−1) or in the search space set with the n-th (or m-th) lowest (or highest) search space set ID in a CORESET associated with CORESETGroupIndex value n−1 (or m−1) or in the n-th (or m-th) PDCCH monitoring occasion for a search space set in a CORESET associated with CORESETGroupIndex value n−1 (or m−1) or in the PDCCH monitoring occasion for a search space set in a CORESET associated with CORESETGroupIndex value n−1 (or m−1) with the n-th (or m-th) lowest (or highest) monitoring occasion ID or having the n-th (or m-th) lowest (or highest) starting control channel element (CCE) index or ending the n-th (or m-th) latest (or earliest) in time could be quasi co-located with the reference signals provided in the corresponding indicated Rel. 17 unified TCI state n (or m)—e.g., among/from the M>1 joint DL and UL TCI states or M>1 separate UL TCI states or N>1 separate DL TCI states indicated by a codepoint in a DCI (e.g., DCI format 1_1 or 1_2 with or without DL assignment) or MAC CE and associated with CORESETGroupIndex value n−1 (or m−1), where n∈{1, ..., N} and m∈{1, ..., M}. For N=2 or M=2, (1) DM-RS antenna ports for receiving the PDCCH candidate(s)—among the PDCCH candidates carrying/containing separate DCIs (e.g., DCI format 1_1 or 1_2 with or without DL assignment) indicating/updating the same TCI field(s) or the same TCI state codepoint(s) or the same N>1 or M>1 Rel. 17 unified TCI states—in a beam indication CORESET associated with CORESETGroupIndex value 0 (or 1) or in a search space set in a CORESET associated with CORESETGroupIndex value 0 (or 1) or in a PDCCH monitoring occasion for a search space set in a CORESET associated with CORESETGroupIndex value 0 (or 1) or in the first beam indication CORESET associated with CORESETGroupIndex value 0 (or 1) or in the beam indication CORESET with the lowest (or highest) CORESET ID associated with CORESETGroupIndex value 0 (or 1) or in the first search space set in a CORESET associated with CORESETGroupIndex value 0 (or 1) or in the search space set with the lowest (or highest) search space set ID in a CORESET associated with CORESETGroupIndex value 0 (or 1) or in the first PDCCH monitoring occasion for a search space set in a CORESET associated with CORESETGroupIndex value 0 (or 1) or in the PDCCH monitoring occasion for a search space set in a CORESET associated with CORESETGroupIndex value 0 (or 1) with the lowest (or highest) monitoring occasion ID or having the lowest (or highest) starting control channel element (CCE) index or ending earlier (or later) in time could be quasi co-located with the reference signals provided in the first indicated Rel. 17 unified TCI state—e.g., among/from the M=2 joint DL and UL TCI states or M=2 separate UL TCI states or N=2 separate DL TCI states indicated by a codepoint in a DCI (e.g., DCI format 1_1 or 1_2 with or without DL assignment) or MAC CE and associated with CORESETGroupIndex value 0 (or 1), and (2) DM-RS antenna ports for receiving the PDCCH candidate(s)—among the PDCCH candidates carrying/containing separate DCIs (e.g., DCI format 1_1 or 1_2 with or without DL assignment) indicating/updating the same TCI field(s) or the same TCI state codepoint(s) or the same N>1 or M>1 Rel. 17 unified TCI states—in a beam indication CORESET associated with CORESETGroupIndex value 1 (or 0) or in a search space set in a CORESET associated with CORESETGroupIndex value 1 (or 0) or in a PDCCH monitoring occasion for a search space set in a CORESET associated with CORESETGroupIndex value 1 (or 0) or in the second beam indication CORESET associated with CORESETGroupIndex value 1 (or 0) or in the beam indication CORESET with the highest (or lowest) CORESET ID associated with CORESETGroupIndex value 1 (or 0) or in the second search space set in a CORESET associated with CORESETGroupIndex value 1 (or 0) or in the search space set with the highest (or lowest) search space set ID in a CORESET associated with CORESETGroupIndex value 1 (or 0) or in the second PDCCH monitoring occasion for a search space set in a CORESET associated with CORESETGroupIndex value 1 (or 0) or in the PDCCH monitoring occasion for a search space set in a CORESET associated with CORESETGroupIndex value 1 (or 0) with the highest (or lowest) monitoring occasion ID or having the highest (or lowest) starting control channel element (CCE) index or ending later (or earlier) in time could be quasi co-located with the reference signals provided in the second indicated Rel. 17 unified TCI state—e.g., among/from the M=2 joint DL and UL TCI states or M=2 separate UL TCI states or N=2 separate DL TCI states indicated by a codepoint in a DCI (e.g., DCI format 1_1 or 1_2 with or without DL assignment) or MAC CE and associated with CORESETGroupIndex value 1 (or 0).

In one example, a reference PDCCH candidate—among the PDCCH candidates from the search space sets configured with searchSpaceLinking carrying/containing the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states—could be determined/configured according to at least one of the following examples.

In one example, for N=2 or M=2, the reference PDCCH candidate could correspond to the first or second PDCCH candidate or the PDCCH candidate with the lowest or highest starting CCE index or the PDCCH candidate from the first or second search space set configured with searchSpaceLinking or the PDCCH candidate from the search space set configured with searchSpaceLinking with the lowest or highest search space set ID or the PDCCH candidate in the first or second CORESET or the PDCCH candidate in the CORESET with the lowest or highest CORESET ID or the PDCCH candidate in the CORE SET associated with CORESETGroupIndex value 0 or 1 or the PDCCH candidate ending later or earlier in time—among the PDCCH candidates from the search space sets configured with searchSpaceLinking carrying/containing the same DCI payload/contents (e.g., DCI format 1_1 or 1_2 with or without DL assignment) indicating/updating the same TCI field(s) or the same TCI state codepoint(s) or the same N=2 or M=2 Rel. 17 unified TCI states.

In another example, the reference PDCCH candidate could correspond to the n-th (or m-th) PDCCH candidate or the PDCCH candidate with the n-th (or m-th) lowest or highest starting CCE index or the PDCCH candidate from the n-th (or m-th) search space set configured with searchSpaceLinking or the PDCCH candidate from the search space set configured with searchSpaceLinking with the n-th (or m-th) lowest or highest search space set ID or the PDCCH candidate in the n-th (or m-th) CORESET or the PDCCH candidate in the CORESET with the n-th (or m-th) lowest or highest CORESET ID or the PDCCH candidate in the CORESET associated with CORESETGroupIndex value n−1 (or m−1) or the PDCCH candidate ending the n-th (or m-th) latest or earliest in time—among the PDCCH candidates from the search space sets configured with searchSpaceLinking carrying/containing the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states, wherein n∈{1, . . . , N} and m∈{1, . . . , M}. For all of the above cases, n or m could be indicated by the network via higher layer RRC signaling, MAC CE command or dynamic DCI based signaling; alternatively, n or m could be fixed in the system specification(s) and known to both the network and the UE.

In one example, a reference search space set—among the search space sets configured with searchSpaceLinking containing the PDCCH candidates carrying/containing the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states—could be determined/configured according to at least one of the following examples.

In one example, for N=2 or M=2, the reference search space set could correspond to the first or second search space set or the search space set with the lowest or highest search space set ID or the search space set in the first or second CORESET or the search space set in the CORESET with the lowest or highest CORESET ID or the search space set in the CORESET associated with CORESETGroupIndex value 0 or 1 or the search space set containing the PDCCH candidate ending later or earlier in time—among the search space sets configured with searchSpaceLinking containing the PDCCH candidates carrying/containing the same DCI payload/contents (e.g., DCI format 1_1 or 1_2 with or without DL assignment) indicating/updating the same TCI field(s) or the same TCI state codepoint(s) or the same N=2 or M=2 Rel. 17 unified TCI states.

In another example, the reference search space set could correspond to the n-th (or m-th) search space set or the search space set with the n-th (or m-th) lowest or highest search space set ID or the search space set in the n-th (or m-th) CORESET or the search space set in the CORESET with the n-th (or m-th) lowest or highest CORESET ID or the search space set in the CORESET associated with CORESETGroupIndex value n−1 (or m−1) or the search space set containing the PDCCH candidate ending the n-th (or m-th) latest or earliest in time—among the search space sets configured with searchSpaceLinking containing the PDCCH candidates carrying/containing the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states, wherein n∈{1, . . . , N} and m∈{1, . . . , M}. For all of the above cases, n or m could be indicated by the network via higher layer RRC signaling, MAC CE command or dynamic DCI based signaling; alternatively, n or m could be fixed in the system specification(s) and known to both the network and the UE.

In one example, a reference CORESET—among the CORESETs containing the PDCCH candidates carrying/containing the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states—could be determined/configured according to at least one of the following examples.

In one example, for N=2 or M=2, the reference CORESET could correspond to the first or second CORESET or the CORESET with the lowest or highest CORESET ID or the CORESET associated with CORESETGroupIndex value 0 or 1 or the CORESET containing the PDCCH candidate ending later or earlier in time—among the CORESETs containing the PDCCH candidates carrying/containing the same DCI payload/contents (e.g., DCI format 1_1 or 1_2 with or without DL assignment) indicating/updating the same TCI field(s) or the same TCI state codepoint(s) or the same N=2 or M=2 Rel. 17 unified TCI states.

In another example, the reference CORESET could correspond to the n-th (or m-th) CORESET or the CORESET with the n-th (or m-th) lowest or highest CORESET ID or the CORESET associated with CORESETGroupIndex value n−1 (or m−1) or the CORESET containing the PDCCH candidate ending the n-th (or m-th) latest or earliest in time—among the CORESETs containing the PDCCH candidates carrying/containing the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states, wherein n∈{1, . . . , N} and m∈ {1, . . . , M}. For all of the above cases, n or m could be indicated by the network via higher layer RRC signaling, MAC CE command or dynamic DCI based signaling; alternatively, n or m could be fixed in the system specification(s) and known to both the network and the UE.

In one example, a reference PDCCH candidate—among the PDCCH candidates carrying/containing separate DCIs (e.g., DCI format 1_1 or 1_2 with or without DL assignment) indicating/updating the same TCI field(s) or the same TCI state codepoint(s) or the same N>1 or M>1 Rel. 17 unified TCI states—could be determined/configured according to at least one of the following examples.

In one example, for N=2 or M=2, the reference PDCCH candidate could correspond to the first or second PDCCH candidate or the PDCCH candidate with the lowest or highest starting CCE index or the PDCCH candidate from the first or second search space set or the PDCCH candidate from the search space set with the lowest or highest search space set ID or the PDCCH candidate in the first or second CORESET or the PDCCH candidate in the CORESET with the lowest or highest CORESET ID or the PDCCH candidate in the CORESET associated with CORESETGroupIndex value 0 or 1 or the PDCCH candidate ending later or earlier in time or the PDCCH candidate carrying/containing a DCI/DCI format with DL assignment or the PDCCH candidate carrying/containing a DCI/DCI format without DL assignment—among the PDCCH candidates carrying/containing separate DCIs (e.g., DCI format 1_1 or 1_2 with or without DL assignment) indicating/updating the same TCI field(s) or the same TCI state codepoint(s) or the same N=2 or M=2 Rel. 17 unified TCI states.

In another example, the reference PDCCH candidate could correspond to the n-th (or m-th) PDCCH candidate or the PDCCH candidate with the n-th (or m-th) lowest or highest starting CCE index or the PDCCH candidate from the n-th (or m-th) search space set or the PDCCH candidate from the search space set with the n-th (or m-th) lowest or highest search space set ID or the PDCCH candidate in the n-th (or m-th) CORESET or the PDCCH candidate in the CORESET with the n-th (or m-th) lowest or highest CORESET ID or the PDCCH candidate in the CORESET associated with CORESETGroupIndex value n−1 (or m−1) or the PDCCH candidate ending the n-th (or m-th) latest (or earliest) in time or the n-th (or m-th) PDCCH candidate carrying/containing a DCI/DCI format with DL assignment or the n-th (or m-th) PDCCH candidate carrying/containing a DCI/DCI format without DL assignment—among the PDCCH candidates carrying/containing separate DCIs (e.g., DCI format 1_1 or 1_2 with or without DL assignment) indicating/updating the same TCI field(s) or the same TCI state codepoint(s) or the same N>1 or M>1 Rel. 17 unified TCI states, wherein $n \in \{1, \ldots, N\}$ and $m \in \{1, \ldots, M\}$. For all of the above cases, norm could be indicated by the network via higher layer RRC signaling, MAC CE command or dynamic DCI based signaling; alternatively, n or m could be fixed in the system specification(s) and known to both the network and the UE.

In one example, a reference search space set—among the search space sets containing the PDCCH candidates carrying/containing separate DCIs (e.g., DCI format 1_1 or 1_2 with or without DL assignment) indicating/updating the same TCI field(s) or the same TCI state codepoint(s) or the same N>1 or M>1 Rel. 17 unified TCI states—could be determined/configured according to at least one of the following example.

In one example, for N=2 or M=2, the reference search space set could correspond to the first or second search space set or the search space set with the lowest or highest search space set ID or the search space set in the first or second CORESET or the search space set in the CORESET with the lowest or highest CORESET ID or the search space set received in the CORESET associated with CORESETGroupIndex value 0 or 1 or the search space set containing the PDCCH candidate ending later or earlier in time or the search space set containing the PDCCH candidate carrying/containing a DCI/DCI format with DL assignment or the search space set containing the PDCCH candidate carrying/containing a DCI/DCI format without DL assignment—among the search space sets containing the PDCCH candidates carrying/containing separate DCIs (e.g., DCI format 1_1 or 1_2 with or without DL assignment) indicating/updating the same TCI field(s) or the same TCI state codepoint(s) or the same N=2 or M=2 Rel. 17 unified TCI states.

In another example, the reference search space set could correspond to the n-th (or m-th) search space set or the search space set with the n-th (or m-th) lowest or highest search space set ID or the search space set in the n-th (or m-th) CORESET or the search space set in the CORESET with the n-th (or m-th) lowest or highest CORESET ID or the search space set received in the CORESET associated with CORESETGroupIndex value n−1 (or m−1) or the search space set containing the PDCCH candidate ending the n-th (or m-th) latest (or earliest) in time or the n-th (or m-th) search space set containing the PDCCH candidate carrying/containing a DCI/DCI format with DL assignment or the n-th (or m-th) search space set containing the PDCCH candidate carrying/containing a DCI/DCI format without DL assignment—among the search space sets containing the PDCCH candidates carrying/containing separate DCIs (e.g., DCI format 1_1 or 1_2 with or without DL assignment) indicating/updating the same TCI field(s) or the same TCI state codepoint(s) or the same N>1 or M>1 Rel. 17 unified TCI states, wherein $n \in \{1, \ldots, N\}$ and $m \in \{1, \ldots, M\}$. For all of the above cases, nor m could be indicated by the network via higher layer RRC signaling, MAC CE command or dynamic DCI based signaling; alternatively, n or m could be fixed in the system specification(s) and known to both the network and the UE.

In one example, a reference CORESET—among the CORESETs containing the PDCCH candidates carrying/containing separate DCIs (e.g., DCI format 1_1 or 1_2 with or without DL assignment) indicating/updating the same TCI field(s) or the same TCI state codepoint(s) or the same N>1 or M>1 Rel. 17 unified TCI states—could be determined/configured according to at least one of the following examples.

In one example, for N=2 or M=2, the reference CORESET could correspond to the first or second CORESET or the CORESET with the lowest or highest CORESET ID or the CORESET associated with CORESETGroupIndex value 0 or 1 or the CORESET containing the PDCCH candidate ending later or earlier in time or the CORESET containing the PDCCH candidate carrying/containing a DCI/DCI format with DL assignment or the CORESET containing the PDCCH candidate carrying/containing a DCI/DCI format without DL assignment—among the CORESETs containing the PDCCH candidates carrying/containing separate DCIs (e.g., DCI format 1_1 or 1_2 with or without DL assignment) indicating/updating the same TCI field(s) or the same TCI state codepoint(s) or the same N=2 or M=2 Rel. 17 unified TCI states.

In another example, the reference CORESET could correspond to the n-th (or m-th) CORESET or the CORESET with the n-th (or m-th) lowest or highest CORESET ID or the CORESET associated with CORESETGroupIndex value n−1 (or m−1) or the CORESET containing the PDCCH candidate ending the n-th (or m-th) latest (or earliest) in time or the n-th (or m-th) CORESET containing the PDCCH candidate carrying/containing a DCI/DCI format with DL assignment or the n-th (or m-th) CORESET containing the PDCCH candidate carrying/containing a DCI/DCI format without DL assignment—among the CORESETs containing the PDCCH candidates carrying/containing separate DCIs (e.g., DCI format 1_1 or 1_2 with or without DL assignment) indicating/updating the same TCI field(s) or the same TCI state codepoint(s) or the same N>1 or M>1 Rel. 17 unified TCI states, wherein n∈{1, . . . , N} and me {1, . . . , M}. For all of the above cases, nor m could be indicated by the network via higher layer RRC signaling, MAC CE command or dynamic DCI based signaling; alternatively, n or m could be fixed in the system specification(s) and known to both the network and the UE.

The Rel. 17 unified TCI states indicated in the PDCCH candidates—from one or more search space sets configured with searchSpaceLinking received in one or more CORESETs—carrying/containing the same DCI payload/contents (e.g., DCI format 1_1 or 1_2 with or without DL assignment) indicating/updating the same TCI field(s) or the same TCI state codepoint(s) or the same N>1 or M>1 Rel. 17 unified TCI states (example in the present disclosure), or the Rel. 17 unified TCI states indicated in the PDCCH candidates—from one or more search space sets received in one or more CORESETs—carrying/containing separate DCIs (e.g., DCI format 1_1 or 1_2 with or without DL assignment) indicating/updating the same TCI field(s) or the same TCI state codepoint(s) or the same N>1 or M>1 Rel. 17 unified TCI states, could be applied according to at least one of the following examples of timelines.

In one example, when the UE may transmit the last symbol of the PUCCH with HARQ-ACK information corresponding to the DCI carrying the M>1 or N>1 Rel. 17 unified TCI states indicated in the reference PDCCH candidate determined according to the mentioned examples in the present disclosure or in the reference search space set determined according to the mentioned examples in the present disclosure or in the reference CORESET determined according to the mentioned examples in the present disclosure and without DL assignment, the indicated M>1 or N>1 Rel. 17 unified TCI states may be applied starting from the first slot that is at least BeamAppTime_r17 (beam application time—BAT) symbols after the last symbol of the PUCCH. The first slot and the BAT provided by the higher layer parameter BeamAppTime_r17 symbols are both determined on the carrier with the smallest subcarrier spacing (SCS) among the carrier(s) applying the beam indication.

In another example, when the UE may receive the first (or the last) symbol of the DCI carrying the M>1 or N>1 Rel. 17 unified TCI states (with or without DL assignment) indicated in the reference PDCCH candidate determined according to the mentioned examples in the present disclosure or in the reference search space set determined according to the mentioned examples in the present disclosure or in the reference CORESET determined according to the mentioned examples in the present disclosure, the indicated M>1 or N>1 Rel. 17 unified TCI states may be applied starting from the first slot that is at least BeamAppTime_r17 (beam application time—BAT) symbols after the first (or the last) symbol of the DCI for unified TCI state indication in the reference PDCCH candidate determined according to the mentioned examples in the present disclosure or in the reference search space set determined according to the mentioned examples in the present disclosure or in the reference CORESET determined according to the mentioned examples in the present disclosure. The first slot and the BAT provided by the higher layer parameter BeamApp-Time_r17 symbols are both determined on the carrier with the smallest subcarrier spacing (SCS) among the carrier(s) applying the beam indication.

In yet another example, when the UE may transmit the last symbol of the PUCCH with HARQ-ACK information corresponding to PDSCH(s) scheduled by the DCI carrying the M>1 or N>1 Rel. 17 unified TCI states indicated in the reference PDCCH candidate determined according to the mentioned examples in the present disclosure or in the reference search space set determined according to the mentioned examples in the present disclosure or in the reference CORESET determined according to the mentioned examples in the present disclosure, the indicated M>1 or N>1 Rel. 17 unified TCI states may be applied starting from the first slot that is at least BeamAppTime_r17 (beam application time—BAT) symbols after the last symbol of the PUCCH. The first slot and the BAT provided by the higher layer parameter BeamAppTime_r17 symbols are both determined on the carrier with the smallest subcarrier spacing (SCS) among the carrier(s) applying the beam indication.

As discussed in the mentioned examples in the present disclosure, the network could transmit the same DCI payload indicating the same TCI field(s) or TCI state codepoint(s) or Rel. 17 unified TCI state(s) update across different PDCCH candidates/search space sets/CORESETs, or separate DCIs/DCI formats indicating the same TCI field(s) or TCI state codepoint(s) or Rel. 17 unified TCI state(s) update. For this case, the UE could report a single HARQ-ACK codebook/HARQ-ACK information for the same Rel. 17 unified TCI state(s) update indicated in the same DCI payload repeatedly transmitted across different PDCCH candidates/search spaces/CORESETs or in separate DCIs/DCI formats.

A UE could report in a slot the HARQ-ACK information for a Rel. 17 unified TCI state(s) update/indication, wherein the slot can be determined according to at least one of the following examples.

In one example, the UE could report HARQ-ACK information for a Rel. 17 unified TCI state(s) update/indication in a (Type-1 or Type-2) HARQ-ACK codebook k slots after the end of the reference PDCCH candidate determined according to the mentioned examples in the present disclosure or the end of the reference search space set determined according to the mentioned examples in the present disclosure or the end of the reference CORESET determined according to the mentioned examples in the present disclosure, wherein k is indicated by a value of a PDSCH-to-HARQ feedback timing indicator field in the corresponding DCI format in the reference PDCCH candidate determined according to the mentioned examples in the present disclosure or in the reference search space set determined according to the mentioned examples in the present disclosure or in the reference CORESET determined according to the mentioned examples in the present disclosure, and the DCI format in the reference PDCCH candidate determined according to the mentioned examples in the present disclosure or in the reference search space set determined according to the mentioned examples in the present disclosure or in the reference CORESET determined according to the mentioned examples in the present disclosure could indicate the M>1 or N>1 Rel. 17 unified TCI states without DL assignment.

In another example, the UE could report HARQ-ACK information for a Rel. 17 unified TCI state(s) update/indication in a (Type-1 or Type-2) HARQ-ACK codebook k slots after the end of a PDSCH reception scheduled by the corresponding DCI format in the reference PDCCH candidate determined according to the mentioned examples in the present disclosure or in the reference search space set determined according to the mentioned examples in the present disclosure or in the reference CORESET determined according to the mentioned examples in the present disclosure, wherein k is indicated by a value of a PDSCH-to-HARQ feedback timing indicator field in the corresponding DCI format in the reference PDCCH candidate determined according to the mentioned examples in the present disclosure or in the reference search space set determined according to the mentioned examples in the present disclosure or in the reference CORESET determined according to the mentioned examples in the present disclosure, and the DCI format in the reference PDCCH candidate determined according to the mentioned examples in the present disclosure or in the reference search space set determined according to the mentioned examples in the present disclosure or in the reference CORESET determined according to the mentioned examples in the present disclosure could indicate the M>1 or N>1 Rel. 17 unified TCI states with DL assignment.

In one embodiment, various unified TCI state/beam indication methods and PDCCH repetition strategies for DCI(s) indicating TCI state/beam update for one or more TRPs in a multi-DCI (mDCI) based multi-TRP system are provided.

In the present disclosure, one or more CORESETs in the mDCI based multi-TRP system could be configured with a same pool index, denoted by CORESETPoolIndex. The CORESETs configured with the same CORESETPoolIndex value could be associated with the same TRP in a multi-TRP system. The UE could be provided by PDCCH-Config one or more (e.g., two) CORESETPoolIndex values (e.g., 0 and/or 1). The association of a CORESET and a CORESETPoolIndex value could be via indicating the explicit CORESETPoolIndex value (e.g., either 0 or 1) in the parameter, e.g., the higher layer parameter ControlResourceSet, configuring the CORESET.

In a mDCI based multi-TRP system, a UE could receive from the network one or more (e.g., M>1 or N>1) MAC CEs or DCIs (e.g., DCI format 1_1 or 1_2 with or without DL assignment) each associated/configured with a CORESETPoolIndex value and indicating one or more joint DL and UL Rel. 17 unified TCI states or one or more separate UL Rel. 17 unified TCI states or a first combination of one or more joint DL and UL Rel. 17 unified TCI states and separate UL Rel. 17 unified TCI states or one or more separate DL Rel. 17 unified TCI states or a second combination of one or more joint DL and UL Rel. 17 unified TCI states and separate DL Rel. 17 unified TCI states or a third combination of one or more joint DL and UL Rel. 17 unified TCI states, separate DL Rel. 17 unified TCI states and separate UL Rel. 17 unified TCI states for UE-dedicated reception on PDSCH/PDCCH or dynamic-grant/configured-grant based PUSCH and all of dedicated PUCCH resources. For instance, the DCI format for unified TCI state/beam indication (e.g., DCI format 1_1 or 1_2 with or without DL assignment) could be received in a CORESET associated with a CORESETPoolIndex value and include a "transmission configuration indication" field containing one or more codepoints activated by a first MAC CE activation command from a set/pool of codepoints.

For this case, each codepoint could indicate one or more joint DL and UL Rel. 17 unified TCI states or one or more separate UL Rel. 17 unified TCI states or a first combination of one or more joint DL and UL Rel. 17 unified TCI states and separate UL Rel. 17 unified TCI states or one or more separate DL Rel. 17 unified TCI states or a second combination of one or more joint DL and UL Rel. 17 unified TCI states and separate DL Rel. 17 unified TCI states or a third combination of one or more joint DL and UL Rel. 17 unified TCI states, separate DL Rel. 17 unified TCI states and separate UL Rel. 17 unified TCI for UE-dedicated reception on PDSCH/PDCCH or dynamic-grant/configured-grant based PUSCH and all of dedicated PUCCH resources.

Furthermore, DM-RS antenna ports for PDCCH receptions in one or more CORESETs associated with a CORESETPoolIndex value could be quasi co-located with reference signal(s) provided in one or more indicated Rel. 17 unified TCI states associated/configured with the same CORESETPoolIndex value. In the present disclosure, the CORESETs associated with a CORESETPoolIndex whose QCL assumption(s) follow that provided in the indicated Rel. 17 unified TCI state(s) associated with the same CORESETPoolIndex or sharing the indicated Rel. 17 unified TCI state(s) associated with the same CORESETPoolIndex is referred to as Type-I CORESET(s) for the CORESETPoolIndex, while the CORESET(s) associated with a CORESETPoolIndex whose QCL assumption(s) does not follow that provided in the indicated Rel. 17 unified TCI state(s) associated with the same CORESETPoolIndex or not sharing the indicated Rel. 17 unified TCI state(s) associated with the same CORESETPoolIndex is referred to as Type-II CORESET(s) for the CORESETPoolIndex.

Furthermore, a Type-I CORESET or a Type-II CORESET for a CORESETPoolIndex could correspond to one or more of: (1) "CORESET A": a CORESET other than CORESET with index 0 (or CORESET #0) associated with only UE-dedicated PDCCH reception(s) in a CC, comprising, e.g., CORESET(s) associated with USS set(s) or Type3-PDCCH CSS set(s); (2) "CORESET B": a CORESET other than CORESET #0 associated with only non-UE-dedicated PDCCH reception(s) in a CC, comprising, e.g., CORESET(s) associated with all types of CSS sets such as Type0/0A/1/2/3-PDCCH CSS sets or CSS sets other than Type3-PDCCH CSS set(s) such as Type0/0A/1/2-PDCCH CSS sets; (3) "CORESET C": a CORESET other than CORESET #0 associated with both UE-dedicated and non-UE-dedicated PDCCH receptions in a CC; and (4) CORESET #0, i.e., CORESET with index 0.

The UE could be provided/configured with "useIndicatedR17TCIState" for one or more of the Type-I CORESETs. For instance, the UE could be provided/configured with "useIndicatedR17TCIstate" set to "enabled" in the parameter, e.g., the higher layer parameter ControlResourceSet, that configures the corresponding Type-I CORESET(s) for a CORESETPoolIndex.

The same PDCCH or DCI payload (e.g., DCI format 1_1 or 1_2 with or without DL assignment) indicating/updating the same Rel. 17 unified TCI state(s) could be repeated in time, frequency or spatial domains. Alternatively, the network could transmit separate DCIs/DCI payloads (e.g., DCI format 1_1 or 1_2 with or without DL assignment) indicating/updating the same Rel. 17 unified TCI state(s).

In one example, one or more (e.g., N>1 or M>1) PDCCH candidates from one or more (e.g., N>1 or M>1) search space sets configured with a higher layer parameter searchSpaceLinking could be received in one or more (e.g., N>1 or M>1) CORESETs associated with different values of CORESETPoolIndex. Each of the one or more CORESETs could be a Type-I CORESET or a Type-II CORESET for the corresponding CORESETPoolIndex value as described above. Furthermore, each of the one or more CORESETs could be configured with a Rel. 17 unified TCI state. The one or more PDCCH candidates received in the CORESETs associated with different CORESETPoolIndex values could carry/contain the same DCI payload/contents (e.g., DCI format 1_1 or 1_2 with or without DL assignment) indicating/updating the same TCI field(s) or the same TCI state codepoint(s) or the same Rel. 17 unified TCI state(s). Hence, the corresponding one or more CORESETs can also be referred to as beam indication CORESETs.

For instance, a UE could receive in N=2 or M=2 beam indication CORESETs (e.g., Type-I CORESETs or Type-II CORESETs as described above) at least N=2 or M=2 search space sets configured with searchSpaceLinking, respectively, wherein each of the at least N=2 or M=2 search space sets could include at least one PDCCH candidate, each of the N=2 or M=2 beam indication CORESETs could be configured with a single active Rel. 17 unified TCI state, the N=2 or M=2 beam indication CORESETs are associated/configured with CORESETPoolIndex values 0 and 1 respectively, and the PDCCH candidate(s) from the at least N=2 or M=2 search space sets linked by the higher layer parameter searchSpaceLinking could correspond to the same DCI payload/contents (e.g., DCI format 1_1 or 1_2 with or without DL assignment) indicating/updating the same TCI field(s) or the same TCI state codepoint(s) or the same Rel. 17 unified TCI state(s).

In another example, one or more (e.g., N>1 or M>1) PDCCH candidates from one or more (e.g., N>1 or M>1) search space sets could be received in one or more (e.g., N>1 or M>1) CORESETs associated with different values of CORESETPoolIndex. Each of the one or more CORESETs could be a Type-I CORESET or a Type-II CORESET for the corresponding CORESETPoolIndex value as described above. Furthermore, each of the one or more CORESETs could be configured with a Rel. 17 unified TCI state. The one or more PDCCH candidates received in the CORESETs associated with different CORESETPoolIndex values could carry/contain one or more separate DCIs (e.g., DCI format 1_1 or 1_2 with or without DL assignment) indicating/updating the same TCI field(s) or the same TCI state codepoint(s) or the same Rel. 17 unified TCI states, wherein other DCI contents/fields could be different among/across the one or more separate DCIs (multi-chance PDCCH transmission/reception) and each of the one or more separate DCIs could be received in a CORESET associated with a different CORESETPoolIndex value.

For this case, one or more of the separate DCIs/DCI formats could schedule PDSCH reception(s), while one or more of the separate DCIs/DCI formats could be without any DL assignment(s). Hence, the corresponding one or more CORESETs can also be referred to as beam indication CORESETs. For instance, a UE could receive in N=2 or M=2 beam indication CORESETs (e.g., Type-I CORESETs or Type-II CORESETs as described above) at least N=2 or M=2 search space sets, respectively, wherein each of the at least N=2 or M=2 search space sets could include at least one PDCCH candidate, each of the N=2 or M=2 beam indication CORESETs could be configured with a single active Rel. 17 unified TCI state, the N=2 or M=2 beam indication CORESETs are associated/configured with CORESETPoolIndex values 0 and 1 respectively, and the PDCCH candidates from the at least N=2 or M=2 search space sets could respectively correspond to two DCIs (e.g., DCI format 1_1 or 1_2 with or without DL assignment) indicating/updating the same TCI field(s) or the same TCI state codepoint(s) or the same Rel. 17 unified TCI states. For this case, the two DCIs could be received in CORESETs associated with CORESETPoolIndex values 0 and 1 respectively, and other DCI contents/fields such as DL assignment could be different between the two DCIs.

For mDCI based multi-TRP operation, DM-RS antenna ports for PDCCH receptions in one or more (beam indication) CORESETs associated with a CORESETPoolIndex value could be quasi co-located with reference signals provided in one or more indicated Rel. 17 unified TCI states associated with the same CORESETPoolIndex value. When a UE receives from the network one or more DCIs/DCI formats (e.g., DCI format 1_1 or 1_2 with or without DL assignment) or MAC CEs each associated with a CORESETPoolIndex value and having a TCI state codepoint indicating one or more Rel. 17 unified TCI states, the Rel. 17 unified TCI states for the beam indication CORESETs associated with different values of CORESETPoolIndex could be determined according to at least one of examples.

In one example, if one or more CORESETPoolIndex values are configured, DM-RS antenna ports for receiving the PDCCH candidate(s)—among the PDCCH candidates from the search space sets configured with searchSpaceLinking and carrying/containing the same DCI payload/contents (e.g., DCI format 1_1 or 1_2 with or without DL assignment) indicating/updating the same TCI field(s) or the same TCI state codepoint(s) or the same Rel. 17 unified TCI states—in a beam indication CORESET associated with CORESETPoolIndex value n−1 (or m−1) or in a search space set configured with searchSpaceLinking in a CORESET associated with CORESETPoolIndex value n−1 (or m−1) or in a PDCCH monitoring occasion for a search space set configured with searchSpaceLinking in a CORESET associated with CORESETPoolIndex value n−1 (or m−1) or in the n-th (or m-th) beam indication CORESET associated with CORESETPoolIndex value n−1 (or m−1) or in the beam indication CORESET with the n-th (or m-th) lowest (or highest) CORESET ID associated with CORESETPoolIndex value n−1 (or m−1) or in the n-th (or m-th) search space set configured with searchSpaceLinking in a CORESET associated with CORESETPoolIndex value n−1 (or m−1) or in the search space set configured with searchSpaceLinking with the n-th (or m-th) lowest (or highest) search space set ID in a CORESET associated with CORESETPoolIndex value n−1 (or m−1) or in the n-th (or m-th) PDCCH monitoring occasion for a search space set configured with searchSpaceLinking in a CORESET associated with CORESETPoolIndex value n−1 (or m−1) or in the PDCCH monitoring occasion for a search space set configured with searchSpaceLinking in a CORESET associated with CORESETPoolIndex value n−1 (or m−1) with the n-th (or m-th) lowest (or highest) monitoring occasion ID or having the n-th (or m-th) lowest (or highest) starting control channel element (CCE) index or ending the n-th (or m-th) latest (or earliest) in time could be quasi co-located with the reference signals provided in one or more Rel. 17 unified TCI states (e.g., with TCI state ID n or m) indicated by a codepoint in a DCI (e.g., DCI format 1_1 or 1_2 with or without DL assignment) or MAC CE associated with CORESETPoolIndex value n−1 (or m−1).

In such examples, wherein $n \in \{1, \ldots, N\}$ and $m \{1, \ldots, M\}$. For N=2 or M=2, (1) DM-RS antenna ports for receiving the PDCCH candidate(s)—among the PDCCH candidates from the search space sets configured with searchSpaceLinking and carrying/containing the same DCI payload/contents (e.g., DCI format 1_1 or 1_2 with or without DL assignment) indicating/updating the same TCI field(s) or the same TCI state codepoint(s) or the same Rel. 17 unified TCI states—in a beam indication CORESET associated with CORESETPoolIndex value 0 (or 1) or in a search space set configured with searchSpaceLinking in a CORESET associated with CORESETPoolIndex value 0 (or 1) or in a PDCCH monitoring occasion for a search space set configured with searchSpaceLinking in a CORESET associated with CORESETPoolIndex value 0 (or 1) or in the first beam indication CORESET associated with CORESETPoolIndex value 0 (or 1) or in the beam indication CORESET with the lowest (or highest) CORESET ID associated with CORESETPoolIndex value 0 (or 1) or in the first search space set configured with searchSpaceLinking in a CORESET associated with CORESETPoolIndex value 0 (or 1) or in the search space set configured with searchSpaceLinking with the lowest (or highest) search space set ID in a CORESET associated with CORESETPoolIndex value 0 (or 1) or in the first PDCCH monitoring occasion for a search space set configured with searchSpaceLinking in a CORESET associated with CORESETGroupIndex value 0 (or 1) or in the PDCCH monitoring occasion for a search space set configured with searchSpaceLinking in a CORESET associated with CORESETPoolIndex value 0 (or 1) with the lowest (or highest) monitoring occasion ID or having the lowest (or highest) starting control channel element (CCE) index or ending earlier (or later) in time could be quasi co-located with the reference signals provided in one or more Rel. 17 unified TCI states (e.g., with the lowest TCI state ID) indicated by a codepoint in a DCI (e.g., DCI format 1_1 or 1_2 with or without DL assignment) or MAC CE associated with CORESETPoolIndex value 0 (or 1), and (2) DM-RS antenna ports for receiving the PDCCH candidate(s)—among the PDCCH candidates from the search space sets configured with searchSpaceLinking and carrying/containing the same DCI payload/contents (e.g., DCI format 1_1 or 1_2 with or without DL assignment) indicating/updating the same TCI field(s) or the same TCI state codepoint(s) or the same Rel. 17 unified TCI states—in a beam indication CORESET associated with CORESETPoolIndex value 1 (or 0) or in a search space set configured with searchSpaceLinking in a CORESET associated with CORESETPoolIndex value 1 (or 0) or in a PDCCH monitoring occasion for a search space set configured with searchSpaceLinking in a CORESET associated with CORESETPoolIndex value 1 (or 0) or in the second beam indication CORESET associated with CORESETPoolIndex value 1 (or 0) or in the beam indication CORESET with the highest (or lowest) CORESET ID associated with CORESETPoolIndex value 1 (or 0) or in the second search space set configured with searchSpaceLinking in a CORESET associated with CORESETPoolIndex value 1 (or 0) or in the search space set configured with searchSpaceLinking with the highest (or lowest) search space set ID in a CORESET associated with CORESETPoolIndex value 1 (or 0) or in the second PDCCH monitoring occasion for a search space set configured with searchSpaceLinking in a CORESET associated with CORESETGroupIndex value 1 (or 0) or in the PDCCH monitoring occasion for a search space set configured with searchSpaceLinking in a CORESET associated with CORESETPoolIndex value 1 (or 0) with the highest (or lowest) monitoring occasion ID or having the highest (or lowest) starting control channel element (CCE) index or ending later (or earlier) in time could be quasi co-located with the reference signals provided in one or more Rel. 17 unified TCI states (e.g., with the highest TCI state ID) indicated by a codepoint in a DCI (e.g., DCI format 1_1 or 1_2 with or without DL assignment) or MAC CE associated with CORESETPoolIndex value 1 (or 0).

In another example, if one or more CORESETPoolIndex values are configured, DM-RS antenna ports for receiving the PDCCH candidate(s)—among the PDCCH candidates carrying/containing separate DCIs (e.g., DCI format 1_1 or 1_2 with or without DL assignment) associated with different CORESETPoolIndex values indicating/updating the same TCI field(s) or the same TCI state codepoint(s) or the same Rel. 17 unified TCI states—in a beam indication CORESET associated with CORESETPoolIndex value n−1 (or m−1) or in a search space set in a CORESET associated with CORESETPoolIndex value n−1 (or m−1) or in a PDCCH monitoring occasion for a search space set in a CORESET associated with CORESETPoolIndex value n−1 (or m−1) or in the n-th (or m-th) beam indication CORESET associated with CORESETPoolIndex value n−1 (or m−1) or in the beam indication CORESET with the n-th (or m-th) lowest (or highest) CORESET ID associated with CORESETPoolIndex value n−1 (or m−1) or in the n-th (or m-th) search space set in a CORESET associated with CORESETPoolIndex value n−1 (or m−1) or in the search space set with the n-th (or m-th) lowest (or highest) search space set ID in a CORESET associated with CORESETPoolIndex value n−1 (or m−1) or in the n-th (or m-th) PDCCH monitoring occasion for a search space set in a CORESET associated with CORESETPoolIndex value n−1 (or m−1) or in the PDCCH monitoring occasion for a search space set in a CORESET associated with CORESETPoolIndex value n−1 (or m−1) with the n-th (or m-th) lowest (or highest) monitoring occasion ID or having the n-th (or m-th) lowest (or highest) starting control channel element (CCE) index or ending the n-th (or m-th) latest (or earliest) in time could be quasi co-located with the reference signals provided in one or more Rel. 17 unified TCI states (e.g., with TCI state ID n or m) indicated by a codepoint in a DCI (e.g., DCI format 1_1 or 1_2 with or without DL assignment) or MAC CE associated with CORESETPoolIndex value n−1 (or m−1), where $n \in \{1, \ldots, N\}$ and $m \in \{1, \ldots, M\}$. For N=2 or M=2, (1) DM-RS antenna ports for receiving the PDCCH candidate(s)—among the PDCCH candidates carrying/containing separate DCIs (e.g., DCI format 1_1 or 1_2 with or without DL assignment) associated with CORESETPoolIndex values 0 and 1 indicating/updating the same TCI field(s) or the same TCI state codepoint(s) or the same Rel. 17 unified TCI states—in a beam indication CORESET associated with CORESETPoolIndex value 0 (or 1) or in a search space set in a CORESET associated with CORESETPoolIndex value 0 (or 1) or in a PDCCH monitoring occasion for a search space set in a CORESET associated with CORESETPoolIndex value 0 (or 1) or in the first beam indication CORESET associated with CORESETPoolIndex value 0 (or 1) or in the beam indication CORESET with the lowest (or highest) CORESET ID associated with CORESETPoolIndex value 0 (or 1) or in the first search space set in a CORESET associated with CORESETPoolIndex value 0 (or 1) or in the search space set with the lowest (or highest) search space set ID in a CORESET associated with CORESETPoolIndex value 0 (or 1) or in the first PDCCH monitoring occasion for a search space set in a CORESET associated with CORESETPoolIndex value 0 (or 1) or in the PDCCH monitoring occasion for a search space set in a CORESET associated with CORESETPoolIndex value 0 (or 1) with the lowest (or highest) monitoring occasion ID or having the lowest (or highest) starting control channel element (CCE) index or ending earlier (or later) in time could be quasi co-located with the reference signals provided in one or more Rel. 17 unified TCI states (e.g., with the lowest TCI state ID) indicated by a codepoint in a DCI (e.g., DCI format 1_1 or 1_2 with or without DL assignment) or MAC CE associated with CORESETPoolIndex value 0 (or 1), and (2) DM-RS antenna ports for receiving the PDCCH candidate(s)— among the PDCCH candidates carrying/containing separate DCIs (e.g., DCI format 1_1 or 1_2 with or without DL assignment) associated with CORESETPoolIndex values 0 and 1 indicating/updating the same TCI field(s) or the same TCI state codepoint(s) or the same Rel. 17 unified TCI states—in a beam indication CORESET associated with CORESETPoolIndex value 1 (or 0) or in a search space set in a CORESET associated with CORESETPoolIndex value 1 (or 0) or in a PDCCH monitoring occasion for a search space set in a CORESET associated with CORESETPoolIndex value 1 (or 0) or in the second beam indication CORESET associated with CORESETPoolIndex value 1 (or 0) or in the beam indication CORESET with the highest (or lowest) CORESET ID associated with CORESETPoolIndex value 1 (or 0) or in the second search space set in a CORESET associated with CORESETPoolIndex value 1 (or 0) or in the search space set with the highest (or lowest) search space set ID in a CORESET associated with CORESETPoolIndex value 1 (or 0) or in the second PDCCH monitoring occasion for a search space set in a CORESET associated with CORESETPoolIndex value 1 (or 0) or in the PDCCH monitoring occasion for a search space set in a CORESET associated with CORESETPoolIndex value 1 (or 0) with the highest (or lowest) monitoring occasion ID or having the highest (or lowest) starting control channel element (CCE) index or ending later (or earlier) in time could be quasi co-located with the reference signals provided in one or more Rel. 17 unified TCI states (e.g., with the highest TCI state ID) indicated by a codepoint in a DCI (e.g., DCI format 1_1 or 1_2 with or without DL assignment) or MAC CE associated with CORESETPoolIndex value 1 (or 0).

In one example, a reference PDCCH candidate—among the PDCCH candidates from the search space sets configured with searchSpaceLinking received in the CORESETs associated with different values of CORESETPoolIndex carrying/containing the same DCI payload/contents (e.g., DCI format 1_1 or 1_2 with or without DL assignment) indicating/updating the same TCI field(s) or the same TCI state codepoint(s) or the same Rel. 17 unified TCI states—could be determined/configured according to at least one of the following examples.

In one example, for N=2 or M=2, the reference PDCCH candidate could correspond to the first or second PDCCH candidate or the PDCCH candidate with the lowest or highest starting CCE index or the PDCCH candidate from the first or second search space set configured with searchSpaceLinking or the PDCCH candidate from the search space set configured with searchSpaceLinking with the lowest or highest search space set ID or the PDCCH candidate in the first or second CORESET or the PDCCH candidate in the CORESET with the lowest or highest CORESET ID or the PDCCH candidate in the CORESET associated with CORESETPoolIndex value 0 or 1 or the PDCCH candidate ending later or earlier in time—among the PDCCH candidates from the search space sets configured with searchSpaceLinking received in the CORESETs associated with CORESETPoolIndex values 0 and 1 carrying/containing the same DCI payload/contents (e.g., DCI format 1_1 or 1_2 with or without DL assignment) indicating/updating the same TCI field(s) or the same TCI state codepoint(s) or the same Rel. 17 unified TCI states.

In another example, the reference PDCCH candidate could correspond to the n-th (or m-th) PDCCH candidate or the PDCCH candidate with the n-th (or m-th) lowest or highest starting CCE index or the PDCCH candidate from the n-th (or m-th) search space set configured with searchSpaceLinking or the PDCCH candidate from the search space set configured with searchSpaceLinking with the n-th (or m-th) lowest or highest search space set ID or the PDCCH candidate in the n-th (or m-th) CORESET or the PDCCH candidate in the CORESET with the n-th (or m-th) lowest or highest CORESET ID or the PDCCH candidate in the CORESET associated with CORESETPoolIndex value n−1 (or m−1) or the PDCCH candidate ending the n-th (or m-th) latest or earliest in time—among the PDCCH candidates from the search space sets configured with searchSpaceLinking received in the CORESETs associated with different values of CORESETPoolIndex carrying/containing the same DCI payload/contents (e.g., DCI format 1_1 or 1_2 with or without DL assignment) indicating/updating the same TCI field(s) or the same TCI state codepoint(s) or the same Rel. 17 unified TCI states, wherein $n \in \{1, \ldots, N\}$ and $m \in \{1, \ldots, M\}$.

For all of the above cases, n or m could be indicated by the network via higher layer RRC signaling, MAC CE command or dynamic DCI based signaling; alternatively, n or m could be fixed in the system specification(s) and known to both the network and the UE.

In one example, a reference search space set—among the search space sets configured with searchSpaceLinking in the CORESETs associated with different values of CORESETPoolIndex containing the PDCCH candidates carrying/containing the same DCI payload/contents (e.g., DCI format 1_1 or 1_2 with or without DL assignment) indicating/updating the same TCI field(s) or the same TCI state codepoint(s) or the same Rel. 17 unified TCI states—could be determined/configured according to at least one of the following examples.

In one example, for N=2 or M=2, the reference search space set could correspond to the first or second search space set or the search space set with the lowest or highest search space set ID or the search space set in the first or second CORESET or the search space set in the CORESET with the lowest or highest CORESET ID or the search space set in the CORESET associated with CORESETPoolIndex value 0 or 1 or the search space set containing the PDCCH candidate ending later or earlier in time—among the search space sets configured with searchSpaceLinking received in the CORESETs associated CORESETPoolIndex values 0 and 1 containing the PDCCH candidates carrying/containing the same DCI payload/contents (e.g., DCI format 1_1 or 1_2 with or without DL assignment) indicating/updating the same TCI field(s) or the same TCI state codepoint(s) or the same Rel. 17 unified TCI states.

In another example, the reference search space set could correspond to the n-th (or m-th) search space set or the search space set with the n-th (or m-th) lowest or highest search space set ID or the search space set in the n-th (or m-th) CORESET or the search space set in the CORESET with the n-th (or m-th) lowest or highest CORESET ID or the search space set in the CORESET associated with CORESETPoolIndex value n−1 (or m−1) or the search space set containing the PDCCH candidate ending the n-th (or m-th) latest or earliest in time—among the search space sets configured with searchSpaceLinking received in the CORESETs associated with different values of CORESETPoolIndex containing the PDCCH candidates carrying/containing the same DCI payload/contents (e.g., DCI format 1_1 or 1_2 with or without DL assignment) indicating/updating the same TCI field(s) or the same TCI state codepoint(s) or the same Rel. 17 unified TCI states, wherein $n \in \{1, \ldots, N\}$ and $m \in \{1, \ldots, M\}$. For all of the above cases, n or m could be indicated by the network via higher layer RRC signaling, MAC CE command or dynamic DCI based signaling; alternatively, n or m could be fixed in the system specification(s) and known to both the network and the UE.

In one example, a reference CORESET—among the CORESETs associated with different values of CORESETPoolIndex containing the PDCCH candidates carrying/containing the same DCI payload/contents (e.g., DCI format 1_1 or 1_2 with or without DL assignment) indicating/updating the same TCI field(s) or the same TCI state codepoint(s) or the same Rel. 17 unified TCI states—could be determined/configured according to at least one of the following examples.

In one example, for N=2 or M=2, the reference CORESET could correspond to the first or second CORESET or the CORESET with the lowest or highest CORESET ID or the CORESET associated with CORESETPoolIndex value 0 or 1 or the CORESET containing the PDCCH candidate ending later or earlier in time—among the CORESETs associated with CORESETPoolIndex values 0 and 1 containing the PDCCH candidates carrying/containing the same DCI payload/contents (e.g., DCI format 1_1 or 1_2 with or without DL assignment) indicating/updating the same TCI field(s) or the same TCI state codepoint(s) or the same Rel. 17 unified TCI states.

In another example, the reference CORESET could correspond to the n-th (or m-th) CORESET or the CORESET with the n-th (or m-th) lowest or highest CORESET ID or the CORESET associated with CORESETPoolIndex value n−1 (or m−1) or the CORESET containing the PDCCH candidate ending the n-th (or m-th) latest or earliest in time—among the CORESETs associated with different values of CORESETPoolIndex containing the PDCCH candidates carrying/containing the same DCI payload/contents (e.g., DCI format 1_1 or 1_2 with or without DL assignment) indicating/updating the same TCI field(s) or the same TCI state codepoint(s) or the same Rel. 17 unified TCI states, wherein $n \in \{1, \ldots, N\}$ and $m \in \{1, \ldots, M\}$. For all of the above cases, n or m could be indicated by the network via higher layer RRC signaling, MAC CE command or dynamic DCI based signaling; alternatively, n or m could be fixed in the system specification(s) and known to both the network and the UE.

In one example, a reference PDCCH candidate—among the PDCCH candidates received in the CORESETs associated with different values of CORESETPoolIndex carrying/containing separate DCIs (e.g., DCI format 1_1 or 1_2 with or without DL assignment) associated with different CORESETPoolIndex values indicating/updating the same TCI field(s) or the same TCI state codepoint(s) or the same Rel. 17 unified TCI states—could be determined/configured according to at least one of the following examples.

In one example, for N=2 or M=2, the reference PDCCH candidate could correspond to the first or second PDCCH candidate or the PDCCH candidate with the lowest or highest starting CCE index or the PDCCH candidate from the first or second search space set or the PDCCH candidate from the search space set with the lowest or highest search space set ID or the PDCCH candidate in the first or second CORESET or the PDCCH candidate in the CORESET with the lowest or highest CORESET ID or the PDCCH candidate in the CORESET associated with CORESETPoolIndex value 0 or 1 or the PDCCH candidate ending later or earlier in time or the PDCCH candidate carrying/containing a DCI/DCI format with DL assignment or the PDCCH candidate carrying/containing a DCI/DCI format without DL assignment—among the PDCCH candidates received in the CORESETs associated with CORESETPoolIndex values 0 and 1 carrying/containing separate DCIs (e.g., DCI format 1_1 or 1_2 with or without DL assignment) associated with CORESETPoolIndex values 0 and 1 indicating/updating the same TCI field(s) or the same TCI state codepoint(s) or the same Rel. 17 unified TCI states.

In another example, the reference PDCCH candidate could correspond to the n-th (or m-th) PDCCH candidate or the PDCCH candidate with the n-th (or m-th) lowest or highest starting CCE index or the PDCCH candidate from the n-th (or m-th) search space set or the PDCCH candidate from the search space set with the n-th (or m-th) lowest or highest search space set ID or the PDCCH candidate in the n-th (or m-th) CORESET or the PDCCH candidate in the CORESET with the n-th (or m-th) lowest or highest CORESET ID or the PDCCH candidate in the CORESET associated with CORESETPoolIndex value n−1 (or m−1) or the PDCCH candidate ending the n-th (or m-th) latest (or earliest) in time or the n-th (or m-th) PDCCH candidate carrying/containing a DCI/DCI format with DL assignment or the n-th (or m-th) PDCCH candidate carrying/containing a DCI/DCI format without DL assignment—among the PDCCH candidates received in CORESETs associated with different values of CORESETPoolIndex carrying/containing separate DCIs (e.g., DCI format 1_1 or 1_2 with or without DL assignment) associated with different CORESETPoolIndex values indicating/updating the same TCI field(s) or the same TCI state codepoint(s) or the same Rel. 17 unified TCI states, wherein $n \in \{1, \ldots, N\}$ and $m \in \{1, \ldots, M\}$.

For all of the above cases, n or m could be indicated by the network via higher layer RRC signaling, MAC CE command or dynamic DCI based signaling; alternatively, n or m could be fixed in the system specification(s) and known to both the network and the UE.

In one example, a reference search space set—among the search space sets received in the CORESETs associated with different values of CORESETPoolIndex containing the PDCCH candidates carrying/containing separate DCIs (e.g., DCI format 1_1 or 1_2 with or without DL assignment) associated with different CORESETPoolIndex values indicating/updating the same TCI field(s) or the same TCI state codepoint(s) or the same Rel. 17 unified TCI states—could be determined/configured according to at least one of the following examples.

In one example, for N=2 or M=2, the reference search space set could correspond to the first or second search space set or the search space set with the lowest or highest search space set ID or the search space set in the first or second CORESET or the search space set in the CORESET with the lowest or highest CORESET ID or the search space set received in the CORESET associated with CORESETPoolIndex value 0 or 1 or the search space set containing the PDCCH candidate ending later or earlier in time or the search space set containing the PDCCH candidate carrying/containing a DCI/DCI format with DL assignment or the search space set containing the PDCCH candidate carrying/containing a DCI/DCI format without DL assignment—among the search space sets received in the CORESETs associated with CORESETPoolIndex values 0 and 1 containing the PDCCH candidates carrying/containing separate DCIs (e.g., DCI format 1_1 or 1_2 with or without DL assignment) associated with CORESETPoolIndex values 0 and 1 indicating/updating the same TCI field(s) or the same TCI state codepoint(s) or the same Rel. 17 unified TCI states.

In another example, the reference search space set could correspond to the n-th (or m-th) search space set or the search space set with the n-th (or m-th) lowest or highest search space set ID or the search space set in the n-th (or m-th) CORESET or the search space set in the CORESET with the n-th (or m-th) lowest or highest CORESET ID or the search space set received in the CORESET associated with CORESETPoolIndex value n−1 (or m−1) or the search space set containing the PDCCH candidate ending the n-th (or m-th) latest (or earliest) in time or the n-th (or m-th) search space set containing the PDCCH candidate carrying/containing a DCI/DCI format with DL assignment or the n-th (or m-th) search space set containing the PDCCH candidate carrying/containing a DCI/DCI format without DL assignment—among the search space sets received in the CORESETs associated with different values of CORESETPoolIndex containing the PDCCH candidates carrying/containing separate DCIs (e.g., DCI format 1_1 or 1_2 with or without DL assignment) associated with different CORESETPoolIndex values indicating/updating the same TCI field(s) or the same TCI state codepoint(s) or the same Rel. 17 unified TCI states, wherein n∈{1, . . . , N} and m∈ {1, . . . , M}.

For all of the above cases, n or m could be indicated by the network via higher layer RRC signaling, MAC CE command or dynamic DCI based signaling; alternatively, n or m could be fixed in the system specification(s) and known to both the network and the UE.

In one example, a reference CORESET—among the CORESETs associated with different values of CORESETPoolIndex containing the PDCCH candidates carrying/containing separate DCIs (e.g., DCI format 1_1 or 1_2 with or without DL assignment) associated with different CORESETPoolIndex values indicating/updating the same TCI field(s) or the same TCI state codepoint(s) or the same Rel. 17 unified TCI states—could be determined/configured according to at least one of the following.

In one example, for N=2 or M=2, the reference CORESET could correspond to the first or second CORESET or the CORESET with the lowest or highest CORESET ID or the CORESET associated with CORESETPoolIndex value 0 or 1 or the CORESET containing the PDCCH candidate ending later or earlier in time or the CORESET containing the PDCCH candidate carrying/containing a DCI/DCI format with DL assignment or the CORESET containing the PDCCH candidate carrying/containing a DCI/DCI format without DL assignment—among the CORESETs associated with CORESETPoolIndex values 0 and 1 containing the PDCCH candidates carrying/containing separate DCIs (e.g., DCI format 1_1 or 1_2 with or without DL assignment) associated with CORESETPoolIndex values 0 and 1 indicating/updating the same TCI field(s) or the same TCI state codepoint(s) or the same Rel. 17 unified TCI states.

In another example, the reference CORESET could correspond to the n-th (or m-th) CORESET or the CORESET with the n-th (or m-th) lowest or highest CORESET ID or the CORESET associated with CORESETPoolIndex value n−1 (or m−1) or the CORESET containing the PDCCH candidate ending the n-th (or m-th) latest (or earliest) in time or the n-th (or m-th) CORESET containing the PDCCH candidate carrying/containing a DCI/DCI format with DL assignment or the n-th (or m-th) CORESET containing the PDCCH candidate carrying/containing a DCI/DCI format without DL assignment—among the CORESETs associated with different values of CORESETPoolIndex containing the PDCCH candidates carrying/containing separate DCIs (e.g., DCI format 1_1 or 1_2 with or without DL assignment) associated with different CORESETPoolIndex values indicating/updating the same TCI field(s) or the same TCI state codepoint(s) or the same Rel. 17 unified TCI states, wherein n∈{1, . . . , N} and m∈{1, . . . , M}. For all of the above cases, norm could be indicated by the network via higher layer RRC signaling, MAC CE command or dynamic DCI based signaling; alternatively, n or m could be fixed in the system specification(s) and known to both the network and the UE.

The Rel. 17 unified TCI states indicated in the PDCCH candidates—from one or more search space sets configured with searchSpaceLinking received in one or more CORESETs associated with different values of CORESETPoolIndex—carrying/containing the same DCI payload/contents (e.g., DCI format 1_1 or 1_2 with or without DL assignment) indicating/updating the same TCI field(s) or the same TCI state codepoint(s) or the same Rel. 17 unified TCI states (example in the present disclosure), or the Rel. 17 unified TCI states indicated in the PDCCH candidates—from one or more search space sets received in one or more CORESETs associated with different values of CORESETPoolIndex—carrying/containing separate DCIs (e.g., DCI format 1_1 or 1_2 with or without DL assignment) associated with different CORESETPoolIndex values indicating/updating the same TCI field(s) or the same TCI state codepoint(s) or the same Rel. 17 unified TCI states, could be applied according to at least one of the following timelines.

In one example, when the UE may transmit the last symbol of the PUCCH with HARQ-ACK information corresponding to the DCI carrying the Rel. 17 unified TCI state(s) indicated in the reference PDCCH candidate determined according to the mentioned examples in the present disclosure or in the reference search space set determined according to the mentioned examples in the present disclosure or in the reference CORESET determined according to the mentioned examples in the present disclosure and without DL assignment, the indicated Rel. 17 unified TCI state(s) may be applied starting from the first slot that is at least BeamAppTime_r17 (beam application time—BAT) symbols after the last symbol of the PUCCH. The first slot and the BAT provided by the higher layer parameter BeamAppTime_r17 symbols are both determined on the carrier with the smallest subcarrier spacing (SCS) among the carrier(s) applying the beam indication.

In another example, when the UE may receive the first (or the last) symbol of the DCI carrying the Rel. 17 unified TCI state(s) (with or without DL assignment) indicated in the reference PDCCH candidate determined according to the mentioned examples in the present disclosure or in the reference search space set determined according to the mentioned examples in the present disclosure or in the reference CORESET determined according to the mentioned examples in the present disclosure, the indicated Rel. 17 unified TCI state(s) may be applied starting from the first slot that is at least BeamAppTime_r17 (beam application time—BAT) symbols after the first (or the last) symbol of the DCI for unified TCI state indication in the reference PDCCH candidate determined according to the mentioned examples in the present disclosure or in the reference search space set determined according to the mentioned examples in the present disclosure or in the reference CORESET determined according to the mentioned examples in the present disclosure. The first slot and the BAT provided by the higher layer parameter BeamAppTime_r17 symbols are both determined on the carrier with the smallest subcarrier spacing (SCS) among the carrier(s) applying the beam indication.

In yet another example, when the UE may transmit the last symbol of the PUCCH with HARQ-ACK information corresponding to PDSCH(s) scheduled by the DCI carrying the Rel. 17 unified TCI state(s) indicated in the reference PDCCH candidate determined according to the mentioned examples in the present disclosure or in the reference search space set determined according to the mentioned examples in the present disclosure or in the reference CORESET determined according to the mentioned examples in the present disclosure, the indicated Rel. 17 unified TCI state(s) may be applied starting from the first slot that is at least BeamAppTime_r17 (beam application time—BAT) symbols after the last symbol of the PUCCH. The first slot and the BAT provided by the higher layer parameter BeamAppTime_r17 symbols are both determined on the carrier with the smallest subcarrier spacing (SCS) among the carrier(s) applying the beam indication.

In one example, the network could transmit the same DCI payload indicating the same TCI field(s) or TCI state codepoint(s) or Rel. 17 unified TCI state(s) update across different PDCCH candidates/search space sets/CORESETs associated with different values of CORESETPoolIndex (e.g., 0 and 1), or separate DCIs/DCI formats associated with different values of CORESETPoolIndex (e.g., 0 and 1) indicating the same TCI field(s) or TCI state codepoint(s) or Rel. 17 unified TCI state(s) update. For this case, the UE could report a single HARQ-ACK codebook/HARQ-ACK information for the same Rel. 17 unified TCI state(s) update indicated in the same DCI payload repeatedly transmitted across different PDCCH candidates/search spaces/CORESETs associated with different values of CORESETPoolIndex (e.g., 0 and 1) or in separate DCIs/DCI formats associated with different values of CORESETPoolIndex (e.g., 0 and 1).

A UE could report in a slot the HARQ-ACK information for a Rel. 17 unified TCI state(s) update/indication, wherein the slot can be determined according to at least one of the following examples.

In one example, the UE could report HARQ-ACK information for a Rel. 17 unified TCI state(s) update/indication in a (Type-1 or Type-2) HARQ-ACK codebook k slots after the end of the reference PDCCH candidate determined according to the mentioned examples in the present disclosure or the end of the reference search space set determined according to the mentioned examples in the present disclosure or the end of the reference CORESET determined according to the mentioned examples in the present disclosure, wherein k is indicated by a value of a PDSCH-to-HARQ feedback timing indicator field in the corresponding DCI format in the reference PDCCH candidate determined according to the mentioned examples in the present disclosure or in the reference search space set determined according to the mentioned examples in the present disclosure or in the reference CORESET determined according to the mentioned examples in the present disclosure, and the DCI format in the reference PDCCH candidate determined according to the mentioned examples in the present disclosure or in the reference search space set determined according to the mentioned examples in the present disclosure or in the reference CORESET determined according to the mentioned examples in the present disclosure could indicate the Rel. 17 unified TCI state(s) without DL assignment.

In another example, the UE could report HARQ-ACK information for a Rel. 17 unified TCI state(s) update/indication in a (Type-1 or Type-2) HARQ-ACK codebook k slots after the end of a PDSCH reception scheduled by the corresponding DCI format in the reference PDCCH candidate determined according to the mentioned examples in the present disclosure or in the reference search space set determined according to the mentioned examples in the present disclosure or in the reference CORESET determined according to the mentioned examples in the present disclosure, wherein k is indicated by a value of a PDSCH-to-HARQ feedback timing indicator field in the corresponding DCI format in the reference PDCCH candidate determined according to the mentioned examples in the present disclosure or in the reference search space set determined according to the mentioned examples in the present disclosure or in the reference CORESET determined according to the mentioned examples in the present disclosure, and the DCI format in the reference PDCCH candidate determined according to the mentioned examples in the present disclosure or in the reference search space set determined according to the mentioned examples in the present disclosure or in the reference CORESET determined according to the mentioned examples in the present disclosure could indicate the Rel. 17 unified TCI state(s) with DL assignment.

Under the Rel. 17 unified transmission configuration indication (TCI) framework, beam indication procedure for the multi-TRP operation needs to be specified. Furthermore, means of indicating and configuring TCI field(s)/TCI state codepoint(s) targeting different deployment scenarios are also needed.

The present disclosure provides various design aspects related to beam indication for multi-TRP operation under the Rel. 17 unified TCI state framework. Furthermore, various TCI state(s) indication and configuration methods are developed targeting different deployment scenarios and use cases. Dynamic switching between single-TRP and multi-TRP operation modes under the Rel. 17 unified TCI framework is also specified.

In one embodiment, various methods of indicating/configurating M>1 or N>1 unified TCI states targeting different deployment scenarios/uses cases are provided.

As discussed above, a UE could be provided by the network, e.g., via MAC CE or DCI (e.g., DCI format 1_1 or 1_2 with or without DL assignment) based signaling through the higher layer parameter TCI-State_r17, M>1 joint DL and UL Rel. 17 unified TCI states or M>1 separate UL Rel. 17 unified TCI states or a first combination of M>1 joint DL and UL Rel. 17 unified TCI states and separate UL Rel. 17 unified TCI states or N>1 separate DL Rel. 17 unified TCI states or a second combination of N>1 joint DL and UL Rel. 17 unified TCI states and separate DL Rel. 17 unified TCI states or a third combination of N>1 joint DL and UL Rel. 17 unified TCI states, separate DL Rel. 17 unified TCI states and separate UL Rel. 17 unified TCI for UE-dedicated reception on PDSCH/PDCCH or dynamic-grant/configured-grant based PUSCH and all of dedicated PUCCH resources.

For instance, the DCI format for unified TCI state/beam indication (e.g., DCI format 1_1 or 1_2 with or without DL assignment) could include a "transmission configuration indication" field containing one or more codepoints activated by a first MAC CE activation command from a set/pool of codepoints. For this case, each codepoint could indicate M>1 joint DL and UL Rel. 17 unified TCI states or M>1 separate UL Rel. 17 unified TCI states or a first combination of M>1 joint DL and UL Rel. 17 unified TCI states and separate UL Rel. 17 unified TCI states or N>1 separate DL Rel. 17 unified TCI states or a second combination of N>1 joint DL and UL Rel. 17 unified TCI states and separate DL Rel. 17 unified TCI states or a third combination of N>1 joint DL and UL Rel. 17 unified TCI states, separate DL Rel. 17 unified TCI states and separate UL Rel. 17 unified TCI for UE-dedicated reception on PDSCH/PDCCH or dynamic-grant/configured-grant based PUSCH and all of dedicated PUCCH resources.

In one operation mode, at least one of the N>1 or M>1 Rel. 17 unified TCI states—referred to as reference Rel. 17 unified TCI state(s)—indicated by one or more TCI state codepoints in a DCI (e.g., DCI format 1_1 or 1_2 with or without DL assignment) or MAC CE is associated with/ configured for one or more CORESETs, while the remaining Rel. 17 unified TCI states other than the reference Rel. 17 unified TCI state(s) indicated by the one or more TCI state codepoints in the same DCI (e.g., DCI format 1_1 or 1_2 with or without DL assignment) or MAC CE could be associated with/configured for channel(s)/signal(s) such as PDSCH(s)/PUCCH(s)/PUSCH(s) other than downlink control channel(s) PDCCH(s) received in the one or more CORESETs.

In a single-DCI (sDCI) based multi-TRP system, a UE could receive PDCCHs only in sDCI CORESETs, which could be determined according to at least one of examples.

In one example, CORESETs not associated with any CORESETPoolIndex values are sDCI CORESETs. For instance, the UE is not provided by the higher layer parameter PDCCH-Config in ControlResourceSet any CORESETPoolIndex values. In this case, all CORESETs could be sDCI CORESETs.

In another example, the UE could be provided by the higher layer parameter PDCCH-Config that contains multiple (e.g., two) values of CORESETPoolIndex (e.g., 0 and 1) in ControlResourceSet. For this case, the sDCI CORESETs (provided by the higher layer parameter ControlResourceSet) are associated with a specific CORESETPoolIndex value (e.g., 0 or 1).

In yet another example, the UE could be provided by the higher layer parameter PDCCH-Config that contains a single value of CORESETPoolIndex (e.g., 0 or 1) in ControlResourceSet. For this case, the sDCI CORESETs (provided by the higher layer parameter ControlResourceSet) are associated with the provided CORESETPoolIndex value (e.g., 0 or 1).

In yet another example, the UE is not provided by the higher layer parameter PDCCH-Config in ControlResourceSet any CORESETPoolIndex values. For this case, the UE assumes CORESETPoolIndex value 0 for all CORESETs. The sDCI CORESETs (provided by the higher layer parameter ControlResourceSet) are associated with the CORESETPoolIndex value 0.

Furthermore, one or more CORESETs in the sDCI based multi-TRP system could be configured with a same group index, denoted by CORESETGroupIndex. The CORESETs configured with the same CORESETGroupIndex value could be associated with the same TRP in a multi-TRP system. The UE could be provided by PDCCH-Config one or more (e.g., two) CORESETGroupIndex values (e.g., 0 and/or 1). The association of a CORESET and a CORESETGroupIndex value could be via indicating the explicit CORESETGroupIndex value (e.g., either 0 or 1) in the parameter, e.g., the higher layer parameter ControlResourceSet, configuring the CORESET.

For this case, the sDCI CORESETs could be determined according to at least one of examples.

In one example, CORESETs not associated with any CORESETGroupIndex values are sDCI CORESETs. For instance, the UE is not provided by the higher layer parameter PDCCH-Config in ControlResourceSet any CORESETGroupIndex values. In this case, all CORESETs could be sDCI CORESETs.

In another example, the UE could be provided by the higher layer parameter PDCCH-Config that contains multiple (e.g., two) values of CORESETGroupIndex (e.g., 0 and 1) in ControlResourceSet. For this case, the sDCI CORESETs (provided by the higher layer parameter ControlResourceSet) are associated with a specific CORESETGroupIndex value (e.g., 0 or 1).

In yet another example, the UE could be provided by the higher layer parameter PDCCH-Config that contains a single value of CORESETGroupIndex (e.g., 0 or 1) in ControlResourceSet. For this case, the sDCI CORESETs (provided by the higher layer parameter ControlResourceSet) are associated with the provided CORESETGroupIndex value (e.g., 0 or 1).

In yet another example, the UE is not provided by the higher layer parameter PDCCH-Config in ControlResourceSet any CORESETGroupIndex values. For this case, the UE assumes CORESETGroupIndex value 0 for all CORESETs. The sDCI CORESETs (provided by the higher layer parameter ControlResourceSet) are associated with the CORESETGroupIndex value 0.

In addition to the above discussed design examples, a CORESET, in which a DCI format scheduling more than one PDSCHs whose DM-RS antenna ports are quasi co-located with reference signals provided in different TCI states are received, could be a sDCI CORESET.

For the operation mode, DM-RS antenna ports for PDCCH receptions in one or more sDCI CORESETs could be quasi co-located with reference signal(s) provided in an indicated reference Rel. 17 unified TCI state—e.g., one out of the indicated M>1 joint DL and UL TCI states or M>1 separate UL TCI states or N>1 separate DL TCI states. In the present disclosure, the sDCI CORESETs whose QCL assumption(s) follow that provided in the reference Rel. 17 unified TCI state or sharing the reference Rel. 17 unified TCI state is referred to as Type-1 sDCI CORESET(s), while the sDCI CORESET(s) whose QCL assumption(s) does not follow that provided in the reference Rel. 17 unified TCI state or not sharing the reference Rel. 17 unified TCI state is referred to as Type-2 sDCI CORESET(s).

Furthermore, a Type-1 sDCI CORESET or a Type-2 sDCI CORESET could correspond to one or more of: (1) "CORESET A": a CORESET other than CORESET with index 0 (or CORESET #0) associated with only UE-dedicated PDCCH reception(s) in a CC, comprising, e.g., CORESET(s) associated with USS set(s) or Type3-PDCCH CSS set(s); (2) "CORESET B": a CORESET other than CORESET #0 associated with only non-UE-dedicated PDCCH reception(s) in a CC, comprising, e.g., CORESET(s) associated with all types of CSS sets such as Type0/0A/1/2/3-PDCCH CSS sets or CSS sets other than Type3-PDCCH CSS set(s) such as Type0/0A/1/2-PDCCH CSS sets; (3) "CORESET C": a CORESET other than CORESET #0 associated with both UE-dedicated and non-UE-dedicated PDCCH receptions in a CC; and (4) CORESET #0, i.e., CORESET with index 0.

The UE could be provided/configured with "useIndicatedR17TCIState" for one or more of the Type-1 sDCI CORESETs. For instance, the UE could be provided/configured with "useIndicatedR17TCIstate" set to "enabled" in the parameter, e.g., the higher layer parameter ControlResourceSet, that configures the corresponding Type-1 sDCI CORESET(s).

In the present disclosure, in the single-DCI based multi-TRP system, the indicated Rel. 17 unified TCI state n or m (n∈{1, . . . , N} and m∈{1, . . . , M}) could correspond to the n-th joint DL and UL TCI state or the m-th separate UL TCI state or the n-th separate DL TCI state or the m-th TCI state in the first combination of TCI states or the n-th TCI state in the second combination of TCI states or the n-th TCI state in the third combination of TCI states or the joint DL and UL TCI state with the n-th lowest or highest TCI state ID or the separate UL TCI state with the m-th lowest or highest TCI state ID or the separate DL TCI state with the n-th lowest or highest TCI state ID or the TCI state in the first combination of TCI states with the m-th lowest or highest TCI state ID or the TCI state in the second combination of TCI states with the n-th lowest or highest TCI state ID or the TCI state in the third combination of TCI states with the n-th lowest or highest TCI state ID, among the N>1 or M>1 Rel. 17 unified TCI states, indicated via the MAC CE or DCI (e.g., DCI format 1_1 or 1_2 with or without DL assignment) based signaling.

For sDCI based multi-TRP operation with mode, DM-RS antenna ports for PDCCH receptions in the same or different sDCI CORESETs could be quasi co-located with reference signals provided in the indicated reference Rel. 17 unified TCI state. When a UE receives from the network M>1 or N>1 Rel. 17 unified TCI states indicated by a codepoint in a DCI (e.g., DCI format 1_1 or 1_2 with or without DL assignment) or MAC CE, the reference Rel. 17 unified TCI state for the sDCI CORESET(s) could be determined according to at least one of examples.

In one example, DM-RS antenna ports for PDCCH receptions in the same or different sDCI CORESETs or Type-1 sDCI CORESETs could be quasi co-located with reference signals provided in the reference Rel. 17 unified TCI state, which could correspond to at least one of: (i) the first indicated Rel. 17 unified TCI state, (ii) the last indicated Rel. 17 unified TCI state, (iii) the indicated Rel. 17 unified TCI state with the lowest TCI state ID/index, or (iv) the indicated Rel. 17 unified TCI state with the highest TCI state ID/index, among the N>1 (or M>1) Rel. 17 unified TCI states indicated by a codepoint in a DCI (e.g., DCI format 1_1 or 1_2 with or without DL assignment) or MAC CE.

In another example, DM-RS antenna ports for PDCCH receptions in the same or different sDCI CORESETs or Type-1 sDCI CORESETs could be quasi co-located with reference signals provided in the reference Rel. 17 unified TCI state, which could correspond to the indicated Rel. 17 unified TCI state n or m, where $n \in \{1, \ldots, N\}$ and $m \in \{1, \ldots, M\}$. For example, the UE could be higher layer configured by the network, e.g., via higher layer RRC signaling, TCI state index/ID corresponding to the Rel. 17 unified TCI state n (or m) among the N>1 (or M>1) Rel. 17 unified TCI states indicated by a codepoint in a DCI or MAC CE. For another example, the RRC configuration could contain/include a bitmap of length N (or M) with each bit/bit position in the bitmap corresponding to an indicated Rel. 17 unified TCI state; for this case, the UE could receive from the network the bitmap with the n-th (or m-th) bit/bit position set to "1."

Yet for another example, for N=2 or M=2, the RRC configuration could contain/correspond to a one-bit flag indicator with "0" indicating that DM-RS antenna ports for PDCCH receptions in the same or different sDCI CORESETs or Type-1 sDCI CORESETs could be quasi co-located with reference signals provided in the reference Rel. 17 unified TCI state corresponding to the first indicated Rel. 17 unified TCI state or the indicated Rel. 17 unified TCI state with the lowest (or highest) TCI state ID/index, and "1" indicating that DM-RS antenna ports for PDCCH receptions in the same or different sDCI CORESETs or Type-1 sDCI CORESETs could be quasi co-located with reference signals provided in the reference Rel. 17 unified TCI state corresponding to the second indicated Rel. 17 unified TCI state or the indicated Rel. 17 unified TCI state with the highest (or lowest) TCI state ID/index, or vice versa.

In yet another example, DM-RS antenna ports for PDCCH receptions in the same or different sDCI CORESETs or Type-1 sDCI CORESETs could be quasi co-located with reference signals provided in the reference Rel. 17 unified TCI state, which could correspond to the indicated Rel. 17 unified TCI state n or m, where $n \in \{1, \ldots, N\}$ and $m \in \{1, \ldots, M\}$. For example, the UE could receive from the network a MAC CE indicating TCI state index/ID corresponding to the Rel. 17 unified TCI state n (or m) among the N>1 (or M>1) Rel. 17 unified TCI states indicated by a codepoint in a DCI or MAC CE. For another example, the UE could receive from the network a second MAC CE activation command to activate the Rel. 17 unified TCI state n (or m) from the N>1 (or M>1) Rel. 17 unified TCI states indicated by a codepoint in a DCI or MAC CE.

For example, the second MAC CE activation command could correspond to a bitmap of length N (or M) with each bit/bit position in the bitmap corresponding to an indicated Rel. 17 unified TCI state. For this case, the UE could receive from the network the bitmap with the n-th (or m-th) bit/bit position set to "1." Yet for another example, for N=2 or M=2, the second MAC CE activation command could contain/correspond to a one-bit flag indicator with "0" indicating that DM-RS antenna ports for PDCCH receptions in the same or different sDCI CORESETs or Type-1 sDCI CORESETs could be quasi co-located with reference signals provided in the reference Rel. 17 unified TCI state corresponding to the first indicated Rel. 17 unified TCI state or the indicated Rel. 17 unified TCI state with the lowest (or highest) TCI state ID/index, and "1" indicating that DM-RS antenna ports for PDCCH receptions in the same or different sDCI CORESETs or Type-1 sDCI CORESETs could be quasi co-located with reference signals provided in the reference Rel. 17 unified TCI state corresponding to the second indicated Rel. 17 unified TCI state or the indicated Rel. 17 unified TCI state with the highest (or lowest) TCI state ID/index, or vice versa.

The second MAC CE activation command could be the same as the first MAC CE activation command used for activating one or more codepoints from a set/pool of codepoints to indicate the N>1 (M>1) unified TCI states as discussed in the present disclosure.

In yet another example, an indicated Rel. 17 unified TCI state, e.g., the corresponding higher layer parameter TCI-State_r17, could include a "CORESET indicator" field. For example, DM-RS antenna ports for PDCCH receptions in the same or different sDCI CORESETs or Type-1 sDCI CORESETs could be quasi co-located with reference signals provided in the reference Rel. 17 unified TCI state with the corresponding "CORESET indicator" field set to "enabled."

For another example, the "CORESET indicator" field could indicate CORESETPoolIndex value(s). For this case, DM-RS antenna ports for PDCCH receptions in the same or different sDCI CORESETs or Type-1 sDCI CORESETs could be quasi co-located with reference signals provided in the reference Rel. 17 unified TCI state with the corresponding "CORESET indicator" field indicating value 0 of CORESETPoolIndex. Yet for another example, the "CORESET indicator" field could correspond to a one-bit flag indicator. For this case, DM-RS antenna ports for PDCCH receptions in the same or different sDCI CORESETs or Type-1 sDCI CORESETs could be quasi co-located with reference signals provided in the reference Rel. 17 unified TCI state with the corresponding "CORESET indicator" indicating logical "1."

Yet for another example, the "CORESET indicator" field could be an entity ID/index corresponding to PCI, TRP ID/index and etc. For this case, DM-RS antenna ports for PDCCH receptions in the same or different sDCI CORESETs or Type-1 sDCI CORESETs could be quasi co-located with reference signals provided in the reference Rel. 17 unified TCI state with the corresponding "CORESET indicator" field indicating a designated entity ID/index—e.g., the serving cell PCI or the first TRP.

In yet another example, DM-RS antenna ports for PDCCH receptions in the same or different sDCI CORESETs or Type-1 sDCI CORESETs could be quasi co-located with reference signals provided in the reference Rel. 17 unified TCI state, which could correspond to the indicated Rel. 17 unified TCI state n or m, where $n \in \{1, \ldots, N\}$ and $m \in \{1, \ldots, M\}$. In this example, the DCI format (e.g., DCI format 1_1 or 1_2 with or without DL assignment) could include a "CORESET indicator" field. The "CORESET indicator" field could be configured in the same DCI format indicating the N>1 or M>1 Rel. 17 unified TCI states.

For example, the "CORESET indicator" field in the DCI format could indicate TCI state index/ID corresponding to the Rel. 17 unified TCI state n (or m), and therefore the reference Rel. 17 unified TCI state, among the N>1 (or M>1) indicated Rel. 17 unified TCI states. For another example, the "CORESET indicator" field in the DCI format could correspond to a bitmap of length N (or M) with each bit/bit position in the bitmap corresponding to an indicated Rel. 17 unified TCI state. For this case, the n-th (or m-th) bit/bit position in the bitmap is set to "1."

Yet for another example, for N=2 or M=2, the "CORESET indicator" field in the DCI format could correspond to a one-bit flag indicator with "0" indicating that DM-RS antenna ports for PDCCH receptions in the same or different sDCI CORESETs or Type-1 sDCI CORESETs could be quasi co-located with reference signals provided in the reference Rel. 17 unified TCI state corresponding to the first indicated Rel. 17 unified TCI state or the indicated Rel. 17 unified TCI state with the lowest (or highest) TCI state ID/index, and "1" indicating that DM-RS antenna ports for PDCCH receptions in the same or different sDCI CORESETs or Type-1 sDCI CORESETs could be quasi co-located with reference signals provided in the reference Rel. 17 unified TCI state corresponding to the second indicated Rel. 17 unified TCI state or the indicated Rel. 17 unified TCI state with the highest (or lowest) TCI state ID/index, or vice versa.

In the present disclosure, the indicated reference Rel. 17 unified TCI state could be a joint DL and UL TCI state or a separate UL TCI state or a separate DL TCI state or a TCI state in the first combination of TCI states or a TCI state in the second combination of TCI states or a TCI state in the third combination of TCI states.

In the present disclosure, one or more CORESETs in the sDCI based multi-TRP system could be configured with a same group index, denoted by CORESETGroupIndex. The CORESETs configured with the same CORESETGroupIndex value could be associated with the same TRP in a multi-TRP system. The UE could be provided by PDCCH-Config one or more (e.g., two) CORESETGroupIndex values (e.g., 0 and/or 1). The association of a CORESET and a CORESETGroupIndex value could be via indicating the explicit CORESETGroupIndex value (e.g., either 0 or 1) in the parameter, e.g., the higher layer parameter ControlResourceSet, configuring the CORESET.

Furthermore, DM-RS antenna ports for PDCCH receptions in one or more CORESETs could be quasi co-located with reference signal(s) provided in one or more indicated Rel. 17 unified TCI states—e.g., out of the indicated M>1 joint DL and UL TCI states or M>1 separate UL TCI states or N>1 separate DL TCI states. In the present disclosure, the CORESETs whose QCL assumption(s) follow that provided in the indicated Rel. 17 unified TCI state(s) or sharing the indicated Rel. 17 unified TCI state(s) is referred to as Type-I CORESET(s), while the CORESET(s) whose QCL assumption(s) does not follow that provided in the indicated Rel. 17 unified TCI state(s) or not sharing the indicated Rel. 17 unified TCI state(s) is referred to as Type-II CORESET(s). Furthermore, a Type-I CORESET or a Type-II CORESET could correspond to one or more of: (1) "CORESET A": a CORESET other than CORESET with index 0 (or CORESET #0) associated with only UE-dedicated PDCCH reception(s) in a CC, comprising, e.g., CORESET(s) associated with USS set(s) or Type3-PDCCH CSS set(s); (2) "CORESET B": a CORESET other than CORESET #0 associated with only non-UE-dedicated PDCCH reception(s) in a CC, comprising, e.g., CORESET(s) associated with all types of CSS sets such as Type0/0A/1/2/3-PDCCH CSS sets or CSS sets other than Type3-PDCCH CSS set(s) such as Type0/0A/1/2-PDCCH CSS sets; (3) "CORESET C": a CORESET other than CORESET #0 associated with both UE-dedicated and non-UE-dedicated PDCCH receptions in a CC; and (4) CORESET #0, i.e., CORESET with index 0.

The UE could be provided/configured with "useIndicatedR17TCIState" for one or more of the Type-I CORESETs. For instance, the UE could be provided/configured with "useIndicatedR17TCIstate" set to "enabled" in the parameter, e.g., the higher layer parameter ControlResourceSet, that configures the corresponding Type-I CORESET(s).

In another operation mode, one or more of the N>1 or M>1 Rel. 17 unified TCI states indicated by one or more TCI state codepoints in a DCI (e.g., DCI format 1_1 or 1_2 with or without DL assignment) or MAC CE could be associated with/configured for PDCCH/PDSCH/PUCCH/PUSCH repetitions according to at least one of the following examples.

In one operation submode, one or more of the N>1 or M>1 Rel. 17 unified TCI states indicated by one or more TCI state codepoints in a DCI (e.g., DCI format 1_1 or 1_2 with or without DL assignment) or MAC CE could be associated with/configured for one or more PDCCH repetitions—e.g., via transmitting one or more PDCCH candidates carrying/containing the same DCI payload or separate DCIs/DCI formats indicating the same PDSCH assignment or Rel. 17 unified TCI state(s).

In one example, one or more of the N>1 or M>1 Rel. 17 unified TCI states indicated by one or more TCI state codepoints in a DCI (e.g., DCI format 1_1 or 1_2 with or without DL assignment) or MAC CE could be associated with/configured for one or more PDCCH candidates from one or more search space sets received in a single CORESET. The CORESET could be a Type-I CORESET or a Type-II CORESET as described above. The CORESET could be configured with a CORESETPoolIndex/CORESETGroupIndex value (e.g., 0 or 1). Furthermore, the one or more PDCCH candidates received in the CORESET could carry/contain the same DCI payload/contents. For example, the one or more PDCCH candidates received in the CORESET could carry/contain the same DCI payload, e.g., DCI format 1_1 or 1_2 with or without DL assignment indicating/updating the same TCI field(s) or the same TCI state codepoint(s) or the same Rel. 17 unified TCI state(s). For another example, the one or more PDCCH candidates received in the CORESET could carry/contain the same DCI payload, e.g., indicating/configuring the same PDSCH assignment.

In another example, one or more of the N>1 or M>1 Rel. 17 unified TCI states indicated by one or more TCI state codepoints in a DCI (e.g., DCI format 1_1 or 1_2 with or without DL assignment) or MAC CE could be associated with/configured for one or more PDCCH candidates from one or more search space sets configured with a higher layer parameter searchSpaceLinking received in one or more CORESETs. The one or more CORESETs could be Type-I CORESETs or Type-II CORESETs as described above. The one or more CORESETs could be associated with the same or different CORESETGroupIndex/CORESETPoolIndex values. Furthermore, the one or more PDCCH candidates received in different CORESETs could carry/contain the same DCI payload/contents. For example, the one or more PDCCH candidates received in different CORESETs could carry/contain the same DCI payload, e.g., DCI format 1_1 or 1_2 with or without DL assignment indicating/updating the same TCI field(s) or the same TCI state codepoint(s) or the same Rel. 17 unified TCI state(s). For another example, the one or more PDCCH candidates received in different CORESETs could carry/contain the same DCI payload, e.g., indicating/configuring the same PDSCH assignment.

In yet another example, one or more of the N>1 or M>1 Rel. 17 unified TCI states indicated by one or more TCI state codepoints in a DCI (e.g., DCI format 1_1 or 1_2 with or without DL assignment) or MAC CE could be associated with/configured for one or more PDCCH candidates from one or more search space sets received in one or more CORESETs. The one or more CORESETs could be Type-I CORESETs or Type-II CORESETs as described above. The one or more CORESETs could be associated with the same or different CORESETGroupIndex/CORESETPoolIndex values. Furthermore, the one or more PDCCH candidates received in different CORESETs could carry/contain separate DCIs/DCI formats indicating one or more same DCI fields. For example, the one or more PDCCH candidates received in different CORESETs could carry/contain separate DCIs/DCI formats (e.g., DCI format 1_1 or 1_2 with or without DL assignment) but indicating/updating the same TCI field(s) or the same TCI state codepoint(s) or the same Rel. 17 unified TCI state(s). For another example, the one or more PDCCH candidates received in different CORESETs could carry/contain different DCIs/DCI formats but indicating/configuring the same PDSCH assignment.

Other methods/design options of associating one or more of the N>1 or M>1 Rel. 17 unified TCI states indicated by one or more TCI state codepoints in a DCI (e.g., DCI format 1_1 or 1_2 with or without DL assignment) or MAC CE and the one or more PDCCH repetitions can be according to those described in the U.S. patent application Ser. No. 18/066,922, as incorporated by reference its entirety herein—which are incorporated by reference into the present disclosure.

In another operation submode, one or more of the N>1 or M>1 Rel. 17 unified TCI states indicated by one or more TCI state codepoints in a DCI (e.g., DCI format 1_1 or 1_2 with or without DL assignment) or MAC CE could be associated with/configured for one or more PDSCH repetitions—e.g., when the UE is configured/provided by the network higher layer parameter repetitionScheme set to one of "fdmSchemeA," "fdmSchemeB," and "tdmSchemeA" or higher layer parameter repetitionNumber in PDSCH-TimeDomainResourceAllocation.

In one example, when a UE is configured/provided by the network the higher layer parameter repetitionScheme set to "fdmSchemeA," the UE may receive a single PDSCH transmission occasion of the transport block (TB) with each indicated Rel. 17 unified TCI state—among the M>1 or N>1 Rel. 17 unified TCI states indicated by one or more TCI state codepoints in a DCI (e.g., DCI format 1_1 or 1_2 with or without DL assignment) or MAC CE—associated to a non-overlapping frequency domain resource allocation. A UE may assume that precoding granularity is $P_{BWP}$ resource blocks in the frequency domain, where $P_{BWP}$ can be equal to one of the values among {2, 4, wideband}. Methods/design options of associating one or more of the N>1 or M>1 Rel. 17 unified TCI states indicated by one or more TCI state codepoints in a DCI (e.g., DCI format 1_1 or 1_2 with or without DL assignment) or MAC CE and the one or more non-overlapping frequency domain resource allocations when configured with repetitionScheme set to "fdmSchemeA" can be according to those described in the U.S. patent application Ser. No. 18/066,922, as incorporated by reference its entirety herein, which are incorporated by reference into the present disclosure.

In another example, when a UE is configured/provided by the network the higher layer parameter repetitionScheme set to "fdmSchemeB," the UE may receive two PDSCH transmission occasions of the same TB with each indicated Rel. 17 unified TCI state—among the M>1 or N>1 (e.g., M=2 or N=2) Rel. 17 unified TCI states indicated by one or more TCI state codepoints in a DCI (e.g., DCI format 1_1 or 1_2 with or without DL assignment) or MAC CE—associated to a PDSCH transmission occasion. For this case, the two PDSCH transmission occasions have non-overlapping frequency domain resource allocations with respect to each other. A UE may assume that precoding granularity is $P_{BWP}$ resource blocks in the frequency domain, where $P_{BWP}$ can be equal to one of the values among {2, 4, wideband}. Methods/design options of associating one or more of the N>1 or M>1 Rel. 17 unified TCI states indicated by one or more TCI state codepoints in a DCI (e.g., DCI format 1_1 or 1_2 with or without DL assignment) or MAC CE and the one or more PDSCH transmission occasions with non-overlapping frequency domain resource allocations when configured with repetitionScheme set to "fdmSchemeB" can be according to those described in the U.S. patent application Ser. No. 18/066,922, as incorporated by reference in its entirety, which are incorporated by reference into the present disclosure.

In yet another example, when a UE is configured/provided by the network the higher layer parameter repetitionScheme set to "tdmSchemeA," the UE may receive two PDSCH transmission occasions of the same transport block (TB) with each indicated Rel. 17 unified TCI state—among the M>1 or N>1 (e.g., M=2 or N=2) Rel. 17 unified TCI states indicated by one or more TCI state codepoints in a DCI (e.g., DCI format 1_1 or 1_2 with or without DL assignment) or MAC CE—associated to a PDSCH transmission occasion. For this case, the two PDSCH transmission occasions have non-overlapping time domain resource allocations with respect to each other, and both PDSCH transmission occasions may be received within a given slot. Methods/design options of associating one or more of the N>1 or M>1 Rel. 17 unified TCI states indicated by one or more TCI state codepoints in a DCI (e.g., DCI format 1_1 or 1_2 with or without DL assignment) or MAC CE and the one or more PDSCH transmission occasions with non-overlapping time domain resource allocations received within a slot when configured with repetitionScheme set to "tdmSchemeA" can be according to those described in the U.S. patent application Ser. No. 18/066,922, as incorporated by reference in its entirety, which are incorporated by reference into the present disclosure.

In yet another example, when a UE is configured/provided by the network the higher layer parameter repetitionNumber in PDSCH-TimeDomainResourceAllocation, the UE may expect to receive multiple slot level PDSCH transmission occasions of the same TB with the M>1 or N>1 Rel. 17 unified TCI states indicated by one or more TCI state codepoints in a DCI (e.g., DCI format 1_1 or 1_2 with or without DL assignment) or MAC CE used across multiple PDSCH transmission occasions in the repetitionNumber consecutive slots. Methods/design options of associating one or more of the N>1 or M>1 Rel. 17 unified TCI states indicated by one or more TCI state codepoints in a DCI (e.g., DCI format 1_1 or 1_2 with or without DL assignment) or MAC CE and the one or more PDSCH transmission occasions in the repetitionNumber consecutive slots when configured with repetitionNumber in PDSCH-TimeDomainResourceAllocation can be according to those described in the U.S. patent application Ser. No. 18/066,922, as incorporated by reference in its entirety, which are incorporated by reference into the present disclosure.

In yet another operation submode, one or more of the N>1 or M>1 Rel. 17 unified TCI states indicated by one or more TCI state codepoints in a DCI (e.g., DCI format 1_1 or 1_2 with or without DL assignment) or MAC CE could be associated with/configured for one or more PUCCH repetitions—e.g., when the UE is configured/provided by the network a number of slots, denoted by $N_{pucch}$, for repetitions of a PUCCH transmission. For this case, each indicated Rel. 17 unified TCI state—among the M>1 or N>1 (e.g., M=2 or N=2) Rel. 17 unified TCI states indicated by one or more TCI state codepoints in a DCI (e.g., DCI format 1_1 or 1_2 with or without DL assignment) or MAC CE—could be associated to at least one of the $N_{pucch}$ slots for repetitions of a PUCCH transmission. Methods/design options of associating one or more of the N>1 or M>1 Rel. 17 unified TCI states indicated by one or more TCI state codepoints in a DCI (e.g., DCI format 1_1 or 1_2 with or without DL assignment) or MAC CE and the $N_{pucch}$ slots configured for PUCCH repetitions can be according to those described in the U.S. patent application Ser. No. 18/066,922, as incorporated by reference in its entirety.

In yet another operation submode, one or more of the N>1 or M>1 Rel. 17 unified TCI states indicated by one or more TCI state codepoints in a DCI (e.g., DCI format 1_1 or 1_2 with or without DL assignment) or MAC CE could be associated with/configured for one or more PUSCH repetitions—e.g., when the UE is configured/provided by the network two SRS resource sets.

In one example, for PUSCH repetition Type A, in case K>1 consecutive slots, the same symbol allocation is applied across the K consecutive slots and the PUSCH is limited to a single transmission layer. The UE may repeat the TB across the K consecutive slots applying the same symbol allocation in each slot. For this case, each indicated Rel. 17 unified TCI state—among the M>1 or N>1 (e.g., M=2 or N=2) Rel. 17 unified TCI states indicated by one or more TCI state codepoints in a DCI (e.g., DCI format 1_1 or 1_2 with or without DL assignment) or MAC CE—could be associated to at least one of the K consecutive slots for repetitions of a PUSCH transmission. Methods/design options of associating one or more of the N>1 or M>1 Rel. 17 unified TCI states indicated by one or more TCI state codepoints in a DCI (e.g., DCI format 1_1 or 1_2 with or without DL assignment) or MAC CE and the K consecutive slots configured for PUSCH repetitions can be according to those described in the U.S. patent application Ser. No. 18/066,922, as incorporated by reference in its entirety, which are incorporated by reference into the present disclosure.

In another example, for PUSCH repetition Type B, in case K>1 consecutive slots, the same symbol allocation is applied across the K consecutive slots and the PUSCH is limited to a single transmission layer. The UE may repeat the TB across the K consecutive slots applying the same symbol allocation in each slot. For this case, each indicated Rel. 17 unified TCI state—among the M>1 or N>1 (e.g., M=2 or N=2) Rel. 17 unified TCI states indicated by one or more TCI state codepoints in a DCI (e.g., DCI format 1_1 or 1_2 with or without DL assignment) or MAC CE—could be associated to at least one PUSCH nominal repetition. Methods/design options of associating one or more of the N>1 or M>1 Rel. 17 unified TCI states indicated by one or more TCI state codepoints in a DCI (e.g., DCI format 1_1 or 1_2 with or without DL assignment) or MAC CE and the PUSCH nominal repetitions can be according to those described in the U.S. patent application Ser. No. 18/066,922, as incorporated by reference in its entirety, which are incorporated by reference into the present disclosure.

Various design options of beam indication for STxMP (operation submodes) are provided below.

In one operation submode, a UE could be provided by the network, e.g., via one or more TCI state codepoints in a DCI (e.g., DCI format 1_1 or 1_2 with or without DL assignment) or MAC CE, G≥1 groups of Rel. 17 unified TCI states each containing T>1 Rel. 17 unified TCI states. For this case, the T>1 Rel. 17 unified TCI states indicated in each group could correspond to T>1 joint DL and UL TCI states, T>1 separate UL TCI states or a combination of T>1 joint DL and UL TCI states and separate UL TCI states. For this operation submode, upon receiving the indicated Rel. 17 unified TCI state(s), the UE expects to use the same or different spatial filters determined according to the reference signals (e.g., the spatial filters are spatially related to the reference signals) provided in the T>1 Rel. 17 unified TCI states indicated in a same group to simultaneously transmit various uplink channels/signals such as PUCCHs, PUSCHs or SRSs.

In another operation submode, a UE could be provided by the network, e.g., via one or more TCI state codepoints in a DCI (e.g., DCI format 1_1 or 1_2 with or without DL assignment) or MAC CE, Q>1 groups of Rel. 17 unified TCI states each containing T>1 Rel. 17 unified TCI states. For this case, the V≥1 Rel. 17 unified TCI states indicated in each group could correspond to V≥1 joint DL and UL TCI states, V≥1 separate UL TCI states or a combination of V≥1 joint DL and UL TCI states and separate UL TCI states. For this operation submode, the UE expects to use the same or different spatial filters determined according to the reference signals (e.g., the spatial filters are spatially related to the reference signals) provided in the Rel. 17 unified TCI states indicated across different groups (e.g., across the Q>1 groups) to simultaneously transmit various uplink channels/signals such as PUCCHs, PUSCHs or SRSs.

A UE could be provided by the network in a carrier (referred to as a serving carrier) N>1 or M>1 Rel. 17 unified TCI states indicated by one or more TCI state codepoints in a DCI (e.g., DCI format 1_1 or 1_2 with or without DL assignment) or MAC CE. For this operation mode, one or more of the N>1 or M>1 Rel. 17 unified TCI states could be indicated for/associated with the serving carrier, and one or more of the N>1 or M>1 Rel. 17 unified TCI states could be indicated for/associated with one or more carriers/carrier indexes different from the serving carrier/carrier index. In the present disclosure, a carrier could correspond to a cell or a BWP or a component carrier or a frequency band or a frequency range.

For example, the UE could be provided by the network in the serving carrier N=2 or M=2 Rel. 17 unified TCI states indicated by one or more TCI state codepoints in a DCI (e.g., DCI format 1_1 or 1_2 with or without DL assignment) or MAC CE. Furthermore, the UE could be configured with another carrier/carrier index j different from the serving carrier/carrier index. For this case, the UE could expect that the first (or second) indicated Rel. 17 unified TCI state or the indicated Rel. 17 unified TCI state with the lowest (or highest) TCI state ID/index—within the indicated N=2 or M=2 Rel. 17 unified TCI states—is associated with the serving carrier/carrier index, and the second (or first) indicated Rel. 17 unified TCI state or the indicated Rel. 17 unified TCI state with the highest (or lowest) TCI state ID/index—within the indicated N=2 or M=2 Rel. 17 unified TCI states—is associated with carrier/carrier index j.

As discussed in the present disclosure, one or more of the N>1 or M>1 Rel. 17 unified TCI states indicated by one or more TCI state codepoints in a DCI (e.g., DCI format 1_1 or 1_2 with or without DL assignment) or MAC CE could be used for different deployment scenarios/operation modes. Hence, upon receiving the indicated Rel. 17 unified TCI states, the UE may also know (e.g., indicated by the network via RRC or MAC CE or DCI) the corresponding operation mode(s). Various design options of indicating the operation mode(s) in DCI (e.g., in DCI format 1_1 or 1_2 with or without DL assignment) along with the indication of the Rel. 17 unified TCI states are provided as following examples.

In one example, the operation mode(s) could be indicated in the DCI format (e.g., DCI format 1_1 or 1_2 with or without DL assignment) or MAC CE indicating the N>1 or M>1 Rel. 17 unified TCI states. For this design example, the DCI format (e.g., DCI format 1_1 or 1_2 with or without DL assignment) or MAC CE for unified TCI state(s) indication could contain an "Operation Mode" field. For example, the "operation mode" could be set to "Mode-1," "Mode-2," "Mode-3," or "Mode-4" indicating the operation modes discussed in the present disclosure, respectively.

For another example, the "Operation Mode" could be set to "beam indication without repetition," "beam indication with repetition," "beam indication for STXMP" or "beam indication for cross-carrier" indicating the operation modes discussed in the present disclosure, respectively.

Yet for another example, the "Operation Mode" could be a x-bit indicator (e.g., x=2) with each state of the x-bit indicator corresponding to an operation mode. For instance, for x=2, the "Operation Mode" could be set to "0" or "00" corresponding to the operation mode in the present disclosure, "1" or "01" corresponding to the operation mode in the present disclosure, "2" or "10" corresponding to the operation mode in the present disclosure, and "3" or "11" corresponding to the operation mode in the present disclosure.

The UE could also be indicated by the network in the DCI format (e.g., DCI format 1_1 or 1_2 with or without DL assignment) or MAC CE indicating the N>1 or M>1 Rel. 17 unified TCI states one or more operation submodes discussed in the present disclosure. For this design example, the DCI format (e.g., DCI format 1_1 or 1_2 with or without DL assignment) or MAC CE for unified TCI state(s) indication could contain an "Operation SubMode" field.

For example, the "Operation SubMode" could be set to "Mode-2-1," "Mode-2-2," "Mode-2-3," or "Mode-2-4" indicating the operation (submodes) discussed in the present disclosure, respectively, when the operation mode is indicated.

Furthermore, the "Operation SubMode" could be set to "Mode-3-1" or "Mode-3-2" indicating the operation (submodes) discussed in the present disclosure, respectively, when the operation mode is indicated. Alternatively, the "Operation SubMode" could be set to "Mode-2-1," "Mode-2-2," "Mode-2-3," "Mode-2-4," "Mode-3-1," or "Mode-3-2" indicating the operation (submodes) discussed in the present disclosure, respectively.

For another example, the "Operation SubMode" could be set to "PDCCH repetition," "PDSCH repetition," "PUCCH repetition," "PUSCH repetition," "beam indication for STXMP option-1" or "beam indication for STXMP option-2" indicating the operation (submodes) discussed in the present disclosure, respectively. Yet for another example, the "Operation SubMode" could be a x-bit indicator (e.g., x=1, 2 or 3) with each state of the x-bit indicator corresponding to an operation submode. For instance, when the operation mode is indicated (x=2), the "Operation SubMode" could be set to "0" or "00" corresponding to the operation mode in the present disclosure, "1" or "01" corresponding to the operation in the present disclosure, "2" or "10" corresponding to the operation mode in the present disclosure, and "3" or "11" corresponding to the operation mode in the present disclosure.

Furthermore, when the operation mode is indicated (x=1), the "Operation SubMode" could be set to "0" corresponding to the operation mode in the present disclosure, and "1" corresponding to the operation mode in the present disclosure. Alternatively, x could correspond to 3, and the "Operation SubMode" could be set to "0" or "000" corresponding to the operation mode in the present disclosure, "1" or "001" corresponding to the operation mode in the present disclosure, "2" or "010" corresponding to the operation mode in the present disclosure, "3" or "011" corresponding to the operation mode in the present disclosure, "4" or "100" corresponding to the operation mode in the present disclosure, and "5" or "101" corresponding to the operation mode in the present disclosure.

In another example, the operation mode(s) could be indicated in the TCI state field(s) in the DCI format (e.g., DCI format 1_1 or 1_2 with or without DL assignment) or MAC CE indicating the N>1 or M>1 Rel. 17 unified TCI states. For this design example, the TCI field(s) in the DCI format (e.g., DCI format 1_1 or 1_2 with or without DL assignment) or MAC CE for unified TCI state(s) indication could contain an "Operation Mode" parameter. For example, the "Operation Mode" could be set to "Mode-1," "Mode-2," "Mode-3" or "Mode-4" indicating the operation mode discussed in the present disclosure, respectively. For another example, the "Operation Mode" could be set to "beam indication without repetition," "beam indication with repetition," "beam indication for STXMP" or "beam indication for cross-carrier" indicating the operation modes discussed in the present disclosure, respectively.

Yet for another example, the "Operation Mode" could be a x-bit indicator (e.g., x=2) with each state of the x-bit indicator corresponding to an operation mode. For instance, for x=2, the "Operation Mode" could be set to "0" or "00" corresponding to the operation mode in the present disclosure, "1" or "01" corresponding to the operation mode in the present disclosure, "2" or "10" corresponding to the operation mode in the present disclosure, or "3" or "11" corresponding to the operation mode in the present disclosure. The UE could also be indicated by the network in the TCI field(s) in the DCI format (e.g., DCI format 1_1 or 1_2 with or without DL assignment) or MAC CE indicating the N>1 or M>1 Rel. 17 unified TCI states one or more operation submodes in the present disclosure.

For this design example, the TCI field(s) in the DCI format (e.g., DCI format 1_1 or 1_2 with or without DL assignment) or MAC CE for unified TCI state(s) indication could contain an "Operation SubMode" parameter. For example, the "Operation SubMode" could be set to "Mode-2-1," "Mode-2-2," "Mode-2-3" or "Mode-2-4" indicating the operation (submodes) modes discussed in the present disclosure, respectively, when the operation mode is indicated.

Furthermore, the "Operation SubMode" could be set to "Mode-3-1" or "Mode-3-2" indicating the operation (submodes) mode discussed in the present disclosure, respectively, when the operation mode is indicated. Alternatively, the "Operation SubMode" could be set to "Mode-2-1," "Mode-2-2," "Mode-2-3," "Mode-2-4," "Mode-3-1" or "Mode-3-2" indicating the operation (submodes) mode discussed in the present disclosure, respectively. For another example, the "Operation SubMode" could be set to "PDCCH repetition," "PDSCH repetition," "PUCCH repetition," "PUSCH repetition," "beam indication for STXMP option-1" or "beam indication for STXMP option-2" indicating the operation (submodes) mode discussed in the present disclosure, respectively.

Yet for another example, the "Operation SubMode" could be a x-bit indicator (e.g., x=1, 2 or 3) with each state of the x-bit indicator corresponding to an operation submode. For instance, when the operation mode is indicated (x=2), the "Operation SubMode" could be set to "0" or "00" corresponding to the operation mode in the present disclosure, "1" or "01" corresponding to the operation mode in the present disclosure, "2" or "10" corresponding to the operation mode in the present disclosure, and "3" or "11" corresponding to the operation mode in the present disclosure.

Furthermore, when the operation mode is indicated (x=1), the "Operation SubMode" could be set to "0" corresponding to the operation mode in the present disclosure, and "1" corresponding to the operation mode in the present disclosure. Alternatively, x could correspond to 3, and the "Operation SubMode" could be set to "0" or "000" corresponding to the operation mode in the present disclosure, "1" or "001" corresponding to the operation mode in the present disclosure, "2" or "010" corresponding to the operation mode in the present disclosure, "3" or "011" corresponding to the operation mode in the present disclosure, "4" or "100" corresponding to the operation mode in the present disclosure, and "5" or "101" corresponding to the operation mode in the present disclosure.

In yet another example, the operation mode(s) could be indicated in the DCI format (e.g., DCI format 1_1 or 1_2 with or without DL assignment) or MAC CE indicating the N>1 or M>1 Rel. 17 unified TCI states. For this design example, the DCI format (e.g., DCI format 1_1 or 1_2 with or without DL assignment) or MAC CE for unified TCI state(s) indication could contain one or more (e.g., 4) separate "Operation Mode" fields each associating/corresponding to at least one of the operation modes discussed in the present disclosure.

For example, the first "Operation Mode" field could correspond to the operation mode in the present disclosure, the second "Operation Mode" field could correspond to the operation mode in the present disclosure, the third "Operation Mode" field could correspond to the operation mode in the present disclosure, and the fourth "Operation Mode" field could correspond to the operation mode in the present disclosure. For another example, the one or more separate "Operation Mode" fields could include a "beam indication without repetition"/"Mode-1" field corresponding to the operation mode in the present disclosure, a "beam indication with repetition"/"Mode-2" field corresponding to the operation mode in the present disclosure, a "beam indication for STXMP"/"Mode-3" field corresponding to the operation mode in the present disclosure, or a "beam indication for cross-carrier"/"Mode-4" field corresponding to the operation mode in the present disclosure.

One or more of the "Operation Mode" fields could be set to "enabled" or "disabled." The UE could also be indicated by the network in the DCI format (e.g., DCI format 1_1 or 1_2 with or without DL assignment) or MAC CE indicating the N>1 or M>1 Rel. 17 unified TCI states one or more operation submodes in the present disclosure. For this design example, the DCI format (e.g., DCI format 1_1 or 1_2 with or without DL assignment) or MAC CE for unified TCI state(s) indication could contain one or more (e.g., 4) separate "Operation SubMode" fields each associating/corresponding to at least one of the operation submodes discussed in the present disclosure. For example, when the operation mode is indicated, the first "Operation SubMode" field could correspond to the operation mode in the present disclosure, the second "Operation SubMode" field could correspond to the operation mode in the present disclosure, the third "Operation SubMode" field could correspond to the operation mode in the present disclosure, and the fourth "Operation SubMode" field could correspond to the operation mode in the present disclosure.

Furthermore, when the operation mode is indicated, the first "Operation SubMode" field could correspond to the operation mode in the present disclosure, and the second "Operation SubMode" field could correspond to the operation mode in the present disclosure. Alternatively, the first "Operation SubMode" field could correspond to the operation mode in the present disclosure, the second "Operation SubMode" field could correspond to the operation mode in the present disclosure, the third "Operation SubMode" field could correspond to the operation mode in the present disclosure, the fourth "Operation SubMode" field could correspond to the operation mode in the present disclosure, the fifth "Operation SubMode" field could correspond to the operation mode in the present disclosure, and the sixth "Operation SubMode" field could correspond to the operation mode in the present disclosure.

For another example, the one or more separate "Operation SubMode" fields could include a "PDCCH repetition"/"Mode-2-1" field corresponding to the operation mode in the present disclosure, a "PDSCH repetition"/"Mode-2-2" field corresponding to the operation mode in the present disclosure, a "PUCCH repetition"/"Mode-2.3" field corresponding to the operation mode in the present disclosure, a "PUSCH repetition"/"Mode-2.4" field corresponding to the operation mode in the present disclosure, a "beam indication for STXMP option-1"/"Mode-3.1" field corresponding to the operation mode in the present disclosure, a "beam indication for STXMP option-2"/"Mode-3.2" field corresponding to the operation mode in the present disclosure. One or more of the "Operation SubMode" fields could be set to "enabled" or "disabled."

In yet another example, the operation mode(s) could be indicated in the DCI format (e.g., DCI format 1_1 or 1_2 with or without DL assignment) or MAC CE indicating the N>1 or M>1 Rel. 17 unified TCI states. For this design example, the TCI field(s) in the DCI format (e.g., DCI format 1_1 or 1_2 with or without DL assignment) or MAC CE for unified TCI state(s) indication could contain one or more (e.g., 4) separate "Operation Mode" parameters each associating/corresponding to at least one of the operation modes discussed in the present disclosure. For example, the first "Operation Mode" parameter could correspond to the operation mode in the present disclosure, the second "Operation Mode" parameter could correspond to the operation mode in the present disclosure, the third "Operation Mode" parameter could correspond to the operation mode in the present disclosure, and the fourth "Operation Mode" parameter could correspond to the operation mode in the present disclosure.

For another example, the one or more separate "Operation Mode" parameters could include a "beam indication without repetition"/"Mode-1" parameter corresponding to the operation mode in the present disclosure, a "beam indication with repetition"/"Mode-2" parameter corresponding to the operation mode in the present disclosure, a "beam indication for STXMP"/"Mode-3" parameter corresponding to the operation mode in the present disclosure, or a "beam indication for cross-carrier"/"Mode-4" parameter corresponding to the operation mode in the present disclosure. One or more of the "Operation Mode" parameters could be set to "enabled" or "disabled." The UE could also be indicated by the network in the TCI field(s) in the DCI format (e.g., DCI format 1_1 or 1_2 with or without DL assignment) or MAC CE indicating the N>1 or M>1 Rel. 17 unified TCI states one or more operation submodes discussed in the present disclosure.

For this design example, the TCI field(s) in the DCI format (e.g., DCI format 1_1 or 1_2 with or without DL assignment) or MAC CE for unified TCI state(s) indication could contain one or more (e.g., 4) separate "Operation SubMode" parameters each associating/corresponding to at least one of the operation submodes discussed in the present disclosure. For example, when the operation mode is indicated, the first "Operation SubMode" parameter could correspond to the operation mode in the present disclosure, the second "Operation SubMode" parameter could correspond to the operation mode in the present disclosure, the third "Operation SubMode" parameter could correspond to the operation mode in the present disclosure, and the fourth "Operation SubMode" parameter could correspond to the operation mode in the present disclosure.

Furthermore, when the operation mode is indicated, the first "Operation SubMode" parameter could correspond to the operation mode in the present disclosure, and the second "Operation SubMode" parameter could correspond to the operation mode in the present disclosure. Alternatively, the first "Operation SubMode" parameter could correspond to the operation mode in the present disclosure, the second "Operation SubMode" parameter could correspond to the operation mode in the present disclosure, the third "Operation SubMode" parameter could correspond to the operation mode in the present disclosure, the fourth "Operation SubMode" parameter could correspond to the operation mode in the present disclosure, the fifth "Operation SubMode" parameter could correspond to the operation mode in the present disclosure, and the sixth "Operation SubMode" parameter could correspond to the operation mode in the present disclosure.

For another example, the one or more separate "Operation SubMode" parameters could include a "PDCCH repetition"/"Mode-2-1" parameter corresponding to the operation mode in the present disclosure, a "PDSCH repetition"/"Mode-2-2" parameter corresponding to the operation mode in the present disclosure, a "PUCCH repetition"/"Mode-2.3" parameter corresponding to the operation mode in the present disclosure, a "PUSCH repetition"/"Mode-2.4" parameter corresponding to the operation mode in the present disclosure, a "beam indication for STXMP option-1"/"Mode-3.1" parameter corresponding to the operation mode in the present disclosure, a "beam indication for STXMP option-2"/"Mode-3.2" parameter corresponding to the operation mode in the present disclosure. One or more of the "Operation SubMode" parameters could be set to "enabled" or "disabled."

In yet another example, the DCI format (e.g., DCI format 1_1 or 1_2 with or without DL assignment) or MAC CE for unified TCI state(s) indication could contain one or more (e.g., 4) separate TCI fields each associating/corresponding to at least one of the operation modes discussed in the present disclosure. For this case, each TCI field could contain one or more TCI state codepoints (activated by a MAC CE from a set of TCI state codepoints) indicating N>1 or M>1 Rel. 17 unified TCI states.

For instance, the first TCI field or the TCI field with the lowest field ID/index could correspond to the operation mode in the present disclosure, the second TCI field or the TCI field with the second lowest field ID/index could correspond to the operation mode in the present disclosure, the third TCI field or the TCI field with the second highest field ID/index could correspond to the operation mode in the present disclosure, and the fourth TCI field or the TCI field with the highest field ID/index could correspond to the operation mode in the present disclosure. Optionally, one or more of the operation submodes such as operation mode could be indicated in the DCI format or MAC CE for unified TCI state(s) indication following those specified in the examples.

For this case, the Rel. 17 unified TCI states indicated in the TCI field associated with the operation mode (if indicated) are also associated with the operation mode if one or more of them are indicated/enabled. Furthermore, the Rel. 17 unified TCI states indicated in the TCI field associated with the operation mode (if indicated) are also associated with the operation mode if one or more of them are indicated/enabled.

Alternatively, the DCI format (e.g., DCI format 1_1 or 1_2 with or without DL assignment) or MAC CE for unified TCI state(s) indication could also contain one or more separate TCI fields each associating/corresponding to at least one operation submode (if configured) discussed in the present disclosure. For this case, each TCI field could also contain one or more TCI state codepoints (activated by a MAC CE from a set of TCI state codepoints) indicating N>1 or M>1 Rel. 17 unified TCI states. Furthermore, one or more of the TCI fields could be absent/not configured in the DCI format or MAC CE for unified TCI state(s) indication.

In yet another example, the DCI format (e.g., DCI format 1_1 or 1_2 with or without DL assignment) or MAC CE for unified TCI state(s) indication could contain one or more (e.g., 4) separate "Operation Mode" fields each associating/corresponding to at least one of the operation modes discussed in the present disclosure. For example, the first "Operation Mode" field could correspond to the operation mode in the present disclosure, the second "Operation Mode" field could correspond to the operation mode in the present disclosure, the third "Operation Mode" field could correspond to the operation mode in the present disclosure, and the fourth "Operation Mode" field could correspond to the operation mode in the present disclosure.

For another example, the one or more separate "Operation Mode" fields could include a "beam indication without repetition"/"Mode-1" field corresponding to the operation mode in the present disclosure, a "beam indication with repetition"/"Mode-2" field corresponding to the operation mode in the present disclosure, a "beam indication for STXMP"/"Mode-3" field corresponding to the operation mode in the present disclosure, or a "beam indication for cross-carrier"/"Mode-4" field corresponding to the operation mode in the present disclosure. Each "Operation Mode" field, if configured, could indicate one or more TCI state IDs/indexes corresponding to one or more Rel. 17 unified TCI states among the indicated N>1 or M>1 Rel. 17 unified TCI states. Optionally, one or more of the operation submodes such as operation modes could be indicated in the DCI format or MAC CE for unified TCI state(s) indication following those specified in the examples.

For this case, the TCI state IDs/indexes, and therefore the corresponding Rel. 17 unified TCI states, associated with the operation mode (if indicated) are also associated with the operation modes if one or more of them are indicated/enabled. Furthermore, the TCI state IDs/indexes, and therefore the corresponding Rel. 17 unified TCI states, associated with the operation mode (if indicated) are also associated with the operation mode if one or more of them are indicated/enabled. Alternatively, the UE could also be indicated by the network in the DCI format (e.g., DCI format 1_1 or 1_2 with or without DL assignment) or MAC CE indicating the N>1 or M>1 Rel. 17 unified TCI states one or more operation submodes in the present disclosure.

For this design example, the DCI format (e.g., DCI format 1_1 or 1_2 with or without DL assignment) or MAC CE for unified TCI state(s) indication could contain one or more (e.g., 4) separate "Operation SubMode" fields each associating/corresponding to at least one of the operation submodes discussed in the present disclosure. For example, when the operation mode is indicated, the first "Operation SubMode" field could correspond to the operation mode in the present disclosure, the second "Operation SubMode" field could correspond to the operation mode in the present disclosure, the third "Operation SubMode" field could correspond to the operation mode in the present disclosure, and the fourth "Operation SubMode" field could correspond to the operation mode in the present disclosure.

Furthermore, when the operation mode is indicated, the first "Operation SubMode" field could correspond to the operation mode in the present disclosure, and the second "Operation SubMode" field could correspond to the operation mode in the present disclosure. Alternatively, the first "Operation SubMode" field could correspond to the operation mode in the present disclosure, the second "Operation SubMode" field could correspond to the operation mode in the present disclosure, the third "Operation SubMode" field could correspond to the operation mode in the present disclosure, the fourth "Operation SubMode" field could correspond to the operation mode in the present disclosure, the fifth "Operation SubMode" field could correspond to the operation mode in the present disclosure, and the sixth "Operation SubMode" field could correspond to the operation mode in the present disclosure.

For another example, the one or more separate "Operation SubMode" fields could include a "PDCCH repetition"/"Mode-2-1" field corresponding to the operation mode in the present disclosure, a "PDSCH repetition"/"Mode-2-2" field corresponding to the operation mode in the present disclosure, a "PUCCH repetition"/"Mode-2.3" field corresponding to the operation mode in the present disclosure, a "PUSCH repetition"/"Mode-2.4" field corresponding to the operation mode in the present disclosure, a "beam indication for STXMP option-1"/"Mode-3.1" field corresponding to the operation mode in the present disclosure, a "beam indication for STXMP option-2"/"Mode-3.2" field corresponding to the operation mode in the present disclosure. Each "Operation SubMode" field, if configured, could indicate one or more TCI state IDs/indexes corresponding to one or more Rel. 17 unified TCI states among the indicated N>1 or M>1 Rel. 17 unified TCI states.

In yet another example, the TCI field(s) in the DCI format (e.g., DCI format 1_1 or 1_2 with or without DL assignment) or MAC CE for unified TCI state(s) indication could contain one or more (e.g., 4) separate "Operation Mode" parameters each associating/corresponding to at least one of the operation modes discussed in the present disclosure. For example, the first "Operation Mode" parameter could correspond to the operation mode in the present disclosure, the second "Operation Mode" parameter could correspond to the operation mode in the present disclosure, the third "Operation Mode" parameter could correspond to the operation mode in the present disclosure, and the fourth "Operation Mode" parameter could correspond to the operation mode in the present disclosure.

For another example, the one or more separate "Operation Mode" parameters could include a "beam indication without repetition"/"Mode-1" parameter corresponding to the operation mode in the present disclosure, a "beam indication with repetition"/"Mode-2" parameter corresponding to the operation mode in the present disclosure, a "beam indication for STXMP"/"Mode-3" parameter corresponding to the operation mode in the present disclosure, or a "beam indication for cross-carrier"/"Mode-4" parameter corresponding to the operation mode in the present disclosure. Each "Operation Mode" parameter, if configured, could indicate one or more TCI state IDs/indexes corresponding to one or more Rel. 17 unified TCI states among the indicated N>1 or M>1 Rel. 17 unified TCI states.

Optionally, one or more of the operation submodes could be indicated in the DCI format or MAC CE for unified TCI state(s) indication following those specified in the examples. For this case, the TCI state IDs/indexes, and therefore the corresponding Rel. 17 unified TCI states, associated with the operation mode (if indicated) are also associated with the operation modes if one or more of them are indicated/enabled. Furthermore, the TCI state IDs/indexes, and therefore the corresponding Rel. 17 unified TCI states, associated with the operation mode (if indicated) are also associated with the operation mode if one or more of them are indicated/enabled. Alternatively, the UE could also be indicated by the network in the TCI field(s) in the DCI format (e.g., DCI format 1_1 or 1_2 with or without DL assignment) or MAC CE indicating the N>1 or M>1 Rel. 17 unified TCI states one or more operation submodes in the present disclosure.

For this design example, the TCI field(s) in the DCI format (e.g., DCI format 1_1 or 1_2 with or without DL assignment) or MAC CE for unified TCI state(s) indication could contain one or more (e.g., 4) separate "Operation SubMode" parameters each associating/corresponding to at least one of the operation submodes discussed in the present disclosure. For example, when the operation mode is indicated, the first "Operation SubMode" parameter could correspond to the operation mode in the present disclosure, the second "Operation SubMode" parameter could correspond to the operation mode in the present disclosure, the third "Operation SubMode" parameter could correspond to the operation mode in the present disclosure, and the fourth "Operation SubMode" parameter could correspond to the operation mode in the present disclosure.

Furthermore, when the operation mode is indicated, the first "Operation SubMode" parameter could correspond to the operation mode in the present disclosure, and the second "Operation SubMode" parameter could correspond to the operation mode in the present disclosure. Alternatively, the first "Operation SubMode" parameter could correspond to the operation mode in the present disclosure, the second "Operation SubMode" parameter could correspond to the operation mode in the present disclosure, the third "Operation SubMode" parameter could correspond to the operation mode in the present disclosure, the fourth "Operation SubMode" parameter could correspond to the operation mode in the present disclosure, the fifth "Operation SubMode" parameter could correspond to the operation mode in the present disclosure, and the sixth "Operation SubMode" parameter could correspond to the operation mode in the present disclosure.

For another example, the one or more separate "Operation SubMode" parameters could include a "PDCCH repetition"/"Mode-2-1" parameter corresponding to the operation mode in the present disclosure, a "PDSCH repetition"/"Mode-2-2" parameter corresponding to the operation mode in the present disclosure, a "PUCCH repetition"/"Mode-2.3" parameter corresponding to the operation mode in the present disclosure, a "PUSCH repetition"/"Mode-2.4" parameter corresponding to the operation mode in the present disclosure, a "beam indication for STXMP option-1"/"Mode-3.1" parameter corresponding to the operation mode in the present disclosure, a "beam indication for STXMP option-2"/"Mode-3.2" parameter corresponding to the operation mode in the present disclosure. Each "Operation SubMode" parameter, if configured, could indicate one or more TCI state IDs/indexes corresponding to one or more Rel. 17 unified TCI states among the indicated N>1 or M>1 Rel. 17 unified TCI states.

The above discussed design examples in the present disclosure can be used to indicate different operation modes other than/in addition to those specified in the present disclosure.

Furthermore, the above discussed design examples in the present disclosure are for single-DCI based beam indication, which can be extended to/used in a multi-DCI based multi-TRP system, wherein separate DCIs/DCI formats for unified TCI state(s) indication could be received in different CORESETs associated/configured with different values of CORESETPoolIndex.

Alternatively, a UE could be provided by the network via higher layer RRC signaling one or more of the operation modes such as operation modes discussed in the present disclosure. For example, the UE could be configured with a higher layer parameter "beam indication without repetition" corresponding to the operation mode in the present disclosure set to "enabled." For another example, the UE could be configured with a higher layer parameter "beam indication with repetition" corresponding to the operation mode in the present disclosure set to "enabled."

Furthermore, if the UE is configured with a higher layer parameter "PDCCH repetition" set to "enabled" or a CORESET configured with more than one active TCI states or receives one or more PDCCH candidates from one or more search space sets higher layer configured with searchSpaceLinking, the operation mode is configured/enabled. If the UE is configured with a higher layer parameter "PDSCH repetition" set to "enabled" or the higher layer parameter repetitionScheme set to one of "fdmSchemeA," "fdmSchemeB," and "tdmSchemeA" or the higher layer parameter repetitionNumber in PDSCH-TimeDomainResourceAllocation, the operation mode is configured/enabled. If the UE is configured with a higher layer parameter "PUCCH repetition" set to "enabled" or configured/provided by the network a number of slots, denoted by $N_{pucch}$, for repetitions of a PUCCH transmission, the operation mode is configured/enabled.

If the UE is configured with a higher layer parameter "PUSCH repetition" set to "enabled" or configured/provided by the network at least two SRS resource sets with the usage set to "codebook" or "nonCodebook," the operation mode is configured/enabled. Yet for another example, the UE could be configured with a higher layer parameter "beam indication for STXMP option-1" corresponding to the operation mode in the present disclosure set to "enabled." Yet for another example, the UE could be configured with a higher layer parameter "beam indication for STXMP option-2" corresponding to the operation mode in the present disclosure set to "enabled."

Yet for another example, the UE could be configured with a higher layer parameter "beam indication for cross-carrier" corresponding to the operation mode in the present disclosure set to "enabled." Optionally, the UE could receive from the network one or more MAC CE commands indicating one or more of the operation modes such as operation modes discussed in the present disclosure.

In addition, the UE could be first higher layer RRC configured by the network a list of candidate operation modes such as operation modes discussed in the present disclosure. The UE could then receive from the network one or more MAC CE activation commands activating one or more of the operation modes from the higher layer RRC configured list of candidate operation modes. If one or more first operation modes such as operation modes discussed in the present disclosure are indicated/configured via RRC or MAC CE according to the above discussions, the UE could expect the Rel. 17 unified TCI state(s) indicated by one or more TCI state codepoints in a DCI format (e.g., DCI format 1_1 or 1_2 with or without DL assignment) or MAC CE to follow the indicated one or more first operation modes.

For this case, if the UE is further indicated by the network, in a DCI format (e.g., in DCI format 1_1 or 1_2 with or without DL assignment), one or more second operation modes such as operation modes discussed in the present disclosure along with the indication of the Rel. 17 unified TCI states according to those specified in the examples in the present disclosure, the UE could expect the Rel. 17 unified TCI state(s) indicated by one or more TCI state codepoints in a DCI format (e.g., DCI format 1_1 or 1_2 with or without DL assignment) or MAC CE to follow the indicated one or more second operation modes instead of the first operation mode(s).

The above discussed RRC or MAC CE based operation mode(s) indication/configuration can be used to indicate different operation modes other than/in addition to those operation modes specified in the present disclosure. Furthermore, the above discussed RRC or MAC CE based operation mode(s) are for single-DCI based beam indication, which can be extended to/used in a multi-DCI based multi-TRP system, wherein separate DCIs/DCI formats for unified TCI state(s) indication could be received in different CORESETs associated/configured with different values of CORESETPoolIndex.

Under the Rel. 17 unified transmission configuration indication (TCI) framework, beam indication procedure for the multi-TRP operation needs to be specified. Furthermore, under the Rel. 17 unified TCI framework, UE's behavior(s)/assumption(s) of receiving/processing downlink channel(s)/signal(s) such as physical downlink shared channel (PDSCH) and the corresponding DM-RS ports, means of beam indication for physical downlink control channel (PDCCH) repetitions, and dynamic switching between the single-TRP (sTRP) and multi-TRP (mTRP) operation modes, also need to be specified.

The present disclosure provides various design aspects related to beam indication for multi-TRP operation under the Rel. 17 unified TCI state framework. Specifically, UE's behavior(s)/assumption(s) of receiving/processing downlink channel(s)/signal(s) such as physical downlink shared channel (PDSCH) and the corresponding DM-RS ports is specified, and various design options of beam indication for PDCCH repetitions and dynamic switching between the sTRP and mTRP operation modes are also provided.

As discussed in the present disclosure, a UE could receive from the network a DCI format 1_1 or 1_2 with or without DL PDSCH assignment indicating one or more (e.g., M>1 or N>1) Rel. 17 unified TCI states for UE-dedicated reception on PDSCH(s). For this case, a UE could follow the below procedure(s) to determine resource(s)—e.g., resource element(s)—available or not available for PDSCH reception(s). A UE could be first configured with a higher layer parameter rateMatchPatternToAddModList given by PDSCH-Config, by ServingCellConfig or by ServingCellConfigCommon and configuring up to 4RateMatchPattern(s) per BWP and up to 4 RateMatchPattern(s) per serving-cell.

A RateMatchPattern could contain, within a BWP, when provided by PDSCH-Config or within a serving cell when provided by ServingCellConfig or ServingCellConfigCommon, a pair of reserved resources with numerology provided by higher layer parameter subcarrierSpacing given by RateMatchPattern when configured per serving cell or by numerology of associated BWP when configured per BWP. The pair of reserved resources are respectively indicated by an RB level bitmap (higher layer parameter resourceBlocks given by RateMatchPattern) with 1 RB granularity and a symbol level bitmap spanning one or two slots (higher layer parameters symbolsInResourceBlock given by RateMatchPattern) for which the reserved RBs apply.

A bit value equal to 1 in the RB and symbol level bitmaps indicates that the corresponding resource is not available for PDSCH. For each pair of RB and symbol level bitmaps, a UE may be configured with a time-domain pattern (higher layer parameter periodicityAndPattern given by RateMatchPattern), where each bit of periodicityAndPattern corresponds to a unit equal to a duration of the symbol level bitmap, and a bit value equal to 1 indicates that the pair is present in the unit. The periodicityAndPattern can be {1, 2, 4, 5, 8, 10, 20, or 40} units long, but maximum of 40 msec. The first symbol of periodicityAndPattern every 40 msec/P periods is a first symbol in frame $n_f$ mod 4=0, where P is the duration of periodicityAndPattern in units of msec. When periodicityAndPattern is not configured for a pair, for a symbol level bitmap spanning two slots, the bits of the first and second slots correspond respectively to even and odd slots of a radio frame, and for a symbol level bitmap spanning one slot, the bits of the slot correspond to every slot of a radio frame.

The pair can be included in one or two groups of resource sets (higher layer parameters rateMatchPatternGroup1 and rateMatchPatternGroup2 for DCI format 1_1 or rateMatchPatternGroup1DCI-1-2 and rateMatchPatternGroup2DCI-1-2 for DCI format 1_2). The rateMatchPatternToAddModList given by ServingCellConfig or ServingCellConfigCommon configuration in numerology µ applies only to PDSCH of the same numerology µ.

A RateMatchPattern could also contain, within a BWP, a frequency domain resource of a CORESET configured by ControlResourceSet with controlResourceSetId or ControlResourceSetZero and time domain resource determined by the higher layer parameters monitoringSlotPeriodicityAndOffset, duration andf monitoringSymbolsWithinSlot of all search-space-sets configured by SearchSpace and time domain resource of search-space-set zero configured by searchSpaceZero associated with the CORESET as well as CORESET duration configured by ControlResourceSet with controlResourceSetId or ControlResourceSetZero. This resource not available for PDSCH can be included in one or two groups of resource sets (higher layer parameters rateMatchPatternGroup1 and rateMatchPatternGroup2 for DCI format 1_1 or rateMatchPatternGroup1DCI-1-2 and rateMatchPatternGroup2DCI-1-2 for DCI format 1_2).

A configured group rateMatchPatternGroup1 or rateMatchPatternGroup2 contains a list of indices of RateMatchPattern(s) forming a union of resource-sets not available for a PDSCH dynamically if a corresponding bit of the "Rate matching indicator" field of the DCI format 1_1 scheduling the PDSCH or the DCI format 1_1 (with or without DL PDSCH assignment) indicating one or more Rel. 17 unified TCI states (e.g., by one or more TCI state codepoints in one or more TCI fields) for receiving the PDSCH is equal to 1. The REs corresponding to the union of resource-sets configured by RateMatchPattern(s) that are not included in either of the two groups are not available for a PDSCH scheduled by a DCI format 1_0, a PDSCH scheduled by a DCI format 1_1, a PDSCH scheduled by a DCI format 1_2, a PDSCH whose DM-RS port(s) is quasi co-located with the reference signal(s) provided in one or more Rel. 17 unified TCI states indicated in a DCI format 1_1, a PDSCH whose DM-RS port(s) is quasi co-located with the reference signal(s) provided in one or more Rel. 17 unified TCI states indicated in a DCI format 1_2, and PDSCHs with SPS.

When receiving a PDSCH scheduled by a DCI format 1_0 or PDSCHs with SPS activated by a DCI format 1_0, the REs corresponding to configured resources in rateMatchPatternGroup1 or rateMatchPatternGroup2 are not available for the scheduled PDSCH or the activated PDSCHs with SPS. When receiving PDSCHs with SPS activated by a DCI format 1_1 or 1_2, the REs corresponding to configured resources in rateMatchPatternGroup1 or rateMatchPatternGroup2 are not available for the PDSCHs with SPS if a corresponding bit of the Rate matching indicator field of the DCI format 1_1 or 1_2 activating the PDSCHs with SPS is equal to 1.

Furthermore, configured group rateMatchPatternGroup1DCI-1-2 and rateMatchPatternGroup2DCI-1-2 contains a list of indices of RateMatchPattern(s) forming a union of resource-sets not available for a PDSCH dynamically if a corresponding bit of the "Rate matching indicator" field of the DCI format 1_2 scheduling the PDSCH or the DCI format 1_2 (with or without DL PDSCH assignment) indicating one or more Rel. 17 unified TCI states (e.g., by one or more TCI state codepoints in one or more TCI fields) for receiving the PDSCH is equal to 1. The REs corresponding to the union of resource-sets configured by RateMatchPattern(s) that are not included in either of the two groups are not available for a PDSCH scheduled by a DCI format 1_0, a PDSCH scheduled by a DCI format 1_1, a PDSCH scheduled by a DCI format 1_2, a PDSCH whose DM-RS port(s) is quasi co-located with the reference signal(s) provided in one or more Rel. 17 unified TCI states indicated in a DCI format 1_1, a PDSCH whose DM-RS port(s) is quasi co-located with the reference signal(s) provided in one or more Rel. 17 unified TCI states indicated in a DCI format 1_2, and PDSCHs with SPS.

When receiving a PDSCH scheduled by a DCI format 1_0 or PDSCHs with SPS activated by a DCI format 1_0, the REs corresponding to configured resources in rateMatchPatternGroup1DCI-1-2 and rateMatchPatternGroup2DCI-1-2 are not available for the scheduled PDSCH or the activated PDSCHs with SPS. When receiving PDSCHs with SPS activated by a DCI format 1_1 or 1_2, the REs corresponding to configured resources in rateMatchPatternGroup1DCI-1-2 and rateMatchPatternGroup2DCI-1-2 are not available for the PDSCHs with SPS if a corresponding bit of the Rate matching indicator field of the DCI format 1_1 or 1_2 activating the PDSCHs with SPS is equal to 1.

For a bitmap pair included in one or two groups of resource sets (higher layer parameters rateMatchPatternGroup1 and rateMatchPatternGroup2 for DCI format 1_1 or rateMatchPatternGroup1DCI-1-2 and rateMatchPatternGroup2DCI-1-2 for DCI format 1_2), the dynamic indication of availability for PDSCH applies to a set of slot(s) where the rateMatchPatternToAddModList is present among the slots of scheduled PDSCH or PDSCH whose DM-RS port(s) is quasi co-located with the reference signal(s) provided in one or more Rel. 17 unified TCI states indicated in the corresponding DCI format 1_1 or 1_2 with or without DL PDSCH assignment.

In addition, if a UE monitors PDCCH candidates of aggregation levels 8 and 16 with the same starting control channel element (CCE) index in non-interleaved CORESET spanning one OFDM symbol: (1) and if a detected PDCCH scheduling the PDSCH or a detected PDCCH indicating one or more Rel. 17 unified TCI states for receiving the PDSCH (e.g., via DCI format 1_1 or 1_2 with or without DL assignment) has aggregation level 8, the resources corresponding to the aggregation level 16 PDCCH candidate are not available for the PDSCH; and (2) when at least one of the PDCCH candidates of aggregation levels 8 and 16 linked as indicated by higher layer parameter searchSpaceLinking, the PDCCH candidates of aggregation level 16 and any other PDCCH candidate(s) linked with any of the PDCCH candidates of aggregation level 8 and 16 are not available for the PDSCH reception at the UE, if a detected PDCCH scheduling the PDSCH or a detected PDCCH indicating one or more Rel. 17 unified TCI states for receiving the PDSCH (e.g., via DCI format 1_1 or 1_2 with or without DL assignment) is associated with the PDCCH candidates of aggregation level 8 or 16.

If a PDSCH scheduled by a PDCCH or whose DM-RS port(s) quasi co-located with the reference signal(s) provided in one or more Rel. 17 unified TCI states indicated by a PDCCH (e.g., via DCI format 1_1 or 1_2 with or without DL assignment) may overlap with resources in the CORESET(s) containing the PDCCH(s), the resources corresponding to a union of the detected PDCCH that scheduled the PDSCH or indicated the one or more Rel. 17 unified TCI states for receiving the PDSCH and the associated PDCCH DM-RS(s) are not available for the PDSCH. When the PDCCH candidates are associated with a search space set configured with searchSpaceLinking, the resources corresponding to a union of the two configured PDCCH candidates scheduling the PDSCH or indicating one or more Rel. 17 unified TCI states for receiving the PDSCH and the associated PDCCH DM-RS(s) are not available for the PDSCH. When precoderGranularity configured in a CORESET where the PDCCH was detected is set to "allContiguousRBs," the associated PDCCH DM-RS are DM-RS in all REGs of the CORESET. Otherwise, the associated DM-RS are the DM-RS in REGs of the PDCCH.

When the PDCCH candidates, e.g., indicating the same (e.g., N>1 or M>1) Rel. 17 unified TCI state(s) or having the same DL assignment, are associated with one or more search space sets configured with searchSpaceLinking, for the purpose of determining the PDCCH with C-RNTI, CS-RNTI or MCS-C-RNTI scheduling the PDSCH ends at least 14 symbols before the earliest starting symbol of the PDSCH(s) without the corresponding PDCCH transmission, the PDCCH candidate that has PDSCH assignment or indicates the Rel. 17 unified TCI state(s) or ends later in time among the two configured PDCCH candidates is used.

When the PDCCH candidates, e.g., indicating the same (e.g., N>1 or M>1) Rel. 17 unified TCI state(s) or having the same DL assignment, are associated with one or more search space sets configured with searchSpaceLinking, if the two linked PDCCH candidates scheduling the PDSCH with mapping Type A, or if the two linked PDCCH candidates indicating the Rel. 17 unified TCI state(s) for receiving the PDSCH with Type A, or if the two linked PDCCH candidates with at least one of them scheduling the PDSCH with Type A, or if the two linked PDCCH candidates with at least one of them indicating the Rel. 17 unified TCI state(s) for receiving the PDSCH with Type A, were received in the same slot, both linked PDCCH candidates are expected to be contained within the first three symbols of the slot.

When the PDCCH candidates, e.g., indicating the same (e.g., N>1 or M>1) Rel. 17 unified TCI state(s) or having the same DL assignment, are associated with one or more search space sets configured with searchSpaceLinking, the UE is not expected to receive a PDSCH with mapping Type B in a slot, if the first symbol of the PDCCH candidate that starts later in time scheduling the PDSCH or indicating the Rel. 17 unified TCI state(s) for receiving the PDSCH was received in a later symbol than the first symbol indicated in the PDSCH time domain resource allocation.

When the PDCCH candidates, e.g., indicating the same (e.g., N>1 or M>1) Rel. 17 unified TCI state(s) or having the same DL assignment, are associated with one or more search space sets configured with searchSpaceLinking, for the purpose of determining the downlink RB set of a PDSCH when scheduled by DCI format 1_0, the CORESET with lower ID among two CORESETs associated with two PDCCH candidates or the CORESET associated with the PDCCH candidate having the DL PDSCH assignment among the two PDCCH candidates, or the CORESET associated with the PDCCH candidate indicating the Rel. 17 unified TCI state(s) among the two PDCCH candidates, is used.

When the PDCCH candidates, e.g., indicating the same (e.g., N>1 or M>1) Rel. 17 unified TCI state(s) or having the same DL assignment, are associated with one or more search space sets configured with searchSpaceLinking, for the purpose of determining the time offset between the reception of the DL DCI and the corresponding PDSCH, the PDCCH candidate that ends later in time among the two linked PDCCH candidates or the PDCCH candidate that has the DL PDSCH assignment among the two linked PDCCH candidates or the PDCCH candidate that indicates the Rel. 17 unified TCI state(s) for receiving the corresponding PDSCH is used.

When the PDCCH candidates, e.g., indicating the same (e.g., N>1 or M>1) Rel. 17 unified TCI state(s) or having the same DL assignment, are associated with one or more search space sets configured with searchSpaceLinking, for the purpose of determining scheduling offset between the last symbol of the PDCCH carrying the triggering DCI and the first symbol of the aperiodic CSI-RS resources, the PDCCH candidate that ends later in time among the two configured PDCCH candidates or the PDCCH candidate that has the DL PDSCH assignment among the two linked PDCCH candidates or the PDCCH candidate that indicates the Rel. 17 unified TCI state(s) among the two linked PDCCH candidates is used, and the UE does not expect that the aperiodic CSI-RS is transmitted before the first symbol of the PDCCH candidate that starts later in time among the two configured PDCCH candidates or the PDCCH candidate that has the DL PDSCH assignment among the two configured PDCCH candidates or the PDCCH candidate that indicates the Rel. 17 unified TCI state(s) among the two configured PDCCH candidates.

Denote the subcarrier spacing configurations for CSI-RS and PDCCH by $\mu_{CSIRS}$ and $\mu_{PDCCH}$, respectively. If the $\mu_{PDCCH} < \mu_{CSIRS}$, the UE is expected to be able to measure the aperiodic CSI RS, if the CSI-RS starts no earlier than the first symbol of the CSI-RS carrier's slot that starts at least Ncsirs PDCCH symbols after the end of the PDCCH triggering the aperiodic CSI-RS. If the $\mu_{PDCCH} > \mu_{CSIRS}$, the UE is expected to be able to measure the aperiodic CSI RS, if the CSI-RS starts no earlier than at least Ncsirs PDCCH symbols after the end of the PDCCH triggering the aperiodic CSI-RS. When the PDCCH candidates, e.g., indicating the same (e.g., N>1 or M>1) Rel. 17 unified TCI state(s) or having the same DL assignment, are associated with one or more search space sets configured with searchSpaceLinking, for the purpose of determining Ncsirs described above, the PDCCH candidate that ends later in time among the two configured PDCCH candidates or the PDCCH candidate that has the DL PDSCH assignment among the two configured PDCCH candidates or the PDCCH candidate that indicates the Rel. 17 unified TCI state(s) among the two configured PDCCH candidates is used.

An aperiodic CSI report occupies CSI processing unit(s) (CPU(s)) from the first symbol after the PDCCH triggering the CSI report until the last symbol of the scheduled PUSCH carrying the report. When the PDCCH candidates, e.g., indicating the same (e.g., N>1 or M>1) Rel. 17 unified TCI state(s) or having the same DL assignment, are associated with one or more search space sets configured with searchSpaceLinking, for the purpose of determining the CPU occupation duration, the PDCCH candidate that ends later in time among the two linked PDCCH candidates or the PDCCH candidate that has the DL PDSCH assignment among the two configured PDCCH candidates or the PDCCH candidate that indicates the Rel. 17 unified TCI state(s) among the two configured PDCCH candidates is used.

An initial semi-persistent CSI report on PUSCH after the PDCCH trigger occupies CPU(s) from the first symbol after the PDCCH until the last symbol of the scheduled PUSCH carrying the report. When the PDCCH candidates, e.g., indicating the same (e.g., N>1 or M>1) Rel. 17 unified TCI state(s) or having the same DL assignment, are associated with one or more search space sets configured with searchSpaceLinking, for the purpose of determining the CPU occupation duration, the PDCCH candidate that ends later in time among the two linked PDCCH candidates or the PDCCH candidate that has the DL PDSCH assignment among the two configured PDCCH candidates or the PDCCH candidate that indicates the Rel. 17 unified TCI state(s) among the two configured PDCCH candidates is used.

In any slot, the UE is not expected to have more active CSI-RS ports or active CSI-RS resources in active BWPs than reported as capability. NZP CSI-RS resource is active in a duration of time defined as follows. For aperiodic CSI-RS, starting from the end of the PDCCH containing the request and ending at the end of the scheduled PUSCH containing the report associated with this aperiodic CSI-RS. When the PDCCH candidates, e.g., indicating the same (e.g., N>1 or M>1) Rel. 17 unified TCI state(s) or having the same DL assignment, are associated with one or more search space sets configured with searchSpaceLinking, for the purpose of determining the NZP CSI-RS resource active duration, the PDCCH candidate that ends later in time among the two linked PDCCH candidates or the PDCCH candidate that has the DL PDSCH assignment among the two configured PDCCH candidates or the PDCCH candidate that indicates the Rel. 17 unified TCI state(s) among the two configured PDCCH candidates is used.

When the DCI format 1_1 with "Minimum applicable scheduling offset indicator" field is received outside the first three symbols of the slot, value of from Table 5.3.1-1 in the 3GPP TS 38.214 is incremented by one before determining the application delay X. When the PDCCH candidates, e.g., indicating the same (e.g., N>1 or M>1) Rel. 17 unified TCI state(s) or having the same DL assignment, are associated with one or more search space sets configured with searchSpaceLinking, for the purpose of determining "Minimum applicable scheduling offset indicator" field is received outside the first three symbols of the slot, the PDCCH candidate that ends later in time among the two configured PDCCH or the PDCCH candidate that has the DL PDSCH assignment among the two configured PDCCH candidates or the PDCCH candidate that indicates the Rel. 17 unified TCI state(s) among the two configured PDCCH candidates is used.

When the PDCCH candidates, e.g., indicating the same (e.g., N>1 or M>1) Rel. 17 unified TCI state(s) or having the same DL assignment, are associated with one or more search space sets configured with searchSpaceLinking, for the purpose of determining the last symbol of the PDCCH triggering the CSI report(s), the PDCCH candidate that ends later in time among the two configured PDCCH or the PDCCH candidate that has the DL PDSCH assignment among the two configured PDCCH candidates or the PDCCH candidate that indicates the Rel. 17 unified TCI state(s) among the two configured PDCCH candidates is used.

For cross-carrier scheduling, wherein the PDCCH (candidate) carrying the scheduling DCI or the DCI indicating the Rel. 17 unified TCI state(s) for PDSCH reception (e.g., DCI format 1_1 or 1_2 with or without DL assignment) is received on one carrier with one OFDM subcarrier spacing ($\mu_{PDCCH}$), and the PDSCH scheduled to be received by the DCI or the PDSCH whose DM-RS port(s) is quasi co-located with the reference signal(s) provided in the Rel. 17 unified TCI state(s) indicated in the DCI is on another carrier with another OFDM subcarrier spacing ($\mu_{PDSCH}$).

If the $\mu_{PDCCH} < \beta_{PDSCH}$, the UE is expected to receive the PDSCH scheduled by the DCI or the PDSCH whose DM-RS port(s) is quasi co-located with the reference signal(s) provided in the Rel. 17 unified TCI state(s) indicated in the DCI, if the first symbol in the PDSCH allocation, including the DM-RS, as defined by the slot offset $K_0$ and the start and length indicator SLIV of the scheduling DCI or the DCI indicating the corresponding Rel. 17 unified TCI state(s) starts no earlier than the first symbol of the slot of the PDSCH reception starting at least $N_{pdsch}$ PDCCH symbols after the end of the PDCCH scheduling the PDSCH or the PDCCH indicating the Rel. 17 unified TCI state(s) for receiving the PDSCH, not taking into account the effect of receive timing difference between the scheduling cell and the scheduled cell.

If the $\mu_{PDCCH} > \mu_{PDSCH}$, the UE is expected to receive the PDSCH scheduled by the DCI or the PDSCH whose DM-RS port(s) is quasi co-located with the reference signal(s) provided in the Rel. 17 unified TCI state(s) indicated in the DCI, if the first symbol in the PDSCH allocation, including the DM-RS, as defined by the slot offset $K_0$ and the start and length indicator SLIV of the scheduling DCI or the DCI indicating the corresponding Rel. 17 unified TCI state(s) starts no earlier than $N_{pdsch}$ PDCCH symbols after the end of the PDCCH scheduling the PDSCH or the PDCCH indicating the Rel. 17 unified TCI state(s) for receiving the PDSCH, not taking into account the effect of receive timing difference between the scheduling cell and the scheduled cell.

When the PDCCH candidates, e.g., indicating the same (e.g., N>1 or M>1) Rel. 17 unified TCI state(s) or having the same DL assignment, are associated with one or more search space sets configured with searchSpaceLinking, for the purpose of determining $N_{pdsch}$ as described above, the PDCCH candidate that ends later in time among the two configured PDCCH candidates or the PDCCH candidate that has the DL PDSCH assignment among the two configured PDCCH candidates or the PDCCH candidate that indicates the Rel. 17 unified TCI state(s) among the two configured PDCCH candidates is used.

In the present disclosure, various methods of indicating the sTRP or mTRP operation modes or a dynamic switching between the sTRP or mTRP operation modes under the Rel. 17 unified TCI framework are provided.

As discussed in the present disclosure, a UE could be provided by the network in DCI format 1_1 or 1_2 (with or without DL assignment) one or more (e.g., M>1 or N>1) Rel. 17 unified TCI states (e.g., by one or more TCI state codepoints in one or more TCI fields in the DCI format) for UE-dedicated reception(s) on PDSCH/PDCCH or dynamic-grant/configured-grant based PUSCH and all of dedicated PUCCH resources. The same DCI format (e.g., DCI format 1_1 or 1_2 with or without DL assignment) for Rel. 17 unified TCI state(s) indication could also indicate the sTRP or mTRP operation modes or a dynamic switching between the sTRP or mTRP modes.

In one example, the DCI format (e.g., DCI format 1_1 or 1_2 with or without DL assignment) indicating one or more (e.g., M>1 or N>1 for both DL and UL channels/signals) Rel. 17 unified TCI states could contain a "Operation Mode" field. For example, if the "Operation Mode" field is set to 0 (or 1), the sTRP operation mode could be enabled, wherein a UE could be indicated by the network a Rel. 17 unified TCI state for UE-dedicated reception(s) on PDSCH/PDCCH or dynamic-grant/configured-grant based PUSCH and all of dedicated PUCCH resources or channels/signals following the indicated Rel. 17 unified TCI state, e.g., channels/signals configured with higher layer parameter "useIndicatedR17TCIState." If the "Operation Mode" field is set to 1 (or 0), the mTRP operation mode could be enabled, wherein a UE could be indicated by the network M>1 (or N>1) Rel. 17 unified TCI states for UE-dedicated reception(s) on PDSCH/PDCCH or dynamic-grant/config-ured-grant based PUSCH and all of dedicated PUCCH resources or channels/signals following the indicated Rel. 17 unified TCI states, e.g., channels/signals configured with higher layer parameter "useIndicatedR17TCIState."

When M>1 (or N>1) Rel. 17 unified TCI states are indicated by one or more TCI state codepoints in one or more TCI fields in the DCI format and the sTRP operation mode is enabled—e.g., the "Operation Mode" field in the DCI format is set to 0 (or 1): for example, the UE could use the first (or last) Rel. 17 unified TCI state or the Rel. 17 unified TCI state with the lowest (or highest) TCI state ID—among the M>1 or N>1 Rel. 17 unified TCI states indicated in the DCI format—for UE-dedicated reception(s) on PDSCH/PDCCH or dynamic-grant/configured-grant based PUSCH and all of dedicated PUCCH resources or channels/signals following the indicated Rel. 17 unified TCI state, e.g., channels/signals configured with higher layer parameter "useIndicatedR17TCIState"; for another example, the UE could use the m-th (or n-th) Rel. 17 unified TCI state or the Rel. 17 unified TCI state m (or n) or the Rel. 17 unified TCI state with the m-th (or n-th) lowest (or highest) TCI state ID—among the M>1 or N>1 Rel. 17 unified TCI states indicated in the DCI format—for UE-dedicated reception(s) on PDSCH/PDCCH or dynamic-grant/configured-grant based PUSCH and all of dedicated PUCCH resources or channels/signals following the indicated Rel. 17 unified TCI state, e.g., channels/signals configured with higher layer parameter "useIndicatedR17TCIState," where n∈{1, . . . , N} and m∈{1, . . . , M}.

For this case, (1) n (or m) could be fixed in the system specification(s), and known to both the UE and network sides a prior; (2) the UE is configured/indicated by the network the value(s) of n (or m); this configuration/indication could be via higher layer RRC signaling or MAC CE command or DCI based signaling; for example, the DCI format for unified TCI state(s) indication could contain a "TCI state for sTRP and mTRP switching" field indicating the value(s) of the Rel. 17 unified TCI state ID/index m (or n); for another example, the UE could receive from the network a MAC CE activation command/bitmap activating the TCI state ID/index m (or n) from the M>1 or N>1 Rel. 17 unified TCI states indicated in the DCI format.

When M=1 (or N=1) Rel. 17 unified TCI state is indicated by a TCI state codepoint in the TCI field in the DCI format and the mTRP operation mode is enabled—e.g., the "Operation Mode" field in the DCI format is set to 1 (or 0): for example, the UE could use the M>1 or N>1 Rel. 17 unified TCI states previously indicated in a MAC CE or DCI (e.g., DCI format 1_1 or 1_2 with or without DL assignment) for UE-dedicated reception(s) on PDSCH/PDCCH or dynamic-grant/configured-grant based PUSCH and all of dedicated PUCCH resources or channels/signals following the indicated Rel. 17 unified TCI state, e.g., channels/signals configured with higher layer parameter "useIndicatedR17TCIState"; for another example, the DCI format or MAC CE for unified TCI state(s) indication could contain a "TCI state for sTRP and mTRP switching" field indicating M>1 or N>1 Rel. 17 unified TCI states for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState."

In another example, the DCI format (e.g., DCI format 1_1 or 1_2 with or without DL assignment) indicating one or more (e.g., M>1 or N>1 for both DL and UL channels/signals) Rel. 17 unified TCI states could contain a "Operation Mode" field. For example, if the "Operation Mode" field is set to 0 (or 1), the sTRP operation mode could be enabled, wherein a UE could be indicated by the network a first Rel. 17 unified TCI state for UE-dedicated reception(s) on PDSCH/PDCCH or DL channels/signals following the indicated first Rel. 17 unified TCI state, e.g., DL channels/signals configured with higher layer parameter "useIndicatedR17TCIState" or a second Rel. 17 unified TCI state for dynamic-grant/configured-grant based PUSCH and all of dedicated PUCCH resources or UL channels/signals following the indicated second Rel. 17 unified TCI state, e.g., UL channels/signals configured with higher layer parameter "useIndicatedR17TCIState."

If the "Operation Mode" field is set to 1 (or 0), the mTRP operation mode could be enabled, wherein a UE could be indicated by the network M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState" or N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState."

When M>1 (or N>1) Rel. 17 unified TCI states are indicated by one or more TCI state codepoints in one or more TCI fields in the DCI format and the sTRP operation mode is enabled—e.g., the "Operation Mode" field in the DCI format is set to 0 (or 1): for example, the UE could use the first (or last) Rel. 17 unified TCI state or the Rel. 17 unified TCI state with the lowest (or highest) TCI state ID—among the M>1 or N>1 Rel. 17 unified TCI states indicated in the DCI format for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState"—for UE-dedicated reception(s) on PDSCH/PDCCH or DL channels/signals following the indicated Rel. 17 unified TCI state, e.g., DL channels/signals configured with higher layer parameter "useIndicatedR17TCIState."

Furthermore, the UE could use the last (or first) Rel. 17 unified TCI state or the Rel. 17 unified TCI state with the highest (or lowest) TCI state ID—among the M>1 or N>1 Rel. 17 unified TCI states indicated in the DCI format for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState"—for dynamic-grant/configured-grant based PUSCH and all of dedicated PUCCH resources or UL channels/signals following the indicated Rel. 17 unified TCI state, e.g., UL channels/signals configured with higher layer parameter "useIndicatedR17TCIState."

For another example, the UE could use the m1-th Rel. 17 unified TCI state or the Rel. 17 unified TCI state m1 or the Rel. 17 unified TCI state with the m1-th lowest (or highest) TCI state ID—among the M>1 or N>1 Rel. 17 unified TCI states indicated in the DCI format for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState"—for UE-dedicated reception(s) on PDSCH/PDCCH or DL channels/signals following the indicated Rel. 17 unified TCI state, e.g., DL channels/signals configured with higher layer parameter "useIndicatedR17TCIState," where $m1 \in \{1, \ldots, M\}$ or $m1 \in \{1, \ldots, N\}$.

Furthermore, the UE could use the n1-th Rel. 17 unified TCI state or the Rel. 17 unified TCI state n1 or the Rel. 17 unified TCI state with the n1-th lowest (or highest) TCI state ID—among the M>1 or N>1 Rel. 17 unified TCI states indicated in the DCI format for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState"—for dynamic-grant/configured-grant based PUSCH and all of dedicated PUCCH resources or UL channels/signals following the indicated Rel. 17 unified TCI state, e.g., UL channels/signals configured with higher layer parameter "useIndicatedR17TCIState," where $n1 \in \{1, \ldots, N\}$ or $n1 \in \{1, \ldots, M\}$.

For this case, (1) m1 or n1 could be fixed in the system specification(s), and known to both the UE and network sides a prior; (2) the UE is configured/indicated by the network the value(s) of m1 or n1; this configuration/indication could be via higher layer RRC signaling or MAC CE command or DCI based signaling; for example, the DCI format for unified TCI state(s) indication could contain a "TCI state for sTRP and mTRP switching" field indicating the value(s) of the Rel. 17 unified TCI state ID/index m1 or n1—e.g., the first value in the "TCI state for sTRP and mTRP switching" field could correspond to m1 (or n1), and the second value in the "TCI state for sTRP and mTRP switching" field could correspond to n1 (or m1).

For another example, the UE could receive from the network a MAC CE activation command/bitmap activating the TCI state ID/index m1 from the M>1 or N>1 Rel. 17 unified TCI states indicated in the DCI format or the TCI state ID/index n1 from the M>1 or N>1 Rel. 17 unified TCI states indicated in the DCI format; yet for another example, the DCI format for unified TCI state(s) indication could contain a "TCI state for DL sTRP and mTRP switching" field indicating the value(s) of the Rel. 17 unified TCI state ID/index m1 or a "TCI state for UL sTRP and mTRP switching" field indicating the value(s) of the Rel. 17 unified TCI state ID/index n1.

Yet for another example, the UE could receive from the network a first MAC CE activation command/bitmap activating the TCI state ID/index m1 from the M>1 or N>1 Rel. 17 unified TCI states indicated in the DCI format or a second MAC CE activation command/bitmap activating the TCI state ID/index n1 from the M>1 or N>1 Rel. 17 unified TCI states indicated in the DCI format.

When M=1 (or N=1) Rel. 17 unified TCI state is indicated by a TCI state codepoint in the TCI field in the DCI format and the mTRP operation mode is enabled—e.g., the "Operation Mode" field in the DCI format is set to 1 (or 0): for example, the UE could use one or more (e.g., M1>1) Rel. 17 unified TCI states—determined out of the total M>1 (or N>1) Rel. 17 unified TCI states (e.g., by activating the M1>1 Rel. 17 unified TCI states from the total M>1 or N>1 Rel. 17 unified TCI states via one or more MAC CE activation commands) previously indicated in a MAC CE or DCI (e.g., DCI format 1_1 or 1_2 with or without DL assignment) for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState"—for UE-dedicated reception(s) on PDSCH/PDCCH or DL channels/signals following the one or more (e.g., M1>1) Rel. 17 unified TCI states, e.g., DL channels/signals configured with higher layer parameter "useIndicatedR17TCIState" or one or more (e.g., N1>1) Rel. 17 unified TCI states—determined out of the total M>1 (or N>1) Rel. 17 unified TCI states (e.g., by activating the N1>1 Rel. 17 unified TCI states from the total M>1 or N>1 Rel. 17 unified TCI states via one or more MAC CE activation commands) previously indicated in a MAC CE or DCI (e.g., DCI format 1_1 or 1_2 with or without DL assignment) for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState"—for dynamic-grant/configured-grant based PUSCH and all of dedicated PUCCH resources or UL channels/signals following the one or more (e.g., N1>1) Rel. 17 unified TCI states, e.g., UL channels/signals configured with higher layer parameter "useIndicatedR17TCIState."

For another example, the DCI format or MAC CE for unified TCI state(s) indication could contain a "TCI state for sTRP and mTRP switching" field indicating M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState" or N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState."

For instance, the DCI format or MAC CE for unified TCI state(s) indication could contain a "TCI state for sTRP and mTRP switching" field with the first M1 values indicated therein indicating the M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState" or with the last N1 values indicated therein indicating the N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState."

Yet for another example, the DCI format or MAC CE for unified TCI state(s) indication could contain a "TCI state for DL sTRP and mTRP switching" field indicating M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState" or a "TCI state for UL sTRP and mTRP switching" field indicating N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState."

In yet another example, the DCI format (e.g., DCI format 1_1 or 1_2 with or without DL assignment) indicating one or more (e.g., M>1 or N>1 for both DL and UL channels/signals) Rel. 17 unified TCI states could contain a "DL Operation Mode" field or a "UL Operation Mode" field. For example, if the "DL Operation Mode" field is set to 0 (or 1), the sTRP operation mode for DL could be enabled, wherein a UE could be indicated by the network a Rel. 17 unified TCI state for UE-dedicated reception(s) on PDSCH/PDCCH or DL channels/signals following the indicated Rel. 17 unified TCI state, e.g., DL channels/signals configured with higher layer parameter "useIndicatedR17TCIState."

If the "UL Operation Mode" field is set to 0 (or 1), the sTRP operation mode for UL could be enabled, wherein a UE could be indicated by the network a Rel. 17 unified TCI state for dynamic-grant/configured-grant based PUSCH and all of dedicated PUCCH resources or UL channels/signals following the indicated Rel. 17 unified TCI state, e.g., UL channels/signals configured with higher layer parameter "useIndicatedR17TCIState."

If the "DL Operation Mode" field is set to 1 (or 0), the mTRP operation mode for DL could be enabled, wherein a UE could be indicated by the network M>1 (or N>1) Rel. 17 unified TCI states for UE-dedicated reception(s) on PDSCH/PDCCH or DL channels/signals following the indicated Rel. 17 unified TCI states, e.g., DL channels/signals configured with higher layer parameter "useIndicatedR17TCIState"; or if the "UL Operation Mode" field is set to 1 (or 0), the mTRP operation mode for UL could be enabled, wherein a UE could be indicated by the network M>1 (or N>1) Rel. 17 unified TCI states for dynamic-grant/configured-grant based PUSCH and all of dedicated PUCCH resources or UL channels/signals following the indicated Rel. 17 unified TCI states, e.g., UL channels/signals configured with higher layer parameter "useIndicatedR17TCIState."

When M>1 (or N>1) Rel. 17 unified TCI states are indicated by one or more TCI state codepoints in one or more TCI fields in the DCI format and the sTRP operation mode for DL or UL is enabled—e.g., the "DL Operation Mode" field in the DCI format is set to 0 (or 1) or the "UL Operation Mode" field in the DCI format is set to 0 (or 1): for example, the UE could use the first (or last) Rel. 17 unified TCI state or the Rel. 17 unified TCI state with the lowest (or highest) TCI state ID—among the M>1 (or N>1) Rel. 17 unified TCI states indicated in the DCI format—for UE-dedicated reception(s) on PDSCH/PDCCH or dynamic-grant/configured-grant based PUSCH and all of dedicated PUCCH resources or channels/signals following the indicated Rel. 17 unified TCI state, e.g., channels/signals configured with higher layer parameter "useIndicatedR17TCIState."

For another example, the UE could use the m-th (or n-th) Rel. 17 unified TCI state or the Rel. 17 unified TCI state m (or n) or the Rel. 17 unified TCI state with the m-th (or n-th) lowest (or highest) TCI state ID—among the M>1 (or N>1) Rel. 17 unified TCI states indicated in the DCI format—for UE-dedicated reception(s) on PDSCH/PDCCH or dynamic-grant/configured-grant based PUSCH and all of dedicated PUCCH resources or channels/signals following the indicated Rel. 17 unified TCI state, e.g., channels/signals configured with higher layer parameter "useIndicatedR17TCIState," where $n \in \{1, \ldots, N\}$ and $m \in \{1, \ldots, M\}$. For this case, (1) n (or m) could be fixed in the system specification(s), and known to both the UE and network sides a prior; (2) the UE is configured/indicated by the network the value(s) of n (or m).

This configuration/indication could be via higher layer RRC signaling or MAC CE command or DCI based signaling; for example, the DCI format for unified TCI state(s) indication could contain a "TCI state for sTRP and mTRP switching" field indicating the value(s) of the Rel. 17 unified TCI state ID/index m (or n); for another example, the UE could receive from the network a MAC CE activation command/bitmap activating the TCI state ID/index m (or n) from the M>1 (or N>1) Rel. 17 unified TCI states indicated in the DCI format.

When M=1 (or N=1) Rel. 17 unified TCI state is indicated by a TCI state codepoint in the TCI field in the DCI format and the mTRP operation mode for DL or UL is enabled— e.g., the "DL Operation Mode" field in the DCI format is set to 1 (or 0) or the "UL Operation Mode" field in the DCI format is set to 1 (or 0): for example, the UE could use the M>1 or N>1 Rel. 17 unified TCI states previously indicated in a MAC CE or DCI (e.g., DCI format 1_1 or 1_2 with or without DL assignment) for UE-dedicated reception(s) on PDSCH/PDCCH or dynamic-grant/configured-grant based PUSCH and all of dedicated PUCCH resources or channels/signals following the indicated Rel. 17 unified TCI state, e.g., channels/signals configured with higher layer parameter "useIndicatedR17TCIState."

For another example, the DCI format or MAC CE for unified TCI state(s) indication could contain a "TCI state for sTRP and mTRP switching" field indicating M>1 or N>1 Rel. 17 unified TCI states for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState."

In yet another example, the DCI format (e.g., DCI format 1_1 or 1_2 with or without DL assignment) indicating one or more (e.g., M>1 or N>1 for both DL and UL channels/signals) Rel. 17 unified TCI states could contain a "DL Operation Mode" field or a "UL Operation Mode" field. For example, if the "DL Operation Mode" field is set to 0 (or 1), the sTRP operation mode for DL could be enabled, wherein a UE could be indicated by the network a first Rel. 17 unified TCI state for UE-dedicated reception(s) on PDSCH/PDCCH or DL channels/signals following the indicated first Rel. 17 unified TCI state, e.g., DL channels/signals configured with higher layer parameter "useIndicatedR17TCIState."

If the "UL Operation Mode" field is set to 0 (or 1), the sTRP operation mode for UL could be enabled, wherein a UE could be indicated by the network a second Rel. 17 unified TCI state for dynamic-grant/configured-grant based PUSCH and all of dedicated PUCCH resources or UL channels/signals following the indicated second Rel. 17 unified TCI state, e.g., UL channels/signals configured with higher layer parameter "useIndicatedR17TCIState."

If the "DL Operation Mode" field is set to 1 (or 0), the mTRP operation mode for DL could be enabled, wherein a UE could be indicated by the network M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState"; or if the "UL Operation Mode" field is set to 1 (or 0), the mTRP operation mode for UL could be enabled, wherein a UE could be indicated by the network N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState."

When M>1 (or N>1) Rel. 17 unified TCI states are indicated by one or more TCI state codepoints in one or more TCI fields in the DCI format and the sTRP operation mode for DL or UL is enabled: for example, if the "DL Operation Mode" field in the DCI format is set to 0 (or 1), the UE could use the first (or last) Rel. 17 unified TCI state or the Rel. 17 unified TCI state with the lowest (or highest) TCI state ID—among the M>1 or N>1 Rel. 17 unified TCI states indicated in the DCI format for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState"—for UE-dedicated reception(s) on PDSCH/PDCCH or DL channels/signals following the indicated Rel. 17 unified TCI state, e.g., DL channels/signals configured with higher layer parameter "useIndicatedR17TCIState."

Furthermore, if the "UL Operation Mode" field in the DCI format is set to 0 (or 1), the UE could use the last (or first) Rel. 17 unified TCI state or the Rel. 17 unified TCI state with the highest (or lowest) TCI state ID—among the M>1 or N>1 Rel. 17 unified TCI states indicated in the DCI format for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState"—for dynamic-grant/configured-grant based PUSCH and all of dedicated PUCCH resources or UL channels/signals following the indicated Rel. 17 unified TCI state, e.g., UL channels/signals configured with higher layer parameter "useIndicatedR17TCIState."

For another example, if the "DL Operation Mode" field in the DCI format is set to 0 (or 1), the UE could use the m1-th Rel. 17 unified TCI state or the Rel. 17 unified TCI state m1 or the Rel. 17 unified TCI state with the m1-th lowest (or highest) TCI state ID—among the M>1 or N>1 Rel. 17 unified TCI states indicated in the DCI format for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState"—for UE-dedicated reception(s) on PDSCH/PDCCH or DL channels/signals following the indicated Rel. 17 unified TCI state, e.g., DL channels/signals configured with higher layer parameter "useIndicatedR17TCIState," where $m1 \in \{1, \ldots, M\}$ or $m1 \in \{1, \ldots, N\}$.

Furthermore, if the "UL Operation Mode" field in the DCI format is set to 0 (or 1), the UE could use the n1-th Rel. 17 unified TCI state or the Rel. 17 unified TCI state n1 or the Rel. 17 unified TCI state with the n1-th lowest (or highest) TCI state ID—among the M>1 or N>1 Rel. 17 unified TCI states indicated in the DCI format for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState"—for dynamic-grant/configured-grant based PUSCH and all of dedicated PUCCH resources or UL channels/signals following the indicated Rel. 17 unified TCI state, e.g., UL channels/signals configured with higher layer parameter "useIndicatedR17TCIState." where n1∈{1, . . . , N} or n1∈{1, . . . , M}.

For this case, (1) m1 or n1 could be fixed in the system specification(s), and known to both the UE and network sides a prior; (2) the UE is configured/indicated by the network the value(s) of m1 or n1; this configuration/indication could be via higher layer RRC signaling or MAC CE command or DCI based signaling; for example, the DCI format for unified TCI state(s) indication could contain a "TCI state for sTRP and mTRP switching" field indicating the value(s) of the Rel. 17 unified TCI state ID/index m1 or n1—e.g., the first value in the "TCI state for sTRP and mTRP switching" field could correspond to m1 (or n1), and the second value in the "TCI state for sTRP and mTRP switching" field could correspond to n1 (or m1)

For another example, the UE could receive from the network a MAC CE activation command/bitmap activating the TCI state ID/index m1 from the M>1 or N>1 Rel. 17 unified TCI states indicated in the DCI format or the TCI state ID/index n1 from the M>1 or N>1 Rel. 17 unified TCI states indicated in the DCI format; yet for another example, the DCI format for unified TCI state(s) indication could contain a "TCI state for DL sTRP and mTRP switching" field indicating the value(s) of the Rel. 17 unified TCI state ID/index ml or a "TCI state for UL sTRP and mTRP switching" field indicating the value(s) of the Rel. 17 unified TCI state ID/index n1.

Yet for another example, the UE could receive from the network a first MAC CE activation command/bitmap activating the TCI state ID/index m1 from the M>1 or N>1 Rel. 17 unified TCI states indicated in the DCI format or a second MAC CE activation command/bitmap activating the TCI state ID/index n1 from the M>1 or N>1 Rel. 17 unified TCI states indicated in the DCI format.

When M=1 (or N=1) Rel. 17 unified TCI state is indicated by a TCI state codepoint in the TCI field in the DCI format and the mTRP operation mode for DL or UL is enabled: for example, if the "DL Operation Mode" field in the DCI format is set to 1 (or 0), the UE could use one or more (e.g., M1>1) Rel. 17 unified TCI states—determined out of the total M>1 (or N>1) Rel. 17 unified TCI states (e.g., by activating the M1>1 Rel. 17 unified TCI states from the total M>1 or N>1 Rel. 17 unified TCI states via one or more MAC CE activation commands) previously indicated in a MAC CE or DCI (e.g., DCI format 1_1 or 1_2 with or without DL assignment) for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState"—for UE-dedicated reception(s) on PDSCH/PDCCH or DL channels/signals following the one or more (e.g., M1>1) Rel. 17 unified TCI states, e.g., DL channels/signals configured with higher layer parameter "useIndicatedR17TCIState."

Furthermore, if the "UL Operation Mode" field in the DCI format is set to 1 (or 0), one or more (e.g., N1>1) Rel. 17 unified TCI states—determined out of the total M>1 (or N>1) Rel. 17 unified TCI states (e.g., by activating the N1>1 Rel. 17 unified TCI states from the total M>1 or N>1 Rel. 17 unified TCI states via one or more MAC CE activation commands) previously indicated in a MAC CE or DCI (e.g., DCI format 1_1 or 1_2 with or without DL assignment) for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState"—for dynamic-grant/configured-grant based PUSCH and all of dedicated PUCCH resources or UL channels/signals following the one or more (e.g., N1>1) Rel. 17 unified TCI states, e.g., UL channels/signals configured with higher layer parameter "useIndicatedR17TCIState."

For another example, the DCI format or MAC CE for unified TCI state(s) indication could contain a "TCI state for sTRP and mTRP switching" field indicating, if the "DL Operation Mode" field in the DCI format is set to 1 (or 0), M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState," or if the "UL Operation Mode" field in the DCI format is set to 1 (or 0), N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState."

For instance, if both the "DL Operation Mode" field and the "UL Operation Mode" field in the DCI format are set to 1 (or 0), the DCI format or MAC CE for unified TCI state(s) indication could contain a "TCI state for sTRP and mTRP switching" field with the first M1 values indicated therein indicating the M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState" and with the last N1 values indicated therein indicating the N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState."

Yet for another example, the DCI format or MAC CE for unified TCI state(s) indication could contain a "TCI state for DL sTRP and mTRP switching" field indicating M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState" when the "DL Operation Mode" field in the DCI format is set to 1 (or 0) or a "TCI state for UL sTRP and mTRP switching" field indicating N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState" when the "UL Operation Mode" field in the DCI format is set to 1 (or 0).

In yet another example, the DCI format (e.g., DCI format 1_1 or 1_2 with or without DL assignment) indicating one or more (e.g., M1>1 for DL channels/signals or N1>1 for UL channels/signals) Rel. 17 unified TCI states could contain a "Operation Mode" field. For example, if the "Operation Mode" field is set to 0 (or 1), the sTRP operation mode could be enabled, wherein a UE could be indicated by the network a Rel. 17 unified TCI state for UE-dedicated reception(s) on PDSCH/PDCCH or dynamic-grant/configured-grant based PUSCH and all of dedicated PUCCH resources or channels/signals following the indicated Rel. 17 unified TCI state, e.g., channels/signals configured with higher layer parameter "useIndicatedR17TCIState."

If the "Operation Mode" field is set to 1 (or 0), the mTRP operation mode could be enabled, wherein a UE could be indicated by the network M1>1 or N1>1 Rel. 17 unified TCI states for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState."

When M1>1 or N1>1 Rel. 17 unified TCI states are indicated by one or more TCI state codepoints in one or more TCI fields in the DCI format and the sTRP operation mode is enabled—e.g., the "Operation Mode" field in the DCI format is set to 0 (or 1): for example, the UE could use the first (or last) Rel. 17 unified TCI state or the Rel. 17 unified TCI state with the lowest (or highest) TCI state ID—among the M1>1 or N1>1 Rel. 17 unified TCI states indicated in the DCI format—for UE-dedicated reception(s) on PDSCH/PDCCH or dynamic-grant/configured-grant based PUSCH and all of dedicated PUCCH resources or channels/signals following the indicated Rel. 17 unified TCI state, e.g., channels/signals configured with higher layer parameter "useIndicatedR17TCIState."

For another example, the UE could use the m1-th (or n1-th) Rel. 17 unified TCI state or the Rel. 17 unified TCI state m1 (or n1) or the Rel. 17 unified TCI state with the m1-th (or n1-th) lowest (or highest) TCI state ID—among the M1>1 or N1>1 Rel. 17 unified TCI states indicated in the DCI format—for UE-dedicated reception(s) on PDSCH/PDCCH or dynamic-grant/configured-grant based PUSCH and all of dedicated PUCCH resources or channels/signals following the indicated Rel. 17 unified TCI state, e.g., channels/signals configured with higher layer parameter "useIndicatedR17TCIState," where $n1 \in \{1, \ldots, N1\}$ or $n1 \in \{1, \ldots, N1+M1\}$ and $m1 \in \{1, \ldots, M1\}$ or $m1 \in \{1, \ldots, M1+N1\}$. For this case, (1) n1 (or m1) could be fixed in the system specification(s), and known to both the UE and network sides a prior; (2) the UE is configured/indicated by the network the value(s) of n1 (or m1); this configuration/indication could be via higher layer RRC signaling or MAC CE command or DCI based signaling.

For example, the DCI format for unified TCI state(s) indication could contain a "TCI state for sTRP and mTRP switching" field indicating the value(s) of the Rel. 17 unified TCI state ID/index m1 (or n1); for another example, the UE could receive from the network a MAC CE activation command/bitmap activating the TCI state ID/index m1 (or n1) from the M1>1 or N1>1 Rel. 17 unified TCI states indicated in the DCI format.

When M1=1 or N1=1 Rel. 17 unified TCI state is indicated by a TCI state codepoint in the TCI field in the DCI format and the mTRP operation mode is enabled—e.g., the "Operation Mode" field in the DCI format is set to 1 (or 0).

For example, the UE could use the M1>1 or N1>1 Rel. 17 unified TCI states previously indicated in a MAC CE or DCI (e.g., DCI format 1_1 or 1_2 with or without DL assignment) for UE-dedicated reception(s) on PDSCH/PDCCH or dynamic-grant/configured-grant based PUSCH and all of dedicated PUCCH resources or channels/signals following the indicated Rel. 17 unified TCI state, e.g., channels/signals configured with higher layer parameter "useIndicatedR17TCIState."

For another example, the DCI format or MAC CE for unified TCI state(s) indication could contain a "TCI state for sTRP and mTRP switching" field indicating M1>1 or N1>1 Rel. 17 unified TCI states for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState."

In yet another example, the DCI format (e.g., DCI format 1_1 or 1_2 with or without DL assignment) indicating one or more (e.g., M1>1 for DL channels/signals or N1>1 for UL channels/signals) Rel. 17 unified TCI states could contain a "Operation Mode" field. For example, if the "Operation Mode" field is set to 0 (or 1), the sTRP operation mode could be enabled, wherein a UE could be indicated by the network a first Rel. 17 unified TCI state for UE-dedicated reception(s) on PDSCH/PDCCH or DL channels/signals following the indicated first Rel. 17 unified TCI state, e.g., DL channels/signals configured with higher layer parameter "useIndicatedR17TCIState" or a second Rel. 17 unified TCI state for dynamic-grant/configured-grant based PUSCH and all of dedicated PUCCH resources or UL channels/signals following the indicated second Rel. 17 unified TCI state, e.g., UL channels/signals configured with higher layer parameter "useIndicatedR17TCIState."

If the "Operation Mode" field is set to 1 (or 0), the mTRP operation mode could be enabled, wherein a UE could be indicated by the network M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState" or N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState."

When M1>1 or N1>1 Rel. 17 unified TCI states are indicated by one or more TCI state codepoints in one or more TCI fields in the DCI format and the sTRP operation mode is enabled—e.g., the "Operation Mode" field in the DCI format is set to 0 (or 1): for example, the UE could use the first (or last) Rel. 17 unified TCI state or the Rel. 17 unified TCI state with the lowest (or highest) TCI state ID—among the M1>1 Rel. 17 unified TCI states indicated in the DCI format for UE-dedicated reception(s) on PDSCH/PDCCH or DL channels/signals following the indicated Rel. 17 unified TCI states, e.g., DL channels/signals configured with higher layer parameter "useIndicatedR17TCIState"—for UE-dedicated reception(s) on PDSCH/PDCCH or DL channels/signals following the indicated Rel. 17 unified TCI state, e.g., DL channels/signals configured with higher layer parameter "useIndicatedR17TCIState."

Furthermore, the UE could use the first (or last) Rel. 17 unified TCI state or the Rel. 17 unified TCI state with the lowest (or highest) TCI state ID—among the N1>1 Rel. 17 unified TCI states indicated in the DCI format for dynamic-grant/configured-grant based PUSCH and all of dedicated PUCCH resources or UL channels/signals following the indicated Rel. 17 unified TCI states, e.g., UL channels/signals configured with higher layer parameter "useIndicatedR17TCIState"—for dynamic-grant/configured-grant based PUSCH and all of dedicated PUCCH resources or UL channels/signals following the indicated Rel. 17 unified TCI state, e.g., UL channels/signals configured with higher layer parameter "useIndicatedR17TCIState."

For another example, the UE could use the m1-th Rel. 17 unified TCI state or the Rel. 17 unified TCI state m1 or the Rel. 17 unified TCI state with the m1-th lowest (or highest) TCI state ID—among the M1>1 Rel. 17 unified TCI states indicated in the DCI format for UE-dedicated reception(s) on PDSCH/PDCCH or DL channels/signals following the indicated Rel. 17 unified TCI states, e.g., DL channels/signals configured with higher layer parameter "useIndicatedR17TCIState"—for UE-dedicated reception(s) on PDSCH/PDCCH or DL channels/signals following the indicated Rel. 17 unified TCI state, e.g., DL channels/signals configured with higher layer parameter "useIndicatedR17TCIState," where m1 $\in \{1, \ldots, M1\}$.

Furthermore, the UE could use the n1-th Rel. 17 unified TCI state or the Rel. 17 unified TCI state n1 or the Rel. 17 unified TCI state with the n1-th lowest (or highest) TCI state ID—among the N1>1 Rel. 17 unified TCI states indicated in the DCI format for dynamic-grant/configured-grant based PUSCH and all of dedicated PUCCH resources or UL channels/signals following the indicated Rel. 17 unified TCI states, e.g., UL channels/signals configured with higher layer parameter "useIndicatedR17TCIState"—for dynamic-grant/configured-grant based PUSCH and all of dedicated PUCCH resources or UL channels/signals following the indicated Rel. 17 unified TCI state, e.g., UL channels/signals configured with higher layer parameter "useIndicatedR17TCIState," where n1 $\in \{1, \ldots, N1\}$.

For this case, (1) m1 or n1 could be fixed in the system specification(s), and known to both the UE and network sides a prior; (2) the UE is configured/indicated by the network the value(s) of m1 or n1; this configuration/indication could be via higher layer RRC signaling or MAC CE command or DCI based signaling; for example, the DCI format for unified TCI state(s) indication could contain a "TCI state for sTRP and mTRP switching" field indicating the value(s) of the Rel. 17 unified TCI state ID/index m1 or n1—e.g., the first value in the "TCI state for sTRP and mTRP switching" field could correspond to m1 (or n1), and the second value in the "TCI state for sTRP and mTRP switching" field could correspond to n1 (or m1).

For another example, the UE could receive from the network a MAC CE activation command/bitmap activating the TCI state ID/index m1 from the M1>1 Rel. 17 unified TCI states indicated in the DCI format or the TCI state ID/index n1 from the N1>1 Rel. 17 unified TCI states indicated in the DCI format; yet for another example, the DCI format for unified TCI state(s) indication could contain a "TCI state for DL sTRP and mTRP switching" field indicating the value(s) of the Rel. 17 unified TCI state ID/index m1 or a "TCI state for UL sTRP and mTRP switching" field indicating the value(s) of the Rel. 17 unified TCI state ID/index n1.

Yet for another example, the UE could receive from the network a first MAC CE activation command/bitmap activating the TCI state ID/index m1 from the M1>1 Rel. 17 unified TCI states indicated in the DCI format or a second MAC CE activation command/bitmap activating the TCI state ID/index n1 from the N1>1 Rel. 17 unified TCI states indicated in the DCI format.

When M1=1 or N1=1 Rel. 17 unified TCI state is indicated by a TCI state codepoint in the TCI field in the DCI format and the mTRP operation mode is enabled—e.g., the "Operation Mode" field in the DCI format is set to 1 (or 0): for example, the UE could use the M1>1 Rel. 17 unified TCI states previously indicated in a MAC CE or DCI (e.g., DCI format 1_1 or 1_2 with or without DL assignment) for UE-dedicated reception(s) on PDSCH/PDCCH or DL channels/signals following the indicated Rel. 17 unified TCI states, e.g., DL channels/signals configured with higher layer parameter "useIndicatedR17TCIState"—for UE-dedicated reception(s) on PDSCH/PDCCH or DL channels/signals following the M1>1 Rel. 17 unified TCI states, e.g., DL channels/signals configured with higher layer parameter "useIndicatedR17TCIState" or the N1>1 Rel. 17 unified TCI states previously indicated in a MAC CE or DCI (e.g., DCI format 1_1 or 1_2 with or without DL assignment) for dynamic-grant/configured-grant based PUSCH and all of dedicated PUCCH resources or UL channels/signals following the indicated Rel. 17 unified TCI states, e.g., UL channels/signals configured with higher layer parameter "useIndicatedR17TCIState"—for dynamic-grant/configured-grant based PUSCH and all of dedicated PUCCH resources or UL channels/signals following the N1>1 Rel. 17 unified TCI states, e.g., UL channels/signals configured with higher layer parameter "useIndicatedR17TCIState."

For another example, the DCI format or MAC CE for unified TCI state(s) indication could contain a "TCI state for sTRP and mTRP switching" field indicating M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState" or N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState."

For instance, the DCI format or MAC CE for unified TCI state(s) indication could contain a "TCI state for sTRP and mTRP switching" field with the first M1 values indicated therein indicating the M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState" or with the last N1 values indicated therein indicating the N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState."

Yet for another example, the DCI format or MAC CE for unified TCI state(s) indication could contain a "TCI state for DL sTRP and mTRP switching" field indicating M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState" or a "TCI state for UL sTRP and mTRP switching" field indicating N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState."

In yet another example, the DCI format (e.g., DCI format 1_1 or 1_2 with or without DL assignment) indicating one or more (e.g., M1>1 for DL channels/signals or N1>1 for UL channels/signals) Rel. 17 unified TCI states could contain a "DL Operation Mode" field or a "UL Operation Mode" field.

For example, if the "DL Operation Mode" field is set to 0 (or 1), the sTRP operation mode for DL could be enabled, wherein a UE could be indicated by the network a Rel. 17 unified TCI state for UE-dedicated reception(s) on PDSCH/PDCCH or DL channels/signals following the indicated Rel. 17 unified TCI state, e.g., DL channels/signals configured with higher layer parameter "useIndicatedR17TCIState"; if the "UL Operation Mode" field is set to 0 (or 1), the sTRP operation mode for UL could be enabled, wherein a UE could be indicated by the network a Rel. 17 unified TCI state for dynamic-grant/configured-grant based PUSCH and all of dedicated PUCCH resources or UL channels/signals following the indicated Rel. 17 unified TCI state, e.g., UL channels/signals configured with higher layer parameter "useIndicatedR17TCIState."

If the "DL Operation Mode" field is set to 1 (or 0), the mTRP operation mode for DL could be enabled, wherein a UE could be indicated by the network M1>1 (or N1>1) Rel. 17 unified TCI states for UE-dedicated reception(s) on PDSCH/PDCCH or DL channels/signals following the indicated Rel. 17 unified TCI states, e.g., DL channels/signals configured with higher layer parameter "useIndicatedR17TCIState"; or if the "UL Operation Mode" field is set to 1 (or 0), the mTRP operation mode for UL could be enabled, wherein a UE could be indicated by the network M1>1 (or N1>1) Rel. 17 unified TCI states for dynamic-grant/configured-grant based PUSCH and all of dedicated PUCCH resources or UL channels/signals following the indicated Rel. 17 unified TCI states, e.g., UL channels/signals configured with higher layer parameter "useIndicatedR17TCIState."

When M1>1 or N1>1 Rel. 17 unified TCI states are indicated by one or more TCI state codepoints in one or more TCI fields in the DCI format and the sTRP operation mode for DL or UL is enabled—e.g., the "DL Operation Mode" field in the DCI format is set to 0 (or 1) or the "UL Operation Mode" field in the DCI format is set to 0 (or 1): for example, the UE could use the first (or last) Rel. 17 unified TCI state or the Rel. 17 unified TCI state with the lowest (or highest) TCI state ID—among the M1>1 or N1>1 Rel. 17 unified TCI states indicated in the DCI format—for UE-dedicated reception(s) on PDSCH/PDCCH or dynamic-grant/configured-grant based PUSCH and all of dedicated PUCCH resources or channels/signals following the indicated Rel. 17 unified TCI state, e.g., channels/signals configured with higher layer parameter "useIndicatedR17TCIState."

For another example, the UE could use the m1-th (or n1-th) Rel. 17 unified TCI state or the Rel. 17 unified TCI state m1 (or n1) or the Rel. 17 unified TCI state with the m1-th (or n1-th) lowest (or highest) TCI state ID—among the M1>1 or N1>1 Rel. 17 unified TCI states indicated in the DCI format—for UE-dedicated reception(s) on PDSCH/PDCCH or dynamic-grant/configured-grant based PUSCH and all of dedicated PUCCH resources or channels/signals following the indicated Rel. 17 unified TCI state, e.g., channels/signals configured with higher layer parameter "useIndicatedR17TCIState," where n1 $\in\{1, \ldots, N1\}$ or $\{1, \ldots, N1+M1\}$ and m1$\in\{1, \ldots, M1\}$ or $\{1, \ldots, M1+N1\}$.

For this case, (1) n1 (or m1) could be fixed in the system specification(s), and known to both the UE and network sides a prior; (2) the UE is configured/indicated by the network the value(s) of n1 (or m1); this configuration/indication could be via higher layer RRC signaling or MAC CE command or DCI based signaling; for example, the DCI format for unified TCI state(s) indication could contain a "TCI state for sTRP and mTRP switching" field indicating the value(s) of the Rel. 17 unified TCI state ID/index m1 (or n1); for another example, the UE could receive from the network a MAC CE activation command/bitmap activating the TCI state ID/index m1 (or n1) from the M1>1 or N1>1 Rel. 17 unified TCI states indicated in the DCI format.

When M1=1 or N1=1 Rel. 17 unified TCI state is indicated by a TCI state codepoint in the TCI field in the DCI format and the mTRP operation mode for DL or UL is enabled—e.g., the "DL Operation Mode" field in the DCI format is set to 1 (or 0) or the "UL Operation Mode" field in the DCI format is set to 1 (or 0): for example, the UE could use the M1>1 or N1>1 Rel. 17 unified TCI states previously indicated in a MAC CE or DCI (e.g., DCI format 1_1 or 1_2 with or without DL assignment) for UE-dedicated reception(s) on PDSCH/PDCCH or dynamic-grant/configured-grant based PUSCH and all of dedicated PUCCH resources or channels/signals following the indicated Rel. 17 unified TCI state, e.g., channels/signals configured with higher layer parameter "useIndicatedR17TCIState"; for another example, the DCI format or MAC CE for unified TCI state(s) indication could contain a "TCI state for sTRP and mTRP switching" field indicating M1>1 or N1>1 Rel. 17 unified TCI states for UE-dedicated reception(s) on PDSCH/PDCCH or dynamic-grant/configured-grant based PUSCH and all of dedicated PUCCH resources or channels/signals following the indicated Rel. 17 unified TCI states, e.g., channels/signals configured with higher layer parameter "useIndicatedR17TCIState."

In yet another example, the DCI format (e.g., DCI format 1_1 or 1_2 with or without DL assignment) indicating one or more (e.g., M1>1 for DL channels/signals or N1>1 for UL channels/signals) Rel. 17 unified TCI states could contain a "DL Operation Mode" field or a "UL Operation Mode" field.

For example, if the "DL Operation Mode" field is set to 0 (or 1), the sTRP operation mode for DL could be enabled, wherein a UE could be indicated by the network a first Rel. 17 unified TCI state for UE-dedicated reception(s) on PDSCH/PDCCH or DL channels/signals following the indicated first Rel. 17 unified TCI state, e.g., DL channels/signals configured with higher layer parameter "useIndicatedR17TCIState"; if the "UL Operation Mode" field is set to 0 (or 1), the sTRP operation mode for UL could be enabled, wherein a UE could be indicated by the network a second Rel. 17 unified TCI state for dynamic-grant/configured-grant based PUSCH and all of dedicated PUCCH resources or UL channels/signals following the indicated second Rel. 17 unified TCI state, e.g., UL channels/signals configured with higher layer parameter "useIndicatedR17TCIState."

If the "DL Operation Mode" field is set to 1 (or 0), the mTRP operation mode for DL could be enabled, wherein a UE could be indicated by the network M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState"; or if the "UL Operation Mode" field is set to 1 (or 0), the mTRP operation mode for UL could be enabled, wherein a UE could be indicated by the network N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState."

When M1>1 or N1>1 Rel. 17 unified TCI states are indicated by one or more TCI state codepoints in one or more TCI fields in the DCI format and the sTRP operation mode for DL or UL is enabled: for example, if the "DL Operation Mode" field in the DCI format is set to 0 (or 1), the UE could use the first (or last) Rel. 17 unified TCI state or the Rel. 17 unified TCI state with the lowest (or highest) TCI state ID—among the M1>1 Rel. 17 unified TCI states indicated in the DCI format for UE-dedicated reception(s) on PDSCH/PDCCH or DL channels/signals following the indicated Rel. 17 unified TCI states, e.g., DL channels/signals configured with higher layer parameter "useIndicatedR17TCIState"—for UE-dedicated reception(s) on PDSCH/PDCCH or DL channels/signals following the indicated Rel. 17 unified TCI state, e.g., DL channels/signals configured with higher layer parameter "useIndicatedR17TCIState."

Furthermore, if the "UL Operation Mode" field in the DCI format is set to 0 (or 1), the UE could use the first (or last) Rel. 17 unified TCI state or the Rel. 17 unified TCI state with the lowest (or highest) TCI state ID—among the N1>1 Rel. 17 unified TCI states indicated in the DCI format for dynamic-grant/configured-grant based PUSCH and all of dedicated PUCCH resources or UL channels/signals following the indicated Rel. 17 unified TCI states, e.g., UL channels/signals configured with higher layer parameter "useIndicatedR17TCIState"—for dynamic-grant/configured-grant based PUSCH and all of dedicated PUCCH resources or UL channels/signals following the indicated Rel. 17 unified TCI state, e.g., UL channels/signals configured with higher layer parameter "useIndicatedR17TCIState."

For another example, if the "DL Operation Mode" field in the DCI format is set to 0 (or 1), the UE could use the m1-th Rel. 17 unified TCI state or the Rel. 17 unified TCI state m1 or the Rel. 17 unified TCI state with the m1-th lowest (or highest) TCI state ID—among the M1>1 Rel. 17 unified TCI states indicated in the DCI format for UE-dedicated reception(s) on PDSCH/PDCCH or DL channels/signals following the indicated Rel. 17 unified TCI states, e.g., DL channels/signals configured with higher layer parameter "useIndicatedR17TCIState"—for UE-dedicated reception(s) on PDSCH/PDCCH or DL channels/signals following the indicated Rel. 17 unified TCI state, e.g., DL channels/signals configured with higher layer parameter "useIndicatedR17TCIState," where $m1 \in \{1, \ldots, M1\}$.

Furthermore, if the "UL Operation Mode" field in the DCI format is set to 0 (or 1), the UE could use the n1-th Rel. 17 unified TCI state or the Rel. 17 unified TCI state n1 or the Rel. 17 unified TCI state with the n1-th lowest (or highest) TCI state ID—among the N1>1 Rel. 17 unified TCI states indicated in the DCI format for dynamic-grant/configured-grant based PUSCH and all of dedicated PUCCH resources or UL channels/signals following the indicated Rel. 17 unified TCI states, e.g., UL channels/signals configured with higher layer parameter "useIndicatedR17TCIState"—for dynamic-grant/configured-grant based PUSCH and all of dedicated PUCCH resources or UL channels/signals following the indicated Rel. 17 unified TCI state, e.g., UL channels/signals configured with higher layer parameter "useIndicatedR17TCIState," where $n1 \in \{1, \ldots, N1\}$.

For this case, (1) m1 or n1 could be fixed in the system specification(s), and known to both the UE and network sides a prior; (2) the UE is configured/indicated by the network the value(s) of m1 or n1; this configuration/indication could be via higher layer RRC signaling or MAC CE command or DCI based signaling; for example, the DCI format for unified TCI state(s) indication could contain a "TCI state for sTRP and mTRP switching" field indicating the value(s) of the Rel. 17 unified TCI state ID/index m1 or n1—e.g., the first value in the "TCI state for sTRP and mTRP switching" field could correspond to m1 (or n1), and the second value in the "TCI state for sTRP and mTRP switching" field could correspond to n1 (or m1).

For another example, the UE could receive from the network a MAC CE activation command/bitmap activating the TCI state ID/index m1 from the M1>1 Rel. 17 unified TCI states indicated in the DCI format or the TCI state ID/index n1 from the N1>1 Rel. 17 unified TCI states indicated in the DCI format; yet for another example, the DCI format for unified TCI state(s) indication could contain a "TCI state for DL sTRP and mTRP switching" field indicating the value(s) of the Rel. 17 unified TCI state ID/index m1 or a "TCI state for UL sTRP and mTRP switching" field indicating the value(s) of the Rel. 17 unified TCI state ID/index n1

Yet for another example, the UE could receive from the network a first MAC CE activation command/bitmap activating the TCI state ID/index m1 from the M1>1 Rel. 17 unified TCI states indicated in the DCI format or a second MAC CE activation command/bitmap activating the TCI state ID/index n1 from the N1>1 Rel. 17 unified TCI states indicated in the DCI format.

When M1=1 or N1=1 Rel. 17 unified TCI state is indicated by a TCI state codepoint in the TCI field in the DCI format and the mTRP operation mode for DL or UL is enabled: for example, if the "DL Operation Mode" field in the DCI format is set to 1 (or 0), the UE could use the M1>1 Rel. 17 unified TCI states previously indicated in a MAC CE or DCI (e.g., DCI format 1_1 or 1_2 with or without DL assignment) for UE-dedicated reception(s) on PDSCH/PDCCH or DL channels/signals following the indicated Rel. 17 unified TCI states, e.g., DL channels/signals configured with higher layer parameter "useIndicatedR17TCIState"—for UE-dedicated reception(s) on PDSCH/PDCCH or DL channels/signals following the one or more (e.g., M1>1) Rel. 17 unified TCI states, e.g., DL channels/signals configured with higher layer parameter "useIndicatedR17TCIState."

Furthermore, if the "UL Operation Mode" field in the DCI format is set to 1 (or 0), the N1>1 Rel. 17 unified TCI states previously indicated in a MAC CE or DCI (e.g., DCI format 1_1 or 1_2 with or without DL assignment) for dynamic-grant/configured-grant based PUSCH and all of dedicated PUCCH resources or UL channels/signals following the indicated Rel. 17 unified TCI states, e.g., UL channels/signals configured with higher layer parameter "useIndicatedR17TCIState"—for dynamic-grant/configured-grant based PUSCH and all of dedicated PUCCH resources or UL channels/signals following the one or more (e.g., N1>1) Rel. 17 unified TCI states, e.g., UL channels/signals configured with higher layer parameter "useIndicatedR17TCIState."

For another example, the DCI format or MAC CE for unified TCI state(s) indication could contain a "TCI state for sTRP and mTRP switching" field indicating, if the "DL Operation Mode" field in the DCI format is set to 1 (or 0), M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState," or if the "UL Operation Mode" field in the DCI format is set to 1 (or 0), N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState."

For instance, if both the "DL Operation Mode" field and the "UL Operation Mode" field in the DCI format are set to 1 (or 0), the DCI format or MAC CE for unified TCI state(s) indication could contain a "TCI state for sTRP and mTRP switching" field with the first M1 values indicated therein indicating the M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState" and with the last N1 values indicated therein indicating the N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState."

Yet for another example, the DCI format or MAC CE for unified TCI state(s) indication could contain a "TCI state for DL sTRP and mTRP switching" field indicating M1>1 first Rel. 17 unified TCI states for UE-dedicated reception(s) on PDSCH/PDCCH or DL channels/signals following the indicated first Rel. 17 unified TCI states, e.g., DL channels/signals configured with higher layer parameter "useIndicatedR17TCIState" when the "DL Operation Mode" field in the DCI format is set to 1 (or 0) or a "TCI state for UL sTRP and mTRP switching" field indicating N1>1 second Rel. 17 unified TCI states for dynamic-grant/configured-grant based PUSCH and all of dedicated PUCCH resources or UL channels/signals following the indicated second Rel. 17 unified TCI states, e.g., UL channels/signals configured with higher layer parameter "useIndicatedR17TCIState" when the "UL Operation Mode" field in the DCI format is set to 1 (or 0).

Alternatively, instead of the DCI format for unified TCI state(s) indication (e.g., DCI format 1_1 or 1_2 with or without DL assignment), a TCI field in the DCI format for unified TCI state(s) indication could indicate/contain the "Operation Mode," "DL Operation Mode," "UL Operation Mode," "TCI state for sTRP and mTRP switching," "TCI state for UL sTRP and mTRP switching," and/or "TCI state for DL sTRP and mTRP switching" fields/parameters in the examples discussed in the present disclosure to support dynamic switching between the sTRP and mTRP operation modes.

Furthermore, the "TCI state for sTRP and mTRP switching," "TCI state for UL sTRP and mTRP switching," and/or "TCI state for DL sTRP and mTRP switching" fields discussed in the examples in the present disclosure could also correspond to a (existing) "transmission configuration indication" (TCI) field in the corresponding DCI format for unified TCI state(s) indication.

The above discussed design aspects can be equally applied to a multi-DCI based multi-TRP system, wherein a UE could be provided by the network in the higher layer parameter PDCCH-Config different values of CORESET-PoolIndex (e.g., 0 and 1) and the DCI format for unified TCI state(s) indication could be received in a CORESET associated with a respective CORESETPoolIndex value (e.g., 0 or 1).

A cell/TRP in an inter-cell system (e.g., an inter-cell multi-TRP system) could be a non-serving cell/TRP. In this disclosure, the non-serving cell(s) or the non-serving cell TRP(s) could have/broadcast different physical cell IDs (PCIs) and/or other higher layer signaling index values from that of the serving cell or the serving cell TRP (i.e., the serving cell PCI). In one example, the serving cell or the serving cell TRP could be associated with the serving cell ID (SCI) and/or the serving cell PCI. That is, in an inter-cell system, different cells/TRPs could broadcast different PCIs, and/or one or more cells/TRPs (referred to/defined as non-serving cells/TRPs in the present disclosure) could broadcast different PCIs from that of the serving cell/TRP (i.e., the serving cell PCI), and/or one or more cells/TRPs are not associated with valid SCI (e.g., provided by the higher layer parameter ServCellIndex). In the present disclosure, a non-serving cell PCI can also be referred to as an additional PCI, another PCI or a different PCI (with respect to the serving cell PCI).

In Rel. 17, a unified transmission configuration indication (TCI) framework is specified for single-TRP operation, wherein a common beam could be indicated for all UE-dedicated control and/or data channels. To extend the Rel. 17 unified TCI framework to the multi-TRP operation, various design aspects such as means of configurating one or more TCI fields or TCI state codepoints in a DCI format (e.g., DCI format 1_1 or 1_2 with or without DL assignment) to indicate beams for multiple TRPs need to be specified. Furthermore, as multiple multi-TRP operation modes such as PDCCH/PDSCH/PUCCH/PUSCH repetitions are supported/specified in Rel. 16/17, means of dynamic switching between different multi-TRP operation modes or dynamic switching between one or more multi-TRP operation modes and the single-TRP operation mode need to be specified under the Rel. 17 unified TCI framework.

The present disclosure provides various design aspects related to DCI based beam indication for multi-TRP operation. In particular, detailed configuration methods of TCI states, TCI fields or TCI state codepoints in DCI format 1_1 or 1_2 with or without DL assignment, and their association with different TRPs in a multi-TRP system, are specified/provided in the present disclosure. This disclosure further specifies various methods to dynamically switch between different multi-TRP operation modes or between one or more multi-TRP operation modes and the single-TRP operation mode under the unified TCI framework.

The unified (master or main) TCI state is TCI state of UE-dedicated reception on PDSCH/PDCCH or dynamic-grant/configured-grant based PUSCH and all of dedicated PUCCH resources.

As discussed in the present disclosure, a UE could be provided by the network, e.g., via MAC CE or DCI (e.g., DCI format 1_1 or 1_2 with or without DL assignment) based signaling via higher layer parameters DLorJointTCIState or UL-TCIState, M>1 joint DL and UL TCI states or M>1 separate UL TCI states or a first combination of M>1 joint DL and UL TCI states and separate UL TCI states or N>1 separate DL TCI states or a second combination of N>1 joint DL and UL TCI states and separate DL TCI states or a third combination of N>1 joint DL and UL TCI states, separate DL TCI states and separate UL Rel. 17 unified TCI for UE-dedicated reception on PDSCH/PDCCH or dynamic-grant/configured-grant based PUSCH and all of dedicated PUCCH resources.

The UE could be higher layer configured by the network M>1 or N>1 pools of TCI states or TCI state identities (IDs). As aforementioned, here, a TCI state could correspond to a separate DL TCI state provided by DLorJointTCIState, or a separate UL TCI state provided by UL-TCIState, or a joint DL and UL TCI state provided by DLorJointTCIState. Each of the higher layer configured M>1 or N>1 pools of TCI states/TCI state IDs could be associated with an entity ID.

In the present disclosure, the entity ID could correspond to at least one of: a PCI value, a PCI index pointing to an entry/PCI in a list of PCI that are higher layer configured to the UE, a value of CORESETPoolIndex, a value of CORESETGroupIndex, a TRP ID, a TRP-specific higher layer signaling index, a CORESET ID, a resource ID/index, a resource set ID/index and etc. In the present disclosure, the UE could be higher layer configured by the network a list of entity IDs or a list of PCIs or a set of PCI indexes with each PCI index pointing to an entry/PCI in the list of PCIs that are higher layer configured to the UE.

In one example, the first pool of TCI states/TCI state IDs could be associated with the lowest PCI value or the first PCI value in the higher layer configured list of PCIs or the lowest PCI index or the first PCI index in the set of PCI indexes or the PCI index pointing to the lowest PCI value in the higher layer configured list of PCIs, the second pool of TCI states/TCI state IDs could be associated with the second lowest PCI value or the second PCI value in the higher layer configured list of PCIs or the second lowest PCI index or the second PCI index in the set of PCI indexes or the PCI index pointing to the second lowest PCI value in the higher layer configured list of PCIs, and so on, and the last pool of TCI states/TCI state IDs could be associated with the highest PCI value or the last PCI value in the higher layer configured list of PCIs or the highest PCI index or the last PCI index in the set of PCI indexes or the PCI index pointing to the highest PCI value in the higher layer configured list of PCIs.

Or equivalently, the m-th (or n-th) pool of TCI states/TCI state IDs could be associated with the m-th (or n-th) lowest (or highest) PCI value or the m-th (or n-th) PCI value in the higher layer configured list of PCIs or the m-th (or n-th) lowest (or highest) PCI index or the first PCI index in the set of PCI indexes or the PCI index pointing to the m-th (or n-th) lowest (or highest) PCI value in the higher layer configured list of PCIs, where $m \in \{1, \ldots, M\}$ and $n \in \{1, \ldots, N\}$. For M=2 (or N=2), the first (or second) pool of TCI states/TCI state IDs could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) pool of TCI states/TCI state IDs could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

In another example, if the UE is provided in PDCCH-Config two values of CORESETPoolIndex (i.e., 0 and 1), for M=2 (or N=2), the first (or second) pool of TCI states/TCI state IDs could be associated with value 0 of CORESETPoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) pool of TCI states/TCI state IDs could be associated with value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

In yet another example, each of the M>1 (or N>1) pools of TCI states/TCI state IDs could be configured to the UE via a separate higher layer parameter. That is, the UE could be configured by the network M>1 (or N>1) separate higher layer parameters each configuring/indicating a pool of TCI states/TCI state IDs. Furthermore, the higher layer parameter that configures a pool of TCI states/TCI state IDs could also include/indicate an entity ID as described above. For this case, a pool TCI states/TCI state IDs and an entity ID are associated if the pool of TCI states/TCI state IDs and the entity ID are configured/indicated via the same higher layer parameter.

In addition, when the UE is higher layer configured by the network M>1 or N>1 pools of TCI states or TCI state IDs, where each TCI state configured therein corresponds to a separate DL TCI state provided by DLorJointTCIState, or a separate UL TCI state provided by UL-TCIState, or a joint DL and UL TCI state provided by DLorJointTCIState.

In one example, for the m-th (or n-th) pool of TCI states/TCI state IDs comprising K(m) (or K(n)) TCI states/TCI state IDs where $m \in \{1, \ldots, M\}$ and $n \in \{1, \ldots, N\}$, the TCI state IDs in the m-th (or n-th) pool of TCI states/TCI state IDs or the TCI states in the m-th (or n-th) pool of TCI states/TCI state IDs are indexed according to $0, K(m)-1$ (or $K(n)-1$) or $1, \ldots, K(m)$ (or $K(n)$).

For example, for M=2 (or N=2), the first pool of TCI states/TCI state IDs could comprise K1 (e.g., 64) TCI states/TCI state IDs, and the second pool of TCI states/TCI state IDs could comprise K2 (e.g., 64) TCI states/TCI state IDs. For this example, the TCI state IDs in the first pool of TCI states/TCI state IDs or the TCI states in the first pool of TCI states/TCI state IDs could be indexed according to $0, \ldots, K1-1$ (e.g., $0, \ldots, 63$) or $1, \ldots, K1$ (e.g., $1, \ldots, 64$), and the TCI state IDs in the second pool of TCI states/TCI state IDs or the TCI states in the second pool of TCI states/TCI state IDs could be indexed according to $0, \ldots, K2-1$ (e.g., $0, \ldots, 63$) or $1, \ldots, K2$ (e.g., $1, \ldots, 64$).

In another example, the m-th (or n-th) pool of TCI states/TCI state IDs could comprise K(m) (or K(n)) TCI states/TCI state IDs where $m \in \{1, \ldots, M\}$ and $n \in \{1, \ldots, N\}$. For this case, the TCI state IDs in the m-th (or n-th) pool of TCI states/TCI state IDs or the TCI states in the m-th (or n-th) pool of TCI states/TCI state IDs are indexed according to $\Sigma_{i=1}^{m-1} K(i)$ (or $\Sigma_{j=1}^{n-1} K(j)$), $\ldots, \Sigma_{i=1}^{m-1} K(i)+K(m)-1$ (or $\Sigma_{j=1}^{n-1} K(j)+K(n)-1$) or $\Sigma_{i=1}^{m-1} K(i)+1$ (or $\Sigma_{j=1}^{n-1} K(j)+1$), $\ldots, \Sigma_{i=1}^{m-1} K(i)+K(m)$ (or $\Sigma_{j=1}^{n-1} K(j)+K(n)$), where $\Sigma_{i=1}^{0} K(i)=0$ (or $\Sigma_{j=1}^{n-1} K(j)=0$).

For example, for M=2 (or N=2), the first pool of TCI states/TCI state IDs could comprise K1 (e.g., 64) TCI states/TCI state IDs, and the second pool of TCI states/TCI state IDs could comprise K2 (e.g., 64) TCI states/TCI state IDs. For this example, the TCI state IDs in the first pool of TCI states/TCI state IDs or the TCI states in the first pool of TCI states/TCI state IDs could be indexed according to $0, \ldots, K1-1$ (e.g., $0, \ldots, 63$) or $1, \ldots, K1$ (e.g., $1, \ldots, 64$), and the TCI state IDs in the second pool of TCI states/TCI state IDs or the TCI states in the second pool of TCI states/TCI state IDs could be indexed according to $K1, \ldots, K1+K2-1$ (e.g., $64, \ldots, 127$) or $K1+1, \ldots, K1+K2$ (e.g., $65, \ldots, 128$).

Alternatively, the UE could be higher layer configured by the network a single pool of TCI states or TCI state IDs. As aforementioned, here, a TCI state could correspond to a separate DL TCI state provided by DLorJointTCIState, or a separate UL TCI state provided by UL-TCIState, or a joint DL and UL TCI state provided by DLorJointTCIState. A TCI state or TCI state ID configured in the pool of TCI states/TCI state IDs could be associated with an entity ID.

In the present disclosure, the entity ID could correspond to at least one of: a PCI value, a PCI index pointing to an entry/PCI in a list of PCI that are higher layer configured to the UE, a value of CORESETPoolIndex, a value of CORE-SETGroupIndex, a TRP ID, a TRP-specific higher layer signaling index, a CORESET ID, a resource ID/index, a resource set ID/index and etc. Furthermore, one or more of the TCI states or TCI state IDs configured in the pool of TCI states/TCI state IDs could be associated with the same entity ID, and different TCI states or TCI state IDs configured in the pool of TCI states/TCI state IDs could be associated with different entity IDs. In the present disclosure, the TCI states or TCI state IDs in the pool of TCI states/TCI state IDs could be divided/partitioned into M>1 (or N>1) TCI state groups each comprising one or more TCI states/TCI state IDs. The TCI states or TCI state IDs in the same TCI state group are associated with the same entity ID.

In one example, the m-th (or n-th) TCI state group could comprise K(m) (or K(n)) TCI states/TCI state IDs where $m \in \{1, \ldots, M\}$ and $n \in \{1, \ldots, N\}$. For this case, the TCI state IDs in the m-th (or n-th) TCI state group or the TCI states in the m-th (or n-th) TCI state group are indexed according to $\Sigma_{i=1}^{m-1} K(i)$ (or $\Sigma_{j=1}^{n-1} K(j)$), ..., $\Sigma_{i=1}^{m-1} K(i) + K(m)-1$ (or $\Sigma_{j=1}^{N-1} K(J) + K(n)-1$) or $\Sigma_{i=1}^{m-1} K(i)+1$ (or $\Sigma_{j=1}^{n-1} K(j)+1$), ..., $\Sigma_{i=1}^{m-1} K(i)+K(m)$ (or $\Sigma_{j=1}^{n-1} K(j)+K(n)$), where $\Sigma_{i=1}^{0} K(i)=0$ (or $\Sigma_{j=1}^{n-1} K(j)=0$). For example, for M=2 (or N=2), the first TCI state group could comprise K1 (e.g., 32) TCI states/TCI state IDs in the pool of TCI states/TCI state IDs, and the second TCI state group could comprise K2 (e.g., 32) TCI states/TCI state IDs in the pool of TCI states/TCI state IDs.

For this example, the TCI state IDs in the first TCI state group or the TCI states in the first TCI state group could be indexed according to 0, ..., K1-1 (e.g., 0, ..., 31) or 1, ..., K1 (e.g., 1, ..., 32), and the TCI state IDs in the second TCI state group or the TCI states in the second TCI state group could be indexed according to K1, ..., K1+K2-1 (e.g., 32, ..., 63) or K1+1, ..., K1+K2 (e.g., 33, ..., 65). For this example, the UE could be configured by the network, e.g., via higher layer RRC signaling, the number of TCI states/TCI state IDs (e.g., K(m) or K(n) with $m \in \{1, \ldots, M\}$ and $n \in \{1, \ldots, N\}$) in each of the TCI state groups (e.g., the m-th or the n-th TCI state group with $m \in \{1, \ldots, M\}$ and $n \in \{1, \ldots, N\}$) configured in the pool of TCI states/TCI state IDs.

In another example, the UE could be configured by the network M>1 (or N>1) parameters (e.g., higher layer RRC parameters) each associated with/corresponding to/configured for a TCI state group. Each parameter could include/indicate one or more TCI states/TCI state IDs. For this case, the TCI state group associated with the parameter could comprise the one or more TCI states/TCI state IDs configured in the parameter.

In the present disclosure, the UE could be higher layer configured by the network a list of entity IDs or a list of PCIs or a set of PCI indexes with each PCI index pointing to an entry/PCI in the list of PCIs that are higher layer configured to the UE.

In one example, the first TCI state group could be associated with the lowest PCI value or the first PCI value in the higher layer configured list of PCIs or the lowest PCI index or the first PCI index in the set of PCI indexes or the PCI index pointing to the lowest PCI value in the higher layer configured list of PCIs, the second TCI state group could be associated with the second lowest PCI value or the second PCI value in the higher layer configured list of PCIs or the second lowest PCI index or the second PCI index in the set of PCI indexes or the PCI index pointing to the second lowest PCI value in the higher layer configured list of PCIs, and so on, and the last TCI state group could be associated with the highest PCI value or the last PCI value in the higher layer configured list of PCIs or the highest PCI index or the last PCI index in the set of PCI indexes or the PCI index pointing to the highest PCI value in the higher layer configured list of PCIs.

Or equivalently, the m-th (or n-th) TCI state group could be associated with the m-th (or n-th) lowest (or highest) PCI value or the m-th (or n-th) PCI value in the higher layer configured list of PCIs or the m-th (or n-th) lowest (or highest) PCI index or the first PCI index in the set of PCI indexes or the PCI index pointing to the m-th (or n-th) lowest (or highest) PCI value in the higher layer configured list of PCIs, where $m \in \{1, \ldots, M\}$ and $n \in \{1, \ldots, N\}$.

For M=2 (or N=2), the first (or second) TCI state group could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) TCI state group could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

In another example, if the UE is provided in PDCCH-Config two values of CORESETPoolIndex (i.e., 0 and 1), for M=2 (or N=2), the first (or second) TCI state group could be associated with value 0 of CORESETPoolIndex or CORE-SETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) TCI state group could be associated with value 1 of CORESET-PoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

In yet another example, the (higher layer) parameter discussed in the example of the present disclosure that indicates one or more TCI states/TCI state IDs for a TCI state group could also include/indicate an entity ID as described above. For this case, a TCI state group and an entity ID are associated if the TCI state group and the entity ID are associated with the same (higher layer) parameter specified in the example in the present disclosure.

The UE could receive from the network one or more MAC CE subselection/activation commands activating one or more TCI states/TCI state IDs from the one or more TCI state pools, specified in the examples in the present disclosure or the one or more TCI state groups specified in the examples in the present disclosure, used to map up to Nc≥1 (e.g., 8, 16, 32 or 64) TCI state codepoints in a DCI format.

In one example, the UE could receive from the network a MAC CE subselection/activation command activating a set of Nc≥1 (e.g., 8, 16, 32 or 64) TCI state codepoints. In the present disclosure, the UE could be higher layer configured by the network a list of entity IDs or a list of PCIs or a set of PCI indexes with each PCI index pointing to an entry/PCI in the list of PCIs that are higher layer configured to the UE.

For example, a codepoint could correspond to a TCI state, wherein the TCI state could be a separate DL TCI state provided by DLorJointTCIState, a separate UL TCI state provided by UL-TCIState or a joint DL and UL TCI state provided by DLorJointTCIState.

Yet for another example, a codepoint could correspond to a pair of two TCI states, wherein the first TCI state in the pair could be a separate DL TCI state provided by DLorJointTCIState, a separate UL TCI state provided by UL-TCIState or a joint DL and UL TCI state provided by DLorJointTCIState, and the second TCI state in the pair could be a separate DL TCI state provided by DLorJointTCIState, a separate UL TCI state provided by UL-TCIState or a joint DL and UL TCI state provided by DLorJointTCIState. For instance, one TCI state in the pair could be for DL channels/signals, and the other TCI state in the pair could be for UL channels/signals.

Yet for another example, for M=2 (or N=2), a codepoint could correspond to a first TCI state and a second TCI state. For this case, the first TCI state could be a separate DL TCI state provided by DLorJointTCIState, a separate UL TCI state provided by UL-TCIState or a joint DL and UL TCI state provided by DLorJointTCIState, and the second TCI state could be a separate DL TCI state provided by DLorJointTCIState, a separate UL TCI state provided by UL-TCIState or a joint DL and UL TCI state provided by DLorJointTCIState.

Furthermore, the first TCI state could be activated/selected by the MAC CE from the first (or second) TCI state pool specified in the examples or the first (or second) TCI state group specified in the examples in the present disclosure, and the second TCI state could be activated/selected by the MAC CE from the second (or first) TCI state pool specified in the examples or the second (or first) TCI state group specified in the examples in the present disclosure.

Yet for another example, for M=2 (or N=2), a codepoint could correspond to a first TCI state and a second TCI state. For this case, the first TCI state could be a separate DL TCI state provided by DLorJointTCIState, a separate UL TCI state provided by UL-TCIState or a joint DL and UL TCI state provided by DLorJointTCIState, and the second TCI state could be a separate DL TCI state provided by DLorJointTCIState, a separate UL TCI state provided by UL-TCIState or a joint DL and UL TCI state provided by DLorJointTCIState. Furthermore, the first (or second) TCI state could be associated with the entity ID associated with the serving cell PCI/PCI index or the lowest entity ID or the first entity ID in the higher layer configured list of entity IDs, and the second (or first) TCI state could be associated with the entity ID associated with a PCI/PCI index other than the serving cell PCI/PCI index or the highest entity ID value or the last entity ID value in the higher layer configured list of entity IDs.

Alternatively, the first (or second) TCI state could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) TCI state could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, for M=2 (or N=2), a codepoint could correspond to a first TCI state and a second TCI state. For this case, the first TCI state could be a separate DL TCI state provided by DLorJointTCIState, a separate UL TCI state provided by UL-TCIState or a joint DL and UL TCI state provided by DLorJointTCIState, and the second TCI state could be a separate DL TCI state provided by DLorJointTCIState, a separate UL TCI state provided by UL-TCIState or a joint DL and UL TCI state provided by DLorJointTCIState.

Furthermore, if the UE is provided in PDCCH-Config two values of CORESETPoolIndex (i.e., 0 and 1), the first (or second) TCI state could be associated with value 0 of CORESETPoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) TCI state could be associated with value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, for M=2 (or N=2), a codepoint could correspond to two pairs of TCI states with each pair comprising two TCI states. The first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState.

For instance, one TCI state in the first pair could be for DL channels/signals, and the other TCI state in the first pair could be for UL channels/signals. Similarly, the first TCI state in the second pair could be a separate DL TCI state provided by DLorJointTCIState, a separate UL TCI state provided by UL-TCIState or a joint DL and UL TCI state provided by DLorJointTCIState, and the second TCI state in the second pair could be a separate DL TCI state provided by DLorJointTCIState, a separate UL TCI state provided by UL-TCIState or a joint DL and UL TCI state provided by DLorJointTCIState.

For instance, one TCI state in the second pair could be for DL channels/signals, and the other TCI state in the second pair could be for UL channels/signals. Furthermore, the first and second TCI states in the first pair could be activated/selected by the MAC CE from the first (or second) TCI state pool (specified in the examples in the present disclosure) or the first (or second) TCI state group (specified in the examples in the present disclosure), and the first and second TCI states in the second pair could be activated/selected by the MAC CE from the second (or first) TCI state pool (specified in the examples of the present disclosure) or the second (or first) TCI state group (specified in the example of the present disclosure).

Yet for another example, for M=2 (or N=2), a codepoint could correspond to two pairs of TCI states with each pair comprising two TCI states. The first TCI state in the first pair could be a separate DL TCI state provided by DLorJointT-CIState, a separate UL TCI state provided by UL-TCIState or a joint DL and UL TCI state provided by DLorJointT-CIState, and the second TCI state in the first pair could be a separate DL TCI state provided by DLorJointTCIState, a separate UL TCI state provided by UL-TCIState or a joint DL and UL TCI state provided by DLorJointTCIState.

For instance, one TCI state in the first pair could be for DL channels/signals, and the other TCI state in the first pair could be for UL channels/signals. Similarly, the first TCI state in the second pair could be a separate DL TCI state provided by DLorJointTCIState, a separate UL TCI state provided by UL-TCIState or a joint DL and UL TCI state provided by DLorJointTCIState, and the second TCI state in the second pair could be a separate DL TCI state provided by DLorJointTCIState, a separate UL TCI state provided by UL-TCIState or a joint DL and UL TCI state provided by DLorJointTCIState.

For instance, one TCI state in the second pair could be for DL channels/signals, and the other TCI state in the second pair could be for UL channels/signals. Furthermore, the first and second TCI states in the first (or second) pair could be associated with the entity ID associated with the serving cell PCI/PCI index or the lowest entity ID value or the first entity ID value in the higher layer configured list of entity IDs, and the first and second TCI states in the second (or first) pair could be associated with the entity ID associated with a PCI/PCI index other than the serving cell PCI/PCI index or the highest entity ID value or the last entity ID value in the higher layer configured list of entity IDs.

Alternatively, the first and second TCI states in the first (or second) pair could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the first and second TCI states in the second (or first) pair could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, for M=2 (or N=2), a codepoint could correspond to two pairs of TCI states with each pair comprising two TCI states. The first TCI state in the first pair could be a separate DL TCI state provided by DLorJointT-CIState, a separate UL TCI state provided by UL-TCIState or a joint DL and UL TCI state provided by DLorJointT-CIState, and the second TCI state in the first pair could be a separate DL TCI state provided by DLorJointTCIState, a separate UL TCI state provided by UL-TCIState or a joint DL and UL TCI state provided by DLorJointTCIState.

For instance, one TCI state in the first pair could be for DL channels/signals, and the other TCI state in the first pair could be for UL channels/signals. Similarly, the first TCI state in the second pair could be a separate DL TCI state provided by DLorJointTCIState, a separate UL TCI state provided by UL-TCIState or a joint DL and UL TCI state provided by DLorJointTCIState, and the second TCI state in the second pair could be a separate DL TCI state provided by DLorJointTCIState, a separate UL TCI state provided by UL-TCIState or a joint DL and UL TCI state provided by DLorJointTCIState. For instance, one TCI state in the second pair could be for DL channels/signals, and the other TCI state in the second pair could be for UL channels/signals.

Furthermore, if the UE is provided in PDCCH-Config two values of CORESETPoolIndex (i.e., 0 and 1), the first and second TCI states in the first (or second) pair could be associated with value 0 of CORESETPoolIndex or CORE-SETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the first and second TCI states in the second (or first) pair could be associated with value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

As mentioned in the present disclosure, one or more of the $Nc \geq 1$ (e.g., 8, 16, 32 or 64) TCI state codepoints activated by the MAC CE could correspond to the TCI state codepoints described in the examples of the present disclosure. Furthermore, a "transmission configuration indication" field in DCI format 1_1 or 1_2 with or without DL assignment could indicate a TCI state codepoint from the $Nc \geq 1$ (e.g., 8, 16, 32 or 64) activated TCI state codepoints determined according to the examples of the present disclosure. Alternatively, DCI format 1_1 with or without DL assignment or DCI format 1_2 with or without DL assignment could indicate/include a first "transmission configuration indication" field (or denoted by a first TCI field or TCI field 1) indicating a first TCI state codepoint, and a second "transmission configuration indication" field (denoted by a second TCI field or TCI field 2) indicating a second TCI state codepoint.

In one example, the first TCI field or the second TCI field could be a new and dedicated TCI field added/configured in the DCI format 1_1 or 1_2 (with or without DL assignment), which is different from the existing DCI fields configured therein. In another example, the first TCI field or the second TCI field could correspond to the existing "transmission configuration indication" field in the DCI format 1_1 or 1_2 (with or without DL assignment). When the two TCI fields are configured in the DCI format 1_1 or 1_2 with or without DL assignment for beam indication, the first or the second TCI state codepoints could be from the $Nc \geq 1$ (e.g., 8, 16, 32 or 64) activated TCI state codepoints determined according to the examples of the present disclosure.

Optionally, the UE could receive from the network an auxiliary MAC CE subselection/activation command selecting/activating one or more ($Nc' \geq 1$, e.g., $Nc'=8$, 16, 32 or 64) TCI state codepoints from the set of Nc activated TCI state codepoints as a subset of Nc' TCI state codepoints. For this case, the "transmission configuration indication" field in DCI format 1_1 or 1_2 with or without DL assignment could indicate a TCI state codepoint from the subset of $Nc' \geq 1$ (e.g., 8, 16, 32 or 64) TCI state codepoints, or the first or the second TCI state codepoints indicated by the first or the second TCI fields (if configured) in DCI format 1_1 or 1_2 with or without DL assignment could correspond to a TCI state codepoint from the subset of $Nc' \geq 1$ (e.g., 8, 16, 32 or 64) TCI state codepoints.

Additionally, if DCI format 1_1 or 1_2 for beam indication is with DL assignment or the number of TCI state codepoints Nc to be activated by MAC CE is smaller than a threshold, the TCI state codepoint indicated in the "transmission configuration indication" field could only correspond to/indicate a single TCI state or a single pair of TCI states (e.g., the TCI state codepoint specified in the examples of the present disclosure) for single-TRP operation. If two TCI fields are allowed to be configured in a DCI format for beam indication, and if DCI format 1_1 or 1_2 for beam indication is with DL assignment or the number of TCI state codepoints Nc to be activated by MAC CE is smaller than a threshold, only one TCI field (e.g., either TCI field 1 or TCI field 2) can be configured in the DCI format, and the TCI state codepoint (e.g., either the first TCI state codepoint or the second TCI state codepoint) indicated in the corresponding TCI field could only correspond to/indicate a single TCI state or a single pair of TCI states (e.g., the TCI state codepoint specified in the examples of the present disclosure) for single-TRP operation. If DCI format 1_1 or 1_2 for beam indication is with DL assignment or the number of TCI state codepoints Nc to be activated by MAC CE is smaller than a threshold, each of the MAC CE activated TCI state codepoints could only correspond to/indicate a single TCI state or a single pair of TCI states (e.g., the TCI state codepoint specified in the examples of the present disclosure) for single-TRP operation. In the present disclosure, the threshold could be (1) fixed, e.g., 8, 16, 32 or 64, or (2) configured by the network via higher layer RRC signaling or/and MAC CE command or/and DCI based signaling.

In another example, for M=2 (or N=2), the UE could receive from the network a MAC CE subselection/activation command activating two sets of TCI state codepoints. For this case, the first set could contain Nc1≥1 (e.g., 8, 16, 32 or 64) TCI state codepoints, and the second set could contain Nc2≥1 (e.g., 8, 16, 32 or 64) TCI state codepoints. Alternatively, the UE could receive from the network a first MAC CE subselection/activation command activating a first set of Nc1≥1 (e.g., 8, 16, 32 or 64) TCI state codepoints, and a second MAC CE subselection/activation command activating a second set of Nc2≥1 (e.g., 8, 16, 32 or 64) TCI state codepoints.

For example, a codepoint in the first set of codepoints or the second set of codepoints could correspond to a TCI state, wherein the TCI state could be a separate DL TCI state provided by DLorJointTCIState, a separate UL TCI state provided by UL-TCIState or a joint DL and UL TCI state provided by DLorJointTCIState.

Yet for another example, a codepoint in the first set of codepoints or the second set of codepoints could correspond to a pair of two TCI states, wherein the first TCI state in the pair could be a separate DL TCI state provided by DLorJointTCIState, a separate UL TCI state provided by UL-TCIState or a joint DL and UL TCI state provided by DLorJointTCIState, and the second TCI state in the pair could be a separate DL TCI state provided by DLorJointTCIState, a separate UL TCI state provided by UL-TCIState or a joint DL and UL TCI state provided by DLorJointTCIState. For instance, one TCI state in the pair could be for DL channels/signals, and the other TCI state in the pair could be for UL channels/signals.

In the present disclosure, the UE could be higher layer configured by the network a list of entity IDs or a list of PCIs or a set of PCI indexes with each PCI index pointing to an entry/PCI in the list of PCIs that are higher layer configured to the UE.

For example, the TCI states indicated by the first set of TCI state codepoints could be activated/selected by the MAC CE from the first (or second) TCI state pool (specified in the examples of the present disclosure) or the first (or second) TCI state group (specified in the examples of the present disclosure), and the TCI states indicated by the second set of TCI state codepoints could be activated/selected by the MAC CE from the second (or first) TCI state pool (specified in the examples of the present disclosure) or the second (or first) TCI state group (specified in the examples of the present disclosure).

For another example, the TCI states indicated by the first (or second) set of TCI state codepoints could be associated with the entity ID associated with the serving cell PCI/PCI index or the lowest entity ID value or the first entity ID value in the higher layer configured list of entity IDs, and the TCI states indicated by the second (or first) set of TCI state codepoints could be associated with the entity ID associated with a PCI/PCI index other than the serving cell PCI/PCI index or the highest entity ID value or the last entity ID value in the higher layer configured list of entity IDs.

Alternatively, the TCI states indicated by the first (or second) set of TCI state codepoints could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the TCI states indicated by the second (or first) set of TCI state codepoints could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, if the UE is provided in PDCCH-Config two values of CORESETPoolIndex (i.e., 0 and 1), the TCI states indicated by the first (or second) set of TCI state codepoints could be associated with value 0 of CORESETPoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the TCI states indicated by the second (or first) set of TCI state codepoints could be associated with value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, the first MAC CE subselection/activation command could include/indicate a first entity ID, and the second MAC CE subselection/activation command could include/indicate a second entity ID. In the present disclosure, the first entity ID or the second entity ID could correspond to at least one of: a PCI value, a PCI index pointing to an entry/PCI in a list of PCI that are higher layer configured to the UE, a value of CORESETPoolIndex, a value of CORESETGroupIndex, a TRP ID, a TRP-specific higher layer signaling index, a CORESET ID, a resource ID/index, a resource set ID/index and etc. For this case, the TCI states indicated by the first set of TCI state codepoints activated/selected by the first MAC CE subselection/activation command could be associated with the first entity ID, and the TCI states indicated by the second set of TCI state codepoints activated/selected by the second MAC CE sub-selection/activation command could be associated with the second entity ID.

For DCI based beam indication, DCI format 1_1 with or without DL assignment or DCI format 1_2 with or without DL assignment could indicate/include a first "transmission configuration indication" field (or denoted by a first TCI field or TCI field 1) indicating a first TCI state codepoint, and a second "transmission configuration indication" field (denoted by a second TCI field or TCI field 2) indicating a second TCI state codepoint.

In one example, the first TCI field or the second TCI field could be a new and dedicated TCI field added/configured in the DCI format 1_1 or 1_2 (with or without DL assignment), which is different from the existing DCI fields configured therein. In another example, the first TCI field or the second TCI field could correspond to the existing "transmission configuration indication" field in the DCI format 1_1 or 1_2 (with or without DL assignment). In yet another example, the first TCI field or the second TCI field could be configured by repurposing one or more of the existing DCI fields in the DCI format 1_1 or 1_2 (with or without DL assignment). In the present disclosure, the UE could be higher layer configured by the network a list of entity IDs or a list of PCIs or a set of PCI indexes with each PCI index pointing to an entry/PCI in the list of PCIs that are higher layer configured to the UE.

For example, the TCI state(s) indicated by the first TCI state codepoint/the first TCI field could be activated/selected by the MAC CE from the first (or second) TCI state pool (specified in the examples of the present disclosure) or the first (or second) TCI state group (specified in the examples of the present disclosure), and the TCI state(s) indicated by the second TCI state codepoint/the second TCI field could be activated/selected by the MAC CE from the second (or first) TCI state pool (specified in the examples of the present disclosure) or the second (or first) TCI state group (specified in the examples of the present disclosure).

For another example, the first (or second) TCI state codepoint/the first (or second) TCI field could be associated with the entity ID associated with the serving cell PCI/PCI index or the lowest entity ID value or the first entity ID value in the higher layer configured list of entity IDs, and the second (or first) TCI state codepoint/the second (or first) TCI field could be associated with the entity ID associated with a PCI/PCI index other than the serving cell PCI/PCI index or the highest entity ID value or the last entity ID value in the higher layer configured list of entity IDs.

Alternatively, the first (or second) TCI state codepoint/the first (or second) TCI field could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) TCI state codepoint/the second (or first) TCI field could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, if the UE is provided in PDCCH-Config two values of CORESETPoolIndex (i.e., 0 and 1), the first (or second) TCI state codepoint/the first (or second) TCI field could be associated with value 0 of CORESET-PoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) TCI state codepoint/the second (or first) TCI field could be associated with value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

In one example, the first TCI field could indicate the first TCI state codepoint from the first set of TCI state codepoints, and the second TCI field could indicate the second TCI state codepoint from the second set of TCI state codepoints.

In another example, the first TCI field could indicate the first TCI state codepoint from the second set of TCI state codepoints, and the second TCI field could indicate the second TCI state codepoint from the first set of TCI state codepoints.

In yet another example, the UE could receive a first one-bit flag for the first TCI field with "0" indicating that the first TCI state codepoint is indicated from the first (or second) set of TCI state codepoints and "1" indicating that the first TCI state codepoint is indicated from the second (or first) set of TCI state codepoints; furthermore, the UE could receive a second one-bit flag for the second TCI field with "0" indicating that the second TCI state codepoint is indicated from the first (or second) set of TCI state codepoints and "1" indicating that the second TCI state codepoint is indicated from the second (or first) set of TCI state codepoints. The UE could be configured by the network via higher layer RRC signaling or MAC CE command or DCI based signaling the first or second one-bit flag indicators.

If DCI format 1_1 or 1_2 for beam indication is with DL assignment or the number of TCI state codepoints Nc1 in the first set of TCI state codepoints to be activated by MAC CE or the number of TCI state codepoints Nc2 in the second set of TCI state codepoints to be activated by MAC CE or the total number of TCI state codepoints Nc1+Nc2 in the first and second sets of TCI state codepoints to be activated by MAC CE is smaller than a threshold, the DCI format 1_1 or 1_2 could only indicate a single TCI field (e.g., either the first or the second TCI field), and the TCI state codepoint (e.g., either the first or the second TCI state codepoint) indicated in the TCI field could only correspond to/indicate a single TCI state or a single pair of TCI states—e.g., selected from either the first set or the second set of TCI state codepoints—for single-TRP operation.

In the present disclosure, the threshold could be (1) fixed, e.g., 8, 16, 32 or 64, or (2) configured by the network via higher layer RRC signaling or/and MAC CE command or/and DCI based signaling.

For DCI based beam indication, DCI format 1_1 with or without DL assignment or DCI format 1_2 with or without DL assignment could indicate/include a single "transmission configuration indication" field indicating a TCI state codepoint. A new one-bit flag indicator could be indicated/added in the DCI format 1_1 or 1_2 with or without DL assignment; the one-bit flag indicator is used to indicate mapping/association between the TCI field and a TRP.

Alternatively, the new data indicator (NDI) field in the DCI format 1_1 or 1_2 with or without DL assignment could be used to indicate mapping/association between the TCI field and a TRP, and the NDI is toggled with every new transmission. Note that other existing one-bit flag indicator(s) in the DCI format 1_1 or 1_2 with or without DL assignment could also be repurposed to indicate mapping/association between the TCI field and a TRP. In the present disclosure, the UE could be higher layer configured by the network a list of entity IDs or a list of PCIs or a set of PCI indexes with each PCI index pointing to an entry/PCI in the list of PCIs that are higher layer configured to the UE.

For example, if the one-bit flag indicator/NDI is set to "0" or the NDI is toggled, the TCI state(s) indicated by the TCI state codepoint/the TCI field could be activated/selected by the MAC CE from the first (or second) TCI state pool (specified in the examples of the present disclosure) or the first (or second) TCI state group (specified in the examples of the present disclosure), and if the one-bit flag indicator/NDI is set to "1" or the NDI is not toggled, the TCI state(s) indicated by the TCI state codepoint/the TCI field could be activated/selected by the MAC CE from the second (or first) TCI state pool (specified in the examples of the present disclosure) or the second (or first) TCI state group (specified in the examples of the present disclosure).

For another example, if the one-bit flag indicator/NDI is set to "0" (or "1") or the NDI is toggled (or is not toggled), the TCI state codepoint/the TCI field could be associated with the entity ID associated with the serving cell PCI/PCI index or the lowest entity ID value or the first entity ID value in the higher layer configured list of entity IDs, and if the one-bit flag indicator/NDI is set to "1" (or "0") or the NDI is not toggled (or is toggled), the TCI state codepoint/the TCI field could be associated with the entity ID associated with a PCI/PCI index other than the serving cell PCI/PCI index or the highest entity ID value or the last entity ID value in the higher layer configured list of entity IDs.

Alternatively, if the one-bit flag indicator/NDI is set to "0" (or "1") or the NDI is toggled (or is not toggled), the TCI state codepoint/the TCI field could be associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and if the one-bit flag indicator/NDI is set to "1" (or "0") or the NDI is not toggled (or is toggled), the TCI state codepoint/the TCI field could be associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, if the UE is provided in PDCCH-Config two values of CORESETPoolIndex (i.e., 0 and 1): if the one-bit flag indicator/NDI is set to "0" (or "1") or the NDI is toggled (or is not toggled), the TCI state codepoint/the TCI field could be associated with value 0 of CORESETPoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and if the one-bit flag indicator/NDI is set to "1" (or "0") or the NDI is not toggled (or is toggled), the TCI state codepoint/the TCI field could be associated with value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

In the present disclosure, the UE could be higher layer configured by the network a list of entity IDs or a list of PCIs or a set of PCI indexes with each PCI index pointing to an entry/PCI in the list of PCIs that are higher layer configured to the UE.

In one example, a new one-bit flag indicator could be indicated/added in the DCI format 1_1 or 1_2 with or without DL assignment; the one-bit flag indicator is used to indicate mapping/association between the TCI field/TCI codepoint and a set of codepoints (e.g., the first or second set of codepoints). Alternatively, the new data indicator (NDI) field in the DCI format 1_1 or 1_2 with or without DL assignment could be used to indicate mapping/association between the TCI field/TCI state codepoint and a set of codepoints (e.g., the first or second set of codepoints), and the NDI is toggled with every new transmission.

Note that other existing one-bit flag indicator(s) in the DCI format 1_1 or 1_2 with or without DL assignment could also be repurposed to indicate mapping/association between the TCI field/TCI state codepoint and a set of codepoints (e.g., the first or second set of codepoints). For this case, if the one-bit flag indicator/NDI is set to "0" (or "1") or the NDI is toggled (or is not toggled), the TCI field could indicate the TCI state codepoint from the first set of TCI state codepoints, and if the one-bit flag indicator/NDI is set to "1" (or "0") or the NDI is not toggled (or is toggled), the TCI field could indicate the TCI state codepoint from the second set of TCI state codepoints.

In another example, the TCI field could indicate the TCI state codepoint from a third set of TCI state codepoints, wherein the third set of TCI state codepoints comprises one or more TCI state codepoints from the first set of TCI state codepoints and one or more TCI state codepoints from the second set of TCI state codepoints. For instance, the first set of TCI state codepoints could comprise 8 TCI state codepoints, denoted by TCI_0, TCI_1, TCI_2, TCI_3, TCI_4, TCI_5, TCI_6 or TCI_7, and the second set of TCI state codepoints could comprise 8 TCI state codepoints, denoted by TCI_A, TCI_B, TCI_C, TCI_D, TCI_E, TCI_F, TCI_G or TCI_H. The third set of TCI state codepoints could then comprise TCI_0, TCI_1, TCI_2, TCI_3, TCI_A, TCI_B, TCI_C, TCI_D. The third set of TCI state codpoints could comprise any combinations of TCI state codepoints from the first or the second sets. The TCI state codepoints configured in the first or the second sets can be determined/selected into the third set according to at least one of: (1) fixed in the system specifications or (2) configured by the network via higher layer RRC signaling, MAC CE command or dynamic DCI based signaling.

If DCI format 1_1 or 1_2 for beam indication is with DL assignment or the number of TCI state codepoints Nc1 in the first set of TCI state codepoints to be activated by MAC CE or the number of TCI state codepoints Nc2 in the second set of TCI state codepoints to be activated by MAC CE or the total number of TCI state codepoints Nc1+Nc2 in the first and second sets of TCI state codepoints to be activated by MAC CE is smaller than a threshold, the TCI state codepoint indicated in the "transmission configuration indication" field could only correspond to/indicate a single TCI state or a single pair of TCI states—e.g., selected from either the first set or the second set of TCI state codepoints—for single-TRP operation. In the present disclosure, the threshold could be (1) fixed, e.g., 8, 16, 32 or 64, or (2) configured by the network via higher layer RRC signaling or/and MAC CE command or/and DCI based signaling.

In one embodiment, a UE could receive in one or more CORESETs one or more PDCCH candidates from one or more search space sets configured with a higher layer parameter searchSpaceLinking. The one or more PDCCH candidates configured with the same higher layer parameter searchSpaceLinking could contain/carry/convey the same DCI payload. In the present disclosure, the same DCI payload could correspond to any DCI format, e.g., DCI format 1_1 or 1_2 with or without DL assignment for beam indication or DCI format 0_1 or 0_2. As aforementioned, the UE could receive in a DCI (e.g., DCI format 1_1 or 1_2 with or without DL assignment) M>1 (or N>1) TCI states or M>1 (or N>1) pairs of TCI states indicated by one or more TCI state codepoints (or one or more TCI fields) in the corresponding DCI.

One or more of the indicated M>1 (or N>1) TCI states or pairs of TCI states could be associated with/mapped to the one or more CORESETs, in which the one or more PDCCH candidates from the one or more search space sets configured with the same higher layer parameter searchSpaceLinking are received—also referred to as beam indication for PDCCH repetitions. Furthermore, the UE could receive in a DCI (e.g., DCI format 1_1 or 1_2 with or without DL assignment) one or more bits to indicate at least one of: (1) switching between single-TRP PDCCH reception and multi-TRP PDCCH (repetitions) reception, (2) one or more of the indicated M>1 (or N>1) TCI states or pairs of TCI states to use for the single-TRP PDCCH reception, and (3) switching the order of the indicated M>1 (or N>1) TCI states or pairs of TCI states. One or more new/dedicated DCI fields could be added/included/incorporated in the corresponding DCI format to indicate the one or more bits. Alternatively, one or more of the existing DCI fields in the corresponding DCI format could be repurposed to indicate the one or more bits.

In one example, the UE could first receive in a DCI (e.g., DCI format 1_1 or 1_2 with or without DL assignment) M>1 (or N>1) TCI states or pairs of TCI states indicated by one or more TCI state codepoints (or one or more TCI fields) as specified in the examples of the present disclosure and the corresponding sub-examples in the present disclosure, wherein one or more of the indicated M>1 (or N>1) TCI states or pairs of TCI states could be associated with/mapped to one or more CORESETs, in which one or more PDCCH candidates in one or more search space sets configured with the higher layer parameter searchSpaceLinking are received.

The UE could also receive in a DCI (e.g., DCI format 1_1 or 1_2 with or without DL assignment) a one-bit flag indicator for PDCCH. For this design example, a new/dedicated DCI field could be used/configured in the corresponding DCI format to indicate the one-bit flag indicator; alternatively, one of more of the existing DCI fields in the corresponding DCI format could be used/configured to indicate the one-bit flag indicator. For instance, if the one-bit flag indicator for PDCCH is set to "1" (or "0") or "enabled," the UE could use only one of the indicated M>1 (or N>1) TCI states or pairs of TCI states to receive/monitor one or more PDCCH candidates in one or more CORESETs—i.e., PDCCH reception in a single-TRP system; if the one-bit flag indicator for PDCCH is set to "0" (or "1") or "disabled," the UE could use one or more of the indicated M>1 (or N>1) TCI states or pairs of TCI states to receive/monitor one or more PDCCH candidates from one or more search space sets configured with the same higher layer parameter searchSpaceLinking in one or more CORESETs—i.e., PDCCH repetitions reception in a multi-TRP system. More specifically, if the one-bit flag indicator for PDCCH is set to "1" (or "0") or "enabled" (i.e., for the PDCCH reception in a single-TRP system).

For example, the UE could use the first TCI state or the TCI state with the lowest (or highest) TCI state ID among the indicated M>1 (or N>1) TCI states or the separate DL TCI state or the joint DL and UL TCI state in the first pair of TCI states or the separate DL TCI state or the joint DL and UL TCI state in the pair of TCI states associated with the lowest (or highest) TCI state ID among the indicated M>1 (or N>1) pairs of TCI states to receive/monitor one or more PDCCH candidates in one or more CORESETs.

For another example, the UE could use the second TCI state or the TCI state with the second lowest (or second highest) TCI state ID among the indicated M>1 (or N>1) TCI states or the separate DL TCI state or the joint DL and UL TCI state in the second pair of TCI states or the separate DL TCI state or the joint DL and UL TCI state in the pair of TCI states associated with the second lowest (or second highest) TCI state ID among the indicated M>1 (or N>1) pairs of TCI states to receive/monitor one or more PDCCH candidates in one or more CORESETs.

Yet for another example, the UE could use the last TCI state or the TCI state with the highest (or lowest) TCI state ID among the indicated M>1 (or N>1) TCI states or the separate DL TCI state or the joint DL and UL TCI state in the last pair of TCI states or the separate DL TCI state or the joint DL and UL TCI state in the pair of TCI states associated with the highest (or lowest) TCI state ID among the indicated M>1 (or N>1) pairs of TCI states to receive/monitor one or more PDCCH candidates in one or more CORESETs.

Yet for another example, the UE could use the m-th (or n-th) TCI state or the TCI state with the m-th (or n-th) lowest (or highest) TCI state ID among the indicated M>1 (or N>1) TCI states or the separate DL TCI state or the joint DL and UL TCI state in the m-th (or n-th) pair of TCI states or the separate DL TCI state or the joint DL and UL TCI state in the pair of TCI states associated with the m-th (or n-th) lowest (or highest) TCI state ID among the indicated M>1 (or N>1) pairs of TCI states to receive/monitor one or more PDCCH candidates in one or more CORESETs, where $m \in \{1, \ldots, M\}$ and $n \in \{1, \ldots, N\}$. In this example, the index m (or n) could be determined according to at least one of: (1) fixed in the system specification(s) and (2) configured, e.g., via higher layer RRC signaling or MAC CE command or DCI based signaling, by the network.

Yet for another example, the UE could use the separate DL TCI state or the joint DL and UL TCI state among the indicated M>1 (or N>1) TCI states to receive/monitor one or more PDCCH candidates in one or more CORESETs. In this example, only one of the indicated M>1 (or N>1) TCI states could correspond to a separate DL TCI state or a joint DL and UL TCI state.

Yet for another example, the UE could be higher layer configured by the network a list of K entity IDs. In the present disclosure, an entity ID could correspond to at least one of: a PCI value, a PCI index pointing to an entry/PCI in a list of PCI that are higher layer configured to the UE, a value of CORESETPoolIndex, a value of CORESETGroupIndex, a TRP ID, a TRP-specific higher layer signaling index, a CORESET ID, a resource ID/index, a resource set ID/index and etc. The UE could use the TCI state or the pair of TCI states that is associated with the first entity ID or the second entity ID or the last entity ID or the lowest entity ID or the highest entity ID or the second lowest (or second highest) entity ID or the entity ID associated with the serving cell PCI/PCI index or the entity ID associated with a PCI/PCI index different from the serving cell PCI/PCI index or the k-th entity ID or the k-th lowest (or highest) entity ID among the list of K entity IDs to receive/monitor one or more PDCCH candidates in one or more CORESETs, where k∈{1, . . . , K}.

In this example, the index k could be determined according to at least one of: (1) fixed in the system specification(s) and (2) configured, e.g., via higher layer RRC signaling or MAC CE command or DCI based signaling, by the network. Furthermore, K could be equal to M (or N).

Yet for another example, the UE could be higher layer configured by the network a list of L PCIs. The UE could use the TCI state or the pair of TCI states that is associated with the first PCI or the second PCI or the last PCI or the lowest PCI or the highest PCI or the second lowest (or second highest) PCI or the serving cell PCI or a PCI different from the serving cell PCI or the l-th PCI or the l-th lowest (or highest) PCI among the list of L PCIs to receive/monitor one or more PDCCH candidates in one or more CORESETs, where l∈{1, . . . , L}.

Alternatively, the UE could determine a list of L PCI indexes 0, L−1 or 1, L with each PCI index pointing to an entry in the list of L PCIs. For this case, the UE could use the TCI state or the pair of TCI states that is associated with the first PCI index or the second PCI index or the last PCI index or the lowest PCI index or the highest PCI index or the second lowest (or second highest) PCI index or the serving cell PCI index or a PCI index different from the serving cell PCI index or the l-th PCI index or the l-th lowest (or highest) PCI index among the list of L PCI indexes to receive/monitor one or more PDCCH candidates in one or more CORESETs, where l∈{1, . . . , L}. In this example, the index l could be determined according to at least one of: (1) fixed in the system specification(s) and (2) configured, e.g., via higher layer RRC signaling or MAC CE command or DCI based signaling, by the network. Furthermore, L could be equal to M (or N).

Yet for another example, the UE could be provided in PDCCH-Config two values of CORESETPoolIndex (i.e., 0 and 1) for one or more CORESETs. The UE could use the TCI state or the pair of TCI states that is associated with value 0 of CORESETPoolIndex or value 1 of CORESETPoolIndex or value x of CORESETPoolIndex to receive/monitor one or more PDCCH candidates in one or more CORESETs, where x∈{0, 1}. In this example, the value x could be determined according to at least one of: (1) fixed in the system specification(s) and (2) configured, e.g., via higher layer RRC signaling or MAC CE command or DCI based signaling, by the network.

In another example, the UE could first receive in a DCI (e.g., DCI format 1_1 or 1_2 with or without DL assignment) M>1 (or N>1) TCI states or pairs of TCI states indicated by one or more TCI state codepoints (or one or more TCI fields) as specified in the examples of the present disclosure and the corresponding sub-examples in the present disclosure, wherein one or more of the indicated M>1 (or N>1) TCI states or pairs of TCI states could be associated with/mapped to one or more CORESETs, in which one or more PDCCH candidates in one or more search space sets configured with the higher layer parameter searchSpaceLinking are received.

The UE could also receive in a DCI (e.g., DCI format 1_1 or 1_2 with or without DL assignment) a one-bit indicator for PDCCH. For this design example, a new/dedicated DCI field could be used/configured in the corresponding DCI format to indicate the one-bit indicator; alternatively, one of more of the existing DCI fields in the corresponding DCI format could be used/configured to indicate the one-bit indicator. If the one-bit indicator for PDCCH is set to "0" (or "1"), the UE could use one of the indicated M>1 (or N>1) TCI states or pairs of TCI states—a primary TCI state or pair of TCI states—to receive/monitor one or more PDCCH candidates in one or more CORESETs—i.e., PDCCH reception in a single-TRP system; if the one-bit indicator is set to "1" (or "0") for PDCCH, the UE could use another one of the indicated M>1 (or N>1) TCI states or pairs of TCI states—a secondary TCI state or pair of TCI states—to receive/monitor one or more PDCCH candidates in one or more CORESETs—i.e., PDCCH reception in a single-TRP system. Various design examples of determining the primary TCI state or pair of TCI states or the secondary TCI state or pair of TCI states are provided below.

For example, the primary TCI state or pair of TCI states could correspond to the first (or second) TCI state or the TCI state with the lowest (or second lowest/highest) TCI state ID among the indicated M>1 (or N>1) TCI states or the separate DL TCI state or the joint DL and UL TCI state in the first (or second) pair of TCI states or the separate DL TCI state or the joint DL and UL TCI state in the pair of TCI states associated with the lowest (or second lowest/highest) TCI state ID among the indicated M>1 (or N>1) pairs of TCI states, and the secondary TCI state or pair of TCI states could correspond to the second (or first) TCI state or the TCI state with the second lowest/highest (or lowest) TCI state ID among the indicated M>1 (or N>1) TCI states or the separate DL TCI state or the joint DL and UL TCI state in the second (or first) pair of TCI states or the separate DL TCI state or the joint DL and UL TCI state in the pair of TCI states associated with the second lowest/highest (or lowest) TCI state ID among the indicated M>1 (or N>1) pairs of TCI states.

For another example, the primary TCI state or pair of TCI states could correspond to the first (or last) TCI state or the TCI state with the lowest (or highest) TCI state ID among the indicated M>1 (or N>1) TCI states or the separate DL TCI state or the joint DL and UL TCI state in the first (or last) pair of TCI states or the separate DL TCI state or the joint DL and UL TCI state in the pair of TCI states associated with the lowest (or highest) TCI state ID among the indicated M>1 (or N>1) pairs of TCI states, and the secondary TCI state or pair of TCI states could correspond to the last (or first) TCI state or the TCI state with the highest (or lowest) TCI state ID among the indicated M>1 (or N>1) TCI states or the separate DL TCI state or the joint DL and UL TCI state in the last (or first) pair of TCI states or the separate DL TCI state or the joint DL and UL TCI state in the pair of TCI states associated with the highest (or lowest) TCI state ID among the indicated M>1 (or N>1) pairs of TCI states.

Yet for another example, the primary TCI state or pair of TCI states could correspond to the m-th (or n-th) TCI state or the TCI state with the m-th (or n-th) lowest (or highest) TCI state ID among the indicated M>1 (or N>1) TCI states or the separate DL TCI state or the joint DL and UL TCI state in the m-th (or n-th) pair of TCI states or the separate DL TCI state or the joint DL and UL TCI state in the pair of TCI states associated with the m-th (or n-th) lowest (or highest) TCI state ID among the indicated M>1 (or N>1) pairs of TCI states, and the secondary TCI state or pair of TCI states could correspond to the m'-th (or n'-th) TCI state or the TCI state with the m'-th (or n'-th) lowest (or highest) TCI state ID among the indicated M>1 (or N>1) TCI states or the separate DL TCI state or the joint DL and UL TCI state in the m'-th (or n'-th) pair of TCI states or the separate DL TCI state or the joint DL and UL TCI state in the pair of TCI states associated with the m'-th (or n'-th) lowest (or highest) TCI state ID among the indicated M>1 (or N>1) pairs of TCI states, where m∈{1, . . . , M}, n∈{1, . . . , N}, m'∈ {1, . . . , M} and n'∈{1, . . . , N}.

In this example, the index m (or n) and the index m' (or n') could be determined according to at least one of: (1) fixed in the system specification(s) and (2) configured, e.g., via higher layer RRC signaling or MAC CE command or DCI based signaling, by the network.

Yet for another example, the primary TCI state or pair of TCI states could correspond to the first (or second) separate DL TCI state or the first (or second) joint DL and UL TCI state among the indicated M>1 (or N>1) TCI states or the pair of TCI states containing the first (or second) separate DL TCI state or the first (or second) joint DL and UL TCI state among the indicated M>1 (or N>1) pairs of TCI states, and the secondary TCI state or pair of TCI states could correspond to the second (or first) separate DL TCI state or the second (or first) joint DL and UL TCI state among the indicated M>1 (or N>1) TCI states or the pair of TCI states containing the second (or first) separate DL TCI state or the second (or first) joint DL and UL TCI state among the indicated M>1 (or N>1) pairs of TCI states. In this example, for beam indication for downlink channels/signals, only the first separate DL TCI state, the second separate DL TCI state, the first joint DL and UL TCI state or the second joint DL and UL TCI state (among the indicated M>1 or N>1 TCI states or pairs of TCI states) are configured/indicated.

Yet for another example, the UE could be higher layer configured by the network a list of K entity IDs. In the present disclosure, an entity ID could correspond to at least one of: a PCI value, a PCI index pointing to an entry/PCI in a list of PCI that are higher layer configured to the UE, a value of CORESETPoolIndex, a value of CORESET-GroupIndex, a TRP ID, a TRP-specific higher layer signaling index, a CORESET ID, a resource ID/index, a resource set ID/index and etc.

In one example, the primary TCI state or pair of TCI states could correspond to the TCI state or the pair of TCI states that is associated with the first (or second) entity ID or the lowest (or second lowest/highest) entity ID or the entity ID associated with the serving cell PCI/PCI index (or a PCI/PCI index different from the serving cell PCI/PCI index), and the secondary TCI state or pair of TCI states could correspond to the TCI state or the pair of TCI states that is associated with the second (or first) entity ID or the second lowest/highest (or lowest) entity ID or the entity ID associated with a PCI/PCI index different from the serving cell PCI/PCI index (or the serving cell PCI/PCI index). In another example, the primary TCI state or pair of TCI states could correspond to the TCI state or the pair of TCI states that is associated with the first (or last) entity ID or the lowest (or highest) entity ID, and the secondary TCI state or pair of TCI states could correspond to the TCI state or the pair of TCI states that is associated with the last (or first) entity ID or the highest (or lowest) entity ID.

In yet another example, the primary TCI state or pair of TCI states could correspond to the TCI state or the pair of TCI states that is associated with the k-th entity ID or the k-th lowest (or highest) entity ID, and the secondary TCI state or pair of TCI states could correspond to the TCI state or the pair of TCI states that is associated with the k'-th entity ID or the k'-th lowest (or highest) entity ID, where k∈ {1, . . . , K} and k'∈{1, . . . , K}. For this case, the index k or the index k' could be determined according to at least one of: (1) fixed in the system specification(s) and (2) configured, e.g., via higher layer RRC signaling or MAC CE command or DCI based signaling, by the network. Furthermore, K could be equal to M (or N).

Yet for another example, the UE could be higher layer configured by the network a list of L PCIs. In one example, the primary TCI state or pair of TCI states could correspond to the TCI state or the pair of TCI states that is associated with the first (or second) PCI or the lowest (or second lowest/highest) PCI or the serving cell PCI (or a PCI different from the serving cell PCI), and the secondary TCI state or pair of TCI states could correspond to the TCI state or the pair of TCI states that is associated with the second (or first) PCI or the second lowest/highest (or lowest) PCI or a PCI different from the serving cell PCI (or the serving cell PCI). In another example, the primary TCI state or pair of TCI states could correspond to the TCI state or the pair of TCI states that is associated with the first (or last) PCI or the lowest (or highest) PCI, and the secondary TCI state or pair of TCI states could correspond to the TCI state or the pair of TCI states that is associated with the last (or first) PCI or the highest (or lowest) PCI.

In yet another example, the primary TCI state or pair of TCI states could correspond to the TCI state or the pair of TCI states that is associated with the l-th PCI or the l-th lowest (or highest) PCI, and the secondary TCI state or pair of TCI states could correspond to the TCI state or the pair of TCI states that is associated with the l'-th PCI or the l'-th lowest (or highest) PCI, where l∈{1, . . . , L} and l'∈ {1, . . . , L}. Alternatively, the UE could determine a list of L PCI indexes 0, L−1 or 1, . . . , L with each PCI index pointing to an entry in the list of L PCIs. For this case, in one example, the primary TCI state or pair of TCI states could correspond to the TCI state or the pair of TCI states that is associated with the first (or second) PCI index or the lowest (or second lowest/highest) PCI index or the serving cell PCI index (or a PCI index different from the serving cell PCI index), and the secondary TCI state or pair of TCI states could correspond to the TCI state or the pair of TCI states that is associated with the second (or first) PCI index or the second lowest/highest (or lowest) PCI index or a PCI index different from the serving cell PCI index (or the serving cell PCI index).

In another example, the primary TCI state or pair of TCI states could correspond to the TCI state or the pair of TCI states that is associated with the first (or last) PCI index or the lowest (or highest) PCI index, and the secondary TCI state or pair of TCI states could correspond to the TCI state or the pair of TCI states that is associated with the last (or first) PCI index or the highest (or lowest) PCI index; in yet another example, the primary TCI state or pair of TCI states could correspond to the TCI state or the pair of TCI states that is associated with the l-th PCI index or the l-th lowest (or highest) PCI index, and the secondary TCI state or pair of TCI states could correspond to the TCI state or the pair of TCI states that is associated with the l'-th PCI index or the l'-th lowest (or highest) PCI index, where l∈{1, . . . , L} and l'∈{1, . . . , L}. For this case, the index l or the index l' could be determined according to at least one of: (1) fixed in the system specification(s) and (2) configured, e.g., via higher layer RRC signaling or MAC CE command or DCI based signaling, by the network. Furthermore, L could be equal to M (or N).

Yet for another example, the UE could be provided in PDCCH-Config two values of CORESETPoolIndex (i.e., 0 and 1) for one or more CORESETs. The primary TCI state or pair of TCI states could correspond to the TCI state or the pair of TCI states that is associated with value 0 (or 1) of CORESETPoolIndex or value x of CORESETPoolIndex, and the secondary TCI state or pair of TCI states could correspond to the TCI state or the pair of TCI states that is associated with value 1 (or 0) of CORESETPoolIndex or value x' of CORESETPoolIndex, where x∈{0, 1} and x'∈{0, 1}. In this example, the value x or the value x' could be determined according to at least one of: (1) fixed in the system specification(s) and (2) configured, e.g., via higher layer RRC signaling or MAC CE command or DCI based signaling, by the network In yet another example, the UE could first receive in a DCI (e.g., DCI format 1_1 or 1_2 with or without DL assignment) M>1 (or N>1) TCI states or pairs of TCI states—denoted and ordered by {TCI state/TCI states pair #a1, TCI state/TCI states pair #a2, TCI state/TCI states pair #aM (or #aN)}—indicated by one or more TCI state codepoints (or one or more TCI fields) as specified in the examples of the present disclosure and the corresponding sub-examples in the present disclosure, wherein one or more of the indicated M>1 (or N>1) TCI states or pairs of TCI states could be associated with/mapped to one or more CORESETs, in which one or more PDCCH candidates in one or more search space sets configured with the higher layer parameter searchSpaceLinking are received.

The UE could also receive in a DCI (e.g., DCI format 1_1 or 1_2 with or without DL assignment) a one-bit flag indicator to indicate TCI state(s)/pair(s) of TCI states ordering for PDCCH. For this design example, a new/dedicated DCI field could be used/configured in the corresponding DCI format to indicate the one-bit flag indicator; alternatively, one of more of the existing DCI fields in the corresponding DCI format could be used/configured to indicate the one-bit flag indicator.

For instance, if the one-bit flag indicator is set to "1" (or "0") or "enabled," the ordering of the indicated M>1 (or N>1) TCI states or pairs of TCI states are reversed, and the UE may follow the order-reversed M>1 (or N>1) TCI states or pairs of TCI states to receive/monitor one or more PDCCH candidates from one or more search space sets configured with the same higher layer parameter searchSpaceLinking in one or more CORESETs associated with the order-reversed M>1 (or N>1) TCI states or pairs of TCI states, and if the one-bit flag indicator is set to "0" (or "1") or "disabled," the UE may follow the indicated M>1 (or N>1) TCI states or pairs of TCI states to receive/monitor one or more PDCCH candidates from one or more search space sets configured with the same higher layer parameter searchSpaceLinking in one or more CORESETs associated with the indicated M>1 (or N>1) TCI states or pairs of TCI states.

If the indicated M>1 (or N>1) TCI states or pairs of TCI states are (ordered as) {TCI state/TCI states pair #a1, TCI state/TCI states pair #a2, TCI state/TCI states pair #aM (or #aN)}, when the one-bit flag indicator is set to "1" (or "0") or "enabled," the (order-reversed) M>1 (or N>1) TCI states or pairs of TCI states may become to {TCI state/TCI states pair #b1, TCI state/TCI states pair #b2, TCI state/TCI states pair #bM (or #bN)}, where b1=aM (or aN), b2=a(M−1) or (a(N−1)), bM (or bN)=a1.

For M=2 (or N=2), the UE could first receive in a DCI (e.g., DCI format 1_1 or 1_2 with or without DL assignment) two TCI states or pairs of TCI states—denoted and ordered by {TCI state/TCI states pair #a1, TCI state/TCI states pair #a2}; if the one-bit flag indicator is set to "1" (or "0") or "enabled," the UE may follow the order-reversed two TCI states or pairs of TCI states {TCI state/TCI state pair #a2, TCI state/TCI state pair #a1} to receive/monitor one or more PDCCH candidates from one or more search space sets configured with the same higher layer parameter searchSpaceLinking in one or more CORESETs associated with the order-reversed TCI states or pairs of TCI states {TCI state/TCI state pair #a2, TCI state/TCI state pair #a1}, and if the one-bit flag indicator is set to "0" or ("1") or "disabled," the UE may follow the indicated two TCI states or pairs of TCI states {TCI state/TCI state pair #a1, TCI state/TCI state pair #a2} to receive/monitor one or more PDCCH candidates from one or more search space sets configured with the same higher layer parameter searchSpaceLinking in one or more CORESETs associated with the indicated TCI states or pairs of TCI states {TCI state/TCI state pair #a1, TCI state/TCI state pair #a2}.

In yet another example, the UE could first receive in a DCI (e.g., DCI format 1_1 or 1_2 with or without DL assignment) M>1 (or N>1) TCI states or pairs of TCI states—denoted by {TCI state/TCI states pair #a1, TCI state/TCI states pair #a2, TCI state/TCI states pair #aM (or #aN)}—indicated by one or more TCI state codepoints (or one or more TCI fields) as specified in the examples of the present disclosure and the corresponding sub-examples in the present disclosure, wherein one or more of the indicated M>1 (or N>1) TCI states or pairs of TCI states could be associated with/mapped to one or more CORESETs, in which one or more PDCCH candidates in one or more search space sets configured with the higher layer parameter searchSpaceLinking are received. The UE could also receive in a DCI (e.g., DCI format 1_1 or 1_2 with or without DL assignment) a one-bit indicator to indicate TCI state(s)/pair(s) of TCI states ordering for PDCCH.

For this design example, a new/dedicated DCI field could be used/configured in the corresponding DCI format to indicate the one-bit indicator; alternatively, one of more of the existing DCI fields in the corresponding DCI format could be used/configured to indicate the one-bit indicator. For instance, if the one-bit indicator is set to "0" (or "1"), the UE may follow the M>1 (or N>1) TCI states or pairs of TCI states ordered by {TCI state/TCI states pair #a1, TCI state/TCI states pair #a2, . . . , TCI state/TCI states #aM (or #aN)}—a first ordering—to receive/monitor one or more PDCCH candidates from one or more search space sets configured with the same higher layer parameter searchSpaceLinking in one or more CORESETs associated with the M>1 (or N>1) TCI states or pairs of TCI states ordered by {TCI state/TCI states pair #a1, TCI state/TCI states pair #a2, TCI state/TCI states #aM (or #aN)}, and if the one-bit flag indicator is set to "1" (or "0"), the UE may follow the M>1 (or N>1) TCI states or pairs of TCI states ordered by {TCI state/TCI states pair #b1, TCI state/TCI states pair #b2, TCI state/TCI states #bM (or #bN)}—a second ordering—to receive/monitor one or more PDCCH candidates from one or more search space sets configured with the same higher layer parameter searchSpaceLinking in one or more CORESETs associated with the M>1 (or N>1) TCI states or pairs of TCI states ordered by {TCI state/TCI states pair #b1, TCI state/TCI states pair #b2, TCI state/TCI states #bM (or #bN)}.

The first ordering of the TCI states/pairs of TCI states {TCI state/TCI states pair #a1, TCI state/TCI states pair #a2, TCI state/TCI states #aM (or #aN)} or the second ordering of the TCI states/pairs of TCI states {TCI state/TCI states pair #b1, TCI state/TCI states pair #b2, TCI state/TCI states #bM (or #bN)} could be determined according to at least one of: (1) fixed in the system specification(s) and (2) configured, e.g., via higher layer RRC signaling or MAC CE command or DCI based signaling, by the network.

For both (1) and (2), b1 could be equal to aM (or aN), b2 could be equal to a(M−1) or (a(N−1)), bM (or bN) could be equal to a1. For M=2 (or N=2), the UE could first receive in a DCI (e.g., DCI format 1_1 or 1_2 with or without DL assignment) two TCI states or pairs of TCI states—denoted by {TCI state/TCI states pair #a1, TCI state/TCI states pair #a2}; if the one-bit flag indicator is set to "0" (or "1"), the UE may follow the two TCI states or pairs of TCI states ordered by {TCI state/TCI state pair #a1, TCI state/TCI state pair #a2} to receive/monitor one or more PDCCH candidates from one or more search space sets configured with the same higher layer parameter searchSpaceLinking in one or more CORESETs associated with the two TCI states or pairs of TCI states ordered by {TCI state/TCI state pair #a1, TCI state/TCI state pair #a2}, and if the one-bit flag indicator is set to "1" or ("0"), the UE may follow the two TCI states or pairs of TCI states ordered by {TCI state/TCI state pair #a2, TCI state/TCI state pair #a1} to receive/monitor one or more PDCCH candidates from one or more search space sets configured with the same higher layer parameter searchSpaceLinking in one or more CORESETs associated with the two TCI states or pairs of TCI states {TCI state/TCI state pair #a2, TCI state/TCI state pair #a1}.

In yet another example, the UE could first receive in a DCI (e.g., DCI format 1_1 or 1_2 with or without DL assignment) M=1 (or N=1) TCI state or pair of TCI states indicated by a TCI state codepoint (or a TCI field) as specified in the examples of the present disclosure and the corresponding sub-examples in the present disclosure. The UE could then receive in a DCI (e.g., DCI format 1_1 or 1_2 with or without DL assignment) M>1 (or N>1) TCI states or pairs of TCI states indicated by one or more TCI state codepoints (or one or more TCI fields) as specified in the examples of the present disclosure and the corresponding sub-examples in the present disclosure, wherein one or more of the indicated M>1 (or N>1) TCI states or pairs of TCI states could be associated with/mapped to one or more CORESETs, in which one or more PDCCH candidates in one or more search space sets configured with the higher layer parameter searchSpaceLinking are received.

For example, the UE may follow the latest indicated M>1 (or N>1) TCI states or pairs of TCI states to receive/monitor one or more PDCCH candidates from one or more search space sets configured with the same higher layer parameter searchSpaceLinking in one or more CORESETs associated with the latest indicated M>1 (or N>1) TCI states or pairs of TCI states—i.e., multi-TRP PDCCH (repetitions) reception.

For another example, the UE could receive in a DCI (e.g., DCI format 1_1 or 1_2 with or without DL assignment) a one-bit flag indicator for PDCCH. For this design example, a new/dedicated DCI field could be used/configured in the corresponding DCI format to indicate the one-bit flag indicator; alternatively, one of more of the existing DCI fields in the corresponding DCI format could be used/configured to indicate the one-bit flag indicator. For instance, if the one-bit flag indicator for PDCCH is set to "1" (or "0") or "enabled," the UE may follow the latest indicated M>1 (or N>1) TCI states or pairs of TCI states to receive/monitor one or more PDCCH candidates from one or more search space sets configured with the same higher layer parameter searchSpaceLinking in one or more CORESETs associated with the latest indicated M>1 (or N>1) TCI states or pairs of TCI states—i.e., multi-TRP PDCCH (repetitions) reception. If the one-bit flag indicator for PDCCH is set to "0" (or "1") or "disabled," the UE may follow the previously indicated M=1 (or N=1) TCI state or pair of TCI states to receive/monitor one or more PDCCH candidates in one or more CORESETs—i.e., single-TRP PDCCH reception.

Yet for another example, the UE could receive in a DCI (e.g., DCI format 1_1 or 1_2 with or without DL assignment) a one-bit indicator for PDCCH. For this design example, a new/dedicated DCI field could be used/configured in the corresponding DCI format to indicate the one-bit indicator; alternatively, one of more of the existing DCI fields in the corresponding DCI format could be used/configured to indicate the one-bit indicator. For instance, if the one-bit indicator for PDCCH is set to "0" (or "1"), the UE may follow the previously indicated M=1 (or N=1) TCI state or pair of TCI states to receive/monitor one or more PDCCH candidates in one or more CORESETs—i.e., single-TRP PDCCH reception; if the one-bit indicator for PDCCH is set to "1" (or "0"), the UE may follow the latest indicated M>1 (or N>1) TCI states or pairs of TCI states to receive/monitor one or more PDCCH candidates from one or more search space sets configured with the same higher layer parameter searchSpaceLinking in one or more CORESETs associated with the latest indicated M>1 (or N>1) TCI states or pairs of TCI states—i.e., multi-TRP PDCCH (repetitions) reception.

In yet another example, the UE could first receive in a DCI (e.g., DCI format 1_1 or 1_2 with or without DL assignment) M>1 (or N>1) TCI states or pairs of TCI states indicated by one or more TCI state codepoints (or one or more TCI fields) as specified in the examples of the present disclosure and the corresponding sub-examples in the present disclosure, wherein one or more of the indicated M>1 (or N>1) TCI states or pairs of TCI states could be associated with/mapped to one or more CORESETs, in which one or more PDCCH candidates in one or more search space sets configured with the higher layer parameter searchSpaceLinking are received.

The UE could also receive in a DCI (e.g., DCI format 1_1 or 1_2 with or without DL assignment) a multi-bit (>1 bit, e.g., 2-bit) indicator for PDCCH. For this design example, a new/dedicated DCI field could be used/configured in the corresponding DCI format to indicate the multi-bit indicator; alternatively, one of more of the existing DCI fields in the corresponding DCI format could be used/configured to indicate the multi-bit indicator. The multi-bit indicator for PDCCH could indicate one or more of: (1) single-TRP PDCCH reception, (2) multi-TRP PDCCH (repetitions) reception, (3) one or more orderings of the indicated TCI states or pairs of TCI states for single-TRP PDCCH reception or multi-TRP PDCCH (repetitions) reception, and (4) one or more TCI states or pairs of TCI states for single-TRP PDCCH reception or multi-TRP PDCCH (repetitions) reception.

For example, the multi-bit indicator could correspond to a 2-bit indicator with four states "00," "01," "10," and "11." For instance, if the 2-bit indicator is set to "00" (or "01"), the UE could use only one of the indicated M>1 (or N>1) TCI states or pairs of TCI states to receive/monitor one or more PDCCH candidates in one or more CORESETs—i.e., PDCCH reception in a single-TRP system—following the design examples specified in the examples of the present disclosure; if the 2-bit indicator is set to "01" (or "00"), the UE could use one or more of the indicated M>1 (or N>1) TCI states or pairs of TCI states to receive/monitor one or more PDCCH candidates from one or more search space sets configured with the same higher layer parameter searchSpaceLinking in one or more CORESETs—i.e., PDCCH repetitions reception in a multi-TRP system. If the 2-bit indicator is set to "10" (or "11"), the UE may follow the ordering of the indicated M>1 (or N>1) TCI states or pairs of TCI states to receive/monitor one or more PDCCH candidates from one or more search space sets configured with the same higher layer parameter searchSpaceLinking in one or more CORESETs associated with the indicated M>1 (or N>1) TCI states or pairs of TCI states (according to the example in the present disclosure).

If the 2-bit indicator is set to "11" (or "10"), the UE may follow the order-reversed M>1 (or N>1) TCI states or pairs of TCI states to receive/monitor one or more PDCCH candidates from one or more search space sets configured with the same higher layer parameter searchSpaceLinking in one or more CORESETs associated with the order-reversed M>1 (or N>1) TCI states or pairs of TCI states (according to the example in the present disclosure).

Alternatively, if the 2-bit indicator is set to "10" (or "11"), the UE may follow a first ordering of the M>1 (or N>1) TCI states or pairs of TCI states to receive/monitor one or more PDCCH candidates from one or more search space sets configured with the same higher layer parameter searchSpaceLinking in one or more CORESETs associated with the M>1 (or N>1) TCI states or pairs of TCI states in the first ordering; if the 2-bit indicator is set to "11" (or "10"), the UE may follow a second ordering of the M>1 (or N>1) TCI states or pairs of TCI states to receive/monitor one or more PDCCH candidates from one or more search space sets configured with the same higher layer parameter searchSpaceLinking in one or more CORESETs associated with the M>1 (or N>1) TCI states or pairs of TCI states in the second ordering.

The first and second orderings of TCI states/pairs of TCI states could be according to those specified in the example in the present disclosure. Optionally, "00" or "01" of the 2-bit indicator could be used to indicate the orderings of the M>1 (or N>1) TCI states or pairs of TCI states for multi-TRP PDCCH (repetitions) reception as described above, and "10" or "11" of the 2-bit indicator could be used to indicate the single-TRP PDCCH reception or the multi-TRP PDCCH (repetitions) reception as described above.

For another example, the multi-bit indicator could correspond to a 2-bit indicator with four states "00," "01," "10," and "11." For instance, if the 2-bit indicator is set to "00" (or "01"), the UE could use the primary TCI state or pair of TCI states determined from the indicated M>1 (or N>1) TCI states or pairs of TCI states to receive/monitor one or more PDCCH candidates in one or more CORESETs—i.e., PDCCH reception in a single-TRP system; if the 2-bit indicator is set to "01" (or "00"), the UE could use the secondary TCI state or pair of TCI states determined from the indicated M>1 (or N>1) TCI states or pairs of TCI states to receive/monitor one or more PDCCH candidates in one or more CORESETs—i.e., PDCCH reception in a single-TRP system; the primary and secondary TCI states/pairs of TCI states could be determined/configured according to those specified in the examples of the present disclosure.

If the 2-bit indicator is set to "10" (or "11"), the UE may follow the ordering of the indicated M>1 (or N>1) TCI states or pairs of TCI states to receive/monitor one or more PDCCH candidates from one or more search space sets configured with the same higher layer parameter searchSpaceLinking in one or more CORESETs associated with the indicated M>1 (or N>1) TCI states or pairs of TCI states (according to the example in the present disclosure); if the 2-bit indicator is set to "11" (or "10"), the UE may follow the order-reversed M>1 (or N>1) TCI states or pairs of TCI states to receive/monitor one or more PDCCH candidates from one or more search space sets configured with the same higher layer parameter searchSpaceLinking in one or more CORESETs associated with the order-reversed M>1 (or N>1) TCI states or pairs of TCI states (according to the example in the present disclosure).

Alternatively, if the 2-bit indicator is set to "10" (or "11"), the UE may follow a first ordering of the M>1 (or N>1) TCI states or pairs of TCI states to receive/monitor one or more PDCCH candidates from one or more search space sets configured with the same higher layer parameter searchSpaceLinking in one or more CORESETs associated with the M>1 (or N>1) TCI states or pairs of TCI states in the first ordering; if the 2-bit indicator is set to "11" (or "10"), the UE may follow a second ordering of the M>1 (or N>1) TCI states or pairs of TCI states to receive/monitor one or more PDCCH candidates from one or more search space sets configured with the same higher layer parameter searchSpaceLinking in one or more CORESETs associated with the M>1 (or N>1) TCI states or pairs of TCI states in the second ordering. The first and second orderings of TCI states/pairs of TCI states could be according to those specified in the example in the present disclosure.

Optionally, "00" or "01" of the 2-bit indicator could be used to indicate the orderings of the M>1 (or N>1) TCI states or pairs of TCI states for multi-TRP PDCCH (repetitions) reception as described above, and "10" or "11" of the 2-bit indicator could be used to indicate the primary or secondary TCI states/pairs of TCI states for single-TRP PDCCH reception as described above.

Yet for another example, the multi-bit indicator could correspond to a 2-bit indicator with four states "00," "01," "10," and "11," configured according to those specified in the example of the present disclosure. In addition, the UE could also receive in a DCI (e.g., DCI format 1_1 or 1_2 with or without DL assignment) a one-bit indicator. For this design example, a new/dedicated DCI field could be used/configured in the corresponding DCI format to indicate the one-bit indicator; alternatively, one of more of the existing DCI fields in the corresponding DCI format could be used/configured to indicate the one-bit indicator.

When the 2-bit indicator indicates the single-TRP PDCCH reception, if the one-bit indicator is set to "0" (or "1"), the UE could use the primary TCI state or pair of TCI states determined from the indicated M>1 (or N>1) TCI states or pairs of TCI states to receive/monitor one or more PDCCH candidates in one or more CORESETs; if the one-bit indicator is set to "1" (or "0"), the UE could use the secondary TCI state or pair of TCI states determined from the indicated M>1 (or N>1) TCI states or pairs of TCI states to receive/monitor one or more PDCCH candidates in one or more CORESETs; the primary and secondary TCI states/pairs of TCI states could be determined/configured according to those specified in the examples of the present disclosure.

Yet for another example, the multi-bit indicator could correspond to a z-bit indicator (z>1, e.g., z=3) with $2^z$ states (e.g., 8 states for z=3). In this example, a first state of the z-bit indicator could indicate that the single-TRP PDCCH reception is enabled according to the example and the corresponding sub-examples in the present disclosure, a second state of the z-bit indicator could indicate that the multi-TRP PDCCH (repetitions) reception is enabled according to the examples of the present disclosure and the corresponding sub-examples in the present disclosure, a third state of the z-bit indicator could indicate that the UE could use the primary TCI state or pair of TCI states for the single-TRP PDCCH reception as discussed in the example of the present disclosure and the corresponding sub-examples in the present disclosure, a fourth state of the z-bit indicator could indicate that the UE could use the secondary TCI state or pair of TCI states for the single-TRP PDCCH reception as discussed in the example of the present disclosure and the corresponding sub-examples in the present disclosure, a fifth state of the z-bit indicator could indicate an ordering of the M>1 (or N>1) TCI states or pairs of TCI states for the multi-TRP PDCCH (repetitions) reception as discussed in the example of the present disclosure, a sixth state of the z-bit indicator could indicate another ordering of the M>1 (or N>1) TCI states or pairs of TCI states for the multi-TRP PDCCH (repetitions) reception as discussed in the examples of the present disclosure.

In yet another example, the UE could first receive in a DCI (e.g., DCI format 1_1 or 1_2 with or without DL assignment) M=1 (or N=1) TCI state or pair of TCI states indicated by a TCI state codepoint (or a TCI field) as specified in the examples of the present disclosure and the corresponding sub-examples in the present disclosure. The UE could then receive in a DCI (e.g., DCI format 1_1 or 1_2 with or without DL assignment) M>1 (or N>1) TCI states or pairs of TCI states indicated by one or more TCI state codepoints (or one or more TCI fields) as specified in the example of the present disclosure and the corresponding sub-examples in the present disclosure, wherein one or more of the indicated M>1 (or N>1) TCI states or pairs of TCI states could be associated with/mapped to one or more CORESETs, in which one or more PDCCH candidates in one or more search space sets configured with the higher layer parameter searchSpaceLinking are received.

Furthermore, the UE could receive in a DCI (e.g., DCI format 1_1 or 1_2 with or without DL assignment) a multi-bit (>1 bit, e.g., 2-bit) indicator for PDCCH. For this design example, a new/dedicated DCI field could be used/configured in the corresponding DCI format to indicate the multi-bit indicator; alternatively, one of more of the existing DCI fields in the corresponding DCI format could be used/configured to indicate the multi-bit indicator. The multi-bit indicator for PDCCH could indicate one or more of: (1) single-TRP PDCCH reception, (2) multi-TRP PDCCH (repetitions) reception, (3) one or more orderings of the indicated TCI states or pairs of TCI states for single-TRP PDCCH reception or multi-TRP PDCCH (repetitions) reception, and (4) one or more TCI states or pairs of TCI states for single-TRP PDCCH reception or multi-TRP PDCCH (repetitions) reception.

The multi-bit indicator could be configured according to the examples of the present disclosure. For this example, if the multi-bit indicator indicates that the single-TRP PDCCH reception is enabled, the UE could follow the previously indicated M=1 (or N=1) TCI state or pair of TCI states to receive/monitor one or more PDCCH candidates in one or more CORESETs (as discussed in the example of the present disclosure and the corresponding sub-examples in the present disclosure).

The UE could receive from the network one or more MAC CE activation/subselection commands activating one or more sets of TCI states/TCI state IDs from the one or more TCI state pools (specified in the examples in the present disclosure) or the one or more TCI state groups (specified in the examples in the present disclosure), with each set of activated/selected TCI states/TCI state IDs used to map up to Nc≥1 (e.g., 8, 16, 32 or 64) TCI state codepoints in a DCI format. Here, a TCI state codepoint could be configured according to the examples and the corresponding sub-examples in the present disclosure. Furthermore, the one or more sets of activated/selected TCI state codepoints could include/contain/comprise one or more of the following examples.

A first set of TCI state codepoints for single-TRP PDCCH reception: the UE could receive in a DCI (e.g., DCI format 1_1 or 1_2 with or without DL assignment) M=1 (or N=1) TCI state or pair of TCI states indicated by a TCI state codepoint from the first set of TCI state codepoints; the UE could use the indicated TCI state or pair of TCI states for the single-TRP PDCCH reception A second set of TCI state codepoints for single-TRP PDCCH reception: the UE could receive in a DCI (e.g., DCI format 1_1 or 1_2 with or without DL assignment) M=1 (or N=1) TCI state or pair of TCI states indicated by a TCI state codepoint from the second set of TCI state codepoints; the UE could use the indicated TCI state or pair of TCI states as the primary TCI state or pair of TCI states as discussed in the example of the present disclosure and the corresponding sub-examples in the present disclosure for the single-TRP PDCCH reception.

A third set of TCI state codepoints for single-TRP PDCCH reception: the UE could receive in a DCI (e.g., DCI format 1_1 or 1_2 with or without DL assignment) M=1 (or N=1) TCI state or pair of TCI states indicated by a TCI state codepoint from the third set of TCI state codepoints; the UE could use the indicated TCI state or pair of TCI states as the secondary TCI state or pair of TCI states as discussed in the example of the present disclosure and the corresponding sub-examples in the present disclosure for the single-TRP PDCCH reception.

A fourth set of TCI state codepoints for multi-TRP PDCCH (repetitions) reception: the UE could receive in a DCI (e.g., DCI format 1_1 or 1_2 with or without DL assignment) M>1 (or N>1) TCI states or pairs of TCI states indicated by one or more TCI state codepoints from the fourth set of TCI state codepoints, wherein one or more of the indicated M>1 (or N>1) TCI states or pairs of TCI states could be associated with/mapped to one or more CORESETs, in which one or more PDCCH candidates in one or more search space sets configured with the higher layer parameter searchSpaceLinking are received.

A fifth set of TCI state codepoints for multi-TRP PDCCH (repetitions) reception: the UE could receive in a DCI (e.g., DCI format 1_1 or 1_2 with or without DL assignment) M>1 (or N>1) TCI states or pairs of TCI states indicated by one or more TCI state codepoints from the fifth set of TCI state codepoints, wherein one or more of the indicated M>1 (or N>1) TCI states or pairs of TCI states could be associated with/mapped to one or more CORESETs, in which one or more PDCCH candidates in one or more search space sets configured with the higher layer parameter searchSpaceLinking are received. The ordering of the indicated M>1 (or N>1) TCI states or pairs of TCI states from the fifth set could correspond to an ordering of M>1 (or N>1) TCI states or pairs of TCI states (e.g., the first ordering) discussed in the examples of the present disclosure.

A sixth set of TCI state codepoints for multi-TRP PDCCH (repetitions) reception: the UE could receive in a DCI (e.g., DCI format 1_1 or 1_2 with or without DL assignment) M>1 (or N>1) TCI states or pairs of TCI states indicated by one or more TCI state codepoints from the sixth set of TCI state codepoints, wherein one or more of the indicated M>1 (or N>1) TCI states or pairs of TCI states could be associated with/mapped to one or more CORESETs, in which one or more PDCCH candidates in one or more search space sets configured with the higher layer parameter searchSpaceLinking are received. The ordering of the indicated M>1 (or N>1) TCI states or pairs of TCI states from the sixth set could correspond to an ordering of M>1 (or N>1) TCI states or pairs of TCI states (e.g., the second ordering) discussed in the examples in the present disclosure.

The UE could be indicated by the network from which set(s) of TCI state codepoints the indicated one or more TCI states or pairs of TCI states are selected. This indication could be via higher layer RRC signaling or MAC CE command or dynamic DCI based signaling. For instance, a y-bit (y≥1) indicator could be configured/included/incorporated in a DCI format (e.g., DCI format 1_1 or 1_2 with or without DL assignment) to indicate the set(s) of TCI state codepoints. For this design example, a new/dedicated DCI field could be used/configured in the corresponding DCI format to indicate the y-bit indicator.

Alternatively, one of more of the existing DCI fields in the corresponding DCI format could be used/configured to indicate the y-bit indicator. Each state of the y-bit indicator (a total of 2^y states for the y-bit indicator) could correspond to a set of TCI state codepoints (e.g., the first set, the second set, the third set, the fourth set, the fifth set or the sixth set as specified above). For example, if a UE receives in the DCI format for beam indication (e.g., DCI format 1_1 or 1_2 with or without DL assignment) the y-bit indicator (e.g., set to a state), the UE could determine the set of TCI state codepoints corresponding to the indicated state of the y-bit indicator, from which the indicated one or more TCI states or pairs of TCI states are selected. According to the determined set of TCI state codepoints, the UE could perform/conduct the corresponding single-TRP PDCCH reception or multi-TRP PDCCH (repetitions) reception as discussed above.

In a second embodiment of the present disclosure, when a UE is configured/provided by the network higher layer parameter repetitionScheme set to one of "fdmSchemeA," "fdmSchemeB," and "tdmSchemeA" or higher layer parameter repetitionNumber in PDSCH-TimeDomainResourceAllocation, the UE could expect to receive PDSCH repetitions in overlapped or non-overlapped time or frequency domain resources.

When a UE is configured/provided by the network the higher layer parameter repetitionScheme set to "fdmSchemeA" and N>1 (or M>1) TCI states or pairs of TCI states indicated by one or more TCI state codepoints (or one or more TCI fields) in a DCI format (e.g., DCI format 1_1 or 1_2 with or without DL assignment), the UE could receive a single PDSCH transmission occasion of the transport block (TB) with each indicated TCI state or pairs of TCI states associated to a non-overlapping frequency domain resource allocation. A UE may assume that precoding granularity is $P_{BWP}$ resource blocks in the frequency domain, where $P_{BWP}$ can be equal to one of the values among {2, 4, wideband}. For N=2 or M=2, if $P_{BWP}$ is configured/determined as "wideband," the first $\lceil n_{PRB}/2 \rceil$ PRBs—referred to as a first PDSCH transmission in the present disclosure—are assigned to a first indicated TCI state/pair of TCI states, and the remaining $\lfloor n_{PRB}/2 \rfloor$ PRBs—referred to as a second PDSCH transmission in the present disclosure—are assigned to a second indicated TCI state/pair of TCI states, where $n_{PRB}$ is the total number of allocated PRBs for the UE.

If $P_{BWP}$ is configured/determined as one of the values among {2, 4}, even precoding resource block groups (PRGs) within the allocated frequency domain resources—referred to as a first PDSCH transmission in the present disclosure—are assigned to a first indicated TCI state/pair of TCI states, and odd PRGs within the allocated frequency domain resources—referred to as a second PDSCH transmission in the present disclosure—are assigned to a second indicated TCI state/pair of TCI states, wherein the PRGs are numbered continuously in increasing order with the first PRG index equal to 0. In the present disclosure, the first (or second) indicated TCI state/pair of TCI states could correspond to any of the indicated M=2 (or N=2) TCI states/pairs of TCI states.

When a UE is configured/provided by the network the higher layer parameter repetitionScheme set to "fdmSchemeB" and N>1 (or M>1) TCI states or pairs of TCI states indicated by one or more TCI state codepoints (or one or more TCI fields) in a DCI format (e.g., DCI format 1_1 or 1_2 with or without DL assignment), the UE could receive two PDSCH transmission occasions of the same TB with each indicated TCI state/pair of TCI states associated to a PDSCH transmission occasion which has non-overlapping frequency domain resource allocation with respect to the other PDSCH transmission occasion. A UE may assume that precoding granularity is $P_{BWP}$ resource blocks in the frequency domain, where $P_{BWP}$ can be equal to one of the values among {2, 4, wideband}.

For N=2 or M=2, if $P_{BWP}$ is configured/determined as "wideband," the first $\lceil n_{PRB}/2 \rceil$ PRBs —referred to as a first PDSCH transmission in the present disclosure—are assigned to a first indicated TCI state/pair of TCI states, and the remaining $\lfloor n_{PRB}/2 \rfloor$ PRBs—referred to as a second PDSCH transmission in the present disclosure—are assigned to a second indicated TCI state/pair of TCI states, where $n_{PRB}$ is the total number of allocated PRBs for the UE; if $P_{BWP}$ is configured/determined as one of the values among {2, 4}, even precoding resource block groups (PRGs) within the allocated frequency domain resources—referred to as a first PDSCH transmission in the present disclosure—are assigned to a first indicated TCI state/pair of TCI states, and odd PRGs within the allocated frequency domain resources—referred to as a second PDSCH transmission in the present disclosure—are assigned to a second indicated TCI state/pair of TCI states, wherein the PRGs are numbered continuously in increasing order with the first PRG index equal to 0. In the present disclosure, the first (or second) indicated TCI state/pair of TCI states could correspond to any of the indicated M=2 (or N=2) TCI states/pairs of TCI states.

When a UE is configured/provided by the network the higher layer parameter repetitionScheme set to "tdmSchemeA" and N>1 (or M>1) TCI states or pairs of TCI states indicated by one or more TCI state codepoints (or one or more TCI fields) in a DCI format (e.g., DCI format 1_1 or 1_2 with or without DL assignment), the UE could receive two PDSCH transmission occasions of the TB with each indicated TCI state/pair of TCI states associated to a PDSCH transmission occasion which has non-overlapping time domain resource allocation with respect to the other PDSCH transmission occasion and both PDSCH transmission occasions may be received within a given slot.

For M=2 or N=2, a first indicated TCI state/pair of TCI states could be applied to the first PDSCH transmission occasion; a second indicated TCI state/pair of TCI states could be applied to the second PDSCH transmission occasion, and the second PDSCH transmission occasion may have the same number of symbols as the first PDSCH transmission occasion. In the present disclosure, the first (or second) indicated TCI state/pair of TCI states could correspond to any of the indicated M=2 (or N=2) TCI states/pairs of TCI states.

When a UE is configured/provided by the network the higher layer parameter repetitionNumber in PDSCH-TimeDomainResourceAllocation, and N>1 (or M>1) TCI states or pairs of TCI states indicated by one or more TCI state codepoints (or one or more TCI fields) in a DCI format (e.g., DCI format 1_1 or 1_2 with or without DL assignment), the UE may expect to receive multiple slot level PDSCH transmission occasions of the same TB with the indicated M>1 (or N>1) TCI states/pairs of TCI states used across multiple PDSCH transmission occasions in the repetitionNumber consecutive slots.

For N=2 or M=2, when the value indicated by repetitionNumber in PDSCH-TimeDomainResourceAllocation equals to two, a first indicated TCI state is applied to the first PDSCH transmission occasion; a second indicated TCI state/pair of TCI states is applied to the second PDSCH transmission occasion. When the value of repetitionNumber in PDSCH-TimeDomainResourceAllocation is larger than two, the UE may be further configured to enable cyclicMapping or sequentialMapping. When cyclicMapping is enabled, a first indicated TCI state/pair of TCI states and a second indicated TCI state/pair of TCI states are applied to the first PDSCH transmission occasion and the second PDSCH transmission occasion, respectively, and the same TCI mapping pattern continues to the remaining PDSCH transmission occasions.

When sequentialMapping is enabled, a first indicated TCI state/pair of TCI states is applied to the first and second PDSCH transmission occasions, and a second indicated TCI state/pair of TCI states is applied to the third and fourth PDSCH transmission occasions, and the same TCI mapping pattern continues to the remaining PDSCH transmission occasions. In the present disclosure, the first (or second) indicated TCI state/pair of TCI states could correspond to any of the indicated M=2 (or N=2) TCI states/pairs of TCI states.

In a multi-TRP system, when a UE is not configured/provided by the network higher layer parameter repetitionScheme or repetitionNumber in PDSCH-TimeDomainResourceAllocation and the UE is indicated by the network M=2 (or N=2) TCI states or pairs of TCI states by one or more TCI state codepoints (or one or more TCI fields) in a DCI format (e.g., DCI format 1_1 or 1_2 with or without DL assignment) and DM-RS port(s) within two CDM groups in the DCI field "antenna Port(s)," a first indicated TCI state/pair of TCI states could correspond to the CDM group of the first antenna port indicated by the antenna port indication table—referred to as a first PDSCH transmission in the present disclosure, and a second TCI state/pair of TCI states could correspond to the other CDM group—referred to as a second PDSCH transmission in the present disclosure. In the present disclosure, the first (or second) indicated TCI state/pair of TCI states could correspond to any of the indicated M=2 (or N=2) TCI states/pairs of TCI states.

As aforementioned, the UE could receive in a DCI (e.g., DCI format 1_1 or 1_2 with or without DL assignment) M>1 (or N>1) TCI states or M>1 (or N>1) pairs of TCI states indicated by one or more TCI state codepoints (or one or more TCI fields) in the corresponding DCI. One or more of the indicated M>1 (or N>1) TCI states or pairs of TCI states could be associated with/mapped to the one or more PDSCH transmissions/transmission occasions.

Furthermore, the UE could receive in a DCI (e.g., DCI format 1_1 or 1_2 with or without DL assignment) one or more bits to indicate at least one of: (1) switching between single-TRP PDSCH reception and multi-TRP PDSCH (repetitions) reception, (2) one or more of the indicated M>1 (or N>1) TCI states or pairs of TCI states to use for the single-TRP PDSCH reception, and (3) switching the order of the indicated M>1 (or N>1) TCI states or pairs of TCI states. One or more new/dedicated DCI fields could be added/included/incorporated in the corresponding DCI format to indicate the one or more bits. Alternatively, one or more of the existing DCI fields in the corresponding DCI format could be repurposed to indicate the one or more bits.

In one example, the UE could first receive in a DCI (e.g., DCI format 1_1 or 1_2 with or without DL assignment) M>1 (or N>1) TCI states or pairs of TCI states indicated by one or more TCI state codepoints (or one or more TCI fields) as specified in the examples of the present disclosure and the corresponding sub-examples in the present disclosure, wherein one or more of the indicated M>1 (or N>1) TCI states or pairs of TCI states could be associated with/mapped to one or more PDSCH transmissions/transmission occasions as described above for the multi-TRP PDSCH (repetitions) reception.

The UE could also receive in a DCI (e.g., DCI format 1_1 or 1_2 with or without DL assignment) a one-bit flag indicator for PDSCH. For this design example, a new/dedicated DCI field could be used/configured in the corresponding DCI format to indicate the one-bit flag indicator; alternatively, one of more of the existing DCI fields in the corresponding DCI format could be used/configured to indicate the one-bit flag indicator. For instance, if the one-bit flag indicator for PDSCH is set to "1" (or "0") or "enabled," the UE could use only one of the indicated M>1 (or N>1) TCI states or pairs of TCI states to receive one or more PDSCHs or one or more layers of a PDSCH—i.e., PDSCH reception in a single-TRP system; if the one-bit flag indicator for PDSCH is set to "0" (or "1") or "disabled," the UE could use one or more of the indicated M>1 (or N>1) TCI states or pairs of TCI states to receive PDSCH transmissions/transmission occasions—i.e., PDSCH (repetitions) reception in a multi-TRP system. More specifically, if the one-bit flag indicator for PDSCH is set to "1" (or "0") or "enabled" (i.e., for the PDSCH reception in a single-TRP system).

For example, the UE could use the first TCI state or the TCI state with the lowest (or highest) TCI state ID among the indicated M>1 (or N>1) TCI states or the separate DL TCI state or the joint DL and UL TCI state in the first pair of TCI states or the separate DL TCI state or the joint DL and UL TCI state in the pair of TCI states associated with the lowest (or highest) TCI state ID among the indicated M>1 (or N>1) pairs of TCI states to receive one or more PDSCHs or one or more layers of a PDSCH.

For another example, the UE could use the second TCI state or the TCI state with the second lowest (or second highest) TCI state ID among the indicated M>1 (or N>1) TCI states or the separate DL TCI state or the joint DL and UL TCI state in the second pair of TCI states or the separate DL TCI state or the joint DL and UL TCI state in the pair of TCI states associated with the second lowest (or second highest) TCI state ID among the indicated M>1 (or N>1) pairs of TCI states to receive one or more PDSCHs or one or more layers of a PDSCH.

Yet for another example, the UE could use the last TCI state or the TCI state with the highest (or lowest) TCI state ID among the indicated M>1 (or N>1) TCI states or the separate DL TCI state or the joint DL and UL TCI state in the last pair of TCI states or the separate DL TCI state or the joint DL and UL TCI state in the pair of TCI states associated with the highest (or lowest) TCI state ID among the indicated M>1 (or N>1) pairs of TCI states to receive one or more PDSCHs or one or more layers of a PDSCH.

Yet for another example, the UE could use the m-th (or n-th) TCI state or the TCI state with the m-th (or n-th) lowest (or highest) TCI state ID among the indicated M>1 (or N>1) TCI states or the separate DL TCI state or the joint DL and UL TCI state in the m-th (or n-th) pair of TCI states or the separate DL TCI state or the joint DL and UL TCI state in the pair of TCI states associated with the m-th (or n-th) lowest (or highest) TCI state ID among the indicated M>1 (or N>1) pairs of TCI states to receive one or more PDSCHs or one or more layers of a PDSCH, where $m \in \{1, \ldots, M\}$ and $n \in \{1, \ldots, N\}$. In this example, the index m (or n) could be determined according to at least one of: (1) fixed in the system specification(s) and (2) configured, e.g., via higher layer RRC signaling or MAC CE command or DCI based signaling, by the network.

Yet for another example, the UE could use the separate DL TCI state or the joint DL and UL TCI state among the indicated M>1 (or N>1) TCI states to receive one or more PDSCHs or one or more layers of a PDSCH. In this example, only one of the indicated M>1 (or N>1) TCI states could correspond to a separate DL TCI state or a joint DL and UL TCI state.

Yet for another example, the UE could be higher layer configured by the network a list of K entity IDs. In the present disclosure, an entity ID could correspond to at least one of: a PCI value, a PCI index pointing to an entry/PCI in a list of PCI that are higher layer configured to the UE, a value of CORESETPoolIndex, a value of CORESETGroupIndex, a TRP ID, a TRP-specific higher layer signaling index, a CORESET ID, a resource ID/index, a resource set ID/index and etc. The UE could use the TCI state or the pair of TCI states that is associated with the first entity ID or the second entity ID or the last entity ID or the lowest entity ID or the highest entity ID or the second lowest (or second highest) entity ID or the entity ID associated with the serving cell PCI/PCI index or the entity ID associated with a PCI/PCI index different from the serving cell PCI/PCI index or the k-th entity ID or the k-th lowest (or highest) entity ID among the list of K entity IDs to receive one or more PDSCHs or one or more layers of a PDSCH, where $k \in \{1, \ldots, K\}$.

In this example, the index k could be determined according to at least one of: (1) fixed in the system specification(s) and (2) configured, e.g., via higher layer RRC signaling or MAC CE command or DCI based signaling, by the network. Furthermore, K could be equal to M (or N).

Yet for another example, the UE could be higher layer configured by the network a list of L PCIs. The UE could use the TCI state or the pair of TCI states that is associated with the first PCI or the second PCI or the last PCI or the lowest PCI or the highest PCI or the second lowest (or second highest) PCI or the serving cell PCI or a PCI different from the serving cell PCI or the l-th PCI or the l-th lowest (or highest) PCI among the list of L PCIs to receive one or more PDSCHs or one or more layers of a PDSCH, where $l \in \{1, \ldots, L\}$.

Alternatively, the UE could determine a list of L PCI indexes 0, L−1 or 1, L with each PCI index pointing to an entry in the list of L PCIs. For this case, the UE could use the TCI state or the pair of TCI states that is associated with the first PCI index or the second PCI index or the last PCI index or the lowest PCI index or the highest PCI index or the second lowest (or second highest) PCI index or the serving cell PCI index or a PCI index different from the serving cell PCI index or the l-th PCI index or the l-th lowest (or highest) PCI index among the list of L PCI indexes to receive one or more PDSCHs or one or more layers of a PDSCH, where $l \in \{1, \ldots, L\}$. In this example, the index l could be determined according to at least one of: (1) fixed in the system specification(s) and (2) configured, e.g., via higher layer RRC signaling or MAC CE command or DCI based signaling, by the network. Furthermore, L could be equal to M (or N).

Yet for another example, the UE could be provided in PDCCH-Config two values of CORESETPoolIndex (i.e., 0 and 1) for one or more CORESETs. The UE could use the TCI state or the pair of TCI states that is associated with value 0 of CORESETPoolIndex or value 1 of CORESETPoolIndex or value x of CORESETPoolIndex to receive one or more PDSCHs or one or more layers of a PDSCH, where $x \in \{0, 1\}$. In this example, the value x could be determined according to at least one of: (1) fixed in the system specification(s) and (2) configured, e.g., via higher layer RRC signaling or MAC CE command or DCI based signaling, by the network.

In another example, the UE could first receive in a DCI (e.g., DCI format 1_1 or 1_2 with or without DL assignment) M>1 (or N>1) TCI states or pairs of TCI states indicated by one or more TCI state codepoints (or one or more TCI fields) as specified in the examples of the present disclosure and the corresponding sub-examples in the present disclosure, wherein one or more of the indicated M>1 (or N>1) TCI states or pairs of TCI states could be associated with/mapped to one or more PDSCH transmissions/transmission occasions as described above for the multi-TRP PDSCH (repetitions) reception. The UE could also receive in a DCI (e.g., DCI format 1_1 or 1_2 with or without DL assignment) a one-bit indicator for PDSCH. For this design example, a new/dedicated DCI field could be used/configured in the corresponding DCI format to indicate the one-bit indicator; alternatively, one of more of the existing DCI fields in the corresponding DCI format could be used/configured to indicate the one-bit indicator.

If the one-bit indicator for PDSCH is set to "0" (or "1"), the UE could use one of the indicated M>1 (or N>1) TCI states or pairs of TCI states—a primary TCI state or pair of TCI states—to receive one or more PDSCHs or one or more layers of a PDSCH—i.e., PDSCH reception in a single-TRP system; if the one-bit indicator for PDSCH is set to "1" (or "0"), the UE could use another one of the indicated M>1 (or N>1) TCI states or pairs of TCI states—a secondary TCI state or pair of TCI states—to receive one or more PDSCHs or one or more layers of a PDSCH—i.e., PDSCH reception in a single-TRP system. Various design examples of determining the primary TCI state or pair of TCI states or the secondary TCI state or pair of TCI states are provided in the examples in the present disclosure.

In yet another example, the UE could first receive in a DCI (e.g., DCI format 1_1 or 1_2 with or without DL assignment) M>1 (or N>1) TCI states or pairs of TCI states—denoted and ordered by {TCI state/TCI states pair #a1, TCI state/TCI states pair #a2, TCI state/TCI states pair #aM (or #aN)}—indicated by one or more TCI state codepoints (or one or more TCI fields) as specified in the examples of the present disclosure and the corresponding sub-examples in the present disclosure, wherein one or more of the indicated M>1 (or N>1) TCI states or pairs of TCI states could be associated with/mapped to one or more PDSCH transmissions/PDSCH transmission occasions as described above for the multi-TRP PDSCH (repetitions) reception.

The UE could also receive in a DCI (e.g., DCI format 1_1 or 1_2 with or without DL assignment) a one-bit flag indicator to indicate TCI state(s)/pair(s) of TCI states ordering for PDSCH. For this design example, a new/dedicated DCI field could be used/configured in the corresponding DCI format to indicate the one-bit flag indicator; alternatively, one of more of the existing DCI fields in the corresponding DCI format could be used/configured to indicate the one-bit flag indicator.

For instance, if the one-bit flag indicator is set to "1" (or "0") or "enabled," the ordering of the indicated M>1 (or N>1) TCI states or pairs of TCI states are reversed, and the UE may follow the order-reversed M>1 (or N>1) TCI states or pairs of TCI states to receive one or more PDSCH transmissions/PDSCH transmission occasions associated with the order-reversed M>1 (or N>1) TCI states or pairs of TCI states, and if the one-bit flag indicator is set to "0" (or "1") or "disabled," the UE may follow the indicated M>1 (or N>1) TCI states or pairs of TCI states to receive one or more PDSCH transmissions/PDSCH transmission occasions associated with the indicated M>1 (or N>1) TCI states or pairs of TCI states. If the indicated M>1 (or N>1) TCI states or pairs of TCI states are (ordered as) {TCI state/TCI states pair #a1, TCI state/TCI states pair #a2, TCI state/TCI states pair #aM (or #aN)}, when the one-bit flag indicator is set to "1" (or "0") or "enabled," the (order-reversed) M>1 (or N>1) TCI states or pairs of TCI states may become to {TCI state/TCI states pair #b1, TCI state/TCI states pair #b2, TCI state/TCI states pair #bM (or #bN)}, where b1=aM (or aN), b2=a(M−1) or (a(N−1)), bM (or bN)=a1.

For M=2 (or N=2), the UE could first receive in a DCI (e.g., DCI format 1_1 or 1_2 with or without DL assignment) two TCI states or pairs of TCI states—denoted and ordered by {TCI state/TCI states pair #a1, TCI state/TCI states pair #a2}; if the one-bit flag indicator is set to "1" (or "0") or "enabled," the UE may follow the order-reversed two TCI states or pairs of TCI states {TCI state/TCI state pair #a2, TCI state/TCI state pair #a1} to receive one or more PDSCH transmissions/PDSCH transmission occasions (e.g., the first and second PDSCH transmissions or the first and second PDSCH transmission occasions as described above) associated with the order-reversed TCI states or pairs of TCI states {TCI state/TCI state pair #a2, TCI state/TCI state pair #a1}, and if the one-bit flag indicator is set to "0" or ("1") or "disabled," the UE may follow the indicated two TCI states or pairs of TCI states {TCI state/TCI state pair #a1, TCI state/TCI state pair #a2} to receive one or more PDSCH transmissions/PDSCH transmission occasions (e.g., the first and second PDSCH transmissions or the first and second PDSCH transmission occasions as described above) associated with the indicated TCI states or pairs of TCI states {TCI state/TCI state pair #a1, TCI state/TCI state pair #a2}.

In yet another example, the UE could first receive in a DCI (e.g., DCI format 1_1 or 1_2 with or without DL assignment) M>1 (or N>1) TCI states or pairs of TCI states—denoted by {TCI state/TCI states pair #a1, TCI state/TCI states pair #a2, TCI state/TCI states pair #aM (or #aN)}—indicated by one or more TCI state codepoints (or one or more TCI fields) as specified in the examples and the corresponding sub-examples in the present disclosure, wherein one or more of the indicated M>1 (or N>1) TCI states or pairs of TCI states could be associated with/mapped to one or more PDSCH transmissions/PDSCH transmission occasions as described above for the multi-TRP PDSCH (repetitions) reception. The UE could also receive in a DCI (e.g., DCI format 1_1 or 1_2 with or without DL assignment) a one-bit indicator to indicate TCI state(s)/pair(s) of TCI states ordering for PDSCH.

For this design example, a new/dedicated DCI field could be used/configured in the corresponding DCI format to indicate the one-bit indicator; alternatively, one of more of the existing DCI fields in the corresponding DCI format could be used/configured to indicate the one-bit indicator. For instance, if the one-bit indicator is set to "0" (or "1"), the UE may follow the M>1 (or N>1) TCI states or pairs of TCI states ordered by {TCI state/TCI states pair #a1, TCI state/TCI states pair #a2, . . . , TCI state/TCI states #aM (or #aN)}—a first ordering—to receive one or more PDSCH transmissions/transmission occasions associated with the M>1 (or N>1) TCI states or pairs of TCI states ordered by {TCI state/TCI states pair #a1, TCI state/TCI states pair #a2, . . . , TCI state/TCI states #aM (or #aN)}, and if the one-bit flag indicator is set to "1" (or "0"), the UE may follow the M>1 (or N>1) TCI states or pairs of TCI states ordered by {TCI state/TCI states pair #b1, TCI state/TCI states pair #b2, . . . , TCI state/TCI states #bM (or #bN)}—a second ordering—to receive one or more PDSCH transmissions/transmission occasions associated with the M>1 (or N>1) TCI states or pairs of TCI states ordered by {TCI state/TCI states pair #b1, TCI state/TCI states pair #b2, TCI state/TCI states #bM (or #bN)}. The first ordering of the TCI states/pairs of TCI states {TCI state/TCI states pair #a1, TCI state/TCI states pair #a2, TCI state/TCI states #aM (or #aN)} or the second ordering of the TCI states/pairs of TCI states {TCI state/TCI states pair #b1, TCI state/TCI states pair #b2, . . . , TCI state/TCI states #bM (or #bN)} could be determined according to at least one of: (1) fixed in the system specification(s) and (2) configured, e.g., via higher layer RRC signaling or MAC CE command or DCI based signaling, by the network.

For both (1) and (2), b1 could be equal to aM (or aN), b2 could be equal to a(M−1) or (a(N−1)), . . . , bM (or bN) could be equal to a1. For M=2 (or N=2), the UE could first receive in a DCI (e.g., DCI format 1_1 or 1_2 with or without DL assignment) two TCI states or pairs of TCI states—denoted by {TCI state/TCI states pair #a1, TCI state/TCI states pair #a2}; if the one-bit flag indicator is set to "0" (or "1"), the UE may follow the two TCI states or pairs of TCI states ordered by {TCI state/TCI state pair #a1, TCI state/TCI state pair #a2} to receive one or more PDSCH transmissions/transmission occasions (e.g., the first and second PDSCH transmissions or the first and second PDSCH transmission occasions as described above) associated with the two TCI states or pairs of TCI states ordered by {TCI state/TCI state pair #a1, TCI state/TCI state pair #a2}, and if the one-bit flag indicator is set to "1" or ("0"), the UE may follow the two TCI states or pairs of TCI states ordered by {TCI state/TCI state pair #a2, TCI state/TCI state pair #a1} to receive one or more PDSCH transmissions/transmission occasions (e.g., the first and second PDSCH transmissions or the first and second PDSCH transmission occasions as described above) associated with the two TCI states or pairs of TCI states {TCI state/TCI state pair #a2, TCI state/TCI state pair #a1}.

In yet another example, the UE could first receive in a DCI (e.g., DCI format 1_1 or 1_2 with or without DL assignment) M=1 (or N=1) TCI state or pair of TCI states indicated by a TCI state codepoint (or a TCI field) as specified in the examples and the corresponding sub-examples in the present disclosure. The UE could then receive in a DCI (e.g., DCI format 1_1 or 1_2 with or without DL assignment) M>1 (or N>1) TCI states or pairs of TCI states indicated by one or more TCI state codepoints (or one or more TCI fields) as specified in the examples and the corresponding sub-examples in the present disclosure, wherein one or more of the indicated M>1 (or N>1) TCI states or pairs of TCI states could be associated with/mapped to one or more PDSCH transmissions/transmission occasions as described above for the multi-TRP PDSCH (repetitions) reception.

For example, the UE may follow the latest indicated M>1 (or N>1) TCI states or pairs of TCI states to receive one or more PDSCH transmissions/transmission occasions associated with the latest indicated M>1 (or N>1) TCI states or pairs of TCI states—i.e., multi-TRP PDSCH (repetitions) reception.

For another example, the UE could receive in a DCI (e.g., DCI format 1_1 or 1_2 with or without DL assignment) a one-bit flag indicator for PDSCH. For this design example, a new/dedicated DCI field could be used/configured in the corresponding DCI format to indicate the one-bit flag indicator; alternatively, one of more of the existing DCI fields in the corresponding DCI format could be used/configured to indicate the one-bit flag indicator. For instance, if the one-bit flag indicator for PDSCH is set to "1" (or "0") or "enabled," the UE may follow the latest indicated M>1 (or N>1) TCI states or pairs of TCI states to receive one or more PDSCH transmissions/PDSCH transmission occasions associated with the latest indicated M>1 (or N>1) TCI states or pairs of TCI states—i.e., multi-TRP PDSCH (repetitions) reception. If the one-bit flag indicator for PDSCH is set to "0" (or "1") or "disabled," the UE may follow the previously indicated M=1 (or N=1) TCI state or pair of TCI states to receive one or more PDSCHs or one or more layers of a PDSCH—i.e., single-TRP PDSCH reception.

Yet for another example, the UE could receive in a DCI (e.g., DCI format 1_1 or 1_2 with or without DL assignment) a one-bit indicator for PDSCH. For this design example, a new/dedicated DCI field could be used/configured in the corresponding DCI format to indicate the one-bit indicator; alternatively, one of more of the existing DCI fields in the corresponding DCI format could be used/configured to indicate the one-bit indicator. For instance, if the one-bit indicator for PDSCH is set to "0" (or "1"), the UE may follow the previously indicated M=1 (or N=1) TCI state or pair of TCI states to receive one or more PDSCHs or one or more layers of a PDSCH—i.e., single-TRP PDSCH reception; if the one-bit indicator for PDSCH is set to "1" (or "0"), the UE may follow the latest indicated M>1 (or N>1) TCI states or pairs of TCI states to receive one or more PDSCH transmissions/transmission occasions associated with the latest indicated M>1 (or N>1) TCI states or pairs of TCI states—i.e., multi-TRP PDSCH (repetitions) reception.

In yet another example, the UE could first receive in a DCI (e.g., DCI format 1_1 or 1_2 with or without DL assignment) M>1 (or N>1) TCI states or pairs of TCI states indicated by one or more TCI state codepoints (or one or more TCI fields) as specified in the examples and the corresponding sub-examples in the present disclosure, wherein one or more of the indicated M>1 (or N>1) TCI states or pairs of TCI states could be associated with/mapped to one or more PDSCH transmissions/transmission occasions as described above for the multi-TRP PDSCH (repetitions) reception. The UE could also receive in a DCI (e.g., DCI format 1_1 or 1_2 with or without DL assignment) a multi-bit (>1 bit, e.g., 2-bit) indicator for PDSCH. For this design example, a new/dedicated DCI field could be used/configured in the corresponding DCI format to indicate the multi-bit indicator; alternatively, one of more of the existing DCI fields in the corresponding DCI format could be used/configured to indicate the multi-bit indicator.

The multi-bit indicator for PDSCH could indicate one or more of: (1) single-TRP PDSCH reception, (2) multi-TRP PDSCH (repetitions) reception, (3) one or more orderings of the indicated TCI states or pairs of TCI states for single-TRP PDSCH reception or multi-TRP PDSCH (repetitions) reception, and (4) one or more TCI states or pairs of TCI states for single-TRP PDSCH reception or multi-TRP PDSCH (repetitions) reception.

For example, the multi-bit indicator could correspond to a 2-bit indicator with four states "00," "01," "10," and "11." For instance, if the 2-bit indicator is set to "00" (or "01"), the UE could use only one of the indicated M>1 (or N>1) TCI states or pairs of TCI states to receive one or more PDSCHs or one or more layers of a PDSCH—i.e., PDSCH reception in a single-TRP system—following the design examples specified in the present disclosure; if the 2-bit indicator is set to "01" (or "00"), the UE could use one or more of the indicated M>1 (or N>1) TCI states or pairs of TCI states to receive one or more PDSCH transmissions/transmission occasions as described above—i.e., PDSCH (repetitions) reception in a multi-TRP system.

If the 2-bit indicator is set to "10" (or "11"), the UE may follow the ordering of the indicated M>1 (or N>1) TCI states or pairs of TCI states to receive one or more PDSCH transmissions/transmission occasions associated with the indicated M>1 (or N>1) TCI states or pairs of TCI states (according to the example in the present disclosure); if the 2-bit indicator is set to "11" (or "10"), the UE may follow the order-reversed M>1 (or N>1) TCI states or pairs of TCI states to receive one or more PDSCH transmissions/transmission occasions associated with the order-reversed M>1 (or N>1) TCI states or pairs of TCI states (according to the example in the present disclosure).

Alternatively, if the 2-bit indicator is set to "10" (or "11"), the UE may follow a first ordering of the M>1 (or N>1) TCI states or pairs of TCI states to receive one or more PDSCH transmissions/transmission occasions associated with the M>1 (or N>1) TCI states or pairs of TCI states in the first ordering; if the 2-bit indicator is set to "11" (or "10"), the UE may follow a second ordering of the M>1 (or N>1) TCI states or pairs of TCI states to receive one or more PDSCH transmissions/transmission occasions associated with the M>1 (or N>1) TCI states or pairs of TCI states in the second ordering. The first and second orderings of TCI states/pairs of TCI states could be according to those specified in the example in the present disclosure.

Optionally, "00" or "01" of the 2-bit indicator could be used to indicate the orderings of the M>1 (or N>1) TCI states or pairs of TCI states for multi-TRP PDSCH (repetitions) reception as described above, and "10" or "11" of the 2-bit indicator could be used to indicate the single-TRP PDSCH reception or the multi-TRP PDSCH (repetitions) reception as described in the present disclosure.

For another example, the multi-bit indicator could correspond to a 2-bit indicator with four states "00," "01," "10," and "11." For instance, if the 2-bit indicator is set to "00" (or "01"), the UE could use the primary TCI state or pair of TCI states determined from the indicated M>1 (or N>1) TCI states or pairs of TCI states to receive one or more PDSCHs or one or more layers of a PDSCH—i.e., PDSCH reception in a single-TRP system; if the 2-bit indicator is set to "01" (or "00"), the UE could use the secondary TCI state or pair of TCI states determined from the indicated M>1 (or N>1) TCI states or pairs of TCI states to receive one or more PDSCHs or one or more layers of a PDSCH—i.e., PDSCH reception in a single-TRP system; the primary and secondary TCI states/pairs of TCI states could be determined/configured according to those specified in the examples in the present disclosure.

If the 2-bit indicator is set to "10" (or "11"), the UE may follow the ordering of the indicated M>1 (or N>1) TCI states or pairs of TCI states to receive one or more PDSCH transmissions/transmission occasions associated with the indicated M>1 (or N>1) TCI states or pairs of TCI states (according to the example in the present disclosure); if the 2-bit indicator is set to "11" (or "10"), the UE may follow the order-reversed M>1 (or N>1) TCI states or pairs of TCI states to receive one or more PDSCH transmissions/transmission occasions associated with the order-reversed M>1 (or N>1) TCI states or pairs of TCI states (according to the example in the present disclosure).

Alternatively, if the 2-bit indicator is set to "10" (or "11"), the UE may follow a first ordering of the M>1 (or N>1) TCI states or pairs of TCI states to receive one or more PDSCH transmissions/transmission occasions associated with the M>1 (or N>1) TCI states or pairs of TCI states in the first ordering; if the 2-bit indicator is set to "11" (or "10"), the UE may follow a second ordering of the M>1 (or N>1) TCI states or pairs of TCI states to receive one or more PDSCH transmissions/transmission occasions associated with the M>1 (or N>1) TCI states or pairs of TCI states in the second ordering. The first and second orderings of TCI states/pairs of TCI states could be according to those specified in the example in the present disclosure.

Optionally, "00" or "01" of the 2-bit indicator could be used to indicate the orderings of the M>1 (or N>1) TCI states or pairs of TCI states for multi-TRP PDSCH (repetitions) reception as described above, and "10" or "11" of the 2-bit indicator could be used to indicate the primary or secondary TCI states/pairs of TCI states for single-TRP PDSCH reception as described in the present disclosure.

Yet for another example, the multi-bit indicator could correspond to a 2-bit indicator with four states "00," "01," "10," and "11," configured according to those specified in the example of the present disclosure. In addition, the UE could also receive in a DCI (e.g., DCI format 1_1 or 1_2 with or without DL assignment) a one-bit indicator. For this design example, a new/dedicated DCI field could be used/configured in the corresponding DCI format to indicate the one-bit indicator; alternatively, one of more of the existing DCI fields in the corresponding DCI format could be used/configured to indicate the one-bit indicator. When the 2-bit indicator indicates the single-TRP PDSCH reception, if the one-bit indicator is set to "0" (or "1"), the UE could use the primary TCI state or pair of TCI states determined from the indicated M>1 (or N>1) TCI states or pairs of TCI states to receive one or more PDSCHs or one or more layers of a PDSCH; if the one-bit indicator is set to "1" (or "0"), the UE could use the secondary TCI state or pair of TCI states determined from the indicated M>1 (or N>1) TCI states or pairs of TCI states to receive one or more PDSCHs or one or more layers of a PDSCH; the primary and secondary TCI states/pairs of TCI states could be determined/configured according to those specified in the examples of the present disclosure.

Yet for another example, the multi-bit indicator could correspond to a z-bit indicator (z>1, e.g., z=3) with $2^z$ states (e.g., 8 states for z=3). In this example, a first state of the z-bit indicator could indicate that the single-TRP PDSCH reception is enabled according to the example and the corresponding sub-examples in the present disclosure, a second state of the z-bit indicator could indicate that the multi-TRP PDSCH (repetitions) reception is enabled according to the examples and the corresponding sub-examples in the present disclosure, a third state of the z-bit indicator could indicate that the UE could use the primary TCI state or pair of TCI states for the single-TRP PDSCH reception as discussed in the example and the corresponding sub-examples in the present disclosure, a fourth state of the z-bit indicator could indicate that the UE could use the secondary TCI state or pair of TCI states for the single-TRP PDSCH reception as discussed in the example and the corresponding sub-examples in the present disclosure, a fifth state of the z-bit indicator could indicate an ordering of the M>1 (or N>1) TCI states or pairs of TCI states for the multi-TRP PDSCH (repetitions) reception as discussed in the example in the present disclosure, a sixth state of the z-bit indicator could indicate another ordering of the M>1 (or N>1) TCI states or pairs of TCI states for the multi-TRP PDSCH (repetitions) reception as discussed in the examples in the present disclosure.

In yet another example, the UE could first receive in a DCI (e.g., DCI format 1_1 or 1_2 with or without DL assignment) M=1 (or N=1) TCI state or pair of TCI states indicated by a TCI state codepoint (or a TCI field) as specified in the examples and the corresponding sub-examples in the present disclosure. The UE could then receive in a DCI (e.g., DCI format 1_1 or 1_2 with or without DL assignment) M>1 (or N>1) TCI states or pairs of TCI states indicated by one or more TCI state codepoints (or one or more TCI fields) as specified in the examples and the corresponding sub-examples in the present disclosure, wherein one or more of the indicated M>1 (or N>1) TCI states or pairs of TCI states could be associated with/mapped to one or more PDSCH transmissions/PDSCH transmission occasions as described above for the multi-TRP PDSCH (repetitions) reception.

Furthermore, the UE could receive in a DCI (e.g., DCI format 1_1 or 1_2 with or without DL assignment) a multi-bit (>1 bit, e.g., 2-bit) indicator for PDSCH. For this design example, a new/dedicated DCI field could be used/configured in the corresponding DCI format to indicate the multi-bit indicator; alternatively, one of more of the existing DCI fields in the corresponding DCI format could be used/configured to indicate the multi-bit indicator. The multi-bit indicator for PDSCH could indicate one or more of: (1) single-TRP PDSCH reception, (2) multi-TRP PDSCH (repetitions) reception, (3) one or more orderings of the indicated TCI states or pairs of TCI states for single-TRP PDSCH reception or multi-TRP PDSCH (repetitions) reception, and (4) one or more TCI states or pairs of TCI states for single-TRP PDSCH reception or multi-TRP PDSCH (repetitions) reception.

The multi-bit indicator could be configured according to the examples in the present disclosure. For this example, if the multi-bit indicator indicates that the single-TRP PDSCH reception is enabled, the UE could follow the previously indicated M=1 (or N=1) TCI state or pair of TCI states to receive one or more PDSCHs or one or more layers of a PDSCH (as discussed in the example and the corresponding sub-examples in the present disclosure).

The UE could receive from the network one or more MAC CE activation/subselection commands activating one or more sets of TCI states/TCI state IDs from the one or more TCI state pools (specified in the examples in the present disclosure) or the one or more TCI state groups (specified in the examples in the present disclosure), with each set of activated/selected TCI states/TCI state IDs used to map up to $N_c \geq 1$ (e.g., 8, 16, 32 or 64) TCI state codepoints in a DCI format. Here, a TCI state codepoint could be configured according to the examples and the corresponding sub-examples in the present disclosure. Furthermore, the one or more sets of activated/selected TCI state codepoints could include/contain/comprise one or more of the following examples.

A first set of TCI state codepoints for single-TRP PDSCH reception: the UE could receive in a DCI (e.g., DCI format 1_1 or 1_2 with or without DL assignment) M=1 (or N=1) TCI state or pair of TCI states indicated by a TCI state codepoint from the first set of TCI state codepoints; the UE could use the indicated TCI state or pair of TCI states for the single-TRP PDSCH reception.

A second set of TCI state codepoints for single-TRP PDSCH reception: the UE could receive in a DCI (e.g., DCI format 1_1 or 1_2 with or without DL assignment) M=1 (or N=1) TCI state or pair of TCI states indicated by a TCI state codepoint from the second set of TCI state codepoints; the UE could use the indicated TCI state or pair of TCI states as the primary TCI state or pair of TCI states as discussed in the example and the corresponding sub-examples in the present disclosure for the single-TRP PDSCH reception.

A third set of TCI state codepoints for single-TRP PDSCH reception: the UE could receive in a DCI (e.g., DCI format 1_1 or 1_2 with or without DL assignment) M=1 (or N=1) TCI state or pair of TCI states indicated by a TCI state codepoint from the third set of TCI state codepoints; the UE could use the indicated TCI state or pair of TCI states as the secondary TCI state or pair of TCI states as discussed in the example and the corresponding sub-examples in the present disclosure for the single-TRP PDSCH reception.

A fourth set of TCI state codepoints for multi-TRP PDSCH (repetitions) reception: the UE could receive in a DCI (e.g., DCI format 1_1 or 1_2 with or without DL assignment) M>1 (or N>1) TCI states or pairs of TCI states indicated by one or more TCI state codepoints from the fourth set of TCI state codepoints, wherein one or more of the indicated M>1 (or N>1) TCI states or pairs of TCI states could be associated with/mapped to one or more PDSCH transmissions/transmission occasions as described above for the multi-TRP PDSCH (repetitions) reception.

A fifth set of TCI state codepoints for multi-TRP PDSCH (repetitions) reception: the UE could receive in a DCI (e.g., DCI format 1_1 or 1_2 with or without DL assignment) M>1 (or N>1) TCI states or pairs of TCI states indicated by one or more TCI state codepoints from the fifth set of TCI state codepoints, wherein one or more of the indicated M>1 (or N>1) TCI states or pairs of TCI states could be associated with/mapped to one or more PDSCH transmissions/transmission occasions as described above for the multi-TRP PDSCH (repetitions) reception. The ordering of the indicated M>1 (or N>1) TCI states or pairs of TCI states from the fifth set could correspond to an ordering of M>1 (or N>1) TCI states or pairs of TCI states (e.g., the first ordering) discussed in the examples in the present disclosure.

A sixth set of TCI state codepoints for multi-TRP PDSCH (repetitions) reception: the UE could receive in a DCI (e.g., DCI format 1_1 or 1_2 with or without DL assignment) M>1 (or N>1) TCI states or pairs of TCI states indicated by one or more TCI state codepoints from the sixth set of TCI state codepoints, wherein one or more of the indicated M>1 (or N>1) TCI states or pairs of TCI states could be associated with/mapped to one or more PDSCH transmissions/transmission occasions as described above for the multi-TRP PDSCH (repetitions) reception. The ordering of the indicated M>1 (or N>1) TCI states or pairs of TCI states from the sixth set could correspond to an ordering of M>1 (or N>1) TCI states or pairs of TCI states (e.g., the second ordering) discussed in the examples in the present disclosure.

The UE could be indicated by the network from which set(s) of TCI state codepoints the indicated one or more TCI states or pairs of TCI states are selected. This indication could be via higher layer RRC signaling or MAC CE command or dynamic DCI based signaling. For instance, a y-bit (y≥1) indicator could be configured/included/incorporated in a DCI format (e.g., DCI format 1_1 or 1_2 with or without DL assignment) to indicate the set(s) of TCI state codepoints. For this design example, a new/dedicated DCI field could be used/configured in the corresponding DCI format to indicate the y-bit indicator; alternatively, one of more of the existing DCI fields in the corresponding DCI format could be used/configured to indicate the y-bit indicator.

Each state of the y-bit indicator (a total of $2^\wedge y$ states for the y-bit indicator) could correspond to a set of TCI state codepoints (e.g., the first set, the second set, the third set, the fourth set, the fifth set or the sixth set as specified above). For example, if a UE receives in the DCI format for beam indication (e.g., DCI format 1_1 or 1_2 with or without DL assignment) the y-bit indicator (e.g., set to a state), the UE could determine the set of TCI state codepoints corresponding to the indicated state of the y-bit indicator, from which the indicated one or more TCI states or pairs of TCI states are selected. According to the determined set of TCI state codepoints, the UE could perform/conduct the corresponding single-TRP PDSCH reception or multi-TRP PDSCH (repetitions) reception as discussed above.

In a third embodiment of the present disclosure, a UE could be configured with a number of slots, denoted by $N_{pucch}$, for PUCCH transmission repetitions. The UE could also be configured with two SRS resource sets (e.g., provided by srs-ResourceSetToAddModList or srs-ResourceSetToAddModListDCI-0-2) with higher layer parameter usage in SRS-ResourceSet set to "codebook" or "noncodebook" for PUSCH transmission repetitions. As aforementioned, the UE could receive in a DCI (e.g., DCI format 1_1 or 1_2 with or without DL assignment) M>1 (or N>1) TCI states or M>1 (or N>1) pairs of TCI states indicated by one or more TCI state codepoints (or one or more TCI fields) in the corresponding DCI. One or more of the indicated M>1 (or N>1) TCI states or pairs of TCI states could be associated with/mapped to one or more PUCCH transmission repetitions or one or more PUSCH transmission repetitions.

When a UE is configured with a number of slots $N_{pucch}$ for PUCCH transmission repetitions, the indicated N>1 (or M>1) TCI states or pairs of TCI states could be alternated per $N_{pucch}$ repetitions of the PUCCH transmission, where $N_{pucch}=1$ if higher layer parameter mappingPattern="cyclicMapping"; else, $N_{pucch}=N$ (or M). For instance, for N=2 (or M=2), a first and a second indicated TCI states/pairs of TCI states could be alternated per $N_{pucch}$ repetitions of the PUCCH transmission, where $N_{pucch}=1$ if the higher layer parameter mappingPattern="cyclicMapping"; else, $N_{pucch}=2$. In the present disclosure, the first (or second) indicated TCI state/pair of TCI states could correspond to any of the indicated M=2 (or N=2) TCI states/pairs of TCI states.

When a UE is configured with two SRS resource sets (e.g., provided by srs-ResourceSetToAddModList or srs-ResourceSetToAddModListDCI-0-2) with higher layer parameter usage in SRS-ResourceSet set to "codebook" or "noncodebook," for PUSCH repetition Type A, in case K>1 consecutive slots, the same symbol allocation is applied across the K consecutive slots and the PUSCH is limited to a single transmission layer. The UE may repeat the TB across the K consecutive slots applying the same symbol allocation in each slot—also referred to as PUSCH transmission repetitions.

In one example, (1) when K=2, M=2 or N=2, a first and a second indicated TCI states/pairs of TCI states are applied to the first and second slots of 2 consecutive slots, respectively; (2) when K>2 and cyclicMapping in PUSCH-Config is enabled, the indicated TCI state/pair of TCI states n (or m) is applied to the n-th (or m-th) slot of K consecutive slots, and the same TCI state(s) mapping pattern continues to the remaining slots of K consecutive slots. For M=2 or N=2, a first and a second indicated TCI states/pairs of TCI states are applied to the first and second slots of K consecutive slots, respectively, and the same TCI state(s) mapping pattern continues to the remaining slots of K consecutive slots; (3) when K>2 and sequentialMapping in PUSCH-Config is enabled, the indicated TCI state/pair of TCI states n (or m) is applied to the n-th (or m-th) and (n+1)-th (or (m+1)-th) slots of K consecutive slots, and the same TCI state(s) mapping pattern continues to the remaining slots of K consecutive slots.

For M=2 or N=2, a first indicated TCI state/pair of TCI states is applied to the first and second slots of K consecutive slots, and a second indicated TCI state/pair of TCI states is applied to the third and fourth slots of K consecutive slots, and the same TCI state(s) mapping pattern continues to the remaining slots of K consecutive slots. In the present disclosure, the first (or second) indicated TCI state/pair of TCI states could correspond to any of the indicated M=2 (or N=2) TCI states/pairs of TCI states. In this example, the first and second indicated TCI states/pairs of TCI states could correspond to the first and second TCI states/pairs of TCI states of/within the indicated M=2 (or N=2) TCI states/pairs of TCI states, respectively.

In another example, (1) when K=2, M=2 or N=2, a second and a first indicated TCI states/pairs of TCI states are applied to the first and second slots of 2 consecutive slots, respectively; (2) when K>2 and cyclicMapping in PUSCH-Config is enabled, for M=2 or N=2, a second and a first indicated TCI states/pairs of TCI states are applied to the first and second slots of K consecutive slots, respectively, and the same TCI state(s) mapping pattern continues to the remaining slots of K consecutive slots; (3) when K>2 and sequentialMapping in PUSCH-Config is enabled, for M=2 or N=2, a second indicated TCI state/pair of TCI states is applied to the first and second slots of K consecutive slots, and a first indicated TCI state/pair of TCI states is applied to the third and fourth slots of K consecutive slots, and the same TCI state(s) mapping pattern continues to the remaining slots of K consecutive slots. In the present disclosure, the first (or second) indicated TCI state/pair of TCI states could correspond to any of the indicated M=2 (or N=2) TCI states/pairs of TCI states. In this example, the first and second indicated TCI states/pairs of TCI states could correspond to the first and second TCI states/pairs of TCI states of/within the indicated M=2 (or N=2) TCI states/pairs of TCI states, respectively.

When a UE is configured with two SRS resource sets (e.g., provided by srs-ResourceSetToAddModList or srs-ResourceSetToAddModListDCI-0-2) with higher layer parameter usage in SRS-ResourceSet set to "codebook" or "noncodebook," for PUSCH repetition Type B, in case K>1 consecutive slots, the same symbol allocation is applied across the K consecutive slots and the PUSCH is limited to a single transmission layer. The UE may repeat the TB across the K consecutive slots applying the same symbol allocation in each slot—also referred to as PUSCH (nominal) transmission repetitions. One or more of the indicated M>1 (or N>1) TCI states/pairs of TCI states could be associated/mapped to nominal PUSCH repetitions. The association/mapping between the indicated TCI states/pairs of TCI states and the nominal PUSCH repetitions could follow those specified in the examples in the present disclosure (for PUSCH Type A repetition) by considering nominal repetitions instead of slots.

Furthermore, the UE could receive in a DCI (e.g., DCI format 1_1 or 1_2 with or without DL assignment) one or more bits to indicate at least one of: (1) switching between single-TRP PUCCH or PUSCH transmission and multi-TRP PUCCH or PUSCH (repetitions) transmission, (2) one or more of the indicated M>1 (or N>1) TCI states or pairs of TCI states to use for the single-TRP PUCCH or PUSCH transmission, and (3) switching the order of the indicated M>1 (or N>1) TCI states or pairs of TCI states for multi-TRP PUCCH or PUSCH (repetitions) transmission. One or more new/dedicated DCI fields could be added/included/incorporated in the corresponding DCI format to indicate the one or more bits. Alternatively, one or more of the existing DCI fields in the corresponding DCI format could be repurposed to indicate the one or more bits.

In one example, the UE could first receive in a DCI (e.g., DCI format 1_1 or 1_2 with or without DL assignment) M>1 (or N>1) TCI states or pairs of TCI states indicated by one or more TCI state codepoints (or one or more TCI fields) as specified in the examples and the corresponding sub-examples in the present disclosure, wherein one or more of the indicated M>1 (or N>1) TCI states or pairs of TCI states could be associated with/mapped to one or more PUCCH transmission repetitions or PUSCH transmission repetitions as described above for the multi-TRP PUCCH or PUSCH (repetitions) transmission.

The UE could also receive in a DCI (e.g., DCI format 1_1 or 1_2 with or without DL assignment) a one-bit flag indicator for PUCCH or PUSCH. For this design example, a new/dedicated DCI field could be used/configured in the corresponding DCI format to indicate the one-bit flag indicator; alternatively, one of more of the existing DCI fields in the corresponding DCI format could be used/configured to indicate the one-bit flag indicator. For instance, if the one-bit flag indicator for PUCCH or PUSCH is set to "1" (or "0") or "enabled," the UE could use only one of the indicated M>1 (or N>1) TCI states or pairs of TCI states to transmit PUCCH(s) or PUSCH(s)—i.e., PUCCH or PUSCH transmission in a single-TRP system; if the one-bit flag indicator for PUCCH or PUSCH is set to "0" (or "1") or "disabled," the UE could use one or more of the indicated M>1 (or N>1) TCI states or pairs of TCI states to transmit PUCCH transmission repetitions or PUSCH transmission repetitions—i.e., PUCCH or PUSCH (repetitions) transmission in a multi-TRP system. More specifically, if the one-bit flag indicator for PUCCH or PUSCH is set to "1" (or "0") or "enabled" (i.e., for the PUCCH or PUSCH transmission in a single-TRP system).

For example, the UE could use the first TCI state or the TCI state with the lowest (or highest) TCI state ID among the indicated M>1 (or N>1) TCI states or the separate UL TCI state or the joint DL and UL TCI state in the first pair of TCI states or the separate UL TCI state or the joint DL and UL TCI state in the pair of TCI states associated with the lowest (or highest) TCI state ID among the indicated M>1 (or N>1) pairs of TCI states to transmit the PUCCH(s) or PUSCH(s).

For another example, the UE could use the second TCI state or the TCI state with the second lowest (or second highest) TCI state ID among the indicated M>1 (or N>1) TCI states or the separate UL TCI state or the joint DL and UL TCI state in the second pair of TCI states or the separate UL TCI state or the joint DL and UL TCI state in the pair of TCI states associated with the second lowest (or second highest) TCI state ID among the indicated M>1 (or N>1) pairs of TCI states to transmit the PUCCH(s) or PUSCH(s).

Yet for another example, the UE could use the last TCI state or the TCI state with the highest (or lowest) TCI state ID among the indicated M>1 (or N>1) TCI states or the separate UL TCI state or the joint DL and UL TCI state in the last pair of TCI states or the separate UL TCI state or the joint DL and UL TCI state in the pair of TCI states associated with the highest (or lowest) TCI state ID among the indicated M>1 (or N>1) pairs of TCI states to transmit the PUCCH(s) or PUSCH(s).

Yet for another example, the UE could use the m-th (or n-th) TCI state or the TCI state with the m-th (or n-th) lowest (or highest) TCI state ID among the indicated M>1 (or N>1) TCI states or the separate UL TCI state or the joint DL and UL TCI state in the m-th (or n-th) pair of TCI states or the separate UL TCI state or the joint DL and UL TCI state in the pair of TCI states associated with the m-th (or n-th) lowest (or highest) TCI state ID among the indicated M>1 (or N>1) pairs of TCI states to transmit the PUCCH(s) or PUSCH(s), where m∈{1, . . . , M} and n∈{1, . . . , N}. In this example, the index m (or n) could be determined according to at least one of: (1) fixed in the system specification(s) and (2) configured, e.g., via higher layer RRC signaling or MAC CE command or DCI based signaling, by the network.

Yet for another example, the UE could use the separate UL TCI state or the joint DL and UL TCI state among the indicated M>1 (or N>1) TCI states to transmit the PUCCH(s) or PUSCH(s). In this example, only one of the indicated M>1 (or N>1) TCI states could correspond to a separate UL TCI state or a joint DL and UL TCI state.

Yet for another example, the UE could be higher layer configured by the network a list of K entity IDs. In the present disclosure, an entity ID could correspond to at least one of: a PCI value, a PCI index pointing to an entry/PCI in a list of PCI that are higher layer configured to the UE, a value of CORESETPoolIndex, a value of CORESET-GroupIndex, a TRP ID, a TRP-specific higher layer signaling index, a CORESET ID, a resource ID/index, a resource set ID/index and etc. The UE could use the TCI state or the pair of TCI states that is associated with the first entity ID or the second entity ID or the last entity ID or the lowest entity ID or the highest entity ID or the second lowest (or second highest) entity ID or the entity ID associated with the serving cell PCI/PCI index or the entity ID associated with a PCI/PCI index different from the serving cell PCI/PCI index or the k-th entity ID or the k-th lowest (or highest) entity ID among the list of K entity IDs to transmit the PUCCH(s) or PUSCH(s), where k∈{1, . . . , K}. In this example, the index k could be determined according to at least one of: (1) fixed in the system specification(s) and (2) configured, e.g., via higher layer RRC signaling or MAC CE command or DCI based signaling, by the network. Furthermore, K could be equal to M (or N).

Yet for another example, the UE could be higher layer configured by the network a list of L PCIs. The UE could use the TCI state or the pair of TCI states that is associated with the first PCI or the second PCI or the last PCI or the lowest PCI or the highest PCI or the second lowest (or second highest) PCI or the serving cell PCI or a PCI different from the serving cell PCI or the l-th PCI or the l-th lowest (or highest) PCI among the list of L PCIs to transmit the PUCCH(s) or PUSCH(s), where l∈{1, . . . , L}.

Alternatively, the UE could determine a list of L PCI indexes 0, . . . , L−1 or 1, . . . , L with each PCI index pointing to an entry in the list of L PCIs. For this case, the UE could use the TCI state or the pair of TCI states that is associated with the first PCI index or the second PCI index or the last PCI index or the lowest PCI index or the highest PCI index or the second lowest (or second highest) PCI index or the serving cell PCI index or a PCI index different from the serving cell PCI index or the l-th PCI index or the l-th lowest (or highest) PCI index among the list of L PCI indexes to transmit the PUCCH(s) or PUSCH(s), where l∈{1, . . . , L}. In this example, the index l could be determined according to at least one of: (1) fixed in the system specification(s) and (2) configured, e.g., via higher layer RRC signaling or MAC CE command or DCI based signaling, by the network. Furthermore, L could be equal to M (or N).

Yet for another example, the UE could be provided in PDCCH-Config two values of CORESETPoolIndex (i.e., 0 and 1) for one or more CORESETs. The UE could use the TCI state or the pair of TCI states that is associated with value 0 of CORESETPoolIndex or value 1 of CORESETPoolIndex or value x of CORESETPoolIndex to transmit the PUCCH(s) or PUSCH(s), where x∈{0, 1}. In this example, the value x could be determined according to at least one of: (1) fixed in the system specification(s) and (2) configured, e.g., via higher layer RRC signaling or MAC CE command or DCI based signaling, by the network.

In another example, the UE could first receive in a DCI (e.g., DCI format 1_1 or 1_2 with or without DL assignment) M>1 (or N>1) TCI states or pairs of TCI states indicated by one or more TCI state codepoints (or one or more TCI fields) as specified in the examples and the corresponding sub-examples in the present disclosure, wherein one or more of the indicated M>1 (or N>1) TCI states or pairs of TCI states could be associated with/mapped to one or more PUCCH transmission repetitions or PUSCH transmission repetitions as described above for the multi-TRP PUCCH or PUSCH (repetitions) transmission.

The UE could also receive in a DCI (e.g., DCI format 1_1 or 1_2 with or without DL assignment) a one-bit indicator for PUCCH or PUSCH. For this design example, a new/dedicated DCI field could be used/configured in the corresponding DCI format to indicate the one-bit indicator; alternatively, one of more of the existing DCI fields in the corresponding DCI format could be used/configured to indicate the one-bit indicator. If the one-bit indicator for PUCCH or PUSCH is set to "0" (or "1"), the UE could use one of the indicated M>1 (or N>1) TCI states or pairs of TCI states—a primary TCI state or pair of TCI states—to transmit PUCCH(s) or PUSCH(s)—i.e., PUCCH or PUSCH transmission in a single-TRP system; if the one-bit indicator for PUCCH or PUSCH is set to "1" (or "0"), the UE could use another one of the indicated M>1 (or N>1) TCI states or pairs of TCI states—a secondary TCI state or pair of TCI states—to transmit PUCCH(s) or PUSCH(s)—i.e., PUCCH or PUSCH transmission in a single-TRP system. Various design examples of determining the primary TCI state or pair of TCI states or the secondary TCI state or pair of TCI states are provided in the examples of the present disclosure.

In yet another example, the UE could first receive in a DCI (e.g., DCI format 1_1 or 1_2 with or without DL assignment) M>1 (or N>1) TCI states or pairs of TCI states—denoted and ordered by {TCI state/TCI states pair #a1, TCI state/TCI states pair #a2, TCI state/TCI states pair #aM (or #aN)}—indicated by one or more TCI state codepoints (or one or more TCI fields) as specified in the examples and the corresponding sub-examples in the present disclosure, wherein one or more of the indicated M>1 (or N>1) TCI states or pairs of TCI states could be associated with/mapped to one or more PUCCH transmission repetitions or PUSCH transmission repetitions as described above for the multi-TRP PUCCH or PUSCH (repetitions) reception.

The UE could also receive in a DCI (e.g., DCI format 1_1 or 1_2 with or without DL assignment) a one-bit flag indicator to indicate TCI state(s)/pair(s) of TCI states ordering for PUCCH or PUSCH. For this design example, a new/dedicated DCI field could be used/configured in the corresponding DCI format to indicate the one-bit flag indicator; alternatively, one of more of the existing DCI fields in the corresponding DCI format could be used/configured to indicate the one-bit flag indicator. For instance, if the one-bit flag indicator is set to "1" (or "0") or "enabled," the ordering of the indicated M>1 (or N>1) TCI states or pairs of TCI states are reversed, and the UE may follow the order-reversed M>1 (or N>1) TCI states or pairs of TCI states to transmit one or more PUCCH transmission repetitions or PUSCH transmission repetitions associated with the order-reversed M>1 (or N>1) TCI states or pairs of TCI states, and if the one-bit flag indicator is set to "0" (or "1") or "disabled," the UE may follow the indicated M>1 (or N>1) TCI states or pairs of TCI states to transmit one or more PUCCH transmission repetitions or PUSCH transmission repetitions associated with the indicated M>1 (or N>1) TCI states or pairs of TCI states. If the indicated M>1 (or N>1) TCI states or pairs of TCI states are (ordered as) {TCI state/TCI states pair #a1, TCI state/TCI states pair #a2, . . . , TCI state/TCI states pair #aM (or #aN)}, when the one-bit flag indicator is set to "1" (or "0") or "enabled," the (order-reversed) M>1 (or N>1) TCI states or pairs of TCI states may become to {TCI state/TCI states pair #b1, TCI state/TCI states pair #b2, . . . , TCI state/TCI states pair #bM (or #bN)}, where b1=aM (or aN), b2=a(M−1) or (a(N−1)), bM (or bN)=a1.

For M=2 (or N=2), the UE could first receive in a DCI (e.g., DCI format 1_1 or 1_2 with or without DL assignment) two TCI states or pairs of TCI states—denoted and ordered by {TCI state/TCI states pair #a1, TCI state/TCI states pair #a2}; if the one-bit flag indicator is set to "1" (or "0") or "enabled," the UE may follow the order-reversed two TCI states or pairs of TCI states {TCI state/TCI state pair #a2, TCI state/TCI state pair #a1} to transmit one or more PUCCH transmission repetitions or PUSCH transmission repetitions associated with the order-reversed TCI states or pairs of TCI states {TCI state/TCI state pair #a2, TCI state/TCI state pair #a1}, and if the one-bit flag indicator is set to "0" or ("1") or "disabled,"

the UE may follow the indicated two TCI states or pairs of TCI states {TCI state/TCI state pair #a1, TCI state/TCI state pair #a2} to transmit one or more PUCCH transmission repetitions or PUSCH transmission repetitions associated with the indicated TCI states or pairs of TCI states {TCI state/TCI state pair #a1, TCI state/TCI state pair #a2}.

In yet another example, the UE could first receive in a DCI (e.g., DCI format 1_1 or 1_2 with or without DL assignment) M>1 (or N>1) TCI states or pairs of TCI states—denoted by {TCI state/TCI states pair #a1, TCI state/TCI states pair #a2, TCI state/TCI states pair #aM (or #aN)}—indicated by one or more TCI state codepoints (or one or more TCI fields) as specified in the example and the corresponding sub-examples in the present disclosure, wherein one or more of the indicated M>1 (or N>1) TCI states or pairs of TCI states could be associated with/mapped to one or more PUCCH transmission repetitions or PUSCH transmission repetitions as described above for the multi-TRP PUCCH or PUSCH (repetitions) transmission. The UE could also receive in a DCI (e.g., DCI format 1_1 or 1_2 with or without DL assignment) a one-bit indicator to indicate TCI state(s)/pair(s) of TCI states ordering for PUCCH or PUSCH. For this design example, a new/dedicated DCI field could be used/configured in the corresponding DCI format to indicate the one-bit indicator; alternatively, one of more of the existing DCI fields in the corresponding DCI format could be used/configured to indicate the one-bit indicator.

For instance, if the one-bit indicator is set to "0" (or "1"), the UE may follow the M>1 (or N>1) TCI states or pairs of TCI states ordered by {TCI state/TCI states pair #a1, TCI state/TCI states pair #a2, TCI state/TCI states #aM (or #aN)}—a first ordering—to transmit one or more PUCCH transmission repetitions or PUSCH transmission repetitions associated with the M>1 (or N>1) TCI states or pairs of TCI states ordered by {TCI state/TCI states pair #a1, TCI state/TCI states pair #a2, . . . , TCI state/TCI states #aM (or #aN)}, and if the one-bit flag indicator is set to "1" (or "0"), the UE may follow the M>1 (or N>1) TCI states or pairs of TCI states ordered by {TCI state/TCI states pair #b1, TCI state/TCI states pair #b2, . . . , TCI state/TCI states #bM (or #bN)}—a second ordering—to transmit one or more PUCCH transmission repetitions or PUSCH transmission repetitions associated with the M>1 (or N>1) TCI states or pairs of TCI states ordered by {TCI state/TCI states pair #b1, TCI state/TCI states pair #b2, TCI state/TCI states #bM (or #bN)}.

The first ordering of the TCI states/pairs of TCI states {TCI state/TCI states pair #a1, TCI state/TCI states pair #a2, . . . , TCI state/TCI states #aM (or #aN)} or the second ordering of the TCI states/pairs of TCI states {TCI state/TCI states pair #b1, TCI state/TCI states pair #b2, . . . , TCI state/TCI states #bM (or #bN)} could be determined according to at least one of: (1) fixed in the system specification(s) and (2) configured, e.g., via higher layer RRC signaling or MAC CE command or DCI based signaling, by the network. For both (1) and (2), b1 could be equal to aM (or aN), b2 could be equal to a(M−1) or (a(N−1)), bM (or bN) could be equal to a1. For M=2 (or N=2), the UE could first receive in a DCI (e.g., DCI format 1_1 or 1_2 with or without DL assignment) two TCI states or pairs of TCI states—denoted by {TCI state/TCI states pair #a1, TCI state/TCI states pair #a2}; if the one-bit flag indicator is set to "0" (or "1"), the UE may follow the two TCI states or pairs of TCI states ordered by {TCI state/TCI state pair #a1, TCI state/TCI state pair #a2} to transmit one or more PUCCH transmission repetitions or PUSCH transmission repetitions associated with the two TCI states or pairs of TCI states ordered by {TCI state/TCI state pair #a1, TCI state/TCI state pair #a2}, and if the one-bit flag indicator is set to "1" or ("0"), the UE may follow the two TCI states or pairs of TCI states ordered by {TCI state/TCI state pair #a2, TCI state/TCI state pair #a1} to transmit one or more PUCCH transmission repetitions or PUSCH transmission repetitions associated with the two TCI states or pairs of TCI states {TCI state/TCI state pair #a2, TCI state/TCI state pair #a1}.

In yet another example, the UE could first receive in a DCI (e.g., DCI format 1_1 or 1_2 with or without DL assignment) M=1 (or N=1) TCI state or pair of TCI states indicated by a TCI state codepoint (or a TCI field) as specified in the examples and the corresponding sub-examples in the present disclosure. The UE could then receive in a DCI (e.g., DCI format 1_1 or 1_2 with or without DL assignment) M>1 (or N>1) TCI states or pairs of TCI states indicated by one or more TCI state codepoints (or one or more TCI fields) as specified in the examples and the corresponding sub-examples in the present disclosure, wherein one or more of the indicated M>1 (or N>1) TCI states or pairs of TCI states could be associated with/mapped to one or more PUCCH transmission repetitions or PUSCH transmission repetitions as described above for the multi-TRP PUCCH or PUSCH (repetitions) transmission.

For example, the UE may follow the latest indicated M>1 (or N>1) TCI states or pairs of TCI states to transmit one or more PUCCH transmission repetitions or PUSCH transmission repetitions associated with the latest indicated M>1 (or N>1) TCI states or pairs of TCI states—i.e., multi-TRP PUCCH or PUSCH (repetitions) transmission.

For another example, the UE could receive in a DCI (e.g., DCI format 1_1 or 1_2 with or without DL assignment) a one-bit flag indicator for PUCCH or PUSCH. For this design example, a new/dedicated DCI field could be used/configured in the corresponding DCI format to indicate the one-bit flag indicator; alternatively, one of more of the existing DCI fields in the corresponding DCI format could be used/configured to indicate the one-bit flag indicator. For instance, if the one-bit flag indicator for PUCCH or PUSCH is set to "1" (or "0") or "enabled," the UE may follow the latest indicated M>1 (or N>1) TCI states or pairs of TCI states to transmit one or more PUCCH transmission repetitions or PUSCH transmission repetitions associated with the latest indicated M>1 (or N>1) TCI states or pairs of TCI states—i.e., multi-TRP PUCCH or PUSCH (repetitions) transmission. If the one-bit flag indicator for PUCCH or PUSCH is set to "0" (or "1") or "disabled," the UE may follow the previously indicated M=1 (or N=1) TCI state or pair of TCI states to transmit PUCCH(s) or PUSCH(s)—i.e., single-TRP PUCCH or PUSCH transmission.

Yet for another example, the UE could receive in a DCI (e.g., DCI format 1_1 or 1_2 with or without DL assignment) a one-bit indicator for PUCCH or PUSCH. For this design example, a new/dedicated DCI field could be used/configured in the corresponding DCI format to indicate the one-bit indicator; alternatively, one of more of the existing DCI fields in the corresponding DCI format could be used/configured to indicate the one-bit indicator. For instance, if the one-bit indicator for PUCCH or PUSCH is set to "0" (or "1"), the UE may follow the previously indicated M=1 (or N=1) TCI state or pair of TCI states to transmit PUCCH(s) or PUSCH(s)—i.e., single-TRP PUCCH or PUSCH transmission; if the one-bit indicator for PUCCH or PUSCH is set to "1" (or "0"), the UE may follow the latest indicated M>1 (or N>1) TCI states or pairs of TCI states to transmit one or more PUCCH transmission repetitions or PUSCH transmission repetitions associated with the latest indicated M>1 (or N>1) TCI states or pairs of TCI states—i.e., multi-TRP PUCCH or PUSCH (repetitions) transmission.

In yet another example, the UE could first receive in a DCI (e.g., DCI format 1_1 or 1_2 with or without DL assignment) M>1 (or N>1) TCI states or pairs of TCI states indicated by one or more TCI state codepoints (or one or more TCI fields) as specified in the examples and the corresponding sub-examples in the present disclosure, wherein one or more of the indicated M>1 (or N>1) TCI states or pairs of TCI states could be associated with/mapped to one or more PUCCH transmission repetitions or PUSCH transmission repetitions as described above for the multi-TRP PUCCH or PUSCH (repetitions) transmission. The UE could also receive in a DCI (e.g., DCI format 1_1 or 1_2 with or without DL assignment) a multi-bit (>1 bit, e.g., 2-bit) indicator for PUCCH or PUSCH.

For this design example, a new/dedicated DCI field could be used/configured in the corresponding DCI format to indicate the multi-bit indicator; alternatively, one of more of the existing DCI fields in the corresponding DCI format could be used/configured to indicate the multi-bit indicator. The multi-bit indicator for PUCCH or PUSCH could indicate one or more of: (1) single-TRP PUCCH or PUSCH transmission, (2) multi-TRP PUCCH or PUSCH (repetitions) transmission, (3) one or more orderings of the indicated TCI states or pairs of TCI states for single-TRP PUCCH or PUSCH transmission or multi-TRP PUCCH or PUSCH (repetitions) transmission, and (4) one or more TCI states or pairs of TCI states for single-TRP PUCCH or PUSCH transmission or multi-TRP PUCCH or PUSCH (repetitions) transmission.

For example, the multi-bit indicator could correspond to a 2-bit indicator with four states "00," "01," "10," and "11." For instance, if the 2-bit indicator is set to "00" (or "01"), the UE could use only one of the indicated M>1 (or N>1) TCI states or pairs of TCI states to transmit PUCCH(s) or PUSCH(s)—i.e., PUCCH or PUSCH transmission in a single-TRP system—following the design examples specified in the examples of the present disclosure; if the 2-bit indicator is set to "01" (or "00"), the UE could use one or more of the indicated M>1 (or N>1) TCI states or pairs of TCI states to transmit one or more PUCCH transmission repetitions or PUSCH transmission repetitions as described above—i.e., PUCCH or PUSCH (repetitions) transmission in a multi-TRP system.

If the 2-bit indicator is set to "10" (or "11"), the UE may follow the ordering of the indicated M>1 (or N>1) TCI states or pairs of TCI states to transmit one or more PUCCH transmission repetitions or PUSCH transmission repetitions associated with the indicated M>1 (or N>1) TCI states or pairs of TCI states (according to the example in the present disclosure); if the 2-bit indicator is set to "11" (or "10"), the UE may follow the order-reversed M>1 (or N>1) TCI states or pairs of TCI states to transmit one or more PUCCH transmission repetitions or PUSCH transmission repetitions associated with the order-reversed M>1 (or N>1) TCI states or pairs of TCI states (according to the example in the present disclosure).

Alternatively, if the 2-bit indicator is set to "10" (or "11"), the UE may follow a first ordering of the M>1 (or N>1) TCI states or pairs of TCI states to transmit one or more PUCCH transmission repetitions or PUSCH transmission repetitions associated with the M>1 (or N>1) TCI states or pairs of TCI states in the first ordering; if the 2-bit indicator is set to "11" (or "10"), the UE may follow a second ordering of the M>1 (or N>1) TCI states or pairs of TCI states to transmit one or more PUCCH transmission repetitions or PUSCH transmission repetitions associated with the M>1 (or N>1) TCI states or pairs of TCI states in the second ordering. The first and second orderings of TCI states/pairs of TCI states could be according to those specified in the example in the present disclosure.

Optionally, "00" or "01" of the 2-bit indicator could be used to indicate the orderings of the M>1 (or N>1) TCI states or pairs of TCI states for multi-TRP PUCCH or PUSCH (repetitions) transmission as described above, and "10" or "11" of the 2-bit indicator could be used to indicate the single-TRP PUCCH/PUSCH transmission or the multi-TRP PUCCH/PUSCH (repetitions) transmission as described in the present disclosure.

For another example, the multi-bit indicator could correspond to a 2-bit indicator with four states "00," "01," "10," and "11." For instance, if the 2-bit indicator is set to "00" (or "01"), the UE could use the primary TCI state or pair of TCI states determined from the indicated M>1 (or N>1) TCI states or pairs of TCI states to transmit PUCCH(s) or PUSCH(s)—i.e., PUCCH or PUSCH transmission in a single-TRP system; if the 2-bit indicator is set to "01" (or "00"), the UE could use the secondary TCI state or pair of TCI states determined from the indicated M>1 (or N>1) TCI states or pairs of TCI states to transmit PUCCH(s) or PUSCH(s)—i.e., PUCCH or PUSCH transmission in a single-TRP system; the primary and secondary TCI states/pairs of TCI states could be determined/configured according to those specified in the examples in the present disclosure.

If the 2-bit indicator is set to "10" (or "11"), the UE may follow the ordering of the indicated M>1 (or N>1) TCI states or pairs of TCI states to transmit one or more PUCCH transmission repetitions or PUSCH transmission repetitions associated with the indicated M>1 (or N>1) TCI states or pairs of TCI states (according to the example in the present disclosure); if the 2-bit indicator is set to "11" (or "10"), the UE may follow the order-reversed M>1 (or N>1) TCI states or pairs of TCI states to transmit one or more PUCCH transmission repetitions or PUSCH transmission repetitions associated with the order-reversed M>1 (or N>1) TCI states or pairs of TCI states (according to the example in the present disclosure).

Alternatively, if the 2-bit indicator is set to "10" (or "11"), the UE may follow a first ordering of the M>1 (or N>1) TCI states or pairs of TCI states to transmit one or more PUCCH transmission repetitions or PUSCH transmission repetitions associated with the M>1 (or N>1) TCI states or pairs of TCI states in the first ordering; if the 2-bit indicator is set to "11" (or "10"), the UE may follow a second ordering of the M>1 (or N>1) TCI states or pairs of TCI states to transmit one or more PUCCH transmission repetitions or PUSCH transmission repetitions associated with the M>1 (or N>1) TCI states or pairs of TCI states in the second ordering. The first and second orderings of TCI states/pairs of TCI states could be according to those specified in the example of in the present disclosure.

Optionally, "00" or "01" of the 2-bit indicator could be used to indicate the orderings of the M>1 (or N>1) TCI states or pairs of TCI states for multi-TRP PUCCH or PUSCH (repetitions) transmission as described above, and "10" or "11" of the 2-bit indicator could be used to indicate the primary or secondary TCI states/pairs of TCI states for single-TRP PUCCH or PUSCH transmission as described in the present disclosure.

Yet for another example, the multi-bit indicator could correspond to a 2-bit indicator with four states "00," "01," "10," and "11," configured according to those specified in the example of the present disclosure. In addition, the UE could also receive in a DCI (e.g., DCI format 1_1 or 1_2 with or without DL assignment) a one-bit indicator. For this design example, a new/dedicated DCI field could be used/configured in the corresponding DCI format to indicate the one-bit indicator; alternatively, one of more of the existing DCI fields in the corresponding DCI format could be used/configured to indicate the one-bit indicator. When the 2-bit indicator indicates the single-TRP PUCCH or PUSCH transmission, if the one-bit indicator is set to "0" (or "1"), the UE could use the primary TCI state or pair of TCI states determined from the indicated M>1 (or N>1) TCI states or pairs of TCI states to transmit PUCCH(s) or PUSCH(s); if the one-bit indicator is set to "1" (or "0"), the UE could use the secondary TCI state or pair of TCI states determined from the indicated M>1 (or N>1) TCI states or pairs of TCI states to transmit PUCCH(s) or PUSCH(s); the primary and secondary TCI states/pairs of TCI states could be determined/configured according to those specified in the examples of the present disclosure.

Yet for another example, the multi-bit indicator could correspond to a z-bit indicator (z>1, e.g., z=3) with 2^z states (e.g., 8 states for z=3). In this example, a first state of the z-bit indicator could indicate that the single-TRP PUCCH or PUSCH transmission is enabled according to the example and the corresponding sub-examples in the present disclosure, a second state of the z-bit indicator could indicate that the multi-TRP PUCCH or PUSCH (repetitions) transmission is enabled according to the examples and the corresponding sub-examples in the present disclosure, a third state of the z-bit indicator could indicate that the UE could use the primary TCI state or pair of TCI states for the single-TRP PUCCH or PUSCH transmission as discussed in the example and the corresponding sub-examples in the present disclosure, a fourth state of the z-bit indicator could indicate that the UE could use the secondary TCI state or pair of TCI states for the single-TRP PUCCH or PUSCH transmission as discussed in the example and the corresponding sub-examples in the present disclosure, a fifth state of the z-bit indicator could indicate an ordering of the M>1 (or N>1) TCI states or pairs of TCI states for the multi-TRP PUCCH or PUSCH (repetitions) transmission as discussed in the examples in the present disclosure, a sixth state of the z-bit indicator could indicate another ordering of the M>1 (or N>1) TCI states or pairs of TCI states for the multi-TRP PUCCH or PUSCH (repetitions) transmission as discussed in the examples in the present disclosure.

In yet another example, the UE could first receive in a DCI (e.g., DCI format 1_1 or 1_2 with or without DL assignment) M=1 (or N=1) TCI state or pair of TCI states indicated by a TCI state codepoint (or a TCI field) as specified in the examples and the corresponding sub-examples in the present disclosure. The UE could then receive in a DCI (e.g., DCI format 1_1 or 1_2 with or without DL assignment) M>1 (or N>1) TCI states or pairs of TCI states indicated by one or more TCI state codepoints (or one or more TCI fields) as specified in the examples and the corresponding sub-examples in the present disclosure, wherein one or more of the indicated M>1 (or N>1) TCI states or pairs of TCI states could be associated with/mapped to one or more PUCCH transmission repetitions or PUSCH transmission repetitions as described above for the multi-TRP PUCCH or PUSCH (repetitions) transmission.

Furthermore, the UE could receive in a DCI (e.g., DCI format 1_1 or 1_2 with or without DL assignment) a multi-bit (>1 bit, e.g., 2-bit) indicator for PUCCH or PUSCH. For this design example, a new/dedicated DCI field could be used/configured in the corresponding DCI format to indicate the multi-bit indicator; alternatively, one of more of the existing DCI fields in the corresponding DCI format could be used/configured to indicate the multi-bit indicator.

The multi-bit indicator for PUCCH or PUSCH could indicate one or more of: (1) single-TRP PUCCH or PUSCH transmission, (2) multi-TRP PUCCH or PUSCH (repetitions) transmission, (3) one or more orderings of the indicated TCI states or pairs of TCI states for single-TRP PUCCH/PUSCH transmission or multi-TRP PUCCH/PUSCH (repetitions) transmission, and (4) one or more TCI states or pairs of TCI states for single-TRP PUCCH/PUSCH transmission or multi-TRP PUCCH/PUSCH (repetitions) transmission. The multi-bit indicator could be configured according to the examples in the present disclosure. For this example, if the multi-bit indicator indicates that the single-TRP PUCCH or PUSCH transmission is enabled, the UE could follow the previously indicated M=1 (or N=1) TCI state or pair of TCI states to transmit PUCCH(s) or PUSCH(s) (as discussed in the example and the corresponding sub-examples in the present disclosure).

The UE could receive from the network one or more MAC CE activation/subselection commands activating one or more sets of TCI states/TCI state IDs from the one or more TCI state pools (specified in the examples in the present disclosure) or the one or more TCI state groups (specified in the examples in the present disclosure), with each set of activated/selected TCI states/TCI state IDs used to map up to Nc≥1 (e.g., 8, 16, 32 or 64) TCI state codepoints in a DCI format. Here, a TCI state codepoint could be configured according to the examples and the corresponding sub-examples in the present disclosure. Furthermore, the one or more sets of activated/selected TCI state codepoints could include/contain/comprise one or more of the following examples.

A first set of TCI state codepoints for single-TRP PUCCH or PUSCH transmission: the UE could receive in a DCI (e.g., DCI format 1_1 or 1_2 with or without DL assignment) M=1 (or N=1) TCI state or pair of TCI states indicated by a TCI state codepoint from the first set of TCI state codepoints; the UE could use the indicated TCI state or pair of TCI states for the single-TRP PUCCH or PUSCH transmission.

A second set of TCI state codepoints for single-TRP PUCCH or PUSCH transmission: the UE could receive in a DCI (e.g., DCI format 1_1 or 1_2 with or without DL assignment) M=1 (or N=1) TCI state or pair of TCI states indicated by a TCI state codepoint from the second set of TCI state codepoints; the UE could use the indicated TCI state or pair of TCI states as the primary TCI state or pair of TCI states as discussed in the example and the corresponding sub-examples in the present disclosure for the single-TRP PUCCH or PUSCH transmission.

A third set of TCI state codepoints for single-TRP PUCCH or PUSCH transmission: the UE could receive in a DCI (e.g., DCI format 1_1 or 1_2 with or without DL assignment) M=1 (or N=1) TCI state or pair of TCI states indicated by a TCI state codepoint from the third set of TCI state codepoints; the UE could use the indicated TCI state or pair of TCI states as the secondary TCI state or pair of TCI states as discussed in the example and the corresponding sub-examples in the present disclosure for the single-TRP PUCCH or PUSCH transmission.

A fourth set of TCI state codepoints for multi-TRP PUCCH or PUSCH (repetitions) transmission: the UE could receive in a DCI (e.g., DCI format 1_1 or 1_2 with or without DL assignment) M>1 (or N>1) TCI states or pairs of TCI states indicated by one or more TCI state codepoints from the fourth set of TCI state codepoints, wherein one or more of the indicated M>1 (or N>1) TCI states or pairs of TCI states could be associated with/mapped to one or more PUCCH transmission repetitions or PUSCH transmission repetitions as described above for the multi-TRP PUCCH or PUSCH (repetitions) transmission.

A fifth set of TCI state codepoints for multi-TRP PUCCH or PUSCH (repetitions) transmission: the UE could receive in a DCI (e.g., DCI format 1_1 or 1_2 with or without DL assignment) M>1 (or N>1) TCI states or pairs of TCI states indicated by one or more TCI state codepoints from the fifth set of TCI state codepoints, wherein one or more of the indicated M>1 (or N>1) TCI states or pairs of TCI states could be associated with/mapped to one or more PUCCH transmission repetitions or PUSCH transmission repetitions as described above for the multi-TRP PUCCH or PUSCH (repetitions) transmission. The ordering of the indicated M>1 (or N>1) TCI states or pairs of TCI states from the fifth set could correspond to an ordering of M>1 (or N>1) TCI states or pairs of TCI states (e.g., the first ordering) discussed in the examples in the present disclosure.

A sixth set of TCI state codepoints for multi-TRP PUCCH or PUSCH (repetitions) transmission: the UE could receive in a DCI (e.g., DCI format 1_1 or 1_2 with or without DL assignment) M>1 (or N>1) TCI states or pairs of TCI states indicated by one or more TCI state codepoints from the sixth set of TCI state codepoints, wherein one or more of the indicated M>1 (or N>1) TCI states or pairs of TCI states could be associated with/mapped to one or more PUCCH transmission repetitions or PUSCH transmission repetitions as described above for the multi-TRP PUCCH or PUSCH (repetitions) transmission. The ordering of the indicated M>1 (or N>1) TCI states or pairs of TCI states from the sixth set could correspond to an ordering of M>1 (or N>1) TCI states or pairs of TCI states (e.g., the second ordering) discussed in the example of the present disclosure.

The UE could be indicated by the network from which set(s) of TCI state codepoints the indicated one or more TCI states or pairs of TCI states are selected. This indication could be via higher layer RRC signaling or MAC CE command or dynamic DCI based signaling. For instance, a y-bit (y≥1) indicator could be configured/included/incorporated in a DCI format (e.g., DCI format 1_1 or 1_2 with or without DL assignment) to indicate the set(s) of TCI state codepoints. For this design example, a new/dedicated DCI field could be used/configured in the corresponding DCI format to indicate the y-bit indicator; alternatively, one of more of the existing DCI fields in the corresponding DCI format could be used/configured to indicate the y-bit indicator. Each state of the y-bit indicator (a total of 2^y states for the y-bit indicator) could correspond to a set of TCI state codepoints (e.g., the first set, the second set, the third set, the fourth set, the fifth set or the sixth set as specified above).

For example, if a UE receives in the DCI format for beam indication (e.g., DCI format 1_1 or 1_2 with or without DL assignment) the y-bit indicator (e.g., set to a state), the UE could determine the set of TCI state codepoints corresponding to the indicated state of the y-bit indicator, from which the indicated one or more TCI states or pairs of TCI states are selected. According to the determined set of TCI state codepoints, the UE could perform/conduct the corresponding single-TRP PUCCH or PUSCH transmission or multi-TRP PUCCH or PUSCH (repetitions) transmission as discussed above.

According to the design examples specified in the first, second and third embodiments of the present disclosure, a UE could be configured with separate indicators with each indicator indicating one or more of: (1) single-TRP transmission/reception or multi-TRP (repetitions) transmission/reception, (2) one or more orderings of the indicated TCI states/pairs of TCI states and (3) which TCI state/pair of TCI states to use if the single-TRP transmission/reception is enabled/configured, for a different channel (e.g., PDCCH, PDSCH, PUCCH or PUSCH).

In a fourth embodiment of the present disclosure, a UE could be configured with a common indicator indicating one or more of: (1) single-TRP transmission/reception or multi-TRP (repetitions) transmission/reception, (2) one or more orderings of the indicated TCI states/pairs of TCI states and (3) which TCI state/pair of TCI states to use if the single-TRP transmission/reception is enabled/configured, for one or more different channels. Here, the one or more different channels could correspond to: (a) PDCCH and PDSCH, (b) PDCCH and PUCCH, (c) PDCCH and PUSCH, (d) PDSCH and PUCCH, (e) PDSCH and PUSCH, (f) PUCCH and PUSCH, (g) PDCCH, PDSCH and PUCCH, (h) PDCCH, PDSCH and PUSCH, (i) PDCCH, PUCCH and PUSCH, (j) PDSCH, PUCCH and PUSCH or (k) PDCCH, PDSCH, PUCCH and PUSCH. The common indicator could correspond to following examples.

A one-bit flag indicator—as specified in the examples of the present disclosure—configured/indicated for each of the one or more channels.

A one-bit indicator—as specified in the examples –2.4 of the present disclosure—configured/indicated for each of the one or more channels.

A multi-bit indicator—as specified in the examples of the present disclosure—to indicate TCI state(s)/pair(s) of TCI states ordering for each of the one or more channels.

A multi-bit indicator—as specified in the examples of the present disclosure—to indicate TCI state(s)/pair(s) of TCI states ordering for each of the one or more channels.

A one-bit flag indicator—as specified in the examples of the present disclosure—configured/indicated for each of the one or more channels.

A one-bit indicator—as specified in the examples of the present disclosure—configured/indicated for each of the one or more channels.

A multi-bit indicator—as specified in the examples of the present disclosure—configured/indicated for each of the one or more channels.

A multi-bit indicator—as specified in the examples of the present disclosure—configured/indicated for each of the one or more channels.

The UE could receive from the network one or more MAC CE activation/subselection commands activating one or more sets of TCI states/TCI state IDs from the one or more TCI state pools (specified in the examples of the present disclosure) or the one or more TCI state groups (specified in the examples of the present disclosure), with each set of activated/selected TCI states/TCI state IDs used to map up to $Nc \geq 1$ (e.g., 8, 16, 32 or 64) TCI state codepoints in a DCI format. Here, a TCI state codepoint could be configured according to the examples and the corresponding sub-examples in the present disclosure. Furthermore, the one or more sets of activated/selected TCI state codepoints could include/contain/comprise one or more of the following:

A first set of TCI state codepoints for single-TRP transmission/reception of each of the one or more channels: the UE could receive in a DCI (e.g., DCI format 1_1 or 1_2 with or without DL assignment) M=1 (or N=1) TCI state or pair of TCI states indicated by a TCI state codepoint from the first set of TCI state codepoints; the UE could use the indicated TCI state or pair of TCI states for the single-TRP transmission/reception of each of the one or more channels.

A second set of TCI state codepoints for single-TRP transmission/reception of each of the one or more channels: the UE could receive in a DCI (e.g., DCI format 1_1 or 1_2 with or without DL assignment) M=1 (or N=1) TCI state or pair of TCI states indicated by a TCI state codepoint from the second set of TCI state codepoints; the UE could use the indicated TCI state or pair of TCI states as the primary TCI state or pair of TCI states as discussed in the example and the corresponding sub-examples in the present disclosure for the single-TRP transmission/reception of each of the one or more channels.

A third set of TCI state codepoints for single-TRP transmission/reception of each of the one or more channels: the UE could receive in a DCI (e.g., DCI format 1_1 or 1_2 with or without DL assignment) M=1 (or N=1) TCI state or pair of TCI states indicated by a TCI state codepoint from the third set of TCI state codepoints; the UE could use the indicated TCI state or pair of TCI states as the secondary TCI state or pair of TCI states as discussed in the example and the corresponding sub-examples in the present disclosure for the single-TRP transmission/reception of each of the one or more channels.

A fourth set of TCI state codepoints for multi-TRP (repetitions) transmission/reception of each of the one or more channels: the UE could receive in a DCI (e.g., DCI format 1_1 or 1_2 with or without DL assignment) M>1 (or N>1) TCI states or pairs of TCI states indicated by one or more TCI state codepoints from the fourth set of TCI state codepoints, wherein one or more of the indicated M>1 (or N>1) TCI states or pairs of TCI states could be used for the multi-TRP (repetitions) transmission/reception of each of the one or more channels.

A fifth set of TCI state codepoints for multi-TRP (repetitions) transmission/reception of each of the one or more channels: the UE could receive in a DCI (e.g., DCI format 1_1 or 1_2 with or without DL assignment) M>1 (or N>1) TCI states or pairs of TCI states indicated by one or more TCI state codepoints from the fifth set of TCI state codepoints, wherein one or more of the indicated M>1 (or N>1) TCI states or pairs of TCI states could be used for the multi-TRP (repetitions) transmission/reception of each of the one or more channels. The ordering of the indicated M>1 (or N>1) TCI states or pairs of TCI states from the fifth set could correspond to an ordering of M>1 (or N>1) TCI states or pairs of TCI states (e.g., the first ordering) discussed in the present disclosure.

A sixth set of TCI state codepoints for multi-TRP (repetitions) transmission/reception of each of the one or more channels: the UE could receive in a DCI (e.g., DCI format 1_1 or 1_2 with or without DL assignment) M>1 (or N>1) TCI states or pairs of TCI states indicated by one or more TCI state codepoints from the sixth set of TCI state codepoints, wherein one or more of the indicated M>1 (or N>1) TCI states or pairs of TCI states could be used for the multi-TRP (repetitions) transmission/reception of each of the one or more channels. The ordering of the indicated M>1 (or N>1) TCI states or pairs of TCI states from the sixth set could correspond to an ordering of M>1 (or N>1) TCI states or pairs of TCI states (e.g., the second ordering) discussed in the present disclosure.

The UE could be indicated by the network from which set(s) of TCI state codepoints the indicated one or more TCI states or pairs of TCI states are selected. This indication could be via higher layer RRC signaling or MAC CE command or dynamic DCI based signaling. For instance, a y-bit ($y \geq 1$) indicator could be configured/included/incorporated in a DCI format (e.g., DCI format 1_1 or 1_2 with or without DL assignment) to indicate the set(s) of TCI state codepoints. For this design example, a new/dedicated DCI field could be used/configured in the corresponding DCI format to indicate the y-bit indicator; alternatively, one of more of the existing DCI fields in the corresponding DCI format could be used/configured to indicate the y-bit indicator. Each state of the y-bit indicator (a total of $2^{\wedge}y$ states for the y-bit indicator) could correspond to a set of TCI state codepoints (e.g., the first set, the second set, the third set, the fourth set, the fifth set or the sixth set as specified above). For example, if a UE receives in the DCI format for beam indication (e.g., DCI format 1_1 or 1_2 with or without DL assignment) the y-bit indicator (e.g., set to a state), the UE could determine the set of TCI state codepoints corresponding to the indicated state of the y-bit indicator, from which the indicated one or more TCI states or pairs of TCI states are selected.

According to the determined set of TCI state codepoints, the UE could perform/conduct the corresponding single-TRP PDCCH or PDSCH reception or PUCCH or PUSCH transmission or multi-TRP PDCCH or PDSCH (repetitions) reception or PUCCH or PUSCH (repetitions) transmission as discussed above.

Figure 9:
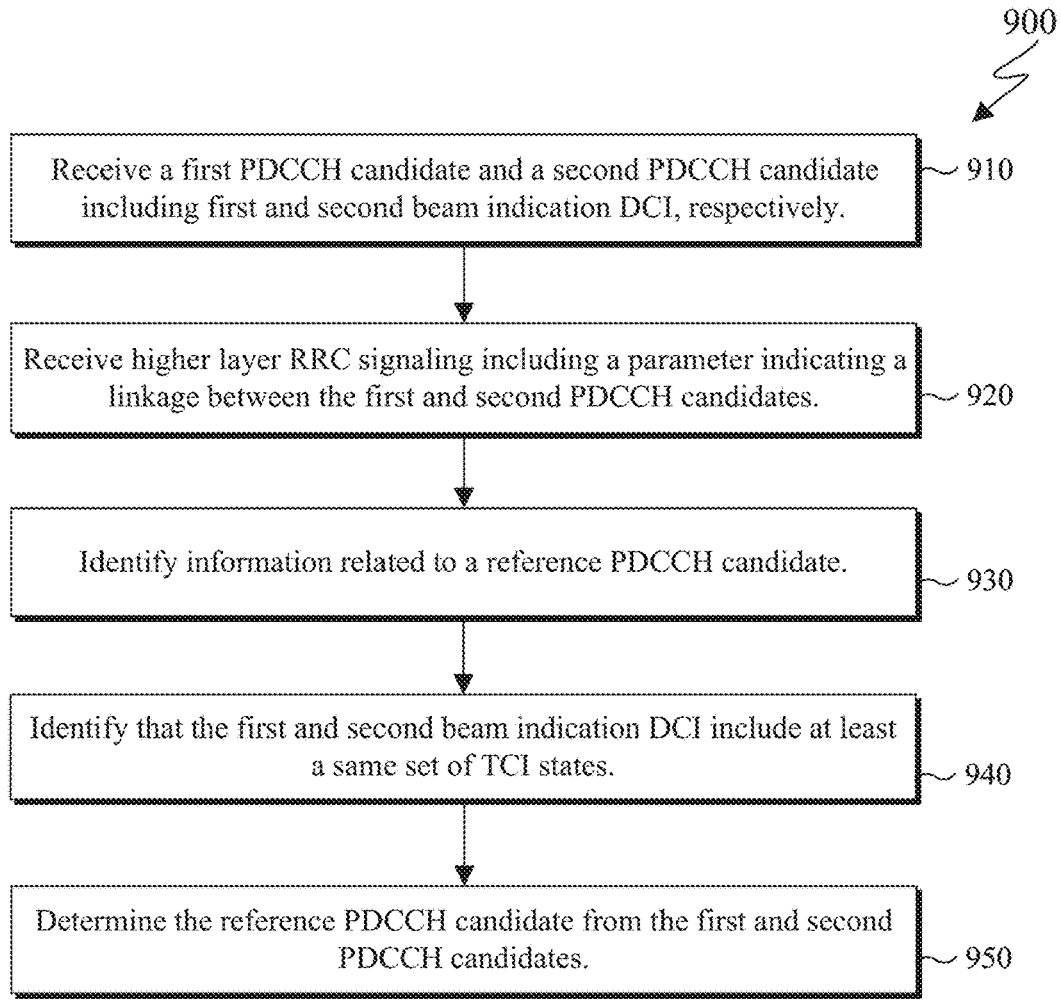
FIG. 9 illustrates a flowchart of an example method for beam indication and repetition in a wireless communication system according to embodiments of the present disclosure.

FIG. 9 illustrates a flowchart of an example method 900 for beam indication and repetition in a wireless communication system according to embodiments of the present disclosure. The steps of the method 900 of FIG. 9 can be performed by any of the UEs 111-116 of FIG. 1, such as the UE 116 of FIG. 3 and a complementary method may be performed by BSs, such as BSs 101-103 in FIG. 1. The method 900 is for illustration only and other embodiments can be used without departing from the scope of the present disclosure.

The method begins with the UE receiving a first PDCCH candidate and a second PDCCH candidate including first and second beam indication DCI, respectively (step 910). For example, in step 910, the first and second PDCCH candidates may be received from first and second TRPs, respectively. The UE also receives higher layer RRC signaling including a parameter indicating a linkage between the first and second PDCCH candidates (step 920). For example, in step 920, the parameter may indicate that repetitions of PDCCH candidates or beam indication DCIs are enabled, for example, across TRPs.

The UE identifies information related to a reference PDCCH candidate (step 930). For example, in step 930, the information related to the reference PDCCH candidate is used to determine which, among the received PDCCH candidates, is used as the reference PDCCH candidate, e.g., for HAQK-ACK, application timing, and other items as discussed herein. In one example, the information may be received via higher layer RRC signaling, a MAC CE, or in a DCI. In another example, the information may be identified based on a fixed rule, such as in system specifications or standards.

The UE then identifies that the first and second beam indication DCI include at least a same set of TCI states (step 940). For example, in step 940, the first and second beam indication DCI, or the first and second PDCCH candidates, are repetitions as indicated based on the parameter.

The UE then determines the reference PDCCH candidate from the first and second PDCCH candidates (step 950). For example, in step 950, the UE determines the reference PDCCH candidate based on the information. In one example, the reference PDCCH candidate is the one received earlier in time than the other PDCCH candidate(s). In another example, the reference PDCCH candidate is received in a CORESET having a lower CORESET ID than a CORESET ID of a CORESET in which the other PDCCH candidate(s) was/were received. In one example, the beam indication DCI included in the reference PDCCH candidate does not include a DL assignment and the UE determines a slot for transmitting a PUCCH with HARQ-ACK information corresponding to the beam indication DCI based on an end of a reception of the reference PDCCH candidate. In another example, the beam indication DCI included in the reference PDCCH candidate includes a DL assignment and UE determines a slot for transmitting the PUCCH with HARQ-ACK information corresponding to a PDSCH scheduled by the beam indication DCI based on an end of a reception of the PDSCH. In various embodiments, the UE applies one or more TCI states in the set of TCI states included in the beam indication DCI in the reference PDCCH candidate starting from a first slot that is at least K symbols after a last symbol of the PUCCH, where K is provided via higher layer RRC signaling.

In one or more embodiments, the UE may also receive a list of PCIs via higher layer RRC signaling and a plurality of TCI states associated with one or more of the PCIs via higher layer RRC signaling. The UE may then determine, from the plurality of TCI states and based on a configuration received by the UE or a fixed rule, groups of TCI states and associate, based on the configuration received by the UE or the fixed rule, the groups of TCI states with one or more of the PCIs, respectively, based on properties of the one or more of the PCIs. For example, the properties of the PCI may include any information about In one or more embodiments, the UE may also receive a list of PCIs via higher layer RRC signaling. The UE may then identify, from a beam indication DCI or a MAC CE, a TCI codepoint indicating first and second TCI states and determine to use the first and second TCI states for transmissions or receptions of channels or signals associated with first and second PCIs, respectively, from the list of PCIs.

In one or more embodiments, the UE may also receive a list of physical cell identifiers (PCIs) via higher layer RRC signaling, the list of PCIs including a PCI other than a serving cell PCI. The UE may then identify a value of a one-bit indicator in a beam indication DCI including one or more TCI states and determine whether to use the one or more TCI states for transmissions or receptions of channels or signals associated with the serving cell PCI or the PCI other than the serving cell PCI based on the value of the one-bit indicator.

The above flowchart illustrates example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to:
receive a first physical downlink control channel (PDCCH) candidate and a second PDCCH candidate including first and second beam indication downlink control information (DCI), respectively, and
receive higher layer radio resource control (RRC) signaling including a parameter indicating a linkage between the first and second PDCCH candidates; and
a processor operably coupled with the transceiver, the processor configured to:
identify information related to a reference PDCCH candidate,
identify, based on the parameter, that the first and second beam indication DCI include at least a same set of transmission configuration indication (TCI) states, and
determine, based on the information, the reference PDCCH candidate from the first and second PDCCH candidates,
wherein the transceiver is further configured to receive a list of physical cell identifiers (PCIs) via higher layer RRC signaling, the list of PCIs including a PCI other than a serving cell PCI, and
wherein the processor is further configured to:
identify a value of a one-bit indicator in a beam indication DCI including one or more TCI states, and
determine whether to use the one or more TCI states for transmissions or receptions of channels or signals associated with the serving cell PCI or the PCI other than the serving cell PCI based on the value of the one-bit indicator.

2. The UE of claim 1, wherein:
the first PDCCH candidate is received earlier in time than the second PDCCH candidate, or
the first PDCCH candidate is received in a control resource set (CORESET) having a lower CORESET identifier (ID) than a CORESET ID of a CORESET in which the second PDCCH candidate was received.

3. The UE of claim 1, wherein the information related to the reference PDCCH candidate is:
indicated via higher layer RRC signaling, a media access control-control element (MAC CE), or in a DCI, or
identified based on a fixed rule.

4. The UE of claim 1, wherein:
the beam indication DCI included in the reference PDCCH candidate does not include a downlink (DL) assignment and the processor is further configured to determine a slot for transmitting a physical uplink control channel (PUCCH) with hybrid automatic repeat request acknowledgement (HARQ-ACK) information corresponding to the beam indication DCI based on an end of a reception of the reference PDCCH candidate, or
the beam indication DCI included in the reference PDCCH candidate includes a DL assignment and the processor is further configured to determine a slot for transmitting the PUCCH with HARQ-ACK information corresponding to a physical downlink shared channel (PDSCH) scheduled by the beam indication DCI based on an end of a reception of the PDSCH.

5. The UE of claim 4, wherein the processor is further configured to apply one or more TCI states in the set of TCI states included in the beam indication DCI in the reference PDCCH candidate starting from a first slot that is at least K symbols after a last symbol of the PUCCH and wherein K is provided via higher layer RRC signaling.

6. The UE of claim 1, wherein:
the transceiver is further configured to receive a plurality of TCI states associated with one or more of the PCIs via higher layer RRC signaling, and the processor is further configured to:
determine, from the plurality of TCI states and based on a configuration received by the UE or a fixed rule, groups of TCI states; and
associate, based on the configuration received by the UE or the fixed rule, the groups of TCI states with one or more of the PCIs, respectively, based on properties of the one or more of the PCIs.

7. The UE of claim 1, wherein the processor is further configured to:
identify, from the beam indication DCI or a media access control-control element (MAC CE), a TCI codepoint indicating first and second TCI states; and
determine to use the first and second TCI states for transmissions or receptions of channels or signals associated with first and second PCIs, respectively, from the list of PCIs.

8. A base station (BS), comprising:
a processor; and
a transceiver operably coupled with the processor, the transceiver configured to:
transmit a first physical downlink control channel (PDCCH) candidate including a first beam indication downlink control information (DCI),
transmit higher layer radio resource control (RRC) signaling including a parameter indicating a linkage between the first PDCCH candidate and a second PDCCH candidate including a second beam indication DCI, and
transmit information related to a reference PDCCH candidate,
wherein the parameter indicates that the first and second beam indication DCI include at least a same set of transmission configuration indication (TCI) states,
wherein the information indicates the reference PDCCH candidate from the first and second PDCCH candidates,
wherein the transceiver is further configured to:
transmit a list of physical cell identifiers (PCIs) via higher layer RRC signaling, the list of PCIs including a PCI other than a serving cell PCI, and
transmit a beam indication DCI including one or more TCI states and a one-bit indicator; and
wherein a value of the one-bit indicator indicates whether to use the one or more TCI states for transmissions or receptions of channels or signals associated with the serving cell PCI or the PCI other than the serving cell PCI.

9. The BS of claim 8, wherein:
the first PDCCH candidate is transmitted earlier in time than the second PDCCH candidate, or
the first PDCCH candidate is transmitted in a control resource set (CORESET) having a lower CORESET identifier (ID) than a CORESET ID of a CORESET in which the second PDCCH candidate was transmitted.

10. The BS of claim 8, wherein the information related to the reference PDCCH candidate is indicated via higher layer RRC signaling, a media access control-control element (MAC CE), or in a DCI.

11. The BS of claim 8, wherein:
the beam indication DCI included in the reference PDCCH candidate does not include a downlink (DL) assignment and the processor is further configured to identify a slot for receiving a physical uplink control channel (PUCCH) with hybrid automatic repeat request acknowledgement (HARQ-ACK) information corresponding to the beam indication DCI based on an end of a transmission of the reference PDCCH candidate, or the beam indication DCI included in the reference PDCCH candidate includes a DL assignment and the processor is further configured to identify a slot for receiving the PUCCH with HARQ-ACK information corresponding to a physical downlink shared channel (PDSCH) scheduled by the beam indication DCI based on an end of a transmission of the PDSCH.

12. The BS of claim 11, wherein one or more TCI states in the set of TCI states included in the beam indication DCI in the reference PDCCH candidate are applicable starting from a first slot that is at least K symbols after a last symbol of the PUCCH and wherein K is transmitted via higher layer RRC signaling.

13. The BS of claim 8, wherein:
the transceiver is further configured to transmit a plurality of TCI states associated with one or more of the PCIs via higher layer RRC signaling;
groups of TCI states from the plurality of TCI states are indicated based on a transmitted configuration or a fixed rule; and
the groups of TCI states are associated with one or more of the PCIs, respectively, based on properties of the one or more of the PCIs.

14. The BS of claim 8, wherein:
the transceiver is further configured to transmit a beam indication DCI or a media access control-control element (MAC CE) including a TCI codepoint that indicates first and second TCI states; and
the first and second TCI states are for transmissions or receptions of channels or signals associated with first and second PCIs, respectively, from the list of PCIs.

15. A method for operating a user equipment (UE), the method comprising:
receiving a first physical downlink control channel (PDCCH) candidate and a second PDCCH candidate including first and second beam indication downlink control information (DCI), respectively;
receiving higher layer radio resource control (RRC) signaling including a parameter indicating a linkage between the first and second PDCCH candidates;
identifying information related to a reference PDCCH candidate;
identifying, based on the parameter, that the first and second beam indication DCI include at least a same set of transmission configuration indication (TCI) states;
determining, based on the information, the reference PDCCH candidate from the first and second PDCCH candidates;
receiving a list of physical cell identifiers (PCIs) via higher layer RRC signaling, the list of PCIs including a PCI other than a serving cell PCI;
identifying a value of a one-bit indicator in a beam indication DCI including one or more TCI states; and
determining whether to use the one or more TCI states for transmissions or receptions of channels or signals associated with the serving cell PCI or the PCI other than the serving cell PCI based on the value of the one-bit indicator.

16. The method of claim 15, wherein:
the first PDCCH candidate is received earlier in time than the second PDCCH candidate, or
the first PDCCH candidate is received in a control resource set (CORESET) having a lower CORESET identifier (ID) than a CORESET ID of a CORESET in which the second PDCCH candidate was received.

17. The method of claim 15, wherein:
the beam indication DCI included in the reference PDCCH candidate does not include a downlink (DL) assignment and the method further comprises determining a slot for transmitting a physical uplink control channel (PUCCH) with hybrid automatic repeat request acknowledgement (HARQ-ACK) information corresponding to the beam indication DCI based on an end of a reception of the reference PDCCH candidate, or
the beam indication DCI included in the reference PDCCH candidate includes a DL assignment and the method further comprises determining a slot for transmitting the PUCCH with HARQ-ACK information corresponding to a physical downlink shared channel (PDSCH) scheduled by the beam indication DCI based on an end of a reception of the PDSCH.

18. The method of claim 17, further comprising applying one or more TCI states in the set of TCI states included in the beam indication DCI in the reference PDCCH candidate starting from a first slot that is at least K symbols after a last symbol of the PUCCH and wherein K is provided via higher layer RRC signaling.

* * * * *